(12) United States Patent
Urman et al.

(10) Patent No.: US 12,425,357 B2
(45) Date of Patent: Sep. 23, 2025

(54) COMMUNICATION APPARATUS GENERATING AND ELIMINATING REDUNDANT DATA PACKETS

(71) Applicant: Mellanox Technologies Ltd., Yokneam (IL)

(72) Inventors: Avi Urman, Yokneam (IL); Lior Narkis, Petah Tikva (IL); Gil Kremer, Nof Hagalil (IL); Saar Tarnopolsky, Haifa (IL); Dotan David Levi, Kiryat Motzkin (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 0 days.

(21) Appl. No.: 17/409,625

(22) Filed: Aug. 23, 2021

(65) Prior Publication Data

US 2021/0385169 A1 Dec. 9, 2021

Related U.S. Application Data

(63) Continuation-in-part of application No. 16/693,302, filed on Nov. 24, 2019, now Pat. No. 11,190,462, (Continued)

(51) Int. Cl.
*H04L 49/552* (2022.01)
*H04L 45/24* (2022.01)
(Continued)

(52) U.S. Cl.
CPC ............ *H04L 49/552* (2013.01); *H04L 45/24* (2013.01); *H04L 47/225* (2013.01); *H04L 47/32* (2013.01);
(Continued)

(58) Field of Classification Search
CPC ....... H04L 47/32; H04L 45/24; H04L 47/225; H04L 69/12; H04L 69/22
See application file for complete search history.

(56) References Cited

U.S. PATENT DOCUMENTS 6,081,907 A 6/2000 Witty et al.
6,700,871 B1 * 3/2004 Harper .................... H04L 47/10
709/225
(Continued)

FOREIGN PATENT DOCUMENTS

CN 110495211 A 11/2019
EP 3510742 B1 * 2/2022 ......... H04L 65/4084
(Continued)

OTHER PUBLICATIONS

IEEE, "IEEE Standard 754-2008 (Revision of IEEE Standard 754-1985): IEEE Standard for Floating-Point Arithmetic," Aug. 29, 2008, 70 pages.
(Continued)

*Primary Examiner* — Nicholas P Celani
(74) *Attorney, Agent, or Firm* — Davis Wright Tremaine LLP

(57) ABSTRACT

Apparatuses, systems, and techniques to eliminate redundant data packets. In at least one embodiment, a communication apparatus generates redundant data packets, and sends them in multiple packet streams. In at least one embodiment, a communication apparatus eliminates redundant data packets from received packet streams.

41 Claims, 54 Drawing Sheets

Related U.S. Application Data which is a continuation-in-part of application No. 15/473,668, filed on Mar. 30, 2017, now Pat. No. 10,516,710.

(60) Provisional application No. 62/457,919, filed on Feb. 12, 2017.

(51) Int. Cl.
| | |
|---|---|
| *H04L 47/22* | (2022.01) |
| *H04L 47/32* | (2022.01) |
| *H04L 65/403* | (2022.01) |
| *H04L 65/612* | (2022.01) |
| *H04L 65/65* | (2022.01) |
| *H04L 69/12* | (2022.01) |
| *H04L 69/22* | (2022.01) |

(52) U.S. Cl.
CPC .......... *H04L 65/403* (2013.01); *H04L 65/612* (2022.05); *H04L 65/65* (2022.05); *H04L 69/12* (2013.01); *H04L 69/22* (2013.01)

(56) References Cited

U.S. PATENT DOCUMENTS

| | | | | |
|---|---|---|---|---|
| 8,549,135 | B1* | 10/2013 | Yazdani | H04L 47/35 709/224 |
| 9,477,677 | B1* | 10/2016 | Wang | G06F 16/1752 |
| 2004/0013117 | A1* | 1/2004 | Hendel | H04L 49/901 370/474 |
| 2006/0069773 | A1 | 3/2006 | Clark | |
| 2008/0019368 | A1* | 1/2008 | Liu | H04L 12/4641 370/392 |
| 2008/0123573 | A1* | 5/2008 | Jiang | H04L 1/1851 370/310 |
| 2009/0262743 | A1* | 10/2009 | Uyehara | H04L 43/08 370/394 |
| 2011/0051727 | A1* | 3/2011 | Cai | H04L 45/24 370/390 |
| 2011/0078783 | A1* | 3/2011 | Duan | H04L 12/4641 714/49 |
| 2013/0132603 | A1* | 5/2013 | Cohen | H04L 47/6225 709/231 |
| 2013/0166905 | A1 | 6/2013 | Wollbrand et al. | |
| 2014/0269893 | A1* | 9/2014 | Parikh | H04N 21/23805 375/240 |
| 2014/0297067 | A1* | 10/2014 | Malay | G05D 1/0094 701/4 |
| 2015/0148003 | A1 | 5/2015 | Piro, Jr. et al. | |
| 2015/0236967 | A1* | 8/2015 | Rozenberg | H04L 65/765 370/235 |
| 2016/0350151 | A1* | 12/2016 | Zou | H04L 45/586 |
| 2017/0070772 | A1* | 3/2017 | Nakamura | H04N 21/4425 |
| 2018/0069908 | A1* | 3/2018 | Buchanan | H04L 12/18 |
| 2018/0070126 | A1* | 3/2018 | Martel | H04L 65/612 |
| 2019/0045119 | A1* | 2/2019 | Stokking | H04N 5/23238 |
| 2020/0092229 | A1 | 3/2020 | Levi et al. | |
| 2020/0280750 | A1* | 9/2020 | Nakamura | H04L 65/764 |
| 2022/0014302 | A1* | 1/2022 | Hurwitz | H04N 21/44227 |

FOREIGN PATENT DOCUMENTS

| | | | | |
|---|---|---|---|---|
| EP | 3510727 B1 * | 3/2022 | | H04L 12/18 |
| JP | 2006505166 A | 2/2006 | | |
| WO | 2013067377 A2 | 5/2013 | | |
| WO | WO-2015196196 A1 * | 12/2015 | | H04L 45/74 |
| WO | WO-2018046703 A1 * | 3/2018 | | H04L 65/4084 |

OTHER PUBLICATIONS

IEEE, "IEEE Standard 802.1CB, IEEE Standard for Frame Replication and Elimination for Reliability," IEEE Computer Society, 2017, 102 pages.
IEEE, "IEEE Standard for 802.3," IEEE Standard for Ethernetn, IEEE Computer Society, Dec. 28, 2012, 634 pages.
Partial European Search Report for Application No. 22191665.3, mailed Jan. 12, 2023, 10 pages.
SMPTE, "Seamless Protection Switching of SMPTE ST 2022 IP Datagrams," SMPTE Standard, 2022, 13 pages.
Wikipedia, "IEEE 802.11," Wikipedia the Free Encyclopedia, https://en.wikipedia.org/wiki/IEEE_802.11, most recent edit Sep. 20, 2020 [retrieved Sep. 22, 2020], 15 pages.
Wikipedia, "IEEE 802.5," Wikepedia The Free Encyclopedia, https://en.wikipedia.org/wiki/Token_Ring, Jan. 14, 2020, 12 pages.
Extended European Search Report for Application No. 22191665.3, mailed Mar. 14, 2023, 13 pages.
Office Action for European Application No. 22191665.3, mailed Feb. 2, 2024, 9 pages.
Office Action for Japanese Application No. 2022-108135, mailed Feb. 8, 2024, 9 pages.
Office Action for European Application No. 22191665.3, mailed Aug. 14, 2024, 5 pages.
Office Action for Chinese Application No. 202210966735.4, mailed Mar. 24, 2025, 13 pages.
Office Action for European Application No. 22191665.3, mailed Mar. 26, 2025, 6 pages.

* cited by examiner

COMMUNICATION APPARATUS GENERATING AND ELIMINATING REDUNDANT DATA PACKETS

TECHNICAL FIELD

At least one embodiment pertains to generating and eliminating redundant data packets. For example, at least one embodiment pertains to communication apparatuses that generate redundant data packets, send the redundant data packets in multiple packet streams, and eliminate redundant data packets from received packet streams. By way of another example, at least one embodiment pertains to communication apparatuses that implement various novel techniques described herein.

BACKGROUND

Devices (e.g., computers, autonomous vehicles, and the like) commonly use high-speed methods to stream data packets across a network. Such high-speed methods typically transmit packets using a non-reliable protocol in which a receiver device does not send acknowledgments to a sender device and/or the sender device does not retransmit lost or corrupted packets to the receiver device. To help increase the probability all of the packets are received by the receiver device, the sender device may transmit the packets and copies of the packets in multiple parallel, streams of the data to the receiver device. Because the data streams are transmitted over multiple different paths through the network, the likelihood that at least one copy of each packet (or an equivalent packet) is received by the receiver device is increased.

Even when multiple parallel, streams of the data are sent to the receiver device, there is still no guarantee that all of the packets of a particular stream will reach the receiver device, or that the packets will arrive at the receiver device in the same order in which the packets were transmitted. Therefore, the receiver device must reconstruct the data transmitted by storing, reordering, processing, and interleaving packets from the two (or more) received data streams. This method provides reliable data transmission, but uses a significant amount of memory, memory bandwidth, and connection (e.g., a peripheral component interconnect express ("PCIe") bus) bandwidth, as well as placing a heavy processing burden on the processor of the sender device, which increases data latency and can limit the data throughput and/or the performance of the entire system.

DETAILED DESCRIPTION

Figure 1:
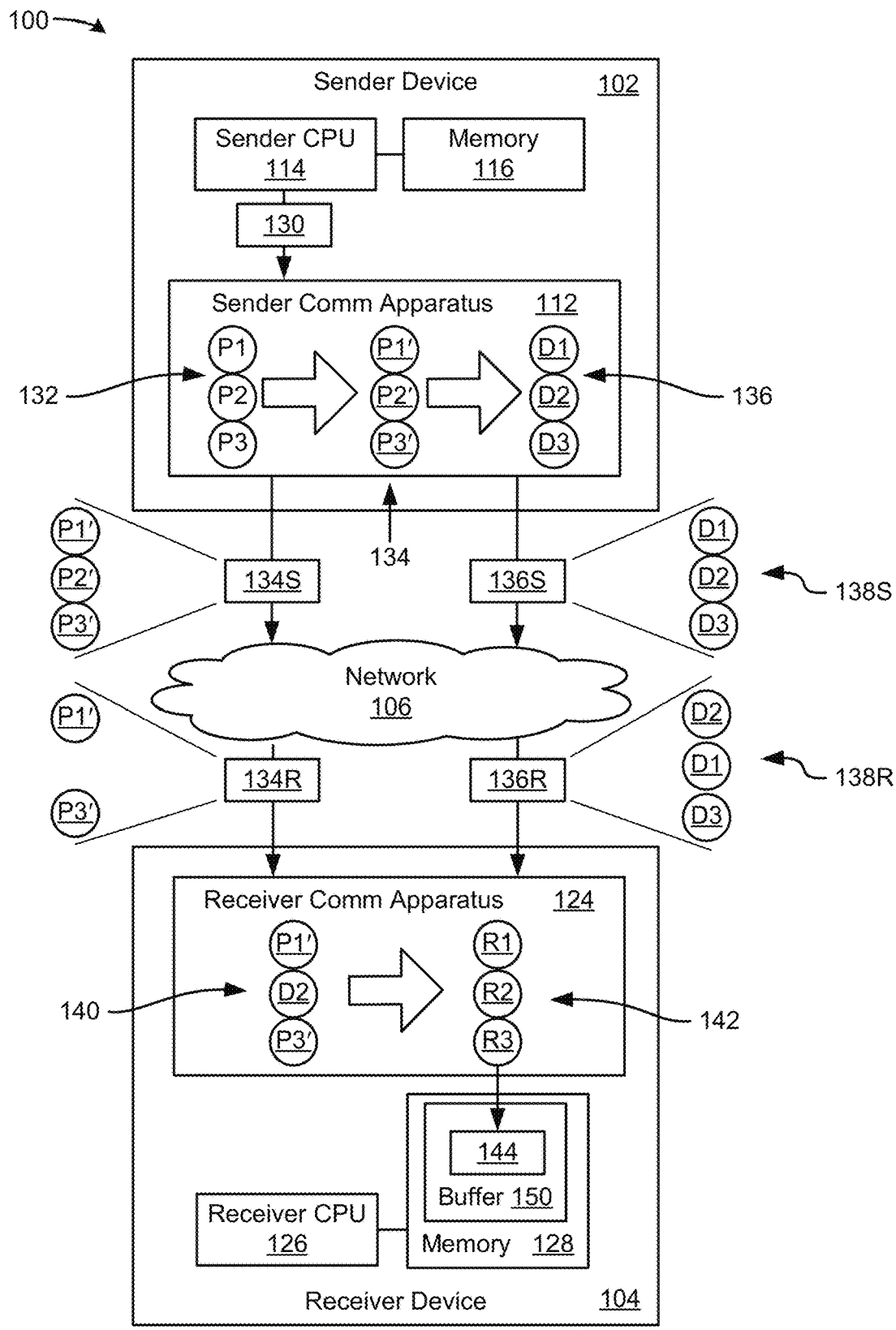
FIG. 1 illustrates an example of a system that includes a sender device connected to a receiver device by a network, in accordance with at least one embodiment.

FIG. 1 illustrates an example of a system 100 that includes a sender device 102 connected to a receiver device 104 by a network 106, in accordance with at least one embodiment. One or both of the sender and receiver devices 102 and 104 may be implemented by one or more computing devices, a virtual machine, an autonomous vehicle, a video camera, broadcast television equipment, one or more sensor devices, and the like. The sender device 102 includes a sender communication apparatus 112, a sender processor 114 (e.g., a central processing unit ("CPU")), and sender memory 116. The receiver device 104 includes a receiver communication apparatus 124, a receiver processor 126 (e.g., a CPU), and receiver memory 128. The sender and receiver communication apparatuses 112 and 124 may each be implemented as a network interface controller ("NIC"), a network interface card, a network adapter, a Local Area Network ("LAN") adapter, a physical network interface, a host channel adapter ("HCA"), an Ethernet NIC, and the like. Optionally, the sender communication apparatus 112 and/or the receiver communication apparatus 124 may be connected to multiple host devices and may send and receive packet flows or streams for each host device simultaneously.

The sender processor 114 sends a message 130 or a link to the message 130 to the sender communication apparatus 112. The message 130 may include a plurality of packets 132 or may be packetized by the sender communication apparatus 112 into the plurality of packets 132. The plurality of packets 132 has an original order. In FIG. 1, the plurality of packets 132 is illustrated as including packets P1-P3 but the plurality of packets 132 may include any number of packets. The sender communication apparatus 112 modifies the plurality of packets 132 to create a plurality of modified packets 134 and copies or duplicates the plurality of modified packets 134 to create a plurality of duplicate packets 136. Together, the plurality of modified packets 134 and the plurality of duplicate packets 136 are sent as packets 138S to the receiver communication apparatus 124. While in the embodiment illustrated, the sender communication apparatus 112 is illustrated as duplicating the plurality of modified packets 134 into the single plurality of duplicate packets 136, in alternate embodiments, the sender communication apparatus 112 may duplicate the plurality of modified packets 134 two or more times to create multiple series of duplicate packets. In the embodiment illustrated, the packets P1-P3 are modified to create the packets P1'-P3', respectively, and the modified packets P1'-P3' are copied to create duplicate packets D1-D3, respectively. Then, the sender communication apparatus 112 transmits the sent packets 138S, which include a plurality of modified packets 134S and a plurality of duplicate packets 136S sent separately over different communication paths through the network 106 to the receiver device 104. In other words, the sender communication apparatus 112 transmits the sent packets 138S in two or more separate streams to the receiver communication apparatus 124.

The receiver communication apparatus 124 receives packets 138R that include a received plurality of modified packets 134R and a received plurality of duplicate packets 136R. In other words, the receiver communication apparatus 124 receives two or more separate streams including the received packets 138R from the sender communication apparatus 112. As will be described below, the packets 138S each include a packet identifier and the received packets 138R may include two or more packets with the same packet identifier. The receiver communication apparatus 124 will keep at most a single packet (e.g., the first received packet) having each unique packet identifier and may drop the rest of the received packets 138R. In at least one embodiment, the payload may include and/or function as the packet identifier. In such embodiments, the receiver communication apparatus 124 will keep at most a single packet (e.g., the first received packet) having each payload and may drop the rest of the received packets 138R.

The received plurality of modified packets 134R may differ from the sent plurality of modified packets 134S because one or more packets may have been lost or corrupted during transport. Further, the sent plurality of modified packets 134S has a first sent order and the received plurality of modified packets 134R has a first received order. The order of the sent plurality of modified packets 134S may change during transport such that the first received order is different from the first sent order. In the example illustrated, the received plurality of modified packets 134R include packets P1' and P3' received in that order with the packet P2' having been lost during transport. Similarly, the received plurality of duplicate packets 136R may differ from the sent plurality of duplicate packets 136S because one or more packets may have been lost or corrupted during transport. Further, the sent plurality of duplicate packets 136S has a second sent order and the received plurality of duplicate packets 136R has a second received order. The order of the sent plurality of duplicate packets 136S may change during transport such that the second received order is different from the second sent order. In the example illustrated, the received plurality of duplicate packets 136R includes packets D2, D1, and D3 received in that order with the packet D3 having been corrupted during transport.

As mentioned above, the receiver communication apparatus 124 keeps at most a single instance of each of the received packets 138R to obtain a plurality of received modified packets 140, and discards the rest of the received packets 138R. For example, the receiver communication apparatus 124 may keep the first uncorrupted instance of each of the received packets 138R. Optionally, the receiver communication apparatus 124 reorders the single instances of the received packets 138R to match as closely as possible the original order of the plurality of packets 132. For example, the receiver communication apparatus 124 may treat each packet individually and build an ordered data set (e.g., implemented as a sliding window). The ordered data set expects a predetermined number of packets having a set of particular packet identifiers. The receiver communication apparatus 124 may pass a first packet received with each of the particular packet identifiers, and drop or ignore subsequent packets received with duplicate packet identifiers or having a packet identifier that is not one of the particular packet identifiers. Each of the first packets received is placed in a packet location within the ordered data set according to the original order. The original order may be indicated by the packet identifier. For example, the packet identifiers may be sequential numeric values that each specify or correspond to a position within the original order and a location in the ordered data set. A particular location in the ordered data set may be empty if no packets are received with the packet identifier that corresponds to the particular location. As packets are received, the first packet with one of the particular packet identifiers is placed in the location in the ordered data set corresponding to the packet identifier of the packet. In the example illustrated, the receiver communication apparatus 124 keeps the packets P1', D2, and P3' as the plurality of received modified packets 140.

The ordered data set (e.g., implemented as a sliding window) may not have enough locations for all of the first packets that will be received by the receiver communication apparatus 124. Thus, the ordered data set may be at least partially emptied (e.g., after a predetermined number of packets are received) and reset to expect a subsequent set of particular packet identifiers. In this manner, the receiver communication apparatus 124 orders the first packets as they are received and creates the received modified packets 140. For example, the ordered data set may be expecting a set of particular packet identifiers including values 7-12. When the ordered data set has received the first packet having a minimum one of the particular packet identifier values (e.g., the packet identifier value 7), that packet may be removed from the order data set, placed in the received modified packets 140, and the ordered data set reset to expect particular packet identifiers including values 8-13.

Then, the receiver communication apparatus 124 removes the modification from the plurality of received modified packets 140 to obtain a plurality of reconstructed packets 142. In the example illustrated, the plurality of reconstructed packets 142 include packets R1-R3. The receiver communication apparatus 124 reconstructs a reconstructed message 144 in a buffer 150 stored in the receiver memory 128. The reconstructed message 144 includes information from the message 130. If at least one uncorrupted copy of each packet of the sent packets 138S is received, the reconstructed message 144 may be an identical copy of the message 130. Thus, in at least one embodiment, the plurality of reconstructed packets 142 are identical to the plurality of packets 132. In at least one embodiment, the receiver communication apparatus 124 may depacketize the plurality of reconstructed packets 142 to create the reconstructed message 144.

Figure 2:
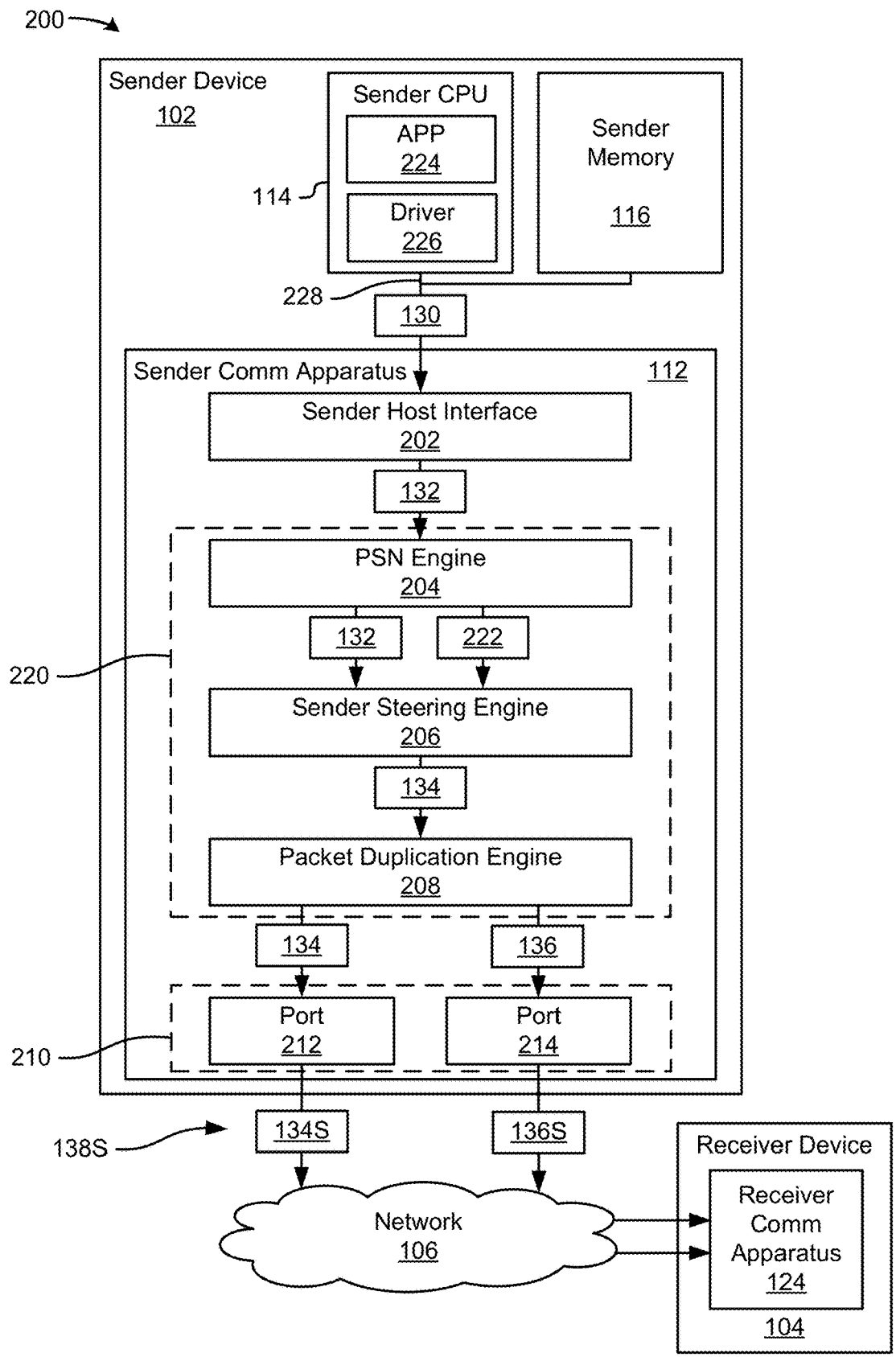
FIG. 2 illustrates example components of a sender communication apparatus, in accordance with at least one embodiment.

FIG. 2 illustrates example components of the sender communication apparatus 112, in accordance with at least one embodiment. The sender communication apparatus 112 may be implemented by packet processing circuitry or other hardware that performs the functions attributed to the sender communication apparatus 112. Referring to FIG. 2, the sender communication apparatus 112 includes a sender host interface 202, a packet identifier engine 204 (e.g., a packet sequence number ("PSN") engine), a sender steering engine 206, a packet duplication engine 208, and a sender network interface 210 connected to the network 106. The sender network interface 210 includes a plurality of sender connections 212 and 214 (e.g., ports) each connected to the network 106.

The sender processor 114 executes instructions, including, in this example, a data processing application 224 (e.g., a video processing application) and a driver 266 for controlling operation of the sender communication apparatus 112. The instructions may be stored by the sender memory 116. The sender host interface 202 is connected to the sender processor 114 and the sender memory 116 by a sender bus 228 (e.g., a PCIe bus). The sender host interface 202 receives the message 130 over the sender bus 228 from the sender processor 114, and packetizes the message 130 into the plurality of packets 132 in accordance with one or more desired transport protocols (e.g., IEEE 802.1CB, SMPTE 2022-7, and the like). Depending upon the implementation details, the plurality of packets 132 may include duplicate packets.

Figure 3:
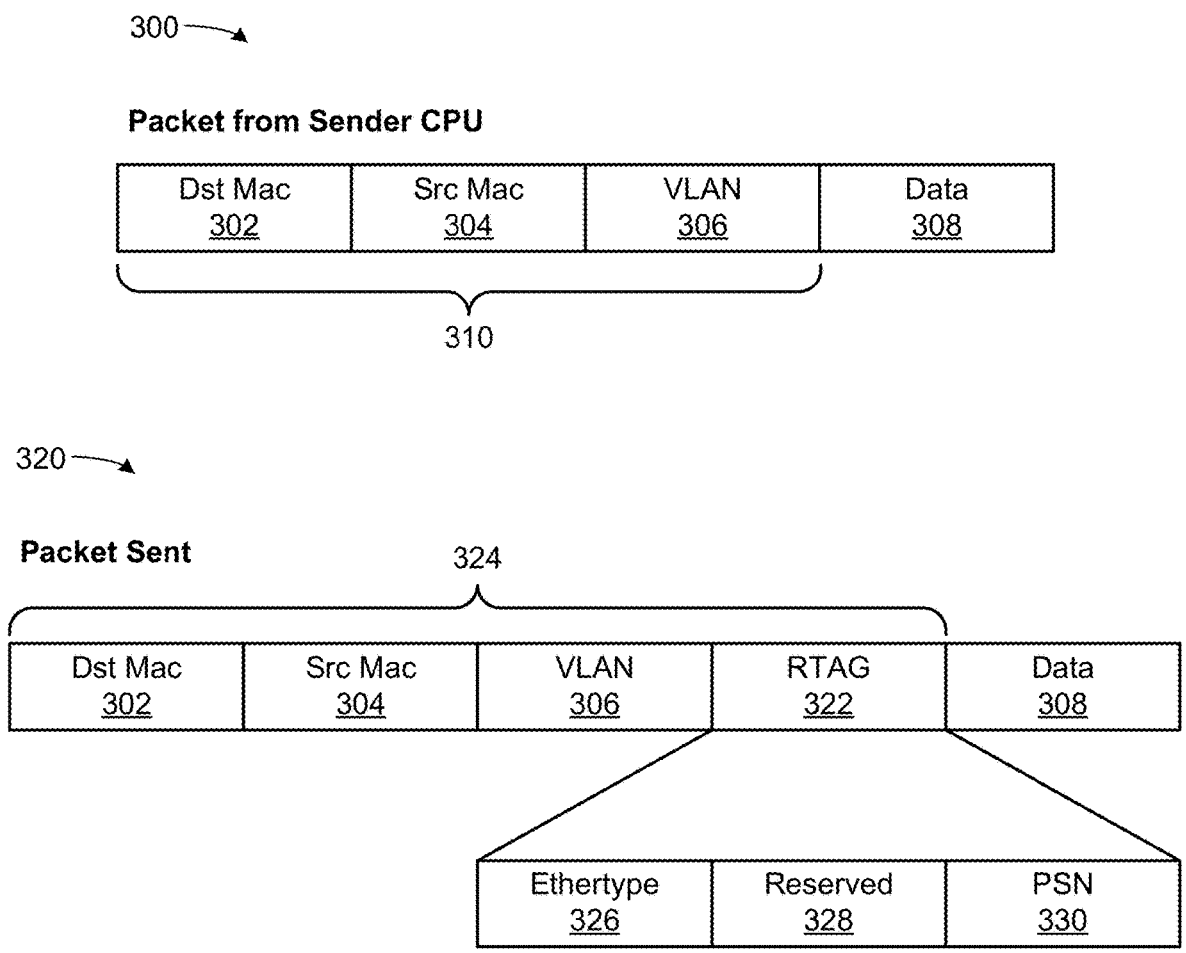
FIG. 3 illustrates example packet formats, in accordance with at least one embodiment.

FIG. 3 illustrates example packet formats 300 and 320, in accordance with at least one embodiment. The packet formats 300 and 320 are non-limiting examples of packet formats that comply with the IEEE 802.1CB standard. The format 300 may be used to create each of the plurality of packets 132. Referring to FIG. 3, the format 300 may include a destination address field 302, a source address field 304, a virtual local area network ("VLAN") field 306, and a data or payload field 308. Together, the destination address field 302, the source address field 304, and the VLAN field 306 are a packet header 310 (e.g., a transport protocol specific packet header). The packet header 310 identifies a unique flow or packet stream. The destination address field 302 and the source address field 304 may each store a Media Access Control ("MAC") address.

Packet processing circuitry 220 is coupled between the sender host interface 202 and the sender network interface 210. For the sake of simplicity, FIG. 2 illustrates only certain specific elements of the packet processing circuitry 220 (e.g., the packet identifier engine 204, the sender steering engine 206, and the packet duplication engine 208) that are used to create the plurality of modified packets 134 and the plurality of duplicate packets 136. But, these elements may be combined with other components used to transmit and receive packets for other purposes and in accordance with other types of protocols. The packet processing circuitry 220 is typically implemented in hardware logic circuits within one or more integrated circuit chips. The logic may be hard-wired or programmable, or a combination of hard-wired and programmable elements. Additionally or alternatively, certain functions of the packet processing circuitry 220 may be implemented in software or firmware executed by an embedded microprocessor or microcontroller.

The sender host interface 202 forwards the plurality of packets 132 to the packet identifier engine 204 (e.g., an Internet Protocol Security ("IPsec") engine), which provides a plurality of packet identifiers 222 to the sender steering engine 206 along with the plurality of packets 132. The plurality of packet identifiers 222 include a unique packet identifier for each of the plurality of packets 132. The packet identifier engine 204 may generate the packet identifiers by incrementing, for each packet, a previous packet number (starting from a base or initial packet identifier) by an increment amount (e.g., one).

The sender steering engine 206 classifies relevant packets and performs actions on the packets according to configurable rules and tables. The sender steering engine 206 determines the path of the packets through the packet processing circuitry 220. The sender steering engine 206 may add one or more transport protocol specific headers and a Redundancy Tag ("RTAG") or redundancy header to each of the plurality of packets 132 in accordance with the rules to thereby modify the plurality of packets 132 and create the plurality of modified packets 134. The redundancy header of each of the plurality of modified packets 134 includes the packet identifier for the modified packet.

Returning to FIG. 2, in many real time streaming protocols, such as the Real-time Transport Protocol ("RTP") and IEEE 802.1CB, each of the packets in each transmitted stream contains a respective sequence number, such as a PSN, which can be used at the receiver device 104 to detect missing packets and restore the packet data to the transmit order. At the receiver device 104, these reordering and reconstruction functions may be performed by the receiver communication apparatus 124, instead of the receiver processor 126 (see FIGS. 1, 4, and 8). Although the figures illustrate a single data communication, which is sent in in multiple streams, the receiver device 104 may receive and process many such data communications concurrently from one or more different sources. By way of a non-limiting example, the message 130 may include one or more video frames that are packetized by the sender communication apparatus 112 into video packets. In such embodiments, the plurality of packets 132 are the video packets, and the plurality of packet identifiers 222 may be implemented as PSNs (e.g., generated in accordance with IEEE 802.1CB and) assigned to the video packets and stored in the packet identifier fields 330 (see FIG. 3) of the plurality of modified packets 134. Further, the video frame(s) may be divided into slices with each slice being stored in the payload field 308 (see FIG. 3) of one of the video packets. The slices may each have a predefined, fixed size. By way of other non-limiting examples, the plurality of packet identifiers 222 may be implemented as other types of sequence numbers (e.g., generated in accordance with other standards) that may be stored in the packet identifier field 330 of the packet header 324 (see FIG. 3), and each payload field 308 may contain a slice of a data segment having a predefined, fixed size per slice.

The sender steering engine 206 forwards the plurality of modified packets 134 to the packet duplication engine 208. The packet duplication engine 208 duplicates each modified packet in the plurality of modified packets 134 a predetermined number of times and transmits each of the plurality of modified packets 134S and its duplicate(s) (e.g., the plurality of duplicate packets 136S) to the receiver communication apparatus 124 via the plurality of sender connections 212 and 214. Thus, the sender communication apparatus 112 sends a plurality of packet streams, one each over the plurality of sender connections 212 and 214, with each of the plurality of packet streams transmitting the message 130. The plurality of sender connections 212 and 214 (e.g., ports) may have different addresses, which serve as the respective source addresses for the packet streams. Alternatively, the streams may be sent through the same port. Optionally, the packet processing circuitry 220 may include an encryption component that encrypts the plurality of modified packets 134 before they are duplicated by the packet duplication engine 208.

Referring to FIG. 3, the modified format 320 may be used to create each of the plurality of modified packets 134 and the plurality of duplicate packets 136 may also each have the format 320. The modified format 320 may include the destination address field 302, the source address field 304, the VLAN field 306, the payload field 308, and a redundancy header 322 (e.g., a RTAG header). Together, the destination address field 302, the source address field 304, the VLAN field 306, and the redundancy header 322 are a modified packet header 324. As mentioned above, the values stored in the destination address field 302, the source address field 304, and the VLAN field 306 identify a unique flow or packet stream. Thus, at least one of these fields will be different in the modified packet header 324 of the plurality of modified packets 134R and the plurality of duplicate packets 136R. The packet duplication engine 208 modifies the source address stored in the source address field 304, the destination address stored in the destination address field 302, and/or the VLAN identifier stored in the VLAN field 306 in the plurality of duplicate packets 136 so that the plurality of modified packets 134 and the plurality of duplicate packets 136 are sent along different paths through the network 106 and the modified packet header 324 is different in the plurality of duplicate packets 136R than in the plurality of modified packets 134R. In the embodiment illustrated, the redundancy header 322 includes an EtherType field 326, a reserved portion 328, and the packet identifier field 330 (e.g., for storing a packet sequence number ("PSN") value). The EtherType field 326 may identify a protocol encapsulated in the payload field 308 and may be used by the receiver device 104 (see FIGS. 1 and 4) to determine how to process the payload.

The packet processing circuitry 220 may reduce or eliminate jitter (or delay) between two or more packets having the same packet identifier because the plurality of duplicate packets 136R are not created until just before they sent to the receiver device 104. Thus, the sent packets 138S may be sent over the plurality of sender connections 212 and 214 (e.g., ports) and delays between those packets having the same packet identifier will be low or minimal (e.g., at most 100 nanoseconds between packets having the same packet identifier).

Figure 4:
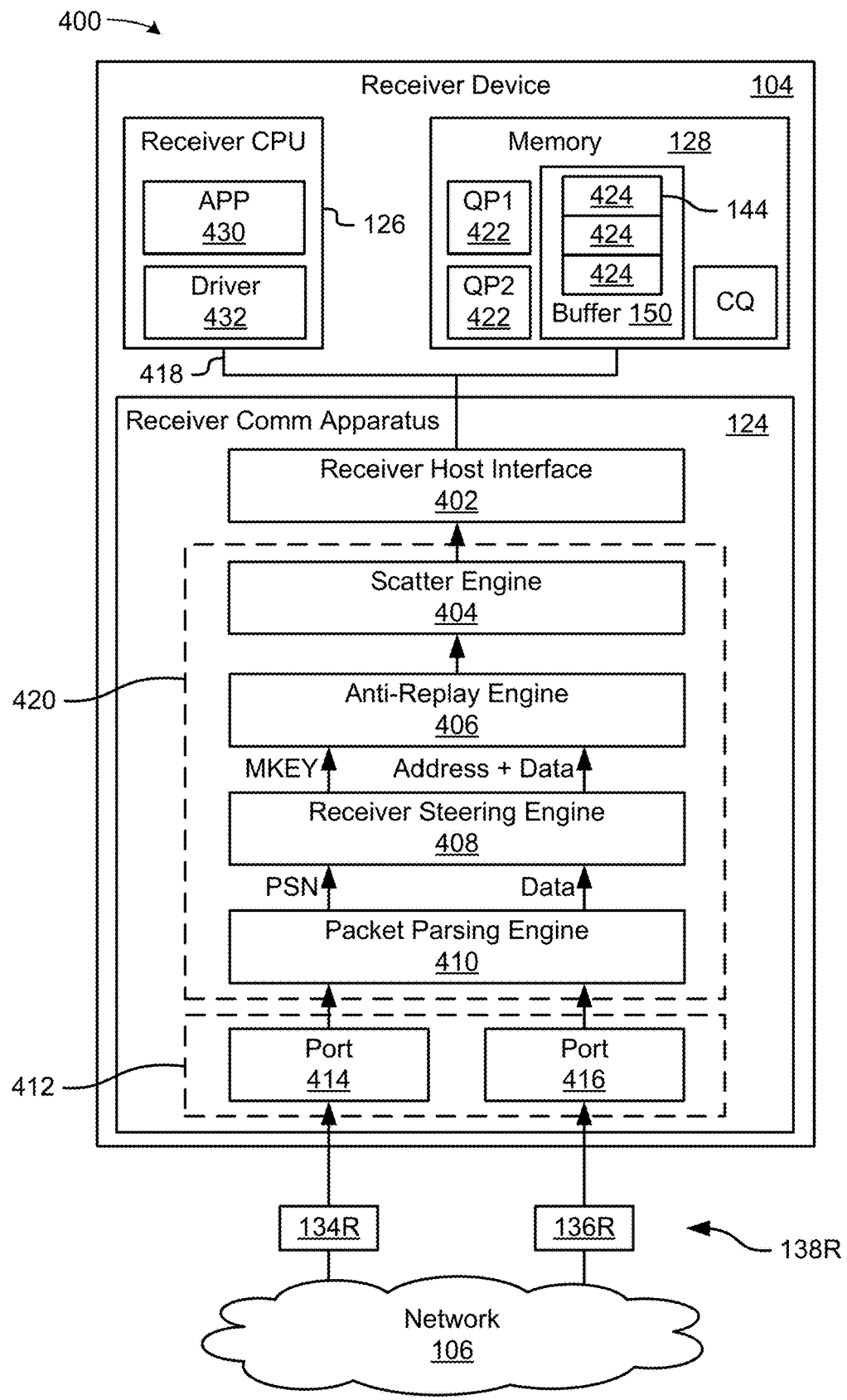
FIG. 4 illustrates example components of a receiver communication apparatus, in accordance with at least one embodiment.

FIG. 4 illustrates example components of the receiver communication apparatus 124, in accordance with at least one embodiment. The receiver communication apparatus 124 may be implemented by packet processing circuitry or other hardware that performs the functions attributed to the receiver communication apparatus 124. The receiver processor 126 executes instructions, including, in this example, a data processing application 430 (e.g., a video processing application) and a driver 432 for controlling operation of the receiver communication apparatus 124. The instructions may be stored by the receiver memory 128.

Referring to FIG. 4, the receiver communication apparatus 124 includes a receiver host interface 402, a scatter engine 404, an anti-replay engine 406, a receiver steering engine 408, a packet parsing engine 410, and a receiver network interface 412 connected to the network 106. The receiver host interface 402 is connected by a receiver bus 418 (e.g., a PCIe bus) to the receiver processor 126 and the receiver memory 128.

The receiver network interface 412 includes a plurality of receiver connections 414 and 416 (e.g., ports) each connected to the network 106. The packet streams (the plurality of modified packets 134R and the plurality of duplicate packets 136R) are each received by the receiver network interface 412. For example, the packet streams may be received one each by the plurality of receiver connections 414 and 416. The receiver host interface 402 is connected to the receiver network interface 412, which is connected to the network 106. The plurality of receiver connections 414 and 416 (e.g., ports) may have different addresses, which serve as the respective destination addresses for the packet streams. For example, the receiver connections 414 and 416 may receive the plurality of modified packets 134R and the plurality of duplicate packets 136R, respectively. Alternatively, the streams may be received through the same port.

Packet processing circuitry 420 is coupled between the receiver host interface 402 and the receiver network interface 412. For the sake of simplicity, FIG. 4 illustrates only certain specific elements of the packet processing circuitry 420 (e.g., the scatter engine 404, the anti-replay engine 406, the receiver steering engine 408, and the packet parsing engine 410) that are used to create the reconstructed message 144. But, these elements may be combined with other components used to transmit and receive packets for other purposes and in accordance with other types of protocols. The packet processing circuitry 420 is typically implemented in hardware logic circuits within one or more integrated circuit chips. The logic may be hard-wired or programmable, or a combination of hard-wired and programmable elements. Additionally or alternatively, certain functions of the packet processing circuitry 420 may be implemented in software or firmware executed by an embedded microprocessor or microcontroller. The packet processing circuitry 420 has a separate instance for each stream the packet processing circuitry 420 receives and processes.

The receiver network interface 412 forwards the received packets 138R to the packet parsing engine 410. The packet parsing engine 410 (e.g., a FlexParser) is a hardware engine that works alongside with a regular or native parser (not shown). The packet parsing engine 410 parses flexible packet formats (e.g., only partially unknown at tapeout) such that steering and other stateless offloads may be performed (e.g., by the receiver steering engine 408) on those packets. For each packet stream, the packet parsing engine 410 (e.g., a FlexParser) parses the packets, identifies those packets that include the redundancy header 322 (see FIG. 3), and forwards them to the receiver steering engine 408. Thus, the packet parsing engine 410 identifies those packets with the redundancy header 322, which includes the packet identifier field 330 storing the packet identifier (e.g., PSN).

To process the received packets 138R, the packet processing circuitry 420 reads and makes use of information posted in an appropriate work queue 422 in the receiver memory 128 by the driver 432 executing on the receiver processor 126. This information enables packet parsing logic of the packet parsing engine 410 to locate and extract the packet identifier (e.g., PSN) stored in the packet identifier field 330 (see FIG. 3) and a payload 424 (e.g., slice) stored in the payload field 308 (see FIG. 3) from each of the received packets 138R.

The driver 432 creates a respective work queue 422 (conventionally referred to as a queue pair, or QP) for the received packets 138R. For each segment in the incoming streams (such as a video frame), the driver 432 posts a corresponding work item (referred to as a work queue element, or WQE) in the appropriate work queue 422 that points to the buffer 150, which will receive the data in the segment. In some embodiments, this functionality is implemented as follows:

Upon receiving a control message from the sender device 102 indicating that the streams (e.g., the sent plurality of modified packets 134S and the sent plurality of duplicate packets 136S) are to be initiated, the driver 432 creates a QP for the flows or streams, and specifies the following parameters, for example, in the QP context in the receiver memory 128, to be accessed by the receiver communication apparatus 124 via the receiver bus 418:
Packet size;
Header size;
Range of expected packet sequence numbers in the segment;
PSN offset within the packet header; and
Size and offset of the payload data (excluding the frame checksum that follows the data).
In some embodiments, for every segment (which may be communicated in tens, hundreds, or even thousands of IP packets), the driver 432 posts a WQE in the queue 422 containing the following information, to be accessed by the receiver communication apparatus 124:
An initial packet identifier (e.g., PSN) for the segment (represented by a variable "X"); and
An initial or base address (represented by a variable "A") for the buffer 150 used to reconstruct the segment.
The WQE thus specifies the location and contents of the buffer 150, which is divided into slices or payloads 424 of the payload size indicated by the QP context. In some implementations, the WQE contains a memory key ("MKEY"), to be used by the receiver communication apparatus 124 in accessing the buffer 150. Alternatively, the above information can be included in the QP context, which points to a cyclic buffer to which the receiver communication apparatus 124 will write the payloads 424 in succession (thus relieving the software of the burden of continually allocating buffers and posting WQEs).
The driver 432 recognizes the first and second streams and associates them with the same QP.

The receiver steering engine 408 classifies and performs actions on packets according to configurable rules and tables. The receiver steering engine 408 determines the path of the packets through the packet processing circuitry 420. The receiver steering engine 408 identifies the packet identifier inside the redundancy header 322, and routes the packet identifier and associated payload to the anti-replay engine 406.

The anti-replay engine 406 provides anti-replay protection (e.g., as part of a security encryption pipeline), which is a protocol used to establish secure connection between two nodes (e.g., the sender and receiver devices 102 and 104) in the network 106. The anti-replay engine 406 may help prevent a bad actor from injecting packets into a packet stream or making changes to existing packets within the packet stream. The anti-replay engine 406 may help prevent a bad actor from effecting a denial of service attack, in which the bad actor attempts to overwhelm or flood the receiver device 104 with a large number of identical packets. The protocol implemented by the anti-replay engine 406 specifies when a connection is established between the sender and receiver devices 102 and 104, a base or initial packet identifier (e.g., PSN) is established. The protocol also specifies that successive packets are assigned and transmitted with packet identifiers (e.g., PSNs) incremented from that initial packet identifier (represented by the variable "X") and that the anti-replay engine 406 evaluates packets received within a sliding window to determine which packets should be passed and which packets should be discarded. For example, if the size of the sliding window is set to ten packets, the sliding window is expecting packet identifier values 1-10, the anti-replay engine 406 receives ten packets in this order [1, 2, 3, 4, 5, 6, 7, 9, 10, 11] within the sliding window, and the anti-replay engine 406 receives the eighth packet outside the sliding window, the anti-replay engine 406 will discard the eighth packet. Alternatively, the eighth packet may be stored in an error queue and processed by instructions executed by the receiver processor 126. As mentioned above, the packet processing circuitry 420 has a separate instance for each stream the packet processing circuitry 420 receives and processes. Therefore, the anti-replay engine 406 has a separate instance and sliding window for each stream. The anti-replay engine 406 may combine these separate sliding windows into a combined sliding window so that only one packet associated with each unique packet identifier is passed by the anti-replay engine 406. The size of the separate and/or combined sliding windows may be a parameter value set by a user. For example, the user may enter the size of the separate and/or combined sliding windows into a graphical user interface (not shown) generated by the receiver device 104 and displayed by the receiver device 104 and/or a display device connected to the receiver device 104. Thus, the anti-replay engine 406 determines whether to pass or discard each packet based at least in part on the packet identifier so that at most a single packet including each unique value of the packet identifier is passed to the scatter engine 404. The modified format 320 used by the received packets 138R causes those packets to appear to the anti-replay engine 406 as a normal packet and the anti-replay engine 406 will track them and eliminate duplicates in the same manner the anti-replay engine 406 will eliminate duplicate packets received from a bad actor or malicious packet source. Optionally, the packet processing circuitry 420 may include a decryption component that decrypts the received packets 138R before they are processed by the anti-replay engine 406.

The scatter engine 404 uses the packet identifier (e.g., PSN), together with the base address (represented by the variable "X") of the buffer 150, to map each payload 424 (e.g., slice) to a respective address in the buffer 150, and thus to write the data payloads 424 to the appropriate addresses via the receiver network interface 412. In other words, the scatter engine 404 determines a correct memory location or address for the packet's payload in the reconstructed message 144 stored in the receiver memory 128. The scatter engine 404 forwards the memory address and packet payload to the receiver host interface 402, which transmits them to the receiver processor 126 and/or the receiver memory 128 for storage in the reconstructed message 144 stored in the receiver memory 128. The system 100 may help reduce the load on the receiver bus 418 by eliminating duplicate packets inside the receiver communication apparatus 124 and sending only one copy of each packet over the receiver bus 418. Thus, the system 100 (see FIG. 1) helps ensure that only data reconstructed from a single set of packets is sent on the receiver bus 418. The receiver communication apparatus 124 notifies the receiver processor 126 when the reconstructed message 144 is complete.

In some embodiments, the receiver processor 126 allocates the single buffer 150 based on the expected segment size and data rate. These stream parameters may be preset or sent in control messages over the network 106 between the sender device 102 and the receiver device 104. In such embodiments, the packet sizes may be fixed and known to the receiver processor 126. Each transmitted packet is labeled with a successive packet identifier (e.g., PSN), as provided by RTP or another suitable protocol.

Hardware logic of the receiver communication apparatus 124 checks data integrity, optionally reorders packets, and eliminates redundant data, using the known packet data sizes and the plurality of packet identifiers 222 (see FIG. 2). Thus, the receiver communication apparatus 124 writes the data payloads 424 to the proper locations in the allocated buffer 150, in accordance with the transmit order (and irrespective of the receive order), while discarding the data from redundant packets. The process of packet reception and reordering may thus be entirely transparent to the receiver processor 126, which may deal only with complete data segments. Assuming the receiver communication apparatus 124 is able to receive data from the network 106 at wire speed, the latency and throughput of video data transfer at the receiver device 104 are limited only by the processing and bus access rates of the receiver communication apparatus 124. Thus, the system 100 (see FIG. 1) may maximize data bandwidth, and/or substantially reduce the processing load, memory footprint, and power consumption of the receiver processor 126.

Figure 5:
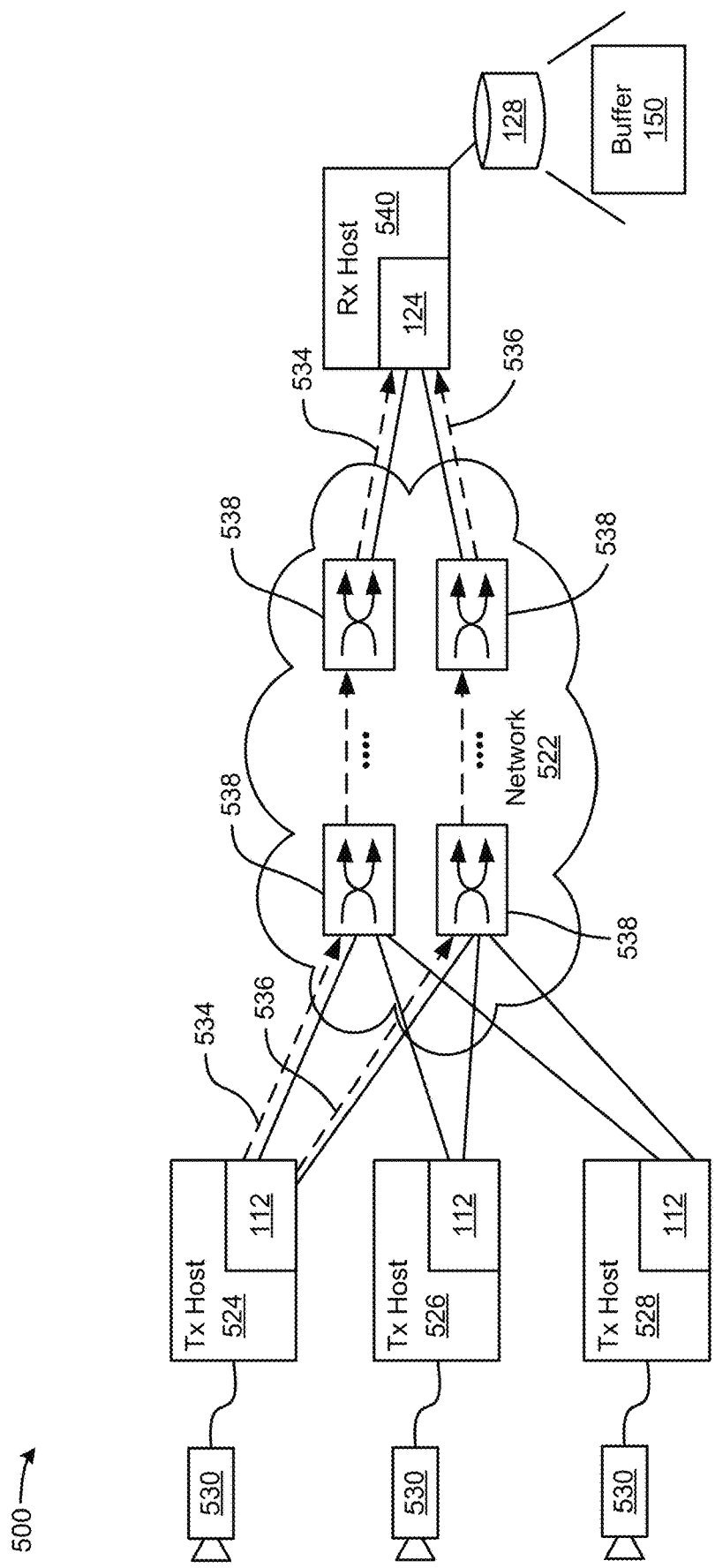
FIG. 5 illustrates a block diagram that schematically illustrates an example data communication system, in accordance with at least one embodiment.
Figure 6:
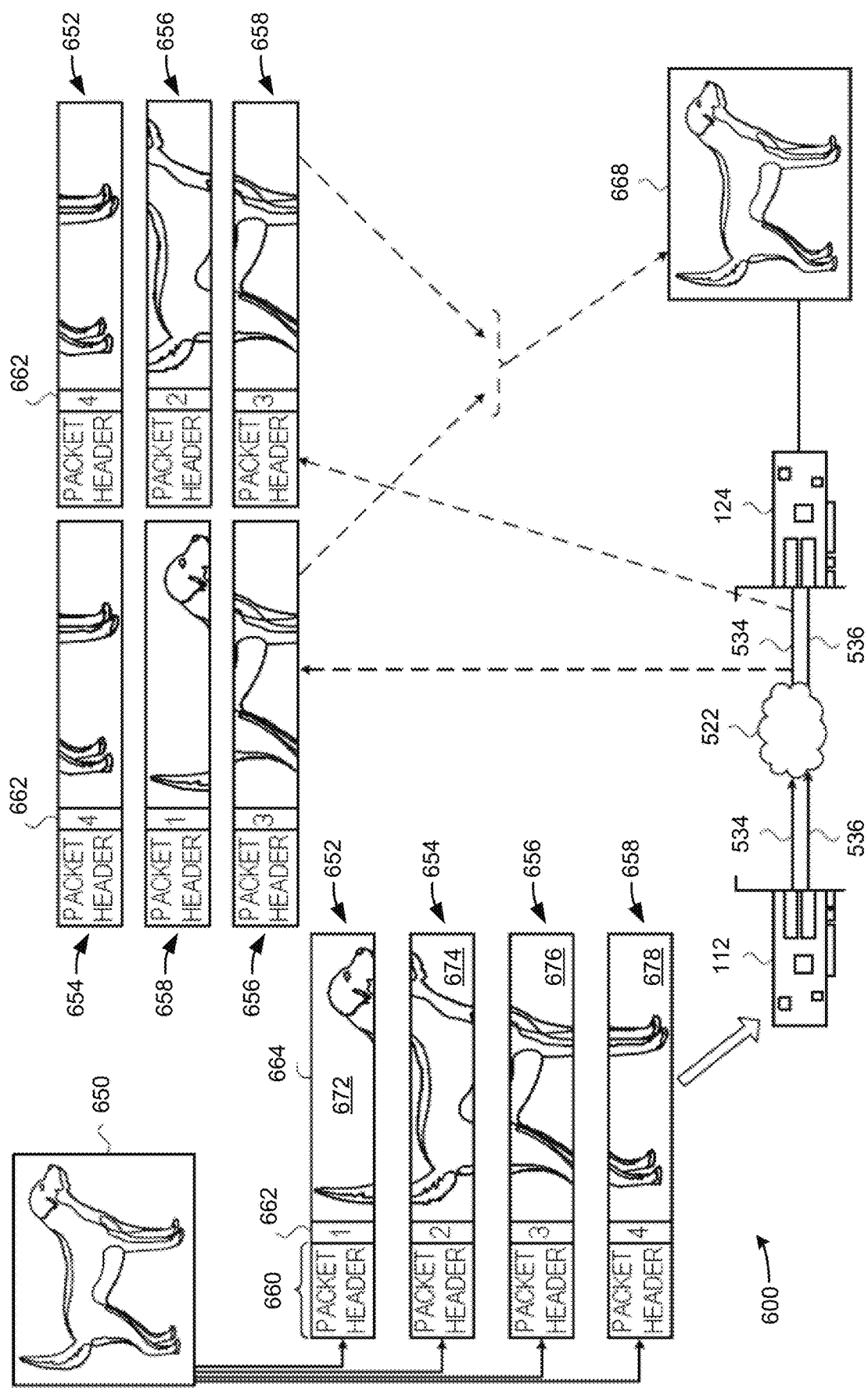
FIG. 6 illustrates a block diagram that schematically illustrates a process of data reconstruction that may be performed by the receiver communication apparatus, in accordance with at least one embodiment.

Although, the above embodiments relate specifically to scenarios in which the sender device 102 transmits multiple streams of packets (with redundancy) to the receiver device 104, the system 100 may transmit single streams of packets (without redundancy), as well as streams of packets using higher degrees of redundancy. The receiver communication apparatus 124 uses the plurality of packet identifiers 222, along with the fixed size per slice, in mapping the data payload stored in the payload field 308 (see FIG. 3) to a respective address in the assigned memory buffer 150 using a linear mapping of the packet identifiers 222. For example, in an alternative embodiment (as illustrated in FIGS. 5 and 6), a packet stream is transmitted in accordance with an enhanced Common Public Radio Interface ("eCPRI"), and the data payloads that are to be written to the buffer 150 by the receiver communication apparatus 124 include radio data. In one of these embodiments, the headers 310 include an open radio access network ("O-RAN") application layer header, and the starting physical resource block ("start-Prbu") values contained in the O-RAN header serve as the packet identifiers.

By way of a non-limiting example, the system 100 may be used to transmit packets within, to, and from an industrial application where, for example, the sender device 102 is an automated machine tool and the receiver device 104 is a controller or server. By way of another non-limiting example, the system 100 may be used to transmit packets within, to, and from an autonomous vehicle. A typical autonomous vehicle (e.g., the sender device 102) has a number of sensors collecting real-time data which is transmitted to one or more processors (e.g., the receiver processor 126 of the receiver device 104) using an unreliable transport protocol. But, for safety reasons, information transmitted within, to, and from an autonomous vehicle must be received reliably. To help ensure information (e.g., sensor data) is reliably received, standards, such as Institute of Electrical and Electronics Engineers ("IEEE") 802.1CB, were developed requiring duplicate packets be send over different communication channels. IEEE 802.1CB and similar protocols specify frame replication and elimination protocols. The system 100 may be used to implement such standards.

By way of yet another non-limiting example, the system 100 may be used to transmit and receive broadcast (e.g., live) television using an unreliable transport protocol (e.g., over the Internet using User Datagram Protocol ("UDP")). For example, a video camera may capture images or video frames of an event and send them to the sender device 102, which will send the sent packets 138S to the receiver device 104. If something happens to portions of the sent packets 138S, such as one or more packets are missing or corrupted, the camera cannot simply recapture the video camera cannot simply recapture the images and the sender device 102 cannot simply resend the missing or corrupted packets because the event(s) captured in the video frames may no longer be usable in the broadcast. To help reduce the impact of missing or corrupted packets on the broadcast message, standards, such as Society of Motion Picture and Television Engineers ("SMPTE") 2022-7, were developed requiring duplicate packets be send over different communication channels. When SMPTE 2022-7 is used, IEEE 802.1CB or another protocol may be used to specify frame replication and elimination protocols. As will be described below, the system 100 may be used to implement such standards.

FIG. 5 illustrates a block diagram that schematically illustrates an example data communication system 500 including multiple transmitting ("Tx") host computers 524, 526, and 528, a packet data network 522, and a receiving ("Rx") host computer 540, in accordance with at least one embodiment. The Tx host computers 524, 526, and 528 are each an implementation of the sender device 102 (see FIGS. 1 and 2), the packet data network 522 is an implementation of the network 106 (see FIGS. 1, 2, and 4), and the Rx host computer 540 is an implementation of the receiver device 104 (see FIGS. 1 and 4). Thus, the Tx host computers 524, 526, and 528 and the Rx host computer 540 are each connected to the packet data network 522. By way of a non-limiting example, the packet data network 522 may be implemented as an Internet Protocol ("IP") network.

In the embodiment illustrated, each of the Tx host computers 524, 526, and 528 receives streaming input data, for example, from a respective video camera 530. This input data includes a series of data segments, such as video frames or fields (e.g., of a predefined size). Each of the Tx host computers 524, 526, and 528 encapsulates the data in a stream of data packets, each having the header 310 (see FIG. 3) and a data payload stored in the payload field 308 (see FIG. 3). The data payloads may each be of a predefined, fixed size containing a respective slice of a given data segment. As described above, the header 310 includes a respective packet identifier field 330 (e.g., storing the startPrbu value and/or PSN). Although, the Tx host computers 524, 526, and 528 and the respective video cameras 530 are shown in FIG. 5, for the sake of conceptual clarity, as separate physical entities, in some implementations, the host computer is incorporated into the video camera (typically together with the sender communication apparatus 112, as well).

The sender communication apparatus 112 of each of the Tx host computers 524, 526, and 528 transmits the data packets over the packet data network 522 in two packet streams 534 and 536, which are indicated by the dashed arrows in FIG. 5. The stream 534 includes the plurality of modified packets 134R (see FIGS. 1 and 4) and the stream 536 includes the plurality of duplicate packets 136R (see FIGS. 1 and 4). Thus, copies of each slice are transmitted concurrently in two packets, one in each of the two packet streams 534 and 536. The streams 534 and 536 are typically transmitted through the network 522 over different, respective paths, for example by transmitting each of the streams 534 and 536 through a different one of the plurality of sender connections 212 and 214 (e.g., ports) of the sender communication apparatus 112, which are connected respectively to different switches 538 in the network 522. The packets are typically transmitted using an unreliable transport protocol, such as RTP over UDP transport, which provides no guarantee that any particular packet will reach its destination. By transmitting the two streams 534 and 536, the Tx host computer 524 ensures that at least one copy of each packet will, with few exceptions, reach its destination. For even higher confidence of delivery, two or even more redundant streams (each like the stream 536) may be transmitted and handled at the Rx host computer 540 in the manner described herein. Alternatively, as noted above, the techniques described herein are useful in efficient handling of even a single packet stream by the receiver communication apparatus 124 of the Rx host computer 540, when redundancy is not required.

The streams 534 and 536, as well as the packet streams transmitted by the other Tx host computers 526 and 528 are addressed to the Rx host computer 540, which is connected to the network 522 by the receiver communication apparatus 124. Upon receiving the data packets from the network 522, the receiver communication apparatus 124 maps the packets in both of the packet streams 534 and 536, using the plurality of packet identifiers 222 (e.g., the startPrbu values and/or the PSNs), to respective addresses in the buffer 150 in the receiver memory 128 of the Rx host computer 540. The receiver communication apparatus 124 writes the data payload to the respective addresses while eliminating redundant data so that the buffer 150 contains exactly one copy of each slice of the data segment, ordered in accordance with the plurality of packet identifiers 222 (e.g., the startPrbu values and/or PSNs). The video frames are thus immediately available in the receiver memory 128 for retransmission (over a television network, for example) or other access.

FIG. 6 illustrates a block diagram that schematically illustrates a process 600 of data reconstruction that may be performed by the receiver communication apparatus 124, in accordance with one embodiment. Each of the video cameras 530 (see FIG. 5) captures an image frame 650, which is divided into slices for transmission by the sender communication apparatus 112 in a sequence of data packets 652-658. Each of the of data packets 652-658 includes a header 660, containing a packet identifier 662 (e.g., a PSN, a startPrbu value, and the like), and a payload 664 containing a respective one of the slices of the image frame 650. The sender communication apparatus 112 transmits two copies of each of the packets 652, 654, 656, 658 (e.g., one in each of the streams 534 and 536).

In the embodiment illustrated, one or more of the packets 652-658 are lost or corrupted in transmission through network 522, and others reach the receiver communication apparatus 124 out of order. The receiver communication apparatus 124 detects and discards corrupted packets, for example by computing and checking packet checksums or other error detection codes, as provided by applicable protocols. In the example illustrated, the receiver communication apparatus 124 has received only the packets 654, 658 and 656 (in that order) from the stream 534 and the packets 652, 656 and 658 from the stream 536. Using the packet identifiers 662, however, the receiver communication apparatus 124 is able to directly place data from the appropriate payloads 664 in the designated buffer 150 in the receiver memory 128 (see FIGS. 1, 4, 5, and 8), and thus reconstruct a complete image frame 668 in the receiver memory 128. As noted earlier, the receiver communication apparatus 124 eliminates redundant data so that the buffer 150 contains exactly one copy of each slice of the frame 650, ordered in accordance with the packet identifiers 662. The process of reconstruction may be transparent to software running on the Rx host computer 540 (see FIG. 5) and requires no involvement by the software or the receiver processor 126 (see FIGS. 1, 4, and 8) in data reordering or eliminating redundancies.

Figure 7:
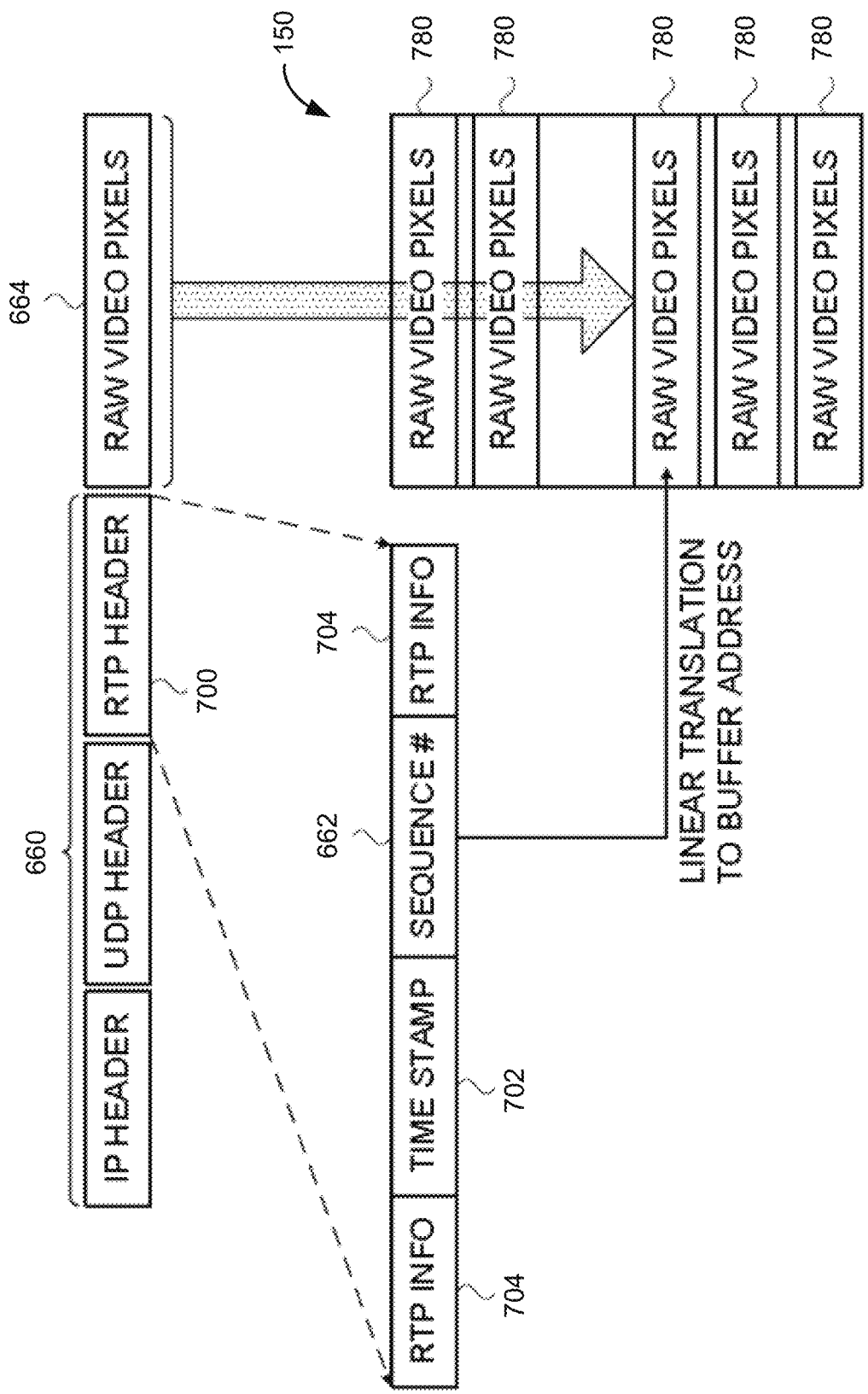
FIG. 7 illustrates a block diagram that schematically shows details of a method for direct placement of packet data that is performed by the receiver communication apparatus, in accordance with at least one embodiment.

FIG. 7 illustrates a block diagram that schematically shows details of a method for direct placement of packet data that is performed by the receiver communication apparatus 124, in accordance with at least one embodiment. FIG. 7 illustrates how the scatter engine 404 (see FIG. 4) uses the packet identifier 662 stored in an RTP header 700 of a video packet in placing the packet data within the buffer 150. By way of other non-limiting examples, the receiver communication apparatus 124 may handle the following video networking protocols in a similar fashion:

SMPTE 2022-5/6/7
VSF TR-03/IETF RFC 4175
intoPIX TICO
Sony IP Live RDD 34 and NMI
NewTek
GigE vision GVSP The packet illustrated in FIG. 7 belongs to a stream in which the payload size of all of the packets is fixed and known in advance. The driver 432 (see FIG. 4) running on the receiver processor 126 (see FIGS. 1, 4, and 8) assigns and informs the receiver communication apparatus 124 of the base address of the buffer 150 to which each data segment in the stream is to be written, as explained above. Within the packet header 660, the RTP header 700 includes a timestamp 702 and other protocol information 704, in addition to the packet identifier 662 (e.g., a PSN). Based on the context information provided by the driver 432, packet parsing logic of the packet parsing engine 410 advances to the known location of the packet identifier 662 in each packet and extracts the packet identifier 662, as well as extracting data slice 80 from the payload 664. On this basis, the scatter engine 404 is able to write the data slices from the payloads 664 to the buffer 150 in the proper order by simple linear translation of the packet identifier 662 (e.g., a PSN).

In other words, for a packet stream beginning from an initial packet identifier represented by the variable "X," with a data payload in each packet having a size represented by a variable "B", and a base address in the buffer 150 represented by the variable "A," the scatter engine 404 (see FIG. 4) will write the payload of each packet having a packet identifier represented by a variable "PSN" to an address determined by Equation 1 below:

$$\text{Payload address} = A + (\text{PSN} - X) \times B \quad \text{Equation 1}$$

When the payloads of two valid packets from different, respective streams in a redundant transmission scheme map to the same address (whether they have the same or different PSNs), only one of them will ultimately be written to the buffer 150. The scatter engine 404 may write only the payload of the packet that arrives first to the buffer 150 and discard the payload of the other packet.

For some protocols, the segment definition is also indicated in the packet header 660, thus enabling alternative implementations that reduce the involvement of the driver 432 even further. For example, the receiver communication apparatus 124 may operate as follows:

A segment in most video applications corresponds to a single frame (or a single field of interlaced video).

In some video protocols, a frame-end marker is entered in the packet transport header: The first and last packets in the segment are identified by a special field in the transport header indicating that they are the first or last packet.

When the frame size is fixed and the frame start and end are marked in the headers in this manner, the receiver communication apparatus 124 can automatically start to write the data into the allocated host buffers when the start marker is received. Thus, the need to specify segment boundaries is also offloaded from the software to the hardware logic of the receiver communication apparatus 124.

When the receiver communication apparatus 124 is implemented as a NIC operating at very high speed (for example, receiving incoming video data at 400 Gbps), access from the NIC to the receiver memory 128 over the receiver bus 418 may become a bottleneck. To reduce pressure on the receiver bus 418, the packet processing circuitry 420 can monitor the packet identifiers (e.g., PSNs) and, when the payload from a given packet having a particular packet identifier in one of the streams has already been written to the buffer 150, simply discard the corresponding packet from the other stream, rather than overwriting the data already in the buffer 150. For this purpose, the packet processing circuitry 420 may maintain a record, such as a packet identifier (e.g., PSN) vector and a rolling packet identifier (e.g., PSN) window (e.g., the sliding window), for each flow. Each packet arriving causes the processing circuitry 420 to flip a bit in the packet identifier (e.g., PSN) vector. When the bit for a given packet identifier is set and the corresponding packet from the other stream arrives, the packet parsing logic of the packet parsing engine 410 drops this latter packet without further processing.

Figure 8:
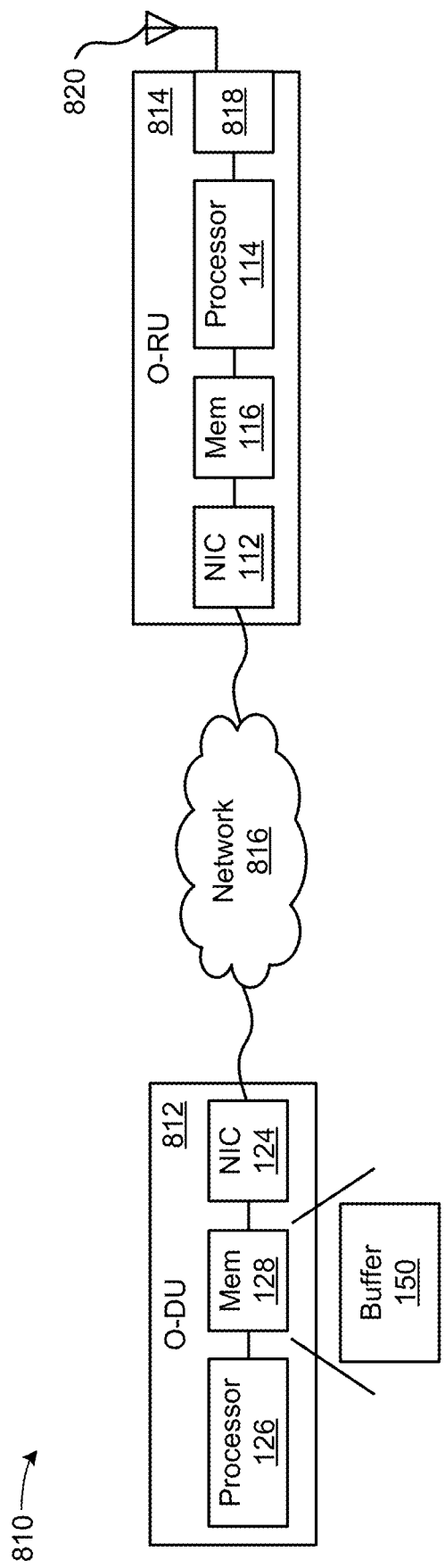
FIG. 8 illustrates a block diagram that schematically illustrates a data communication system for transmission of radio data, in accordance with at least one embodiment.

FIG. 8 illustrates a block diagram that schematically illustrates a data communication system 810 for transmission of radio data, in accordance with at least one embodiment. The system 810 operates in accordance with the enhanced Common Public Radio Interface ("eCPRI") specification, and the Open Radio Access Network (O-RAN) fronthaul requirements, as defined in the O-RAN Fronthaul Working Group Control, User and Synchronization Plane Specification, published by the O-RAN Alliance as Technical Specification ORAN-WG4.CUS.0-v01.00 (2019).

The system 810 includes an O-RAN Distributed Unit ("O-DU") 812, an O-RAN Radio Unit (O-RU) 814, and a network 816 that are implementations of the receiver device 104, the sender device 102, and the network 106. In the system 810, the O-DU 812 communicates over a network 816, such as an IP network, for example, with the O-RU 814, in accordance with the above-mentioned eCPRI and O-RAN specifications. The O-DU 812 includes the receiver processor 126 (e.g., one or more general-purpose computer processors), which has the receiver memory 128, and is connected to the network 816 by the receiver communication apparatus 124. The O-RU 814 includes the sender processor 114 (e.g., one or more general-purpose computer processors), which has the sender memory 116, and is connected to the network 816 by the sender communication apparatus 112. The O-DU 812 and O-RU 814 typically include other, special-purpose interfaces. For example, the O-RU 814 may include a radio transceiver 818 connected to an antenna 820.

The O-RU 814 transmits a sequence of data packets over the network 816, including respective headers and data payloads, which contain data segments of radio signals received by the O-RU 814. Each data segment includes one or more physical resource blocks ("PRBs"), which are divided into slices in the form of data samples, typically including alternating iSamples and qSamples, as defined by the O-RAN specification (see particularly section 6.3, including Table 6-2 on page 95). These samples have a fixed size, between 1 bit and 16 bits per sample, which is defined in the O-RAN header of each packet, as explained below with reference to FIG. 9. The sender communication apparatus 112 (e.g., NIC) transmits the data packets over the network 816, typically using an unreliable transport protocol, such as eCPRI over UDP transport. Upon receiving the data packets from the network 816, the receiver communication apparatus 124 (e.g., NIC) maps the samples contained in the packets to respective addresses in the buffer 150 in the receiver memory 128 of the O-DU 812, with the samples ordered in the buffer 150 in accordance with respective packet identifiers (e.g., sequence numbers) included in the O-RAN headers in the packets. The radio data are thus made immediately available in the receiver memory 128, in the proper order for processing by the O-DU 812.

Figure 9:
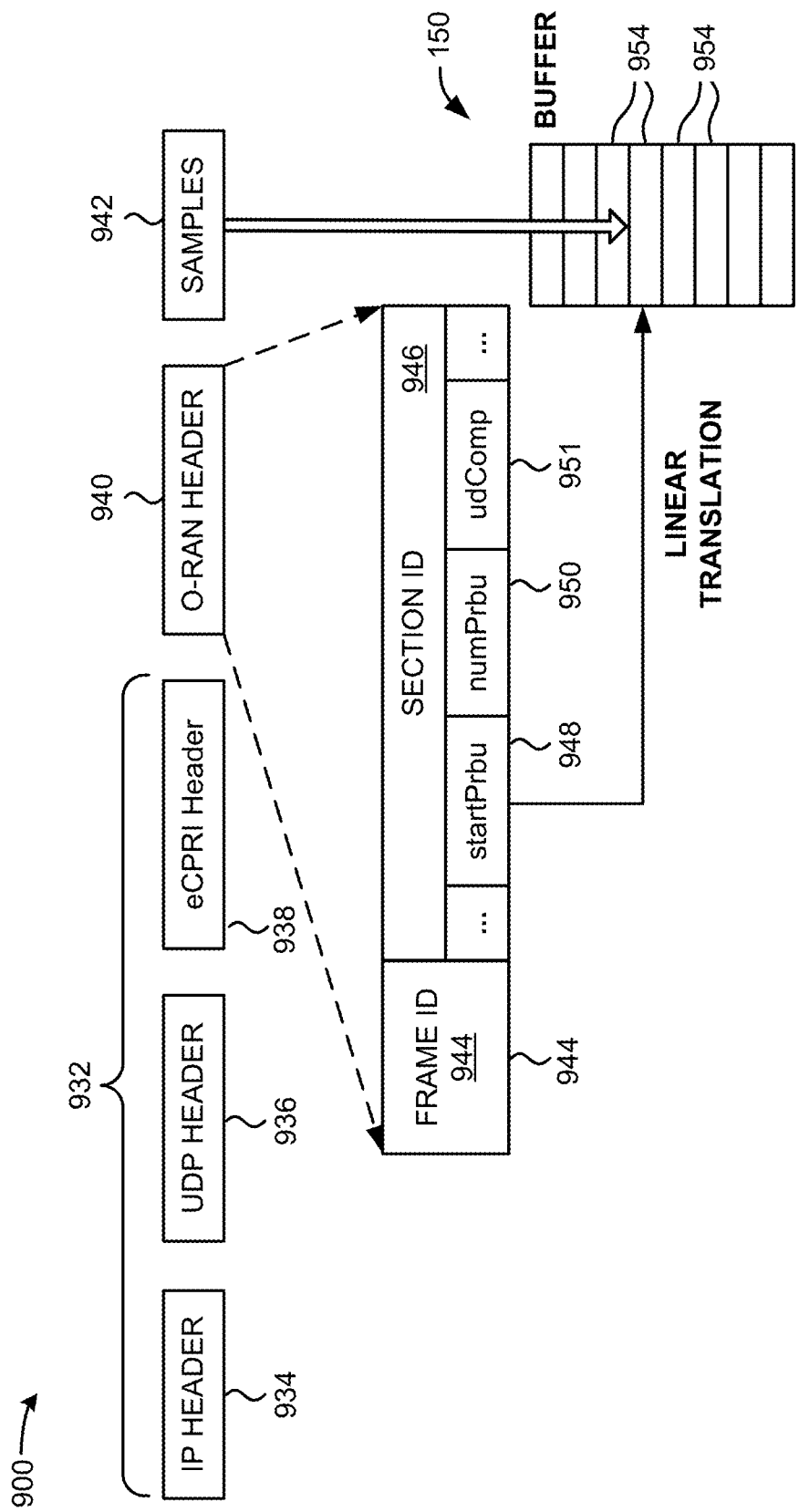
FIG. 9 illustrates a block diagram that schematically illustrates a method for direct placement of packet data in a buffer in receiver memory, in accordance with at least one embodiment.

FIG. 9 illustrates a block diagram that schematically illustrates a method for direct placement of packet data in the buffer 150 in the receiver memory 128, in accordance with the embodiment of FIG. 8. The method is applied to the O-RAN data packets that are received by the O-DU 812. For ease of illustration, FIG. 9 illustrates a packet 900, which is one of the packets received by the O-DU 812. The packet 900 includes network and transport headers 932, including an IP header 934, a UDP header 936, and an eCPRI header 938, for example as defined in section 3.1.3 of the above-mentioned O-RAN specification (page 32). The network and transport headers 932 are followed by an O-RAN application header 940 (as defined in Table 6-2 of the O-RAN specification) and a payload 942 containing a sequence of data samples. The IP header 934 may include a destination address field (like the destination address field 302 illustrated in FIG. 3) and a source address field 304 (like the source address field 304 illustrated in FIG. 3). The UDP header 936 may include a UDP source port field (not shown) that identifies the port from which the packet was sent and/or a UDP destination port field (not shown) that identifies the port to which the packet is sent.

The packet duplication engine 208 modifies the IP header 934 (e.g., the source address stored in the source address field or the destination address stored in the destination address field) and/or the UDP header 936 (e.g., the value stored by the UDP source port field and/or the value stored by the UDP destination port field) in the plurality of duplicate packets 136 so that the plurality of modified packets 134 and the plurality of duplicate packets 136 are sent along different paths through the network 106 and the modified packet header 324 is different in the plurality of duplicate packets 136R than in the plurality of modified packets 134R.

The O-RAN header 940 includes a set of frame ID fields 944, followed by section ID fields 946, which define the data layout of the data segment in payload 942. These section ID fields 946 include, inter alia, a startPrbu field 948, which identifies the starting physical resource block ("PRB") in the packet 900 and thus can serve as a sequence number for purposes of mapping of the samples in payload 942. A numPrbu field 950 indicates the number of contiguous PRBs in this section; and a udCompHdr field 951 indicates the size, in bits, of each sample, i.e., the size of each slice of the PRB in payload 942. When a data packet contains multiple sections of data, section ID fields 946 will be repeated as the header of each section.

The receiver communication apparatus 124 extracts the data samples from payload and writes them to respective addresses 954 in the buffer 150 in the receiver memory 128, using a linear mapping of the startPrbu value in the startPrbu field 948. The startPrbu value indicates the address 154 to which the receiver communication apparatus 124 is to write the first sample in each section, followed contiguously by the succeeding samples. Specifically, in the present embodiment, the receiver communication apparatus 124 maps the samples to addresses 154 using Equation 2 below for the first sample in each section:

$$\text{Payload address} = A + (SN - X) \times B \qquad \text{Equation 2}$$

In this formula, the variable "X" represents the initial packet identifier (e.g., sequence number), the variable "SN" represents the current packet identifier (e.g., sequence number) obtained from the startPrbu value in the startPrbu field 148, the variable "B" represents the fixed size of the samples, obtained from the udCompHdr value in the udCompHdr field 151, and the variable "A" represents the base address of the buffer 150.

Although the embodiment described above refers specifically to transmission of data from the O-RU 814 to the O-DU 812, the principles of this embodiment may similarly be applied by the O-RU 814 when buffering data transmitted by the O-DU 812.

Figure 10:
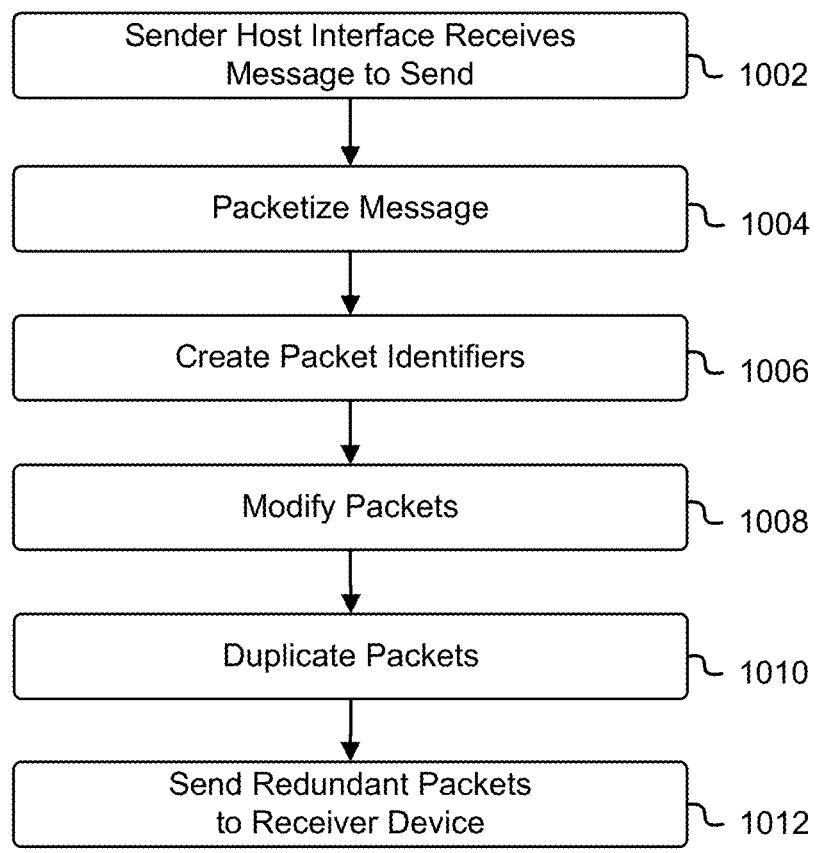
FIG. 10 illustrates a flow diagram of a method that may be performed by the sender device, in accordance with at least one embodiment.

FIG. 10 illustrates a flow diagram of a method 1000 that may be performed by the sender device 102, in accordance with at least one embodiment. In first block 1002, the sender processor 114 sends the message 130 or a link to the message 130 stored in the memory 118 to the sender host interface 202 of the sender communication apparatus 112. The sender processor 114 may execute the data processing application 224 (e.g., a video processing application) which receives image frames from a video camera (e.g., the video camera 530). The sender processor 114 may communicate the message 130 or link thereto to the sender host interface via the sender bus 228 and using the driver 226.

In next block 1004, the sender host interface 202 creates the plurality of packets 132 by packetizing the message 130 and forwards the plurality of packets 132 to the packet identifier engine 204. In block 1006, the packet identifier engine 204 creates packet identifiers for the plurality of packets 132 and forwards both the packet identifiers and the plurality of packets 132 to the sender steering engine 206. In block 1008, the sender steering engine 206 creates the plurality of modified packets 134 by adding the redundancy header 322 (see FIG. 3) to each of the plurality of packets 132 and forwards the plurality of modified packets 134 to the packet duplication engine 208. In block 1010, the packet duplication engine 208 creates the plurality of duplicate packets 136 by duplicating the plurality of modified packets 134 and sends both the plurality of modified packets 134 and the plurality of duplicate packets 136 to the sender network interface 210. In block 1012, the sender network interface 210 sends the plurality of modified packets 134 and the plurality of duplicate packets 136 to the receiver communication apparatus 124 via the network 106. Thus, in block 1012, the sender network interface 210 sends the sent packets 138S, which include the sent plurality of modified packets 134S and the sent plurality of duplicate packets 136S, to the receiver communication apparatus 124 via the network 106. Then, the method 1000 terminates.

Figure 11:
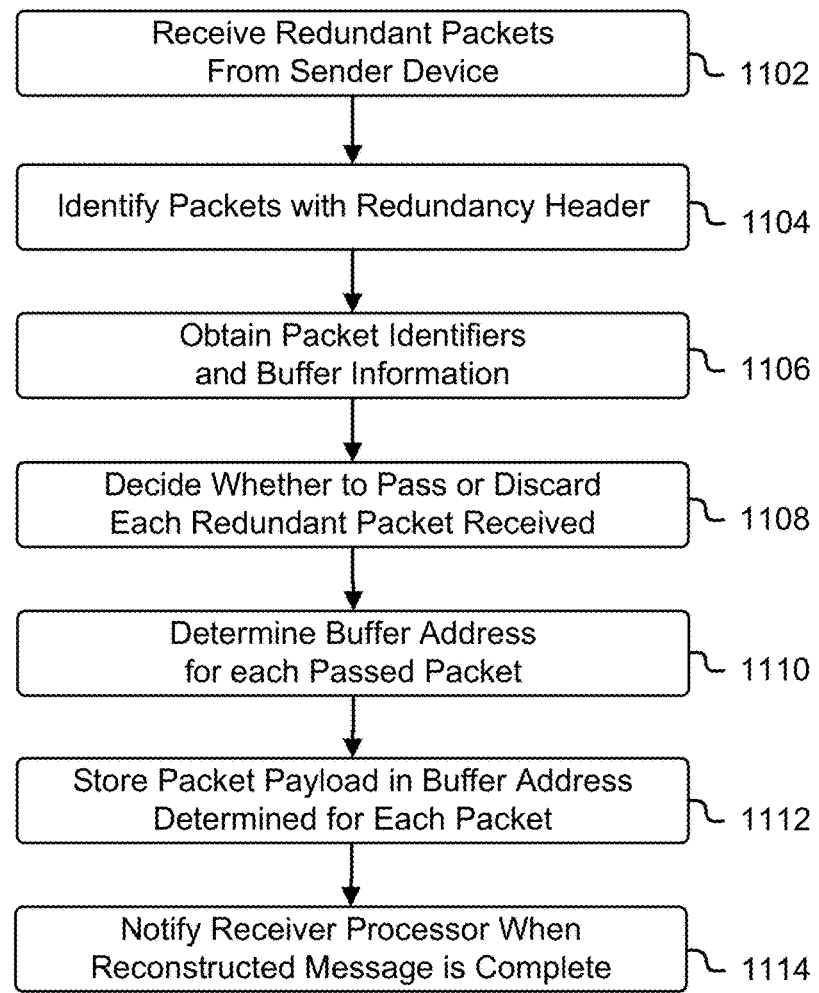
FIG. 11 illustrates a flow diagram of a method that may be performed by the receiver device, in accordance with at least one embodiment.

FIG. 11 illustrates a flow diagram of a method 1100 that may be performed by the receiver device 104, in accordance with at least one embodiment. In first block 1102, the receiver network interface 412 receives the received packets 138R and forwards them to the packet parsing engine 410. In block 1104, the packet parsing engine 410 parses each of the received packets 138R, identifies those of the packets that include the redundancy header 322 (see FIG. 3), and forwards the identified packets to the receiver steering engine 408. In block 1106, the receiver steering engine 408 identifies the packet identifier in each of the identified packets, obtains buffer information, and forwards the buffer information, the packet identifiers, and payloads to the anti-replay engine 406. The receiver steering engine 408 may obtain the buffer information from the driver 432. By way of non-limiting examples, the buffer information may include the MKEY, the base address of the buffer 150, and the like. In block 1108, the anti-replay engine 406 decides, for each of the received packets 138R, whether the packet is forwarded to the scatter engine 404 or discarded. In block 1110, the scatter engine 404 determines an address in the buffer 150 for each payload of each forwarded packet and forwards the address and payload to the receiver host interface 402. In block 1112, the receiver host interface 402 stores the payloads in their respectively addresses. In block 1114, the scatter engine 404 notifies the receiver processor 126 via the receiver host interface 402 when the reconstructed message 144 is complete. Then, the method 1100 terminates.

In the following description, numerous specific details are set forth to provide a more thorough understanding of at least one embodiment. However, it will be apparent to one skilled in the art that the inventive concepts may be practiced without one or more of these specific details.

Servers and Data Centers

The following figures set forth, without limitation, exemplary network server and data center based systems that can be used to implement at least one embodiment.

Figure 12:
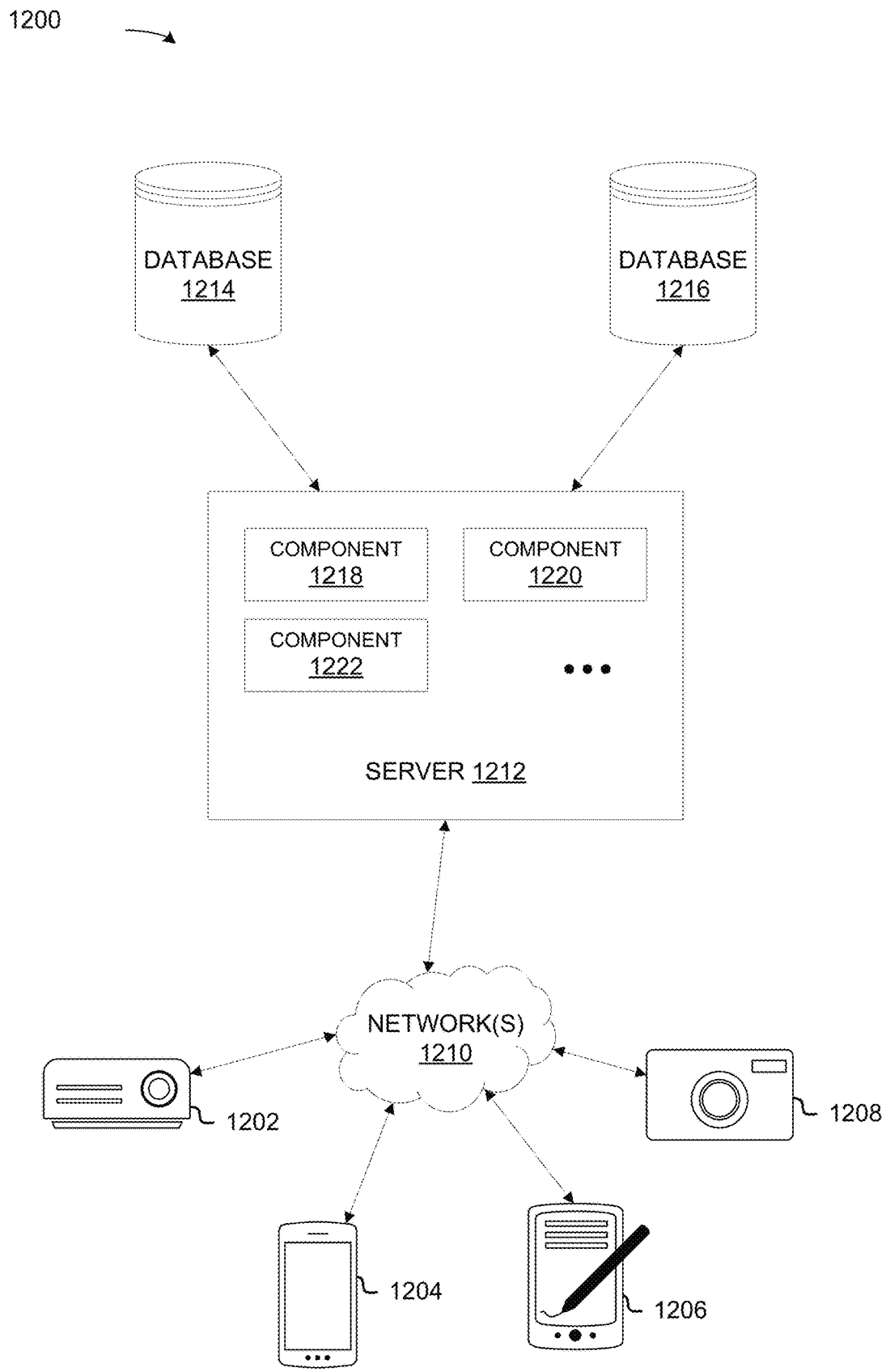
FIG. 12 illustrates a distributed system, in accordance with at least one embodiment.

FIG. 12 illustrates a distributed system 1200, in accordance with at least one embodiment. In at least one embodiment, distributed system 1200 includes one or more client computing devices 1202, 1204, 1206, and 1208, which are configured to execute and operate a client application such as a web browser, proprietary client, and/or variations thereof over one or more network(s) 1210. In at least one embodiment, server 1212 may be communicatively coupled with remote client computing devices 1202, 1204, 1206, and 1208 via network 1210.

In at least one embodiment, server 1212 may be adapted to run one or more services or software applications such as services and applications that may manage session activity of single sign-on (SSO) access across multiple data centers. In at least one embodiment, server 1212 may also provide other services or software applications can include non-virtual and virtual environments. In at least one embodiment, these services may be offered as web-based or cloud services or under a Software as a Service (SaaS) model to users of client computing devices 1202, 1204, 1206, and/or 1208. In at least one embodiment, users operating client computing devices 1202, 1204, 1206, and/or 1208 may in turn utilize one or more client applications to interact with server 1212 to utilize services provided by these components.

In at least one embodiment, software components 1218, 1220 and 1222 of system 1200 are implemented on server 1212. In at least one embodiment, one or more components of system 1200 and/or services provided by these components may also be implemented by one or more of client computing devices 1202, 1204, 1206, and/or 1208. In at least one embodiment, users operating client computing devices may then utilize one or more client applications to use services provided by these components. In at least one embodiment, these components may be implemented in hardware, firmware, software, or combinations thereof. It should be appreciated that various different system configurations are possible, which may be different from distributed system 1200. The embodiment shown in FIG. 12 is thus one example of a distributed system for implementing an embodiment system and is not intended to be limiting.

In at least one embodiment, client computing devices 1202, 1204, 1206, and/or 1208 may include various types of computing systems. In at least one embodiment, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and/or variations thereof. In at least one embodiment, devices may support various applications such as various Internet-related apps, e-mail, short message service (SMS) applications, and may use various other communication protocols. In at least one embodiment, client computing devices may also include general purpose personal computers including, by way of example, personal computers and/or laptop computers running various versions of Microsoft Windows®, Apple Macintosh®, and/or Linux operating systems. In at least one embodiment, client computing devices can be workstation computers running any of a variety of commercially-available UNIX® or UNIX-like operating systems, including without limitation a variety of GNU/Linux operating systems, such as Google Chrome OS. In at least one embodiment, client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1210. Although distributed system 1200 in FIG. 12 is shown with four client computing devices, any number of client computing devices may be supported. Other devices, such as devices with sensors, etc., may interact with server 1212.

In at least one embodiment, network(s) 1210 in distributed system 1200 may be any type of network that can support data communications using any of a variety of available protocols, including without limitation TCP/IP (transmission control protocol/Internet protocol), SNA (systems network architecture), IPX (Internet packet exchange), AppleTalk, and/or variations thereof. In at least one embodiment, network(s) 1210 can be a local area network (LAN), networks based on Ethernet, Token-Ring, a wide-area network, Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

In at least one embodiment, server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In at least one embodiment, server 1212 can include one or more virtual machines running virtual operating systems, or other computing architectures involving virtualization. In at least one embodiment, one or more flexible pools of logical storage devices can be virtualized to maintain virtual storage devices for a server. In at least one embodiment, virtual networks can be controlled by server 1212 using software defined networking. In at least one embodiment, server 1212 may be adapted to run one or more services or software applications.

In at least one embodiment, server 1212 may run any operating system, as well as any commercially available server operating system. In at least one embodiment, server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and/or variations thereof. In at least one embodiment, exemplary database servers include without limitation those commercially available from Oracle, Microsoft, Sybase, IBM (International Business Machines), and/or variations thereof.

In at least one embodiment, server 1212 may include one or more applications to analyze and consolidate data feeds and/or event updates received from users of client computing devices 1202, 1204, 1206, and 1208. In at least one embodiment, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and/or variations thereof. In at least one embodiment, server 1212 may also include one or more applications to display data feeds and/or real-time events via one or more display devices of client computing devices 1202, 1204, 1206, and 1208.

In at least one embodiment, distributed system 1200 may also include one or more databases 1214 and 1216. In at least one embodiment, databases may provide a mechanism for storing information such as user interactions information, usage patterns information, adaptation rules information, and other information. In at least one embodiment, databases 1214 and 1216 may reside in a variety of locations. In at least one embodiment, one or more of databases 1214 and 1216 may reside on a non-transitory storage medium local to (and/or resident in) server 1212. In at least one embodiment, databases 1214 and 1216 may be remote from server 1212 and in communication with server 1212 via a network-based or dedicated connection. In at least one embodiment, databases 1214 and 1216 may reside in a storage-area network (SAN). In at least one embodiment, any necessary files for performing functions attributed to server 1212 may be stored locally on server 1212 and/or remotely, as appropriate. In at least one embodiment, databases 1214 and 1216 may include relational databases, such as databases that are adapted to store, update, and retrieve data in response to SQL-formatted commands.

In at least one embodiment, distributed system 1200 may be used to implement the system 100 (see FIG. 1). In such embodiments, the sender device 102 and/or the receiver device 104 may each be implemented as the server 1212, client computing device 1202, client computing device 1204, client computing device 1206, or client computing device 1208. The network 106 may be implemented as network 1210.

In at least one embodiment, distributed system 1200 may be used to implement the data communication system 500 (see FIG. 5). In such embodiments, one or more of the Tx host computers 524, 526, and 528 and/or the Rx host computer 540 may each be implemented as the server 1212, client computing device 1202, client computing device 1204, client computing device 1206, or client computing device 1208. The packet data network 522 may be implemented as network 1210.

In at least one embodiment, distributed system 1200 may be used to implement the data communication system 810 (see FIG. 8). In such embodiments, the O-DU 812 and/or the O-RU 814 may each be implemented as the server 1212, client computing device 1202, client computing device 1204, client computing device 1206, or client computing device 1208. The network 816 may be implemented as network 1210.

Figure 13:
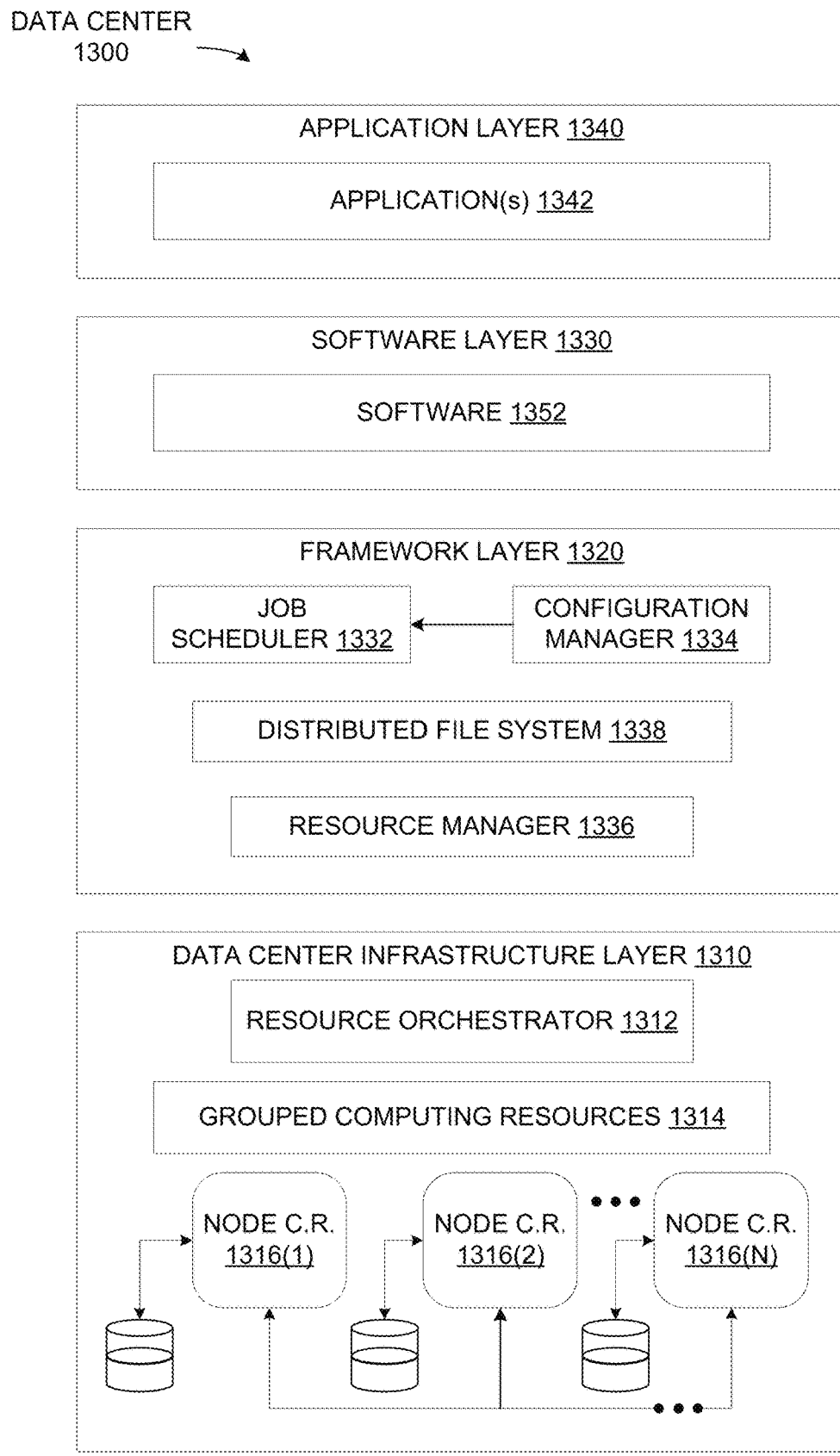
FIG. 13 illustrates an exemplary data center, in accordance with at least one embodiment.

FIG. 13 illustrates an exemplary data center 1300, in accordance with at least one embodiment. In at least one embodiment, data center 1300 includes, without limitation, a data center infrastructure layer 1310, a framework layer 1320, a software layer 1330 and an application layer 1340.

In at least one embodiment, as shown in FIG. 13, data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1316(1)-1316(N) may be a server having one or more of above-mentioned computing resources.

In at least one embodiment, grouped computing resources 1314 may include separate groupings of node C.R.s housed within one or more racks (not shown), or many racks housed in data centers at various geographical locations (also not shown). Separate groupings of node C.R.s within grouped computing resources 1314 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1312 may configure or otherwise control one or more node C.R.s 1316(1)-1316(N) and/or grouped computing resources 1314. In at least one embodiment, resource orchestrator 1312 may include a software design infrastructure ("SDI") management entity for data center 1300. In at least one embodiment, resource orchestrator 1312 may include hardware, software or some combination thereof.

In at least one embodiment, as shown in FIG. 13, framework layer 1320 includes, without limitation, a job scheduler 1332, a configuration manager 1334, a resource manager 1336 and a distributed file system 1338. In at least one embodiment, framework layer 1320 may include a framework to support software 1352 of software layer 1330 and/or one or more application(s) 1342 of application layer 1340. In at least one embodiment, software 1352 or application(s) 1342 may respectively include web-based service software or applications, such as those provided by Amazon Web Services, Google Cloud and Microsoft Azure. In at least one embodiment, framework layer 1320 may be, but is not limited to, a type of free and open-source software web application framework such as Apache Spark™ (hereinafter "Spark") that may utilize distributed file system 1338 for large-scale data processing (e.g., "big data"). In at least one embodiment, job scheduler 1332 may include a Spark driver to facilitate scheduling of workloads supported by various layers of data center 1300. In at least one embodiment, configuration manager 1334 may be capable of configuring different layers such as software layer 1330 and framework layer 1320, including Spark and distributed file system 1338 for supporting large-scale data processing. In at least one embodiment, resource manager 1336 may be capable of managing clustered or grouped computing resources mapped to or allocated for support of distributed file system 1338 and job scheduler 1332. In at least one embodiment, clustered or grouped computing resources may include grouped computing resource 1314 at data center infrastructure layer 1310. In at least one embodiment, resource manager 1336 may coordinate with resource orchestrator 1312 to manage these mapped or allocated computing resources.

In at least one embodiment, software 1352 included in software layer 1330 may include software used by at least portions of node C.R.s 1316(1)-1316(N), grouped computing resources 1314, and/or distributed file system 1338 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316(1)-1316(N), grouped computing resources 1314, and/or distributed file system 1338 of framework layer 1320. In at least one or more types of applications may include, without limitation, CUDA applications, 5G network applications, artificial intelligence application, data center applications, and/or variations thereof.

In at least one embodiment, any of configuration manager 1334, resource manager 1336, and resource orchestrator 1312 may implement any number and type of self-modifying actions based on any amount and type of data acquired in any technically feasible fashion. In at least one embodiment, self-modifying actions may relieve a data center operator of data center 1300 from making possibly bad configuration decisions and possibly avoiding underutilized and/or poor performing portions of a data center.

Figure 14:
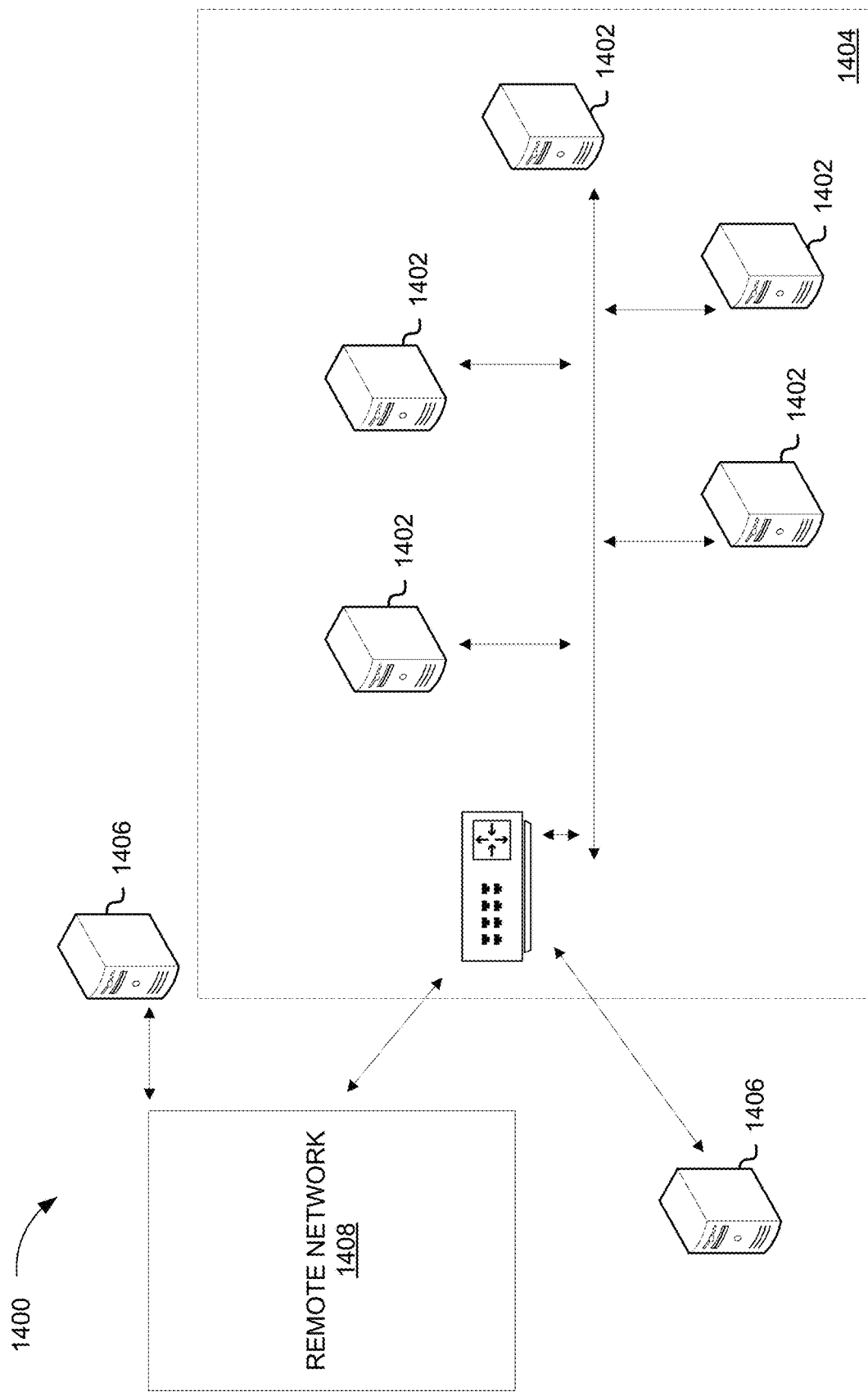
FIG. 14 illustrates a client-server network, in accordance with at least one embodiment.

FIG. 14 illustrates a system 1400 that includes a client-server network 1404 formed by a plurality of network server computers 1402 which are interlinked, in accordance with at least one embodiment. In at least one embodiment, each network server computer 1402 stores data accessible to other network server computers 1402 and to client computers 1406 and networks 1408 which link into a wide area network 1404. In at least one embodiment, configuration of a client-server network 1404 may change over time as client computers 1406 and one or more networks 1408 connect and disconnect from a network 1404, and as one or more trunk line server computers 1402 are added or removed from a network 1404. In at least one embodiment, when a client computer 1406 and a network 1408 are connected with network server computers 1402, client-server network includes such client computer 1406 and network 1408. In at least one embodiment, the term computer includes any device or machine capable of accepting data, applying prescribed processes to data, and supplying results of processes.

In at least one embodiment, client-server network 1404 stores information which is accessible to network server computers 1402, remote networks 1408 and client computers 1406. In at least one embodiment, network server computers 1402 are formed by main frame computers mini-computers, and/or microcomputers having one or more processors each. In at least one embodiment, server computers 1402 are linked together by wired and/or wireless transfer media, such as conductive wire, fiber optic cable, and/or microwave transmission media, satellite transmission media or other conductive, optic or electromagnetic wave transmission media. In at least one embodiment, client computers 1406 access a network server computer 1402 by a similar wired or a wireless transfer medium. In at least one embodiment, a client computer 1406 may link into a client-server network 1404 using a modem and a standard telephone communication network. In at least one embodiment, alternative carrier systems such as cable and satellite communication systems also may be used to link into client-server network 1404. In at least one embodiment, other private or time-shared carrier systems may be used. In at least one embodiment, network 1404 is a global information network, such as the Internet. In at least one embodiment, network is a private intranet using similar protocols as the Internet, but with added security measures and restricted access controls. In at least one embodiment, network 1404 is a private, or semi-private network using proprietary communication protocols.

In at least one embodiment, client computer 1406 is any end user computer, and may also be a mainframe computer, mini-computer or microcomputer having one or more microprocessors. In at least one embodiment, server computer 1402 may at times function as a client computer accessing another server computer 1402. In at least one embodiment, remote network 1408 may be a local area network, a network added into a wide area network through an independent service provider (ISP) for the Internet, or another group of computers interconnected by wired or wireless transfer media having a configuration which is either fixed or changing over time. In at least one embodiment, client computers 1406 may link into and access a network 1404 independently or through a remote network 1408.

In at least one embodiment, system 1400 may be used to implement the system 100 (see FIG. 1). In such embodiments, the sender device 102 and/or the receiver device 104 may each be implemented as one or more of the network server computers 1402 or one or more of client computers 1406. The network 106 may be implemented as remote network 1408.

In at least one embodiment, system 1400 may be used to implement the data communication system 500 (see FIG. 5). In such embodiments, one or more of the Tx host computers 524, 526, and 528 and/or the Rx host computer 540 may each be implemented as one or more of the network server computers 1402 or one or more of client computers 1406. The packet data network 522 may be implemented as remote network 1408.

In at least one embodiment, system 1400 may be used to implement the data communication system 810 (see FIG. 8). In such embodiments, the O-DU 812 and/or the O-RU 814 may each be implemented as one or more of the network server computers 1402 or one or more of client computers 1406. The network 816 may be implemented as remote network 1408.

Figure 15:
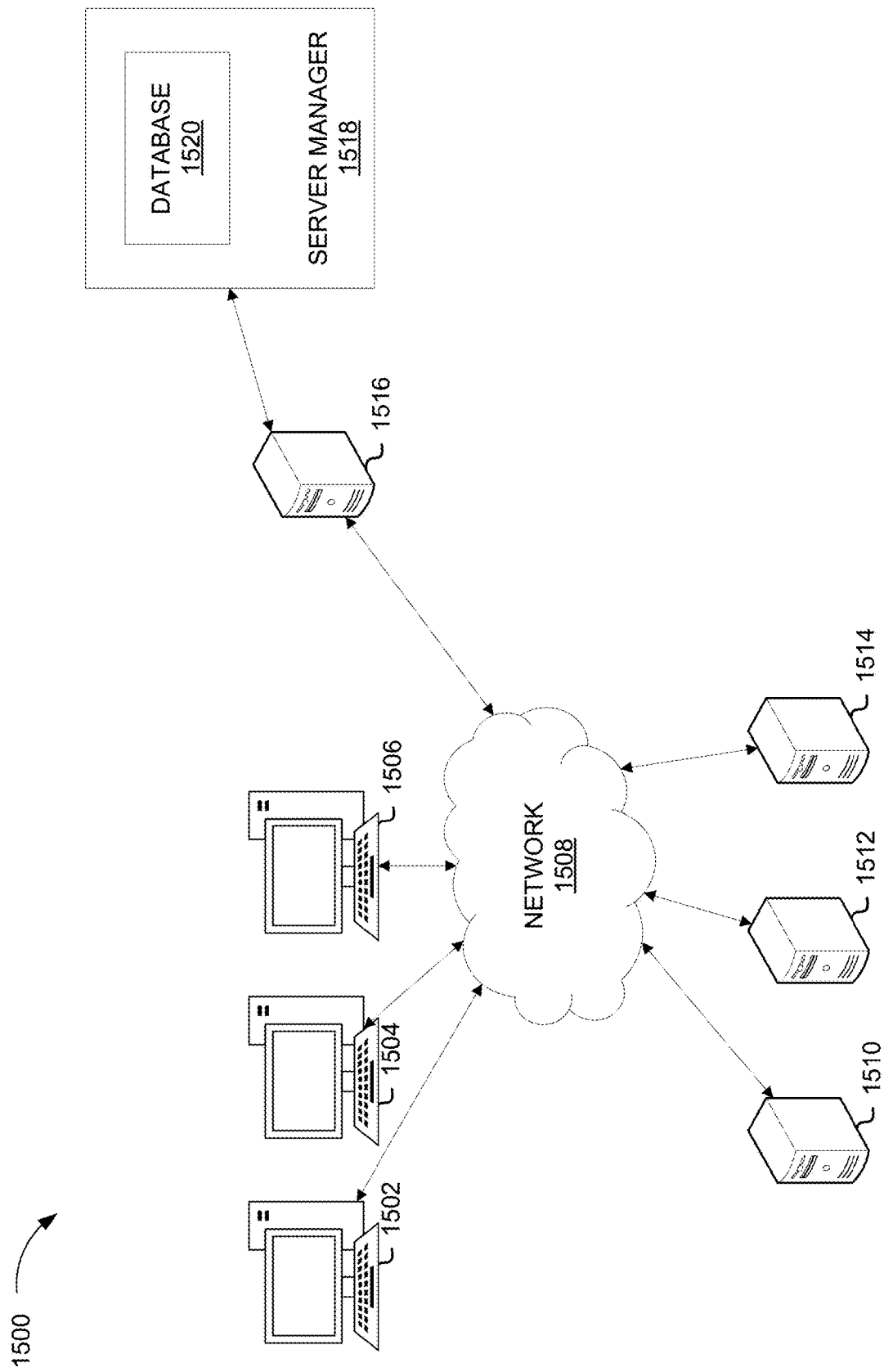
FIG. 15 illustrates a computer network, in accordance with at least one embodiment.

FIG. 15 illustrates a system 1500 that includes a computer network 1508 connecting one or more computing machines, in accordance with at least one embodiment. In at least one embodiment, network 1508 may be any type of electronically connected group of computers including, for instance, the following networks: Internet, Intranet, Local Area Networks (LAN), Wide Area Networks (WAN) or an interconnected combination of these network types. In at least one embodiment, connectivity within a network 1508 may be a remote modem, Ethernet (IEEE 802.3), Token Ring (IEEE 802.5), Fiber Distributed Datalink Interface (FDDI), Asynchronous Transfer Mode (ATM), or any other communication protocol. In at least one embodiment, computing devices linked to a network may be desktop, server, portable, handheld, set-top box, personal digital assistant (PDA), a terminal, or any other desired type or configuration. In at least one embodiment, depending on their functionality, network connected devices may vary widely in processing power, internal memory, and other performance aspects. In at least one embodiment, communications within a network and to or from computing devices connected to a network may be either wired or wireless. In at least one embodiment, network 1508 may include, at least in part, the world-wide public Internet which generally connects a plurality of users in accordance with a client-server model in accordance with a transmission control protocol/internet protocol (TCP/IP) specification. In at least one embodiment, client-server network is a dominant model for communicating between two computers. In at least one embodiment, a client computer ("client") issues one or more commands to a server computer ("server"). In at least one embodiment, server fulfills client commands by accessing available network resources and returning information to a client pursuant to client commands. In at least one embodiment, client computer systems and network resources resident on network servers are assigned a network address for identification during communications between elements of a network. In at least one embodiment, communications from other network connected systems to servers will include a network address of a relevant server/network resource as part of communication so that an appropriate destination of a data/request is identified as a recipient. In at least one embodiment, when a network 1508 includes the global Internet, a network address is an IP address in a TCP/IP format which may, at least in part, route data to an e-mail account, a website, or other Internet tool resident on a server. In at least one embodiment, information and services which are resident on network servers may be available to a web browser of a client computer through a domain name (e.g. www.site.com) which maps to an IP address of a network server.

In at least one embodiment, a plurality of clients 1502, 1504, and 1506 are connected to a network 1508 via respective communication links. In at least one embodiment, each of these clients may access a network 1508 via any desired form of communication, such as via a dial-up modem connection, cable link, a digital subscriber line (DSL), wireless or satellite link, or any other form of communication. In at least one embodiment, each client may communicate using any machine that is compatible with a network 1508, such as a personal computer (PC), work station, dedicated terminal, personal data assistant (PDA), or other similar equipment. In at least one embodiment, clients 1502, 1504, and 1506 may or may not be located in a same geographical area.

In at least one embodiment, a plurality of servers 1510, 1512, and 1514 are connected to a network 1508 to serve clients that are in communication with a network 1508. In at least one embodiment, each server is typically a powerful computer or device that manages network resources and responds to client commands. In at least one embodiment, servers include computer readable data storage media such as hard disk drives and RAM memory that store program instructions and data. In at least one embodiment, servers 1510, 1512, 1514 run application programs that respond to client commands. In at least one embodiment, server 1510 may run a web server application for responding to client requests for HTML, pages and may also run a mail server application for receiving and routing electronic mail. In at least one embodiment, other application programs, such as an FTP server or a media server for streaming audio/video data to clients may also be running on a server 1510. In at least one embodiment, different servers may be dedicated to performing different tasks. In at least one embodiment, server 1510 may be a dedicated web server that manages resources relating to web sites for various users, whereas a server 1512 may be dedicated to provide electronic mail (email) management. In at least one embodiment, other servers may be dedicated for media (audio, video, etc.), file transfer protocol (FTP), or a combination of any two or more services that are typically available or provided over a network. In at least one embodiment, each server may be in a location that is the same as or different from that of other servers. In at least one embodiment, there may be multiple servers that perform mirrored tasks for users, thereby relieving congestion or minimizing traffic directed to and from a single server. In at least one embodiment, servers 1510, 1512, 1514 are under control of a web hosting provider in a business of maintaining and delivering third party content over a network 1508.

In at least one embodiment, web hosting providers deliver services to two different types of clients. In at least one embodiment, one type, which may be referred to as a browser, requests content from servers 1510, 1512, 1514 such as web pages, email messages, video clips, etc. In at least one embodiment, a second type, which may be referred to as a user, hires a web hosting provider to maintain a network resource such as a web site, and to make it available to browsers. In at least one embodiment, users contract with a web hosting provider to make memory space, processor capacity, and communication bandwidth available for their desired network resource in accordance with an amount of server resources a user desires to utilize.

In at least one embodiment, in order for a web hosting provider to provide services for both of these clients, application programs which manage a network resources hosted by servers must be properly configured. In at least one embodiment, program configuration process involves defining a set of parameters which control, at least in part, an application program's response to browser requests and which also define, at least in part, a server resources available to a particular user.

In one embodiment, an intranet server 1516 is in communication with a network 1508 via a communication link. In at least one embodiment, intranet server 1516 is in communication with a server manager 1518. In at least one embodiment, server manager 1518 includes a database of an application program configuration parameters which are being utilized in servers 1510, 1512, 1514. In at least one embodiment, users modify a database 1520 via an intranet 1516, and a server manager 1518 interacts with servers 1510, 1512, 1514 to modify application program parameters so that they match a content of a database. In at least one embodiment, a user logs onto an intranet server 1516 by connecting to an intranet 1516 via computer 1502 and entering authentication information, such as a username and password.

In at least one embodiment, when a user wishes to sign up for new service or modify an existing service, an intranet server 1516 authenticates a user and provides a user with an interactive screen display/control panel that allows a user to access configuration parameters for a particular application program. In at least one embodiment, a user is presented with a number of modifiable text boxes that describe aspects of a configuration of a user's web site or other network resource. In at least one embodiment, if a user desires to increase memory space reserved on a server for its web site, a user is provided with a field in which a user specifies a desired memory space. In at least one embodiment, in response to receiving this information, an intranet server 1516 updates a database 1520. In at least one embodiment, server manager 1518 forwards this information to an appropriate server, and a new parameter is used during application program operation. In at least one embodiment, an intranet server 1516 is configured to provide users with access to configuration parameters of hosted network resources (e.g., web pages, email, FTP sites, media sites, etc.), for which a user has contracted with a web hosting service provider.

In at least one embodiment, system 1500 may be used to implement the system 100 (see FIG. 1). In such embodiments, the sender device 102 and/or the receiver device 104 may each be implemented as intranet server 1516, one or more of the clients 1502, 1504, and 1506, or one or more of servers 1510, 1512, and 1514. The network 106 may be implemented as remote network 1508.

In at least one embodiment, system 1500 may be used to implement the data communication system 500 (see FIG. 5). In such embodiments, one or more of the Tx host computers 524, 526, and 528 and/or the Rx host computer 540 may each be implemented as intranet server 1516, one or more of the clients 1502, 1504, and 1506, or one or more of servers 1510, 1512, and 1514. The packet data network 522 may be implemented as remote network 1508.

In at least one embodiment, system 1500 may be used to implement the data communication system 810 (see FIG. 8). In such embodiments, the O-DU 812 and/or the O-RU 814 may each be implemented as intranet server 1516, one or more of the clients 1502, 1504, and 1506, or one or more of servers 1510, 1512, and 1514. The network 816 may be implemented as remote network 1508.

Figure 16A:
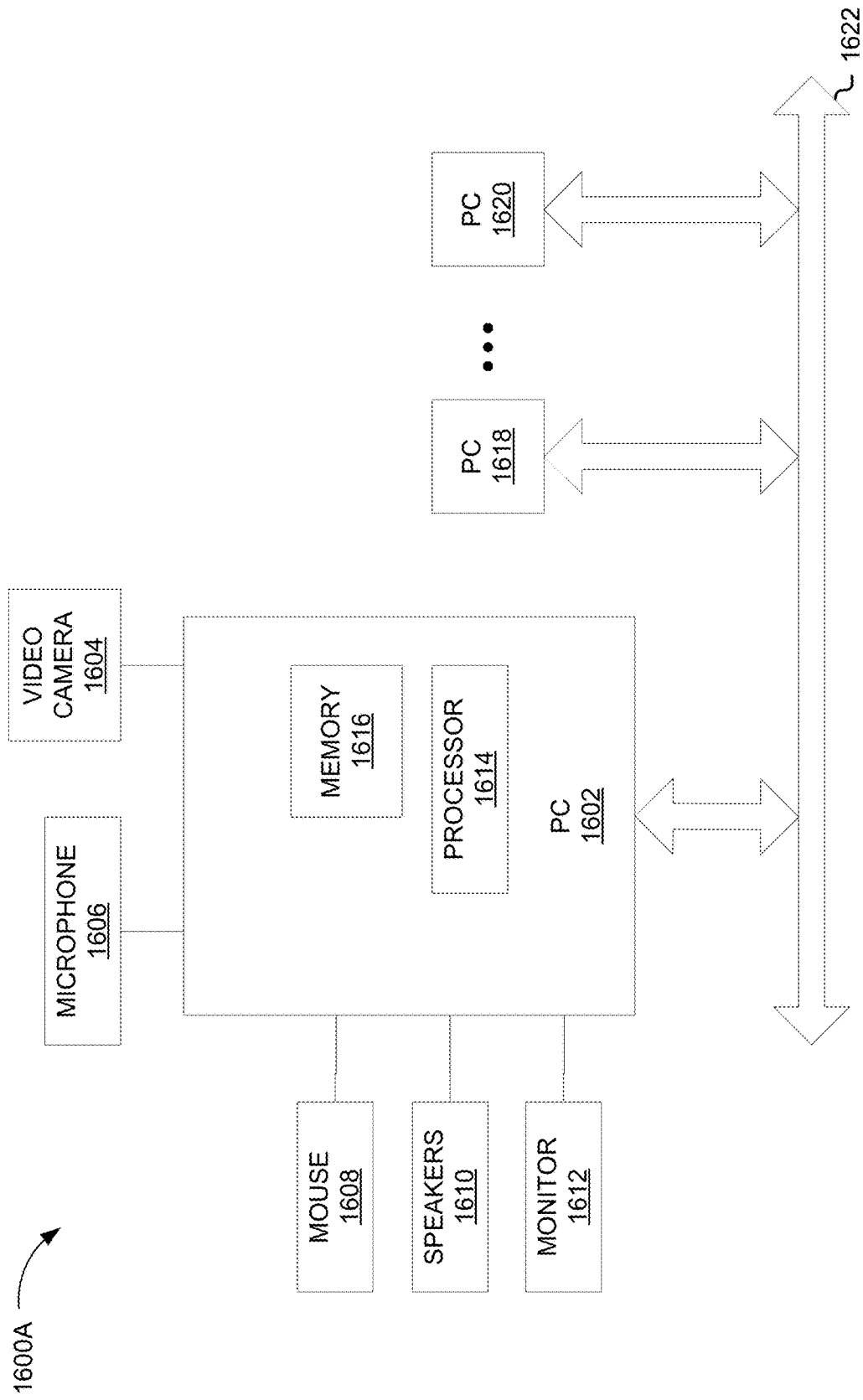
FIG. 16A illustrates a networked computer system, in accordance with at least one embodiment.

FIG. 16A illustrates a networked computer system 1600A, in accordance with at least one embodiment. In at least one embodiment, networked computer system 1600A includes a plurality of nodes or personal computers ("PCs") 1602, 1618, 1620. In at least one embodiment, personal computer or node 1602 includes a processor 1614, memory 1616, video camera 1604, microphone 1606, mouse 1608, speakers 1610, and monitor 1612. In at least one embodiment, PCs 1602, 1618, 1620 may each run one or more desktop servers of an internal network within a given company, for instance, or may be servers of a general network not limited to a specific environment. In at least one embodiment, there is one server per PC node of a network, so that each PC node of a network represents a particular network server, having a particular network URL address. In at least one embodiment, each server defaults to a default web page for that server's user, which may itself contain embedded URLs pointing to further subpages of that user on that server, or to other servers or pages on other servers on a network.

In at least one embodiment, nodes 1602, 1618, 1620 and other nodes of a network are interconnected via medium 1622. In at least one embodiment, medium 1622 may be, a communication channel such as an Integrated Services Digital Network ("ISDN"). In at least one embodiment, various nodes of a networked computer system may be connected through a variety of communication media, including local area networks ("LANs"), plain-old telephone lines ("POTS"), sometimes referred to as public switched telephone networks ("PSTN"), and/or variations thereof. In at least one embodiment, various nodes of a network may also constitute computer system users inter-connected via a network such as the Internet. In at least one embodiment, each server on a network (running from a particular node of a network at a given instance) has a unique address or identification within a network, which may be specifiable in terms of an URL.

In at least one embodiment, a plurality of multi-point conferencing units ("MCUs") may thus be utilized to transmit data to and from various nodes or "endpoints" of a conferencing system. In at least one embodiment, nodes and/or MCUs may be interconnected via an ISDN link or through a local area network ("LAN"), in addition to various other communications media such as nodes connected through the Internet. In at least one embodiment, nodes of a conferencing system may, in general, be connected directly to a communications medium such as a LAN or through an MCU, and that a conferencing system may include other nodes or elements such as routers, servers, and/or variations thereof.

In at least one embodiment, processor 1614 is a general-purpose programmable processor. In at least one embodiment, processors of nodes of networked computer system 1600A may also be special-purpose video processors. In at least one embodiment, various peripherals and components of a node such as those of node 1602 may vary from those of other nodes. In at least one embodiment, node 1618 and node 1620 may be configured identically to or differently than node 1602. In at least one embodiment, a node may be implemented on any suitable computer system in addition to PC systems.

In at least one embodiment, networked computer system 1600A may be used to implement the system 100 (see FIG. 1). In such embodiments, the sender device 102 and/or the receiver device 104 may each be implemented as one or more of PCs 1602, 1618, 1620. The network 106 may be implemented as medium 1622.

In at least one embodiment, networked computer system 1600A may be used to implement the data communication system 500 (see FIG. 5). In such embodiments, one or more of the Tx host computers 524, 526, and 528 and/or the Rx host computer 540 may each be implemented as one or more of PCs 1602, 1618, 1620. The packet data network 522 may be implemented as medium 1622.

In at least one embodiment, networked computer system 1600A may be used to implement the data communication system 810 (see FIG. 8). In such embodiments, the O-DU 812 and/or the O-RU 814 may each be implemented as one or more of PCs 1602, 1618, 1620. The network 816 may be implemented as medium 1622.

Figure 16B:
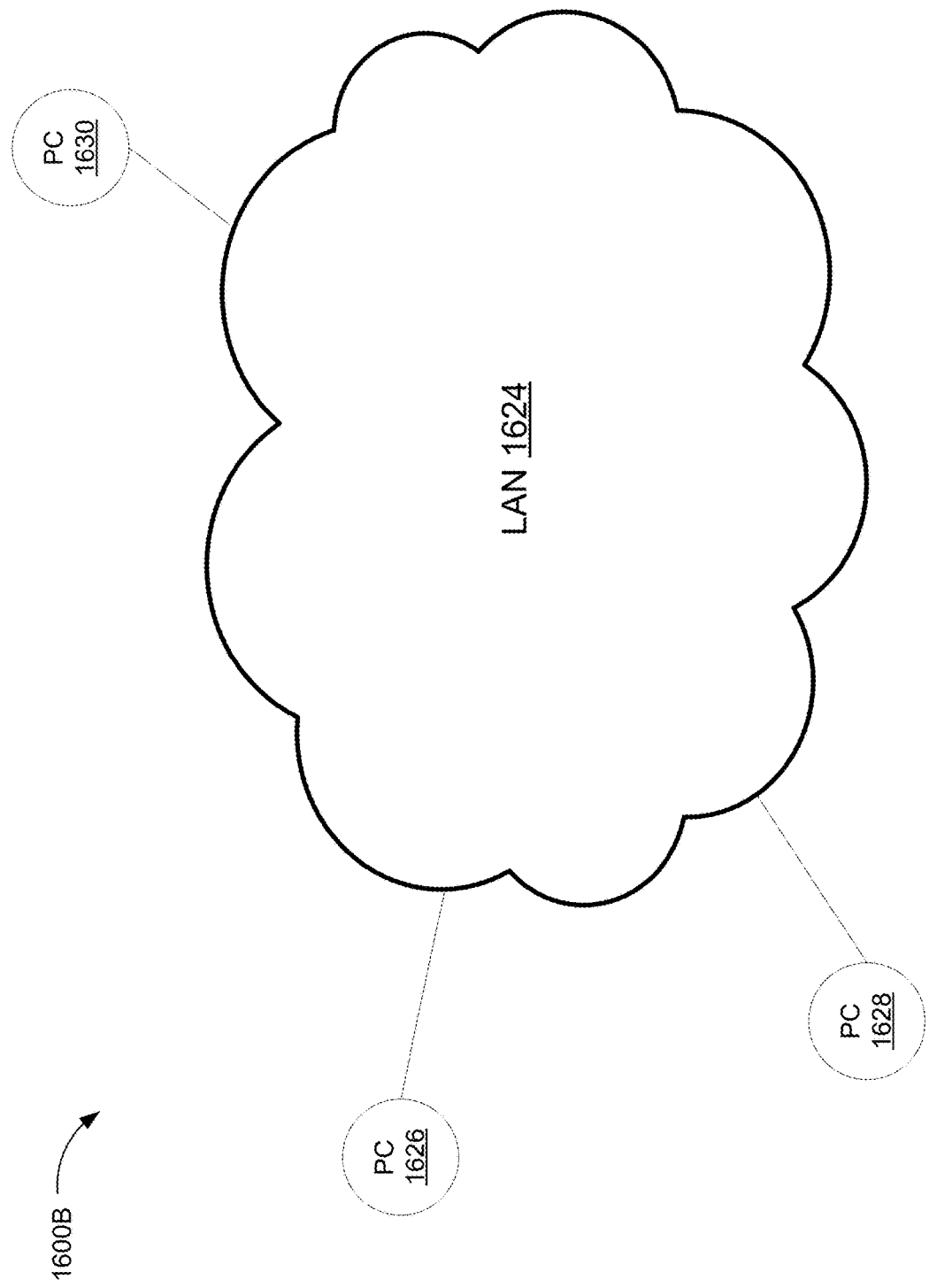
FIG. 16B illustrates a networked computer system, in accordance with at least one embodiment.

FIG. 16B illustrates a networked computer system 1600B, in accordance with at least one embodiment. In at least one embodiment, system 1600B illustrates a network such as LAN 1624, which may be used to interconnect a variety of nodes that may communicate with each other. In at least one embodiment, attached to LAN 1624 are a plurality of nodes such as PC nodes 1626, 1628, 1630. In at least one embodiment, a node may also be connected to the LAN via a network server or other means. In at least one embodiment, system 1600B includes other types of nodes or elements, for example including routers, servers, and nodes.

In at least one embodiment, networked computer system 1600B may be used to implement the system 100 (see FIG. 1). In such embodiments, the sender device 102 and/or the receiver device 104 may each be implemented as one or more of PC nodes 1626, 1628, 1630. The network 106 may be implemented as LAN 1624.

In at least one embodiment, networked computer system 1600B may be used to implement the data communication system 500 (see FIG. 5). In such embodiments, one or more of the Tx host computers 524, 526, and 528 and/or the Rx host computer 540 may each be implemented as one or more of PC nodes 1626, 1628, 1630. The packet data network 522 may be implemented as LAN 1624.

In at least one embodiment, networked computer system 1600B may be used to implement the data communication system 810 (see FIG. 8). In such embodiments, the O-DU 812 and/or the O-RU 814 may each be implemented as one or more of PC nodes 1626, 1628, 1630. The network 816 may be implemented as LAN 1624.

Figure 16C:
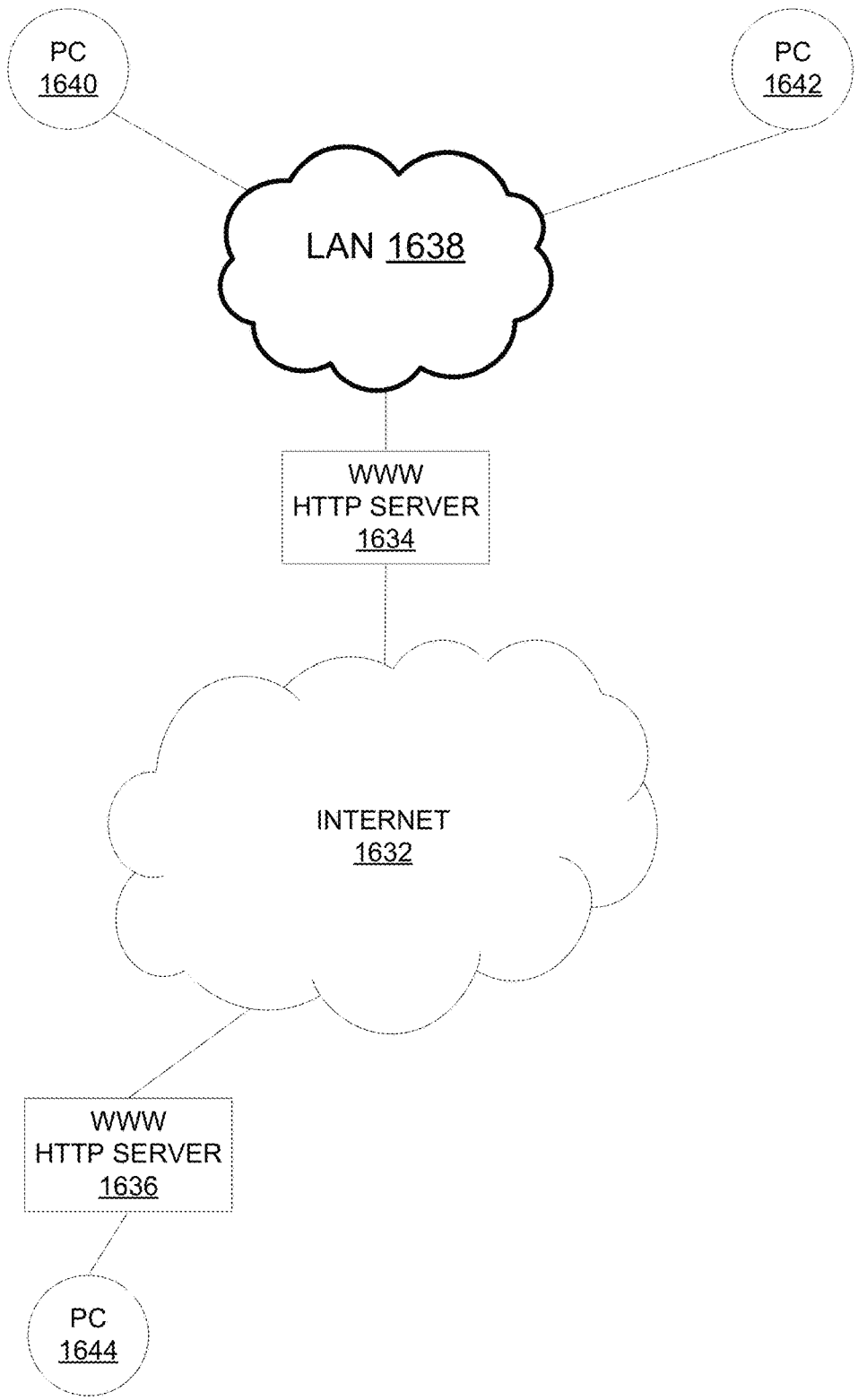
FIG. 16C illustrates a networked computer system, in accordance with at least one embodiment.

FIG. 16C illustrates a networked computer system 1600C, in accordance with at least one embodiment. In at least one embodiment, system 1600C illustrates a WWW system having communications across a backbone communications network such as Internet 1632, which may be used to interconnect a variety of nodes of a network. In at least one embodiment, WWW is a set of protocols operating on top of the Internet, and allows a graphical interface system to operate thereon for accessing information through the Internet. In at least one embodiment, attached to Internet 1632 in WWW are a plurality of nodes such as PCs 1640, 1642, 1644. In at least one embodiment, a node is interfaced to other nodes of WWW through a WWW HTTP server such as servers 1634, 1636. In at least one embodiment, PC 1644 may be a PC forming a node of network 1632 and itself running its server 1636, although PC 1644 and server 1636 are illustrated separately in FIG. 16C for illustrative purposes.

In at least one embodiment, WWW is a distributed type of application, characterized by WWW HTTP, WWW's protocol, which runs on top of the Internet's transmission control protocol/Internet protocol ("TCP/IP"). In at least one embodiment, WWW may thus be characterized by a set of protocols (i.e., HTTP) running on the Internet as its "backbone."

In at least one embodiment, a web browser is an application running on a node of a network that, in WWW-compatible type network systems, allows users of a particular server or node to view such information and thus allows a user to search graphical and text-based files that are linked together using hypertext links that are embedded in documents or files available from servers on a network that understand HTTP. In at least one embodiment, when a given web page of a first server associated with a first node is retrieved by a user using another server on a network such as the Internet, a document retrieved may have various hypertext links embedded therein and a local copy of a page is created local to a retrieving user. In at least one embodiment, when a user clicks on a hypertext link, locally-stored information related to a selected hypertext link is typically sufficient to allow a user's machine to open a connection across the Internet to a server indicated by a hypertext link.

In at least one embodiment, more than one user may be coupled to each HTTP server, for example through a LAN such as LAN 1638 as illustrated with respect to WWW HTTP server 1634. In at least one embodiment, system 1600C may also include other types of nodes or elements. In at least one embodiment, a WWW HTTP server is an application running on a machine, such as a PC. In at least one embodiment, each user may be considered to have a unique "server," as illustrated with respect to PC 1644. In at least one embodiment, a server may be considered to be a server such as WWW HTTP server 1634, which provides access to a network for a LAN or plurality of nodes or plurality of LANs. In at least one embodiment, there are a plurality of users, each having a desktop PC or node of a network, each desktop PC potentially establishing a server for a user thereof. In at least one embodiment, each server is associated with a particular network address or URL, which, when accessed, provides a default web page for that user. In at least one embodiment, a web page may contain further links (embedded URLs) pointing to further subpages of that user on that server, or to other servers on a network or to pages on other servers on a network.

In at least one embodiment, networked computer system 1600C may be used to implement the system 100 (see FIG. 1). In such embodiments, the sender device 102 and/or the receiver device 104 may each be implemented as one or more of PCs 1640, 1642, 1644. The network 106 may be implemented as LAN 1638.

In at least one embodiment, networked computer system 1600C may be used to implement the data communication system 500 (see FIG. 5). In such embodiments, one or more of the Tx host computers 524, 526, and 528 and/or the Rx host computer 540 may each be implemented as one or more of PCs 1640, 1642, 1644. The packet data network 522 may be implemented as LAN 1638.

In at least one embodiment, networked computer system 1600C may be used to implement the data communication system 810 (see FIG. 8). In such embodiments, the O-DU 812 and/or the O-RU 814 may each be implemented as one or more of PCs 1640, 1642, 1644. The network 816 may be implemented as LAN 1638.

Cloud Computing and Services

The following figures set forth, without limitation, exemplary cloud-based systems that can be used to implement at least one embodiment.

In at least one embodiment, cloud computing is a style of computing in which dynamically scalable and often virtualized resources are provided as a service over the Internet. In at least one embodiment, users need not have knowledge of, expertise in, or control over technology infrastructure, which can be referred to as "in the cloud," that supports them. In at least one embodiment, cloud computing incorporates infrastructure as a service, platform as a service, software as a service, and other variations that have a common theme of reliance on the Internet for satisfying computing needs of users. In at least one embodiment, a typical cloud deployment, such as in a private cloud (e.g., enterprise network), or a data center (DC) in a public cloud (e.g., Internet) can consist of thousands of servers (or alternatively, VMs), hundreds of Ethernet, Fiber Channel or Fiber Channel over Ethernet (FCoE) ports, switching and storage infrastructure, etc. In at least one embodiment, cloud can also consist of network services infrastructure like IPsec VPN hubs, firewalls, load balancers, wide area network (WAN) optimizers etc. In at least one embodiment, remote subscribers can access cloud applications and services securely by connecting via a VPN tunnel, such as an IPsec VPN tunnel.

In at least one embodiment, cloud computing is a model for enabling convenient, on-demand network access to a shared pool of configurable computing resources (e.g., networks, servers, storage, applications, and services) that can be rapidly provisioned and released with minimal management effort or service provider interaction.

In at least one embodiment, cloud computing is characterized by on-demand self-service, in which a consumer can unilaterally provision computing capabilities, such as server time and network storage, as needed automatically without requiring human inter-action with each service's provider. In at least one embodiment, cloud computing is characterized by broad network access, in which capabilities are available over a network and accessed through standard mechanisms that promote use by heterogeneous thin or thick client platforms (e.g., mobile phones, laptops, and PDAs). In at least one embodiment, cloud computing is characterized by resource pooling, in which a provider's computing resources are pooled to serve multiple consumers using a multi-tenant model, with different physical and virtual resources dynamically as-signed and reassigned according to consumer demand. In at least one embodiment, there is a sense of location independence in that a customer generally has no control or knowledge over an exact location of provided resources, but may be able to specify location at a higher level of abstraction (e.g., country, state, or datacenter). In at least one embodiment, examples of resources include storage, processing, memory, network bandwidth, and virtual machines. In at least one embodiment, cloud computing is characterized by rapid elasticity, in which capabilities can be rapidly and elastically provisioned, in some cases automatically, to quickly scale out and rapidly released to quickly scale in. In at least one embodiment, to a consumer, capabilities available for provisioning often appear to be unlimited and can be purchased in any quantity at any time. In at least one embodiment, cloud computing is characterized by measured service, in which cloud systems automatically control and optimize resource use by leveraging a metering capability at some level of abstraction appropriate to a type of service (e.g., storage, processing, bandwidth, and active user accounts). In at least one embodiment, resource usage can be monitored, controlled, and reported providing transparency for both a provider and consumer of a utilized service.

In at least one embodiment, cloud computing may be associated with various services. In at least one embodiment, cloud Software as a Service (SaaS) may refer to as service in which a capability provided to a consumer is to use a provider's applications running on a cloud infrastructure. In at least one embodiment, applications are accessible from various client devices through a thin client interface such as a web browser (e.g., web-based email). In at least one embodiment, consumer does not manage or control underlying cloud infrastructure including network, servers, operating systems, storage, or even individual application capabilities, with a possible exception of limited user-specific application configuration settings.

In at least one embodiment, cloud Platform as a Service (PaaS) may refer to a service in which a capability provided to a consumer is to deploy onto cloud infrastructure consumer-created or acquired applications created using programming languages and tools supported by a provider. In at least one embodiment, consumer does not manage or control underlying cloud infrastructure including networks, servers, operating systems, or storage, but has control over deployed applications and possibly application hosting environment configurations.

In at least one embodiment, cloud Infrastructure as a Service (IaaS) may refer to a service in which a capability provided to a consumer is to provision processing, storage, networks, and other fundamental computing resources where a consumer is able to deploy and run arbitrary software, which can include operating systems and applications. In at least one embodiment, consumer does not manage or control underlying cloud infrastructure, but has control over operating systems, storage, deployed applications, and possibly limited control of select networking components (e.g., host firewalls).

In at least one embodiment, cloud computing may be deployed in various ways. In at least one embodiment, a private cloud may refer to a cloud infrastructure that is operated solely for an organization. In at least one embodiment, a private cloud may be managed by an organization or a third party and may exist on-premises or off-premises. In at least one embodiment, a community cloud may refer to a cloud infrastructure that is shared by several organizations and supports a specific community that has shared concerns (e.g., mission, security requirements, policy, and compliance considerations). In at least one embodiment, a community cloud may be managed by organizations or a third party and may exist on-premises or off-premises. In at least one embodiment, a public cloud may refer to a cloud infrastructure that is made available to a general public or a large industry group and is owned by an organization providing cloud services. In at least one embodiment, a hybrid cloud may refer to a cloud infrastructure is a composition of two or more clouds (private, community, or public) that remain unique entities, but are bound together by standardized or proprietary technology that enables data and application portability (e.g., cloud bursting for load-balancing between clouds). In at least one embodiment, a cloud computing environment is service oriented with a focus on statelessness, low coupling, modularity, and semantic interoperability.

Figure 17:
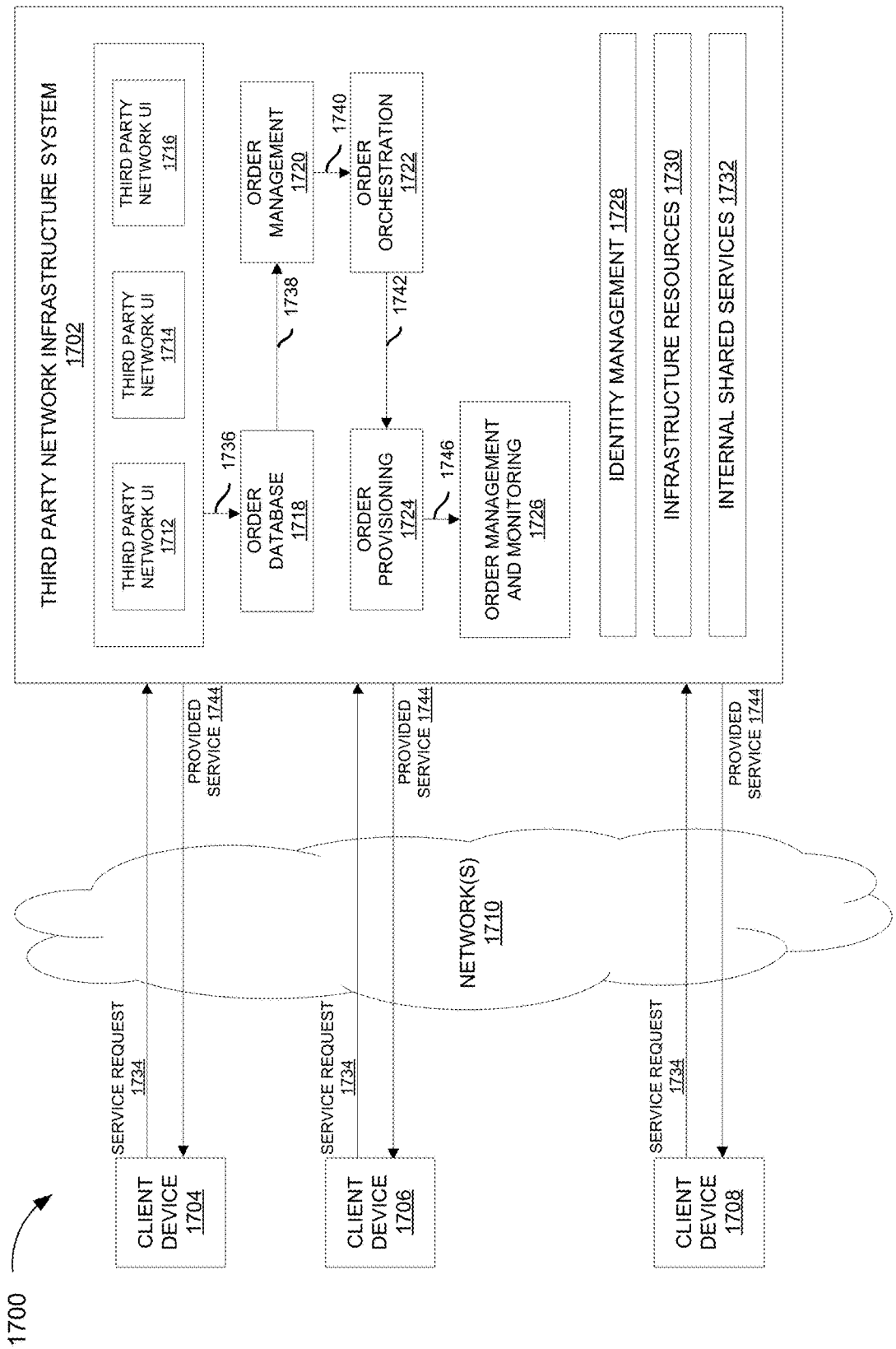
FIG. 17 illustrates one or more components of a system environment in which services may be offered as third party network services, in accordance with at least one embodiment.

FIG. 17 illustrates one or more components of a system environment 1700 in which services may be offered as third party network services, in accordance with at least one embodiment. In at least one embodiment, a third party network may be referred to as a cloud, cloud network, cloud computing network, and/or variations thereof. In at least one embodiment, system environment 1700 includes one or more client computing devices 1704, 1706, and 1708 that may be used by users to interact with a third party network infrastructure system 1702 that provides third party network services, which may be referred to as cloud computing services. In at least one embodiment, third party network infrastructure system 1702 may include one or more computers and/or servers.

It should be appreciated that third party network infrastructure system 1702 depicted in FIG. 17 may have other components than those depicted. Further, FIG. 17 depicts an embodiment of a third party network infrastructure system. In at least one embodiment, third party network infrastructure system 1702 may have more or fewer components than depicted in FIG. 17, may combine two or more components, or may have a different configuration or arrangement of components.

In at least one embodiment, client computing devices 1704, 1706, and 1708 may be configured to operate a client application such as a web browser, a proprietary client application, or some other application, which may be used by a user of a client computing device to interact with third party network infrastructure system 1702 to use services provided by third party network infrastructure system 1702. Although exemplary system environment 1700 is shown with three client computing devices, any number of client computing devices may be supported. In at least one embodiment, other devices such as devices with sensors, etc. may interact with third party network infrastructure system 1702. In at least one embodiment, network(s) 1710 may facilitate communications and exchange of data between client computing devices 1704, 1706, and 1708 and third party network infrastructure system 1702.

In at least one embodiment, services provided by third party network infrastructure system 1702 may include a host of services that are made available to users of a third party network infrastructure system on demand. In at least one embodiment, various services may also be offered including without limitation online data storage and backup solutions, Web-based e-mail services, hosted office suites and document collaboration services, database management and processing, managed technical support services, and/or variations thereof. In at least one embodiment, services provided by a third party network infrastructure system can dynamically scale to meet needs of its users.

In at least one embodiment, a specific instantiation of a service provided by third party network infrastructure system 1702 may be referred to as a "service instance." In at least one embodiment, in general, any service made available to a user via a communication network, such as the Internet, from a third party network service provider's system is referred to as a "third party network service." In at least one embodiment, in a public third party network environment, servers and systems that make up a third party network service provider's system are different from a customer's own on-premises servers and systems. In at least one embodiment, a third party network service provider's system may host an application, and a user may, via a communication network such as the Internet, on demand, order and use an application.

In at least one embodiment, a service in a computer network third party network infrastructure may include protected computer network access to storage, a hosted database, a hosted web server, a software application, or other service provided by a third party network vendor to a user. In at least one embodiment, a service can include password-protected access to remote storage on a third party network through the Internet. In at least one embodiment, a service can include a web service-based hosted relational database and a script-language middleware engine for private use by a networked developer. In at least one embodiment, a service can include access to an email software application hosted on a third party network vendor's web site.

In at least one embodiment, third party network infrastructure system 1702 may include a suite of applications, middleware, and database service offerings that are delivered to a customer in a self-service, subscription-based, elastically scalable, reliable, highly available, and secure manner. In at least one embodiment, third party network infrastructure system 1702 may also provide "big data" related computation and analysis services. In at least one embodiment, term "big data" is generally used to refer to extremely large data sets that can be stored and manipulated by analysts and researchers to visualize large amounts of data, detect trends, and/or otherwise interact with data. In at least one embodiment, big data and related applications can be hosted and/or manipulated by an infrastructure system on many levels and at different scales. In at least one embodiment, tens, hundreds, or thousands of processors linked in parallel can act upon such data in order to present it or simulate external forces on data or what it represents. In at least one embodiment, these data sets can involve structured data, such as that organized in a database or otherwise according to a structured model, and/or unstructured data (e.g., emails, images, data blobs (binary large objects), web pages, complex event processing). In at least one embodiment, by leveraging an ability of an embodiment to relatively quickly focus more (or fewer) computing resources upon an objective, a third party network infrastructure system may be better available to carry out tasks on large data sets based on demand from a business, government agency, research organization, private individual, group of like-minded individuals or organizations, or other entity.

In at least one embodiment, third party network infrastructure system 1702 may be adapted to automatically provision, manage, and track a customer's subscription to services offered by third party network infrastructure system 1702. In at least one embodiment, third party network infrastructure system 1702 may provide third party network services via different deployment models. In at least one embodiment, services may be provided under a public third party network model in which third party network infrastructure system 1702 is owned by an organization selling third party network services and services are made available to a general public or different industry enterprises. In at least one embodiment, services may be provided under a private third party network model in which third party network infrastructure system 1702 is operated solely for a single organization and may provide services for one or more entities within an organization. In at least one embodiment, third party network services may also be provided under a community third party network model in which third party network infrastructure system 1702 and services provided by third party network infrastructure system 1702 are shared by several organizations in a related community. In at least one embodiment, third party network services may also be provided under a hybrid third party network model, which is a combination of two or more different models.

In at least one embodiment, services provided by third party network infrastructure system 1702 may include one or more services provided under Software as a Service (SaaS) category, Platform as a Service (PaaS) category, Infrastructure as a Service (IaaS) category, or other categories of services including hybrid services. In at least one embodiment, a customer, via a subscription order, may order one or more services provided by third party network infrastructure system 1702. In at least one embodiment, third party network infrastructure system 1702 then performs processing to provide services in a customer's subscription order.

In at least one embodiment, services provided by third party network infrastructure system 1702 may include, without limitation, application services, platform services and infrastructure services. In at least one embodiment, application services may be provided by a third party network infrastructure system via a SaaS platform. In at least one embodiment, SaaS platform may be configured to provide third party network services that fall under a SaaS category. In at least one embodiment, SaaS platform may provide capabilities to build and deliver a suite of on-demand applications on an integrated development and deployment platform. In at least one embodiment, SaaS platform may manage and control underlying software and infrastructure for providing SaaS services. In at least one embodiment, by utilizing services provided by a SaaS platform, customers can utilize applications executing on a third party network infrastructure system. In at least one embodiment, customers can acquire an application services without a need for customers to purchase separate licenses and support. In at least one embodiment, various different SaaS services may be provided. In at least one embodiment, examples include, without limitation, services that provide solutions for sales performance management, enterprise integration, and business flexibility for large organizations.

In at least one embodiment, platform services may be provided by third party network infrastructure system 1702 via a PaaS platform. In at least one embodiment, PaaS platform may be configured to provide third party network services that fall under a PaaS category. In at least one embodiment, examples of platform services may include without limitation services that enable organizations to consolidate existing applications on a shared, common architecture, as well as an ability to build new applications that leverage shared services provided by a platform. In at least one embodiment, PaaS platform may manage and control underlying software and infrastructure for providing PaaS services. In at least one embodiment, customers can acquire PaaS services provided by third party network infrastructure system 1702 without a need for customers to purchase separate licenses and support.

In at least one embodiment, by utilizing services provided by a PaaS platform, customers can employ programming languages and tools supported by a third party network infrastructure system and also control deployed services. In at least one embodiment, platform services provided by a third party network infrastructure system may include database third party network services, middleware third party network services and third party network services. In at least one embodiment, database third party network services may support shared service deployment models that enable organizations to pool database resources and offer customers a Database as a Service in a form of a database third party network. In at least one embodiment, middleware third party network services may provide a platform for customers to develop and deploy various business applications, and third party network services may provide a platform for customers to deploy applications, in a third party network infrastructure system.

In at least one embodiment, various different infrastructure services may be provided by an IaaS platform in a third party network infrastructure system. In at least one embodiment, infrastructure services facilitate management and control of underlying computing resources, such as storage, networks, and other fundamental computing resources for customers utilizing services provided by a SaaS platform and a PaaS platform.

In at least one embodiment, third party network infrastructure system 1702 may also include infrastructure resources 1730 for providing resources used to provide various services to customers of a third party network infrastructure system. In at least one embodiment, infrastructure resources 1730 may include pre-integrated and optimized combinations of hardware, such as servers, storage, and networking resources to execute services provided by a Paas platform and a Saas platform, and other resources.

In at least one embodiment, resources in third party network infrastructure system 1702 may be shared by multiple users and dynamically re-allocated per demand. In at least one embodiment, resources may be allocated to users in different time zones. In at least one embodiment, third party network infrastructure system 1702 may enable a first set of users in a first time zone to utilize resources of a third party network infrastructure system for a specified number of hours and then enable a re-allocation of same resources to another set of users located in a different time zone, thereby maximizing utilization of resources.

In at least one embodiment, a number of internal shared services 1732 may be provided that are shared by different components or modules of third party network infrastructure system 1702 to enable provision of services by third party network infrastructure system 1702. In at least one embodiment, these internal shared services may include, without limitation, a security and identity service, an integration service, an enterprise repository service, an enterprise manager service, a virus scanning and white list service, a high availability, backup and recovery service, service for enabling third party network support, an email service, a notification service, a file transfer service, and/or variations thereof.

In at least one embodiment, third party network infrastructure system 1702 may provide comprehensive management of third party network services (e.g., SaaS, PaaS, and IaaS services) in a third party network infrastructure system. In at least one embodiment, third party network management functionality may include capabilities for provisioning, managing, and tracking a customer's subscription received by third party network infrastructure system 1702, and/or variations thereof.

In at least one embodiment, as depicted in FIG. 17, third party network management functionality may be provided by one or more modules, such as an order management module 1720, an order orchestration module 1722, an order provisioning module 1724, an order management and monitoring module 1726, and an identity management module 1728. In at least one embodiment, these modules may include or be provided using one or more computers and/or servers, which may be general purpose computers, specialized server computers, server farms, server clusters, or any other appropriate arrangement and/or combination.

In at least one embodiment, at step 1734, a customer using a client device, such as client computing devices 1704, 1706 or 1708, may interact with third party network infrastructure system 1702 by requesting one or more services provided by third party network infrastructure system 1702 and placing an order for a subscription for one or more services offered by third party network infrastructure system 1702. In at least one embodiment, a customer may access a third party network User Interface (UI) such as third party network UI 1712, third party network UI 1714 and/or third party network UI 1716 and place a subscription order via these UIs. In at least one embodiment, order information received by third party network infrastructure system 1702 in response to a customer placing an order may include information identifying a customer and one or more services offered by a third party network infrastructure system 1702 that a customer intends to subscribe to.

In at least one embodiment, at step 1736, an order information received from a customer may be stored in an order database 1718. In at least one embodiment, if this is a new order, a new record may be created for an order. In at least one embodiment, order database 1718 can be one of several databases operated by third party network infrastructure system 1718 and operated in conjunction with other system elements.

In at least one embodiment, at step 1738, an order information may be forwarded to an order management module 1720 that may be configured to perform billing and accounting functions related to an order, such as verifying an order, and upon verification, booking an order.

In at least one embodiment, at step 1740, information regarding an order may be communicated to an order orchestration module 1722 that is configured to orchestrate provisioning of services and resources for an order placed by a customer. In at least one embodiment, order orchestration module 1722 may use services of order provisioning module 1724 for provisioning. In at least one embodiment, order orchestration module 1722 enables management of business processes associated with each order and applies business logic to determine whether an order should proceed to provisioning.

In at least one embodiment, at step 1742, upon receiving an order for a new subscription, order orchestration module 1722 sends a request to order provisioning module 1724 to allocate resources and configure resources needed to fulfill a subscription order. In at least one embodiment, order provisioning module 1724 enables an allocation of resources for services ordered by a customer. In at least one embodiment, order provisioning module 1724 provides a level of abstraction between third party network services provided by third party network infrastructure system 1700 and a physical implementation layer that is used to provision resources for providing requested services. In at least one embodiment, this enables order orchestration module 1722 to be isolated from implementation details, such as whether or not services and resources are actually provisioned in real-time or pre-provisioned and only allocated/assigned upon request.

In at least one embodiment, at step 1744, once services and resources are provisioned, a notification may be sent to subscribing customers indicating that a requested service is now ready for use. In at least one embodiment, information (e.g. a link) may be sent to a customer that enables a customer to start using requested services.

In at least one embodiment, at step 1746, a customer's subscription order may be managed and tracked by an order management and monitoring module 1726. In at least one embodiment, order management and monitoring module 1726 may be configured to collect usage statistics regarding a customer use of subscribed services. In at least one embodiment, statistics may be collected for an amount of storage used, an amount data transferred, a number of users, and an amount of system up time and system down time, and/or variations thereof.

In at least one embodiment, third party network infrastructure system 1700 may include an identity management module 1728 that is configured to provide identity services, such as access management and authorization services in third party network infrastructure system 1700. In at least one embodiment, identity management module 1728 may control information about customers who wish to utilize services provided by third party network infrastructure system 1702. In at least one embodiment, such information can include information that authenticates identities of such customers and information that describes which actions those customers are authorized to perform relative to various system resources (e.g., files, directories, applications, communication ports, memory segments, etc.). In at least one embodiment, identity management module 1728 may also include management of descriptive information about each customer and about how and by whom that descriptive information can be accessed and modified.

In at least one embodiment, system environment 1700 may be used to implement the system 100 (see FIG. 1). In such embodiments, the sender device 102 and/or the receiver device 104 may each be implemented as one or more of client computing devices 1704, 1706, and 1708, or third party network infrastructure system 1702. The network 106 may be implemented as network(s) 1710.

In at least one embodiment, system environment 1700 may be used to implement the data communication system 500 (see FIG. 5). In such embodiments, one or more of the Tx host computers 524, 526, and 528 and/or the Rx host computer 540 may each be implemented as one or more of client computing devices 1704, 1706, and 1708, or third party network infrastructure system 1702. The packet data network 522 may be implemented as network(s) 1710.

In at least one embodiment, system environment 1700 may be used to implement the data communication system 810 (see FIG. 8). In such embodiments, the O-DU 812 and/or the O-RU 814 may each be implemented as one or more of client computing devices 1704, 1706, and 1708, or third party network infrastructure system 1702. The network 816 may be implemented as network(s) 1710.

Figure 18:
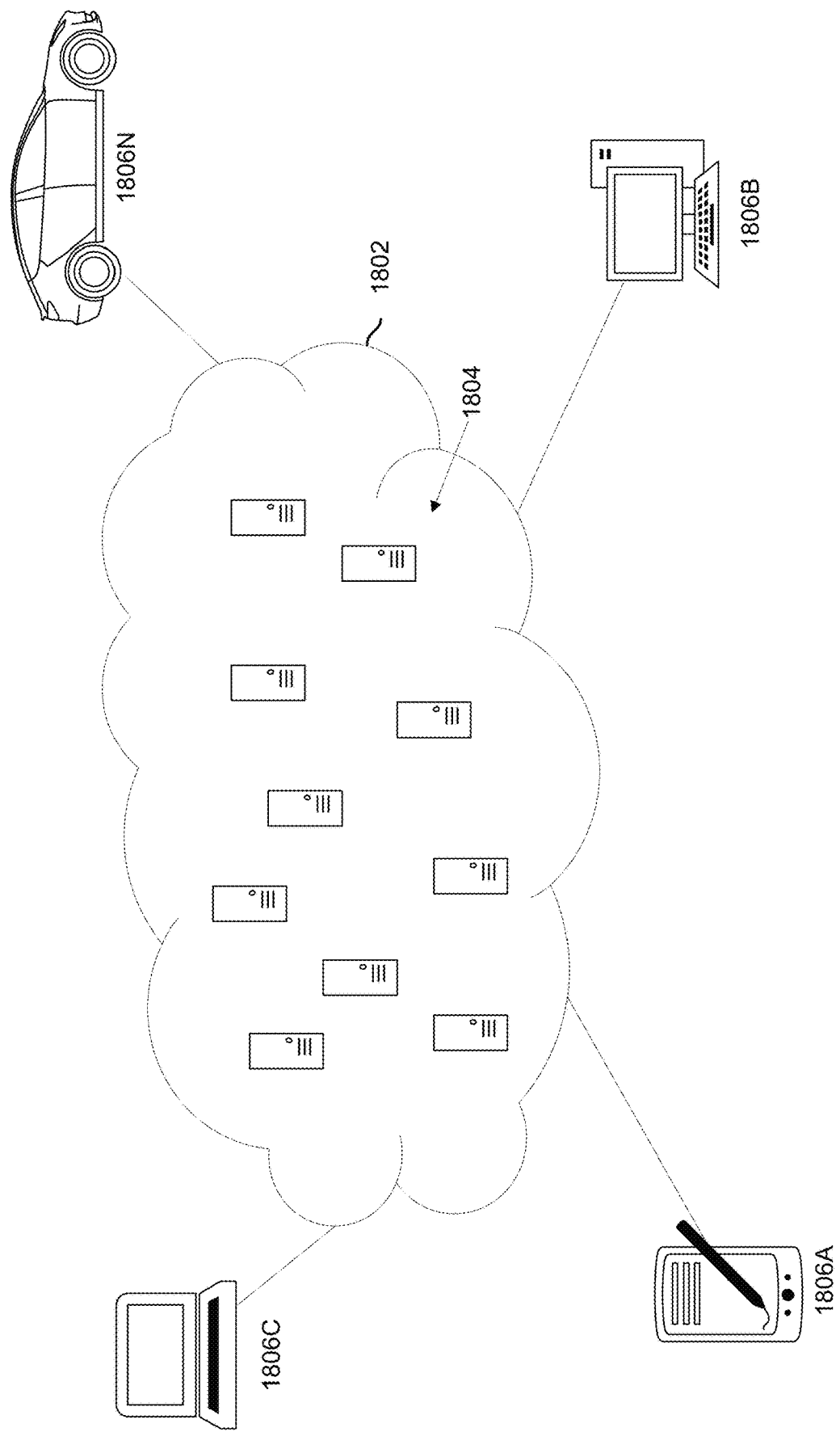
FIG. 18 illustrates a cloud computing environment, in accordance with at least one embodiment.

FIG. 18 illustrates a cloud computing environment 1802, in accordance with at least one embodiment. In at least one embodiment, cloud computing environment 1802 includes one or more computer system/servers 1804 with which computing devices such as, personal digital assistant (PDA) or cellular telephone 1806A, desktop computer 1806B, laptop computer 1806C, and/or automobile computer system 1806N communicate. In at least one embodiment, this allows for infrastructure, platforms, and/or software to be offered as services from cloud computing environment 1802, so as to not require each client to separately maintain such resources. It is understood that types of computing devices 1806A-N shown in FIG. 18 are intended to be illustrative only and that cloud computing environment 1802 can communicate with any type of computerized device over any type of network and/or network/addressable connection (e.g., using a web browser).

In at least one embodiment, a computer system/server 1804, which can be denoted as a cloud computing node, is operational with numerous other general purpose or special purpose computing system environments or configurations. In at least one embodiment, examples of computing systems, environments, and/or configurations that may be suitable for use with computer system/server 1804 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and/or variations thereof.

In at least one embodiment, computer system/server 1804 may be described in a general context of computer system-executable instructions, such as program modules, being executed by a computer system. In at least one embodiment, program modules include routines, programs, objects, components, logic, data structures, and so on, that perform particular tasks or implement particular abstract data types. In at least one embodiment, exemplary computer system/server 1804 may be practiced in distributed loud computing environments where tasks are performed by remote processing devices that are linked through a communications network. In at least one embodiment, in a distributed cloud computing environment, program modules may be located in both local and remote computer system storage media including memory storage devices.

In at least one embodiment, cloud computing environment 1802 may be used to implement the system 100 (see FIG. 1). In such embodiments, the sender device 102 and/or the receiver device 104 may each be implemented as one or more of computer system/servers 1804, PDA or cellular telephone 1806A, desktop computer 1806B, laptop computer 1806C, or automobile computer system 1806N.

In at least one embodiment, cloud computing environment 1802 may be used to implement the data communication system 500 (see FIG. 5). In such embodiments, one or more of the Tx host computers 524, 526, and 528 and/or the Rx host computer 540 may each be implemented as one or more of computer system/servers 1804, PDA or cellular telephone 1806A, desktop computer 1806B, laptop computer 1806C, or automobile computer system 1806N.

In at least one embodiment, cloud computing environment 1802 may be used to implement the data communication system 810 (see FIG. 8). In such embodiments, the O-DU 812 and/or the O-RU 814 may each be implemented as one or more of computer system/servers 1804, PDA or cellular telephone 1806A, desktop computer 1806B, laptop computer 1806C, or automobile computer system 1806N.

Figure 19:
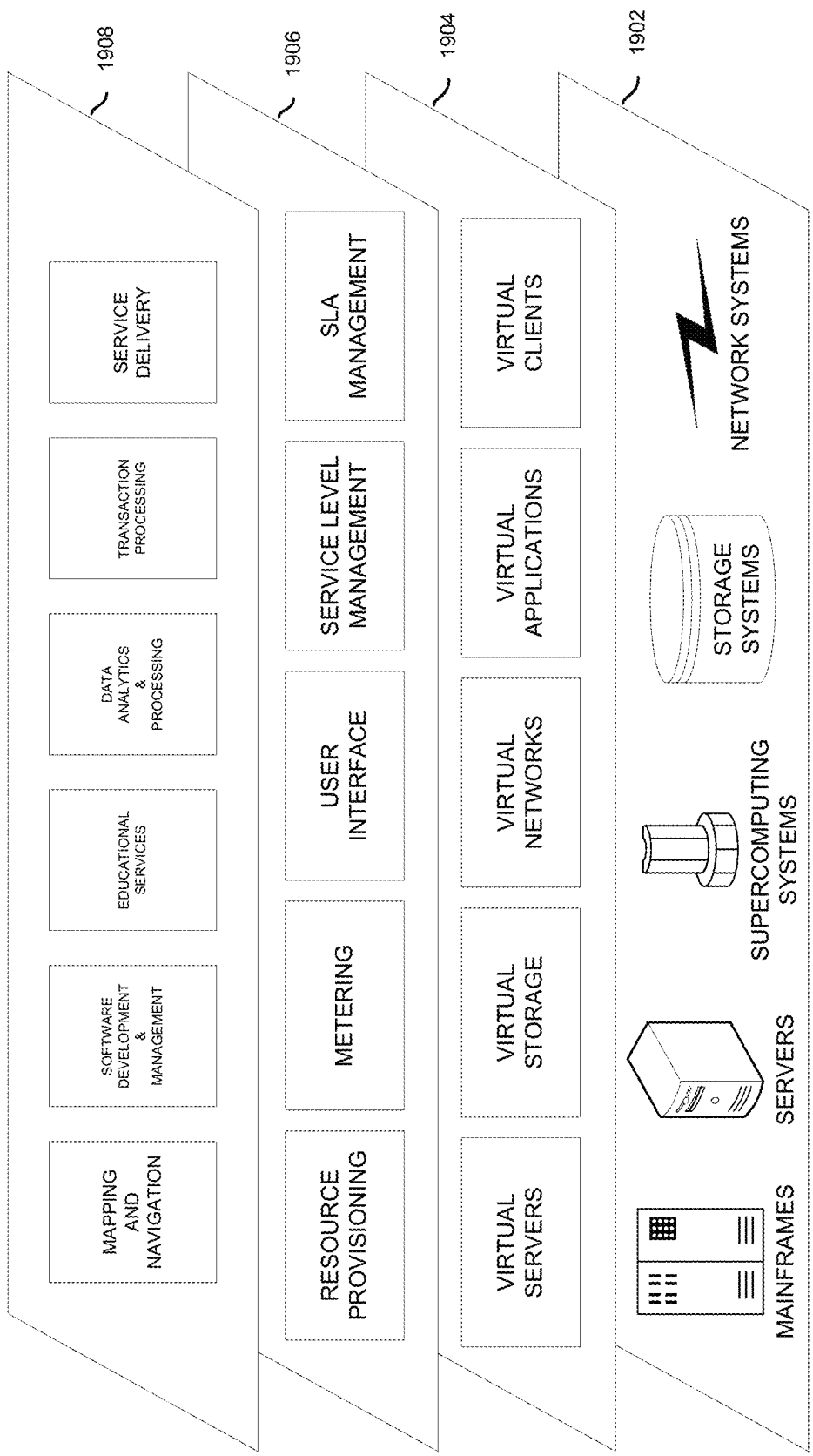
FIG. 19 illustrates a set of functional abstraction layers provided by a cloud computing environment, in accordance with at least one embodiment.

FIG. 19 illustrates a set of functional abstraction layers provided by cloud computing environment 1802 (FIG. 18), in accordance with at least one embodiment. It should be understood in advance that components, layers, and functions shown in FIG. 19 are intended to be illustrative only, and components, layers, and functions may vary.

In at least one embodiment, hardware and software layer 1902 includes hardware and software components. In at least one embodiment, examples of hardware components include mainframes, various RISC (Reduced Instruction Set Computer) architecture based servers, various computing systems, supercomputing systems, storage devices, networks, networking components, and/or variations thereof. In at least one embodiment, examples of software components include network application server software, various application server software, various database software, and/or variations thereof.

In at least one embodiment, virtualization layer 1904 provides an abstraction layer from which following exemplary virtual entities may be provided: virtual servers, virtual storage, virtual networks, including virtual private networks, virtual applications, virtual clients, and/or variations thereof.

In at least one embodiment, management layer 1906 provides various functions. In at least one embodiment, resource provisioning provides dynamic procurement of computing resources and other resources that are utilized to perform tasks within a cloud computing environment. In at least one embodiment, metering provides usage tracking as resources are utilized within a cloud computing environment, and billing or invoicing for consumption of these resources. In at least one embodiment, resources may include application software licenses. In at least one embodiment, security provides identity verification for users and tasks, as well as protection for data and other resources. In at least one embodiment, user interface provides access to a cloud computing environment for both users and system administrators. In at least one embodiment, service level management provides cloud computing resource allocation and management such that required service levels are met. In at least one embodiment, Service Level Agreement (SLA) management provides pre-arrangement for, and procurement of, cloud computing resources for which a future requirement is anticipated in accordance with an SLA.

In at least one embodiment, workloads layer 1908 provides functionality for which a cloud computing environment is utilized. In at least one embodiment, examples of workloads and functions which may be provided from this layer include: mapping and navigation, software development and management, educational services, data analytics and processing, transaction processing, and service delivery.

Supercomputing

The following figures set forth, without limitation, exemplary supercomputer-based systems that can be used to implement at least one embodiment.

In at least one embodiment, a supercomputer may refer to a hardware system exhibiting substantial parallelism and including at least one chip, where chips in a system are interconnected by a network and are placed in hierarchically organized enclosures. In at least one embodiment, a large hardware system filling a machine room, with several racks, each containing several boards/rack modules, each containing several chips, all interconnected by a scalable network, is one particular example of a supercomputer. In at least one embodiment, a single rack of such a large hardware system is another example of a supercomputer. In at least one embodiment, a single chip exhibiting substantial parallelism and containing several hardware components can equally be considered to be a supercomputer, since as feature sizes may decrease, an amount of hardware that can be incorporated in a single chip may also increase.

Figure 20:
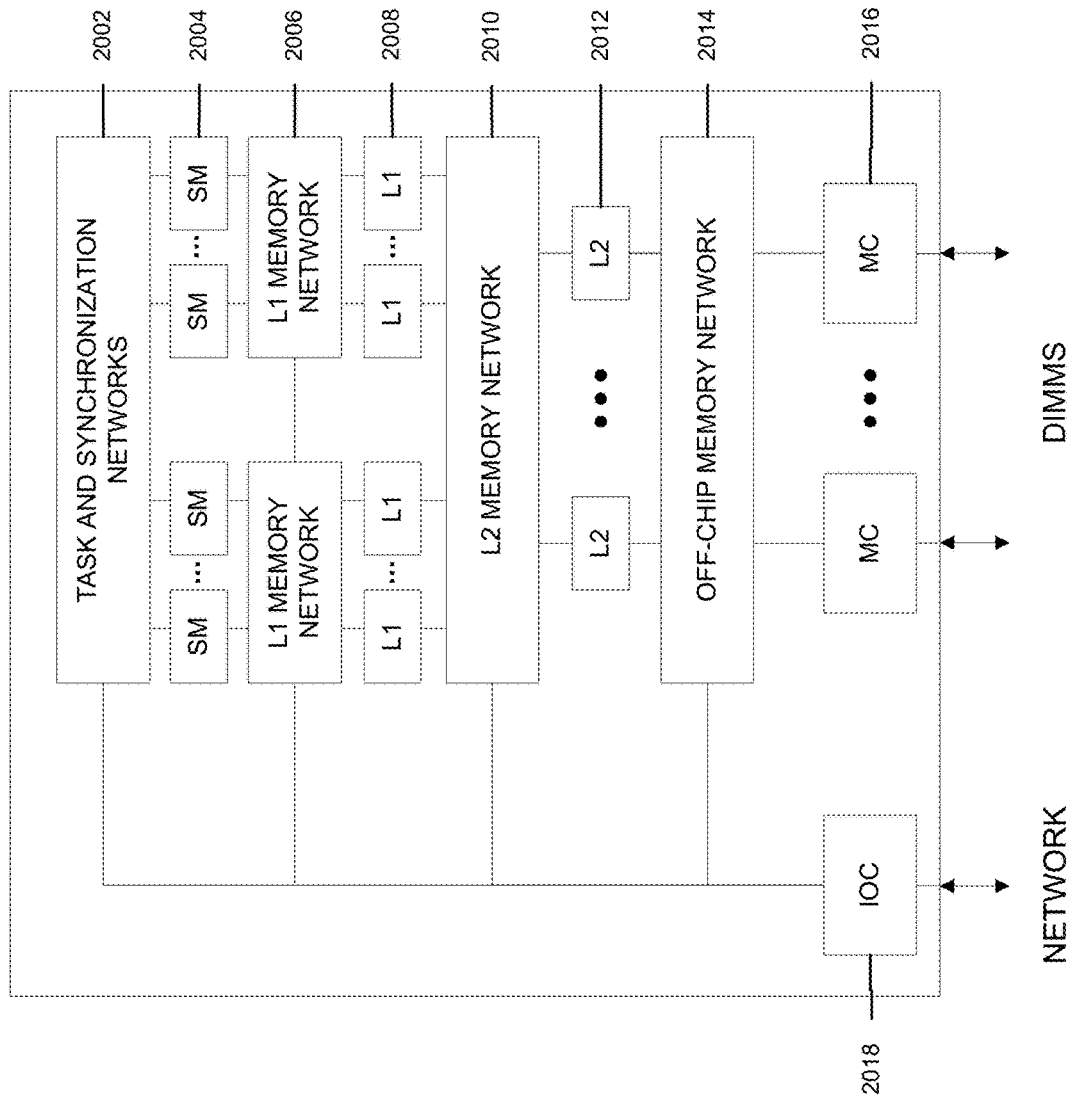
FIG. 20 illustrates a supercomputer at a chip level, in accordance with at least one embodiment.

FIG. 20 illustrates a supercomputer at a chip level, in accordance with at least one embodiment. In at least one embodiment, inside an FPGA or ASIC chip, main computation is performed within finite state machines (2004) called thread units. In at least one embodiment, task and synchronization networks (2002) connect finite state machines and are used to dispatch threads and execute operations in correct order. In at least one embodiment, a multi-level partitioned on-chip cache hierarchy (2008, 2012) is accessed using memory networks (2006, 2010). In at least one embodiment, off-chip memory is accessed using memory controllers (2016) and an off-chip memory network (2014). In at least one embodiment, I/O controller (2018) is used for cross-chip communication when a design does not fit in a single logic chip.

Figure 21:
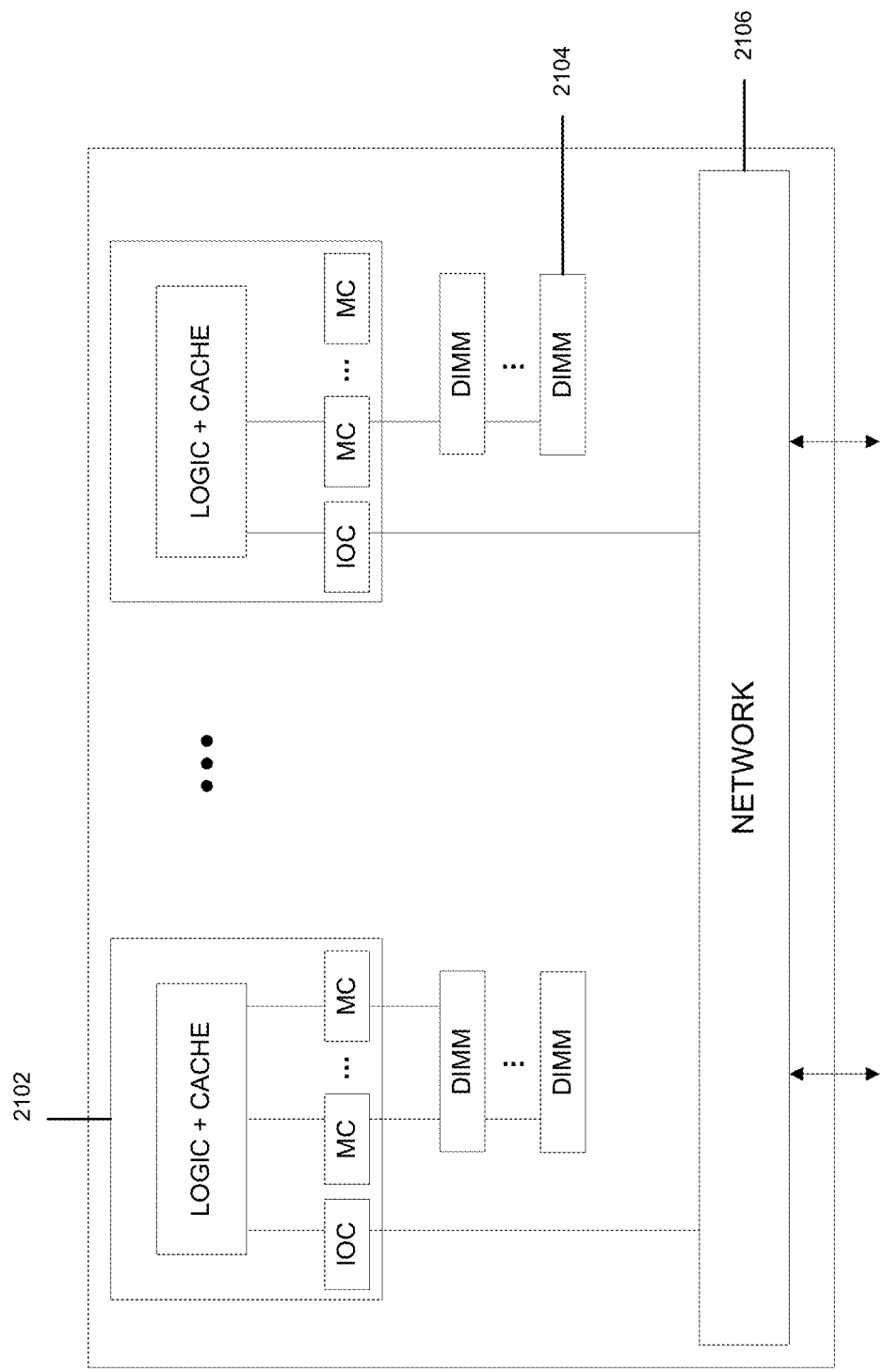
FIG. 21 illustrates a supercomputer at a rack module level, in accordance with at least one embodiment.

FIG. 21 illustrates a supercomputer at a rock module level, in accordance with at least one embodiment. In at least one embodiment, within a rack module, there are multiple FPGA or ASIC chips (2102) that are connected to one or more DRAM units (2104) which constitute main accelerator memory. In at least one embodiment, each FPGA/ASIC chip is connected to its neighbor FPGA/ASIC chip using wide busses on a board, with differential high speed signaling (2106). In at least one embodiment, each FPGA/ASIC chip is also connected to at least one high-speed serial communication cable.

Figure 22:
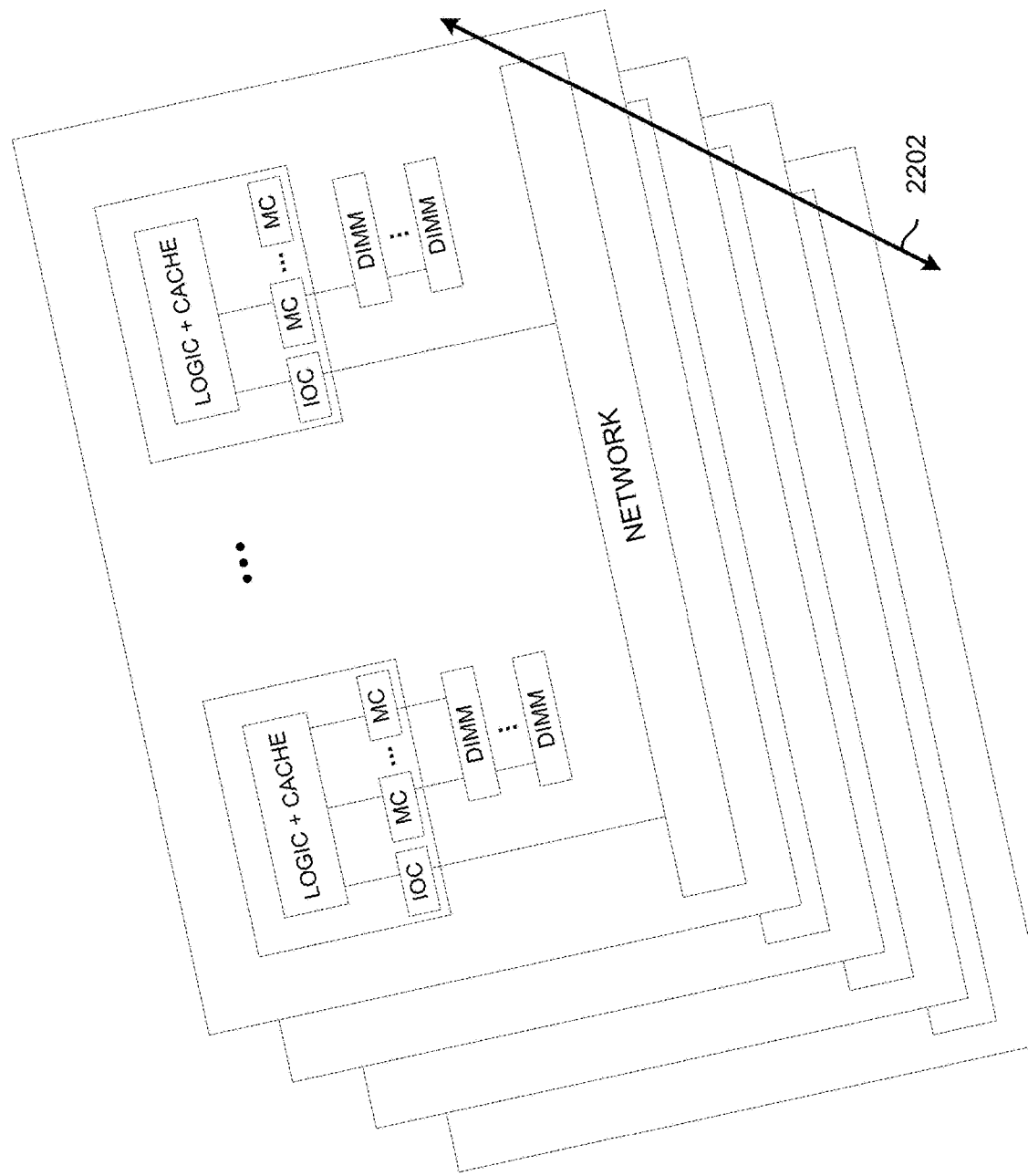
FIG. 22 illustrates a supercomputer at a rack level, in accordance with at least one embodiment.
Figure 23:
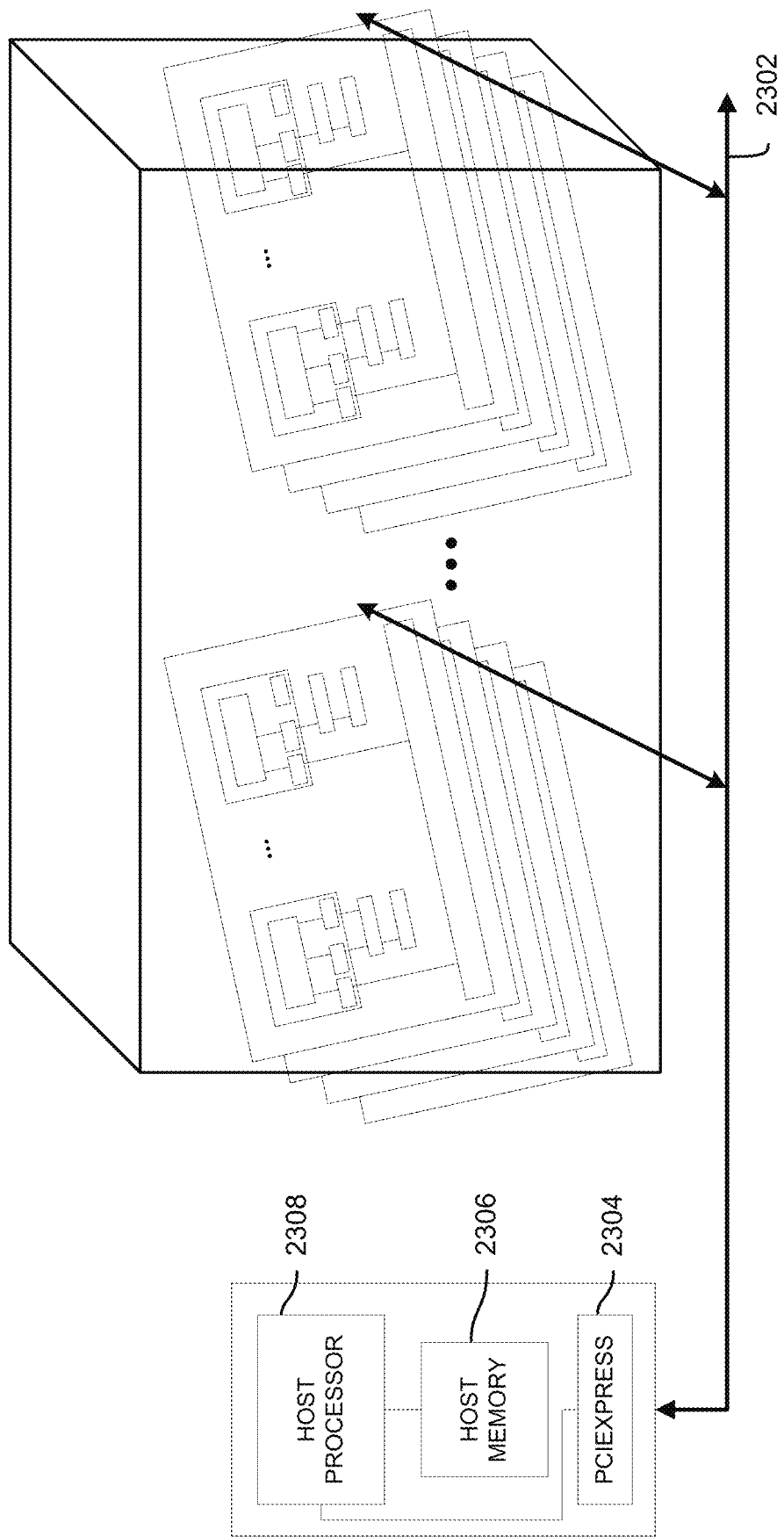
FIG. 23 illustrates a supercomputer at a whole system level, in accordance with at least one embodiment.

FIG. 22 illustrates a supercomputer at a rack level, in accordance with at least one embodiment. FIG. 23 illustrates a supercomputer at a whole system level, in accordance with at least one embodiment. In at least one embodiment, referring to FIG. 22 and FIG. 23, between rack modules in a rack and across racks throughout an entire system, high-speed serial optical or copper cables (2202, 2302) are used to realize a scalable, possibly incomplete hypercube network. In at least one embodiment, one of FPGA/ASIC chips of an accelerator is connected to a host system through a PCI-Express connection (2304). In at least one embodiment, host system includes a host microprocessor (2308) that a software part of an application runs on and a memory consisting of one or more host memory DRAM units (2306) that is kept coherent with memory on an accelerator. In at least one embodiment, host system can be a separate module on one of racks, or can be integrated with one of a supercomputer's modules. In at least one embodiment, cube-connected cycles topology provide communication links to create a hypercube network for a large supercomputer. In at least one embodiment, a small group of FPGA/ASIC chips on a rack module can act as a single hypercube node, such that a total number of external links of each group is increased, compared to a single chip. In at least one embodiment, a group contains chips A, B, C and D on a rack module with internal wide differential busses connecting A, B, C and D in a torus organization. In at least one embodiment, there are 12 serial communication cables connecting a rack module to an outside world. In at least one embodiment, chip A on a rack module connects to serial communication cables 0, 1, 2. In at least one embodiment, chip B connects to cables 3, 4, 5. In at least one embodiment, chip C connects to 6, 7, 8. In at least one embodiment, chip D connects to 9, 10, 11. In at least one embodiment, an entire group {A, B, C, D} constituting a rack module can form a hypercube node within a supercomputer system, with up to 212=4096 rack modules (16384 FPGA/ASIC chips). In at least one embodiment, for chip A to send a message out on link 4 of group {A, B, C, D}, a message has to be routed first to chip B with an on-board differential wide bus connection. In at least one embodiment, a message arriving into a group {A, B, C, D} on link 4 (i.e., arriving at B) destined to chip A, also has to be routed first to a correct destination chip (A) internally within a group {A, B, C, D}. In at least one embodiment, parallel supercomputer systems of other sizes may also be implemented.

In at least one embodiment, the sender device 102 and/or the receiver device 104 may each be implemented using the supercomputer of at least one of FIGS. 20-23. In at least one embodiment, one or more of the Tx host computers 524, 526, and 528 and/or the Rx host computer 540 may each be implemented using the supercomputer of at least one of FIGS. 20-23. In at least one embodiment, the O-DU 812 and/or the O-RU 814 may each be implemented using the supercomputer of at least one of FIGS. 20-23.

Artificial Intelligence

The following figures set forth, without limitation, exemplary artificial intelligence-based systems that can be used to implement at least one embodiment.

Figure 24A:
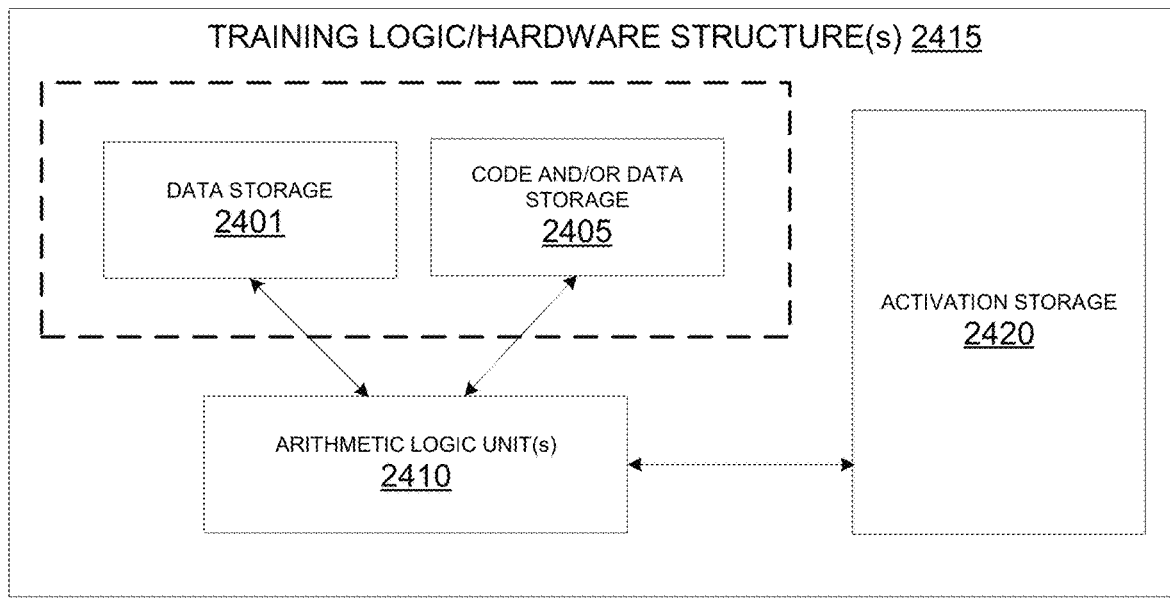
FIG. 24A illustrates inference and/or training logic, in accordance with at least one embodiment.

FIG. 24A illustrates inference and/or training logic 2415 used to perform inferencing and/or training operations associated with one or more embodiments. Details regarding inference and/or training logic 2415 are provided below in conjunction with FIGS. 24A and/or 24B.

In at least one embodiment, inference and/or training logic 2415 may include, without limitation, code and/or data storage 2401 to store forward and/or output weight and/or input/output data, and/or other parameters to configure neurons or layers of a neural network trained and/or used for inferencing in aspects of one or more embodiments. In at least one embodiment, training logic 2415 may include, or be coupled to code and/or data storage 2401 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which such code corresponds. In at least one embodiment code and/or data storage 2401 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 2401 may be included with other on-chip or off-chip data storage, including a processor's L1, L2, or L3 cache or system memory.

In at least one embodiment, any portion of code and/or data storage 2401 may be internal or external to one or more processors or other hardware logic devices or circuits. In at least one embodiment, code and/or code and/or data storage 2401 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 2401 is internal or external to a processor, for example, or including DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2415 may include, without limitation, a code and/or data storage 2405 to store backward and/or output weight and/or input/output data corresponding to neurons or layers of a neural network trained and/or used for inferencing in aspects of one or more embodiments. In at least one embodiment, code and/or data storage 2405 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 2415 may include, or be coupled to code and/or data storage 2405 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes loading of weight or other parameter information into processor ALUs based on an architecture of a neural network to which such code corresponds. In at least one embodiment, any portion of code and/or data storage 2405 may be included with other on-chip or off-chip data storage, including a processor's L1, L2, or L3 cache or system memory. In at least one embodiment, any portion of code and/or data storage 2405 may be internal or external to one or more processors or other hardware logic devices or circuits. In at least one embodiment, code and/or data storage 2405 may be cache memory, DRAM, SRAM, non-volatile memory (e.g., flash memory), or other storage. In at least one embodiment, a choice of whether code and/or data storage 2405 is internal or external to a processor, for example, or including DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 2401 and code and/or data storage 2405 may be separate storage structures. In at least one embodiment, code and/or data storage 2401 and code and/or data storage 2405 may be a combined storage structure. In at least one embodiment, code and/or data storage 2401 and code and/or data storage 2405 may be partially combined and partially separate. In at least one embodiment, any portion of code and/or data storage 2401 and code and/or data storage 2405 may be included with other on-chip or off-chip data storage, including a processor's L1, L2, or L3 cache or system memory.

In at least one embodiment, inference and/or training logic 2415 may include, without limitation, one or more arithmetic logic unit(s) ("ALU(s)") 2410, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 2420 that are functions of input/output and/or weight parameter data stored in code and/or data storage 2401 and/or code and/or data storage 2405. In at least one embodiment, activations stored in activation storage 2420 are generated according to linear algebraic and or matrix-based mathematics performed by ALU(s) 2410 in response to performing instructions or other code, wherein weight values stored in code and/or data storage 2405 and/or data storage 2401 are used as operands along with other values, such as bias values, gradient information, momentum values, or other parameters or hyperparameters, any or all of which may be stored in code and/or data storage 2405 or code and/or data storage 2401 or another storage on or off-chip.

In at least one embodiment, ALU(s) 2410 are included within one or more processors or other hardware logic devices or circuits, whereas in another embodiment, ALU(s) 2410 may be external to a processor or other hardware logic device or circuit that uses them (e.g., a co-processor). In at least one embodiment, ALUs 2410 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 2401, code and/or data storage 2405, and activation storage 2420 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 2420 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 2420 may be cache memory, DRAM, SRAM, non-volatile memory (e.g., flash memory), or other storage. In at least one embodiment, activation storage 2420 may be completely or partially within or external to one or more processors or other logical circuits. In at least one embodiment, a choice of whether activation storage 2420 is internal or external to a processor, for example, or including DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2415 illustrated in FIG. 24A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 2415 illustrated in FIG. 24A may be used in conjunction with central processing unit ("CPU") hardware, graphics processing unit ("GPU") hardware or other hardware, such as field programmable gate arrays ("FPGAs").

Figure 24B:
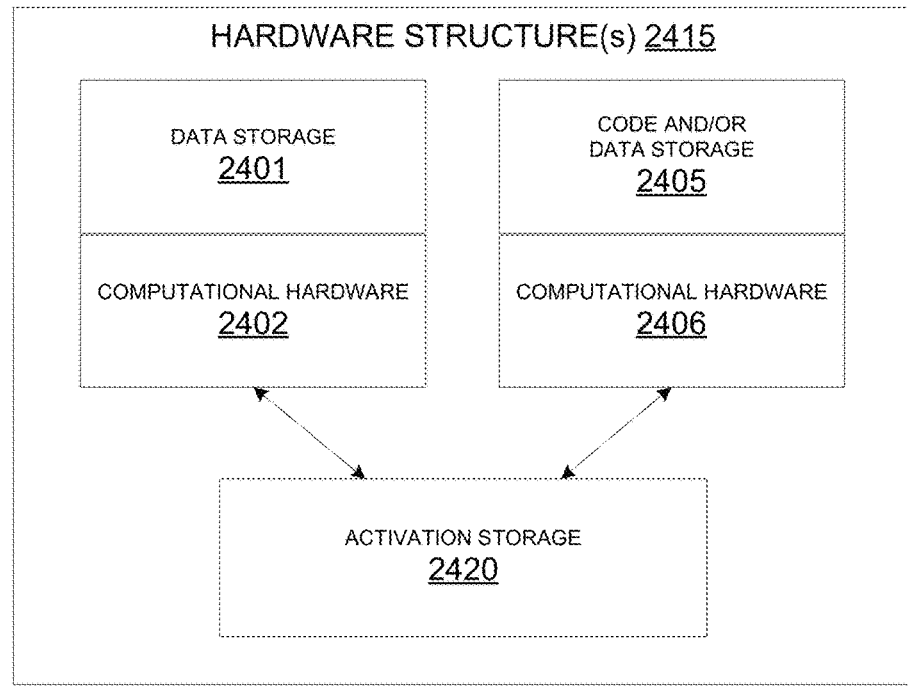
FIG. 24B illustrates inference and/or training logic, in accordance with at least one embodiment.

FIG. 24B illustrates inference and/or training logic 2415, according to at least one embodiment. In at least one embodiment, inference and/or training logic 2415 may include, without limitation, hardware logic in which computational resources are dedicated or otherwise exclusively used in conjunction with weight values or other information corresponding to one or more layers of neurons within a neural network. In at least one embodiment, inference and/or training logic 2415 illustrated in FIG. 24B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 2415 illustrated in FIG. 24B may be used in conjunction with central processing unit (CPU) hardware, graphics processing unit (GPU) hardware or other hardware, such as field programmable gate arrays (FPGAs). In at least one embodiment, inference and/or training logic 2415 includes, without limitation, code and/or data storage 2401 and code and/or data storage 2405, which may be used to store code (e.g., graph code), weight values and/or other information, including bias values, gradient information, momentum values, and/or other parameter or hyperparameter information. In at least one embodiment illustrated in FIG. 24B, each of code and/or data storage 2401 and code and/or data storage 2405 is associated with a dedicated computational resource, such as computational hardware 2402 and computational hardware 2406, respectively. In at least one embodiment, each of computational hardware 2402 and computational hardware 2406 includes one or more ALUs that perform mathematical functions, such as linear algebraic functions, only on information stored in code and/or data storage 2401 and code and/or data storage 2405, respectively, result of which is stored in activation storage 2420.

In at least one embodiment, each of code and/or data storage 2401 and 2405 and corresponding computational hardware 2402 and 2406, respectively, correspond to different layers of a neural network, such that resulting activation from one storage/computational pair 2401/2402 of code and/or data storage 2401 and computational hardware 2402 is provided as an input to a next storage/computational pair 2405/2406 of code and/or data storage 2405 and computational hardware 2406, in order to mirror a conceptual organization of a neural network. In at least one embodiment, each of storage/computational pairs 2401/2402 and 2405/2406 may correspond to more than one neural network layer. In at least one embodiment, additional storage/computation pairs (not shown) subsequent to or in parallel with storage/computation pairs 2401/2402 and 2405/2406 may be included in inference and/or training logic 2415.

In at least one embodiment, the sender device 102 and/or the receiver device 104 may perform inferencing and/or training operations using inference and/or training logic 2415. In at least one embodiment, one or more of the Tx host computers 524, 526, and 528 and/or the Rx host computer 540 may perform inferencing and/or training operations using inference and/or training logic 2415. In at least one embodiment, the O-DU 812 and/or the O-RU 814 may perform inferencing and/or training operations using inference and/or training logic 2415.

Figure 25:
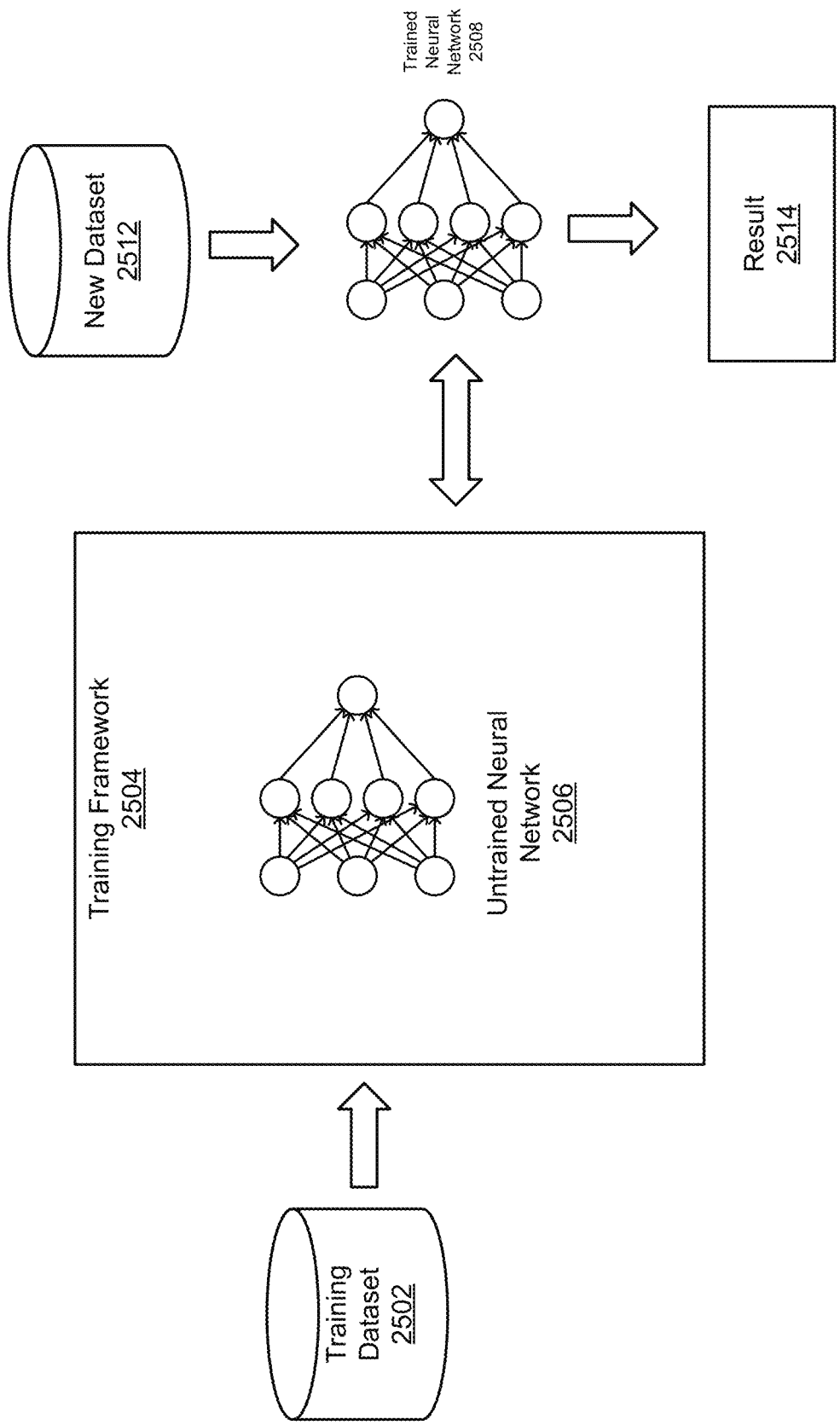
FIG. 25 illustrates training and deployment of a neural network, in accordance with at least one embodiment.

FIG. 25 illustrates training and deployment of a deep neural network, according to at least one embodiment. In at least one embodiment, untrained neural network 2506 is trained using a training dataset 2502. In at least one embodiment, training framework 2504 is a PyTorch framework, whereas in other embodiments, training framework 2504 is a TensorFlow, Boost, Caffe, Microsoft Cognitive Toolkit/CNTK, MXNet, Chainer, Keras, Deeplearning4j, or other training framework. In at least one embodiment, training framework 2504 trains an untrained neural network 2506 and enables it to be trained using processing resources described herein to generate a trained neural network 2508. In at least one embodiment, weights may be chosen randomly or by pre-training using a deep belief network. In at least one embodiment, training may be performed in either a supervised, partially supervised, or unsupervised manner.

In at least one embodiment, untrained neural network 2506 is trained using supervised learning, wherein training dataset 2502 includes an input paired with a desired output for an input, or where training dataset 2502 includes input having a known output and an output of neural network 2506 is manually graded. In at least one embodiment, untrained neural network 2506 is trained in a supervised manner and processes inputs from training dataset 2502 and compares resulting outputs against a set of expected or desired outputs. In at least one embodiment, errors are then propagated back through untrained neural network 2506. In at least one embodiment, training framework 2504 adjusts weights that control untrained neural network 2506. In at least one embodiment, training framework 2504 includes tools to monitor how well untrained neural network 2506 is converging towards a model, such as trained neural network 2508, suitable to generating correct answers, such as in result 2514, based on input data such as a new dataset 2512. In at least one embodiment, training framework 2504 trains untrained neural network 2506 repeatedly while adjust weights to refine an output of untrained neural network 2506 using a loss function and adjustment algorithm, such as stochastic gradient descent. In at least one embodiment, training framework 2504 trains untrained neural network 2506 until untrained neural network 2506 achieves a desired accuracy. In at least one embodiment, trained neural network 2508 can then be deployed to implement any number of machine learning operations.

In at least one embodiment, untrained neural network 2506 is trained using unsupervised learning, wherein untrained neural network 2506 attempts to train itself using unlabeled data. In at least one embodiment, unsupervised learning training dataset 2502 will include input data without any associated output data or "ground truth" data. In at least one embodiment, untrained neural network 2506 can learn groupings within training dataset 2502 and can determine how individual inputs are related to untrained dataset 2502. In at least one embodiment, unsupervised training can be used to generate a self-organizing map in trained neural network 2508 capable of performing operations useful in reducing dimensionality of new dataset 2512. In at least one embodiment, unsupervised training can also be used to perform anomaly detection, which allows identification of data points in new dataset 2512 that deviate from normal patterns of new dataset 2512.

In at least one embodiment, semi-supervised learning may be used, which is a technique in which in training dataset 2502 includes a mix of labeled and unlabeled data. In at least one embodiment, training framework 2504 may be used to perform incremental learning, such as through transferred learning techniques. In at least one embodiment, incremental learning enables trained neural network 2508 to adapt to new dataset 2512 without forgetting knowledge instilled within trained neural network 2508 during initial training.

In at least one embodiment, the sender device 102 and/or the receiver device 104 may train and/or deploy a deep neural network using the process illustrated in FIG. 25. In at least one embodiment, one or more of the Tx host computers 524, 526, and 528 and/or the Rx host computer 540 may train and/or deploy a deep neural network using the process illustrated in FIG. 25. In at least one embodiment, the O-DU 812 and/or the O-RU 814 may train and/or deploy a deep neural network using the process illustrated in FIG. 25.

5G Networks

The following figures set forth, without limitation, exemplary 5G network-based systems that can be used to implement at least one embodiment.

Figure 26:
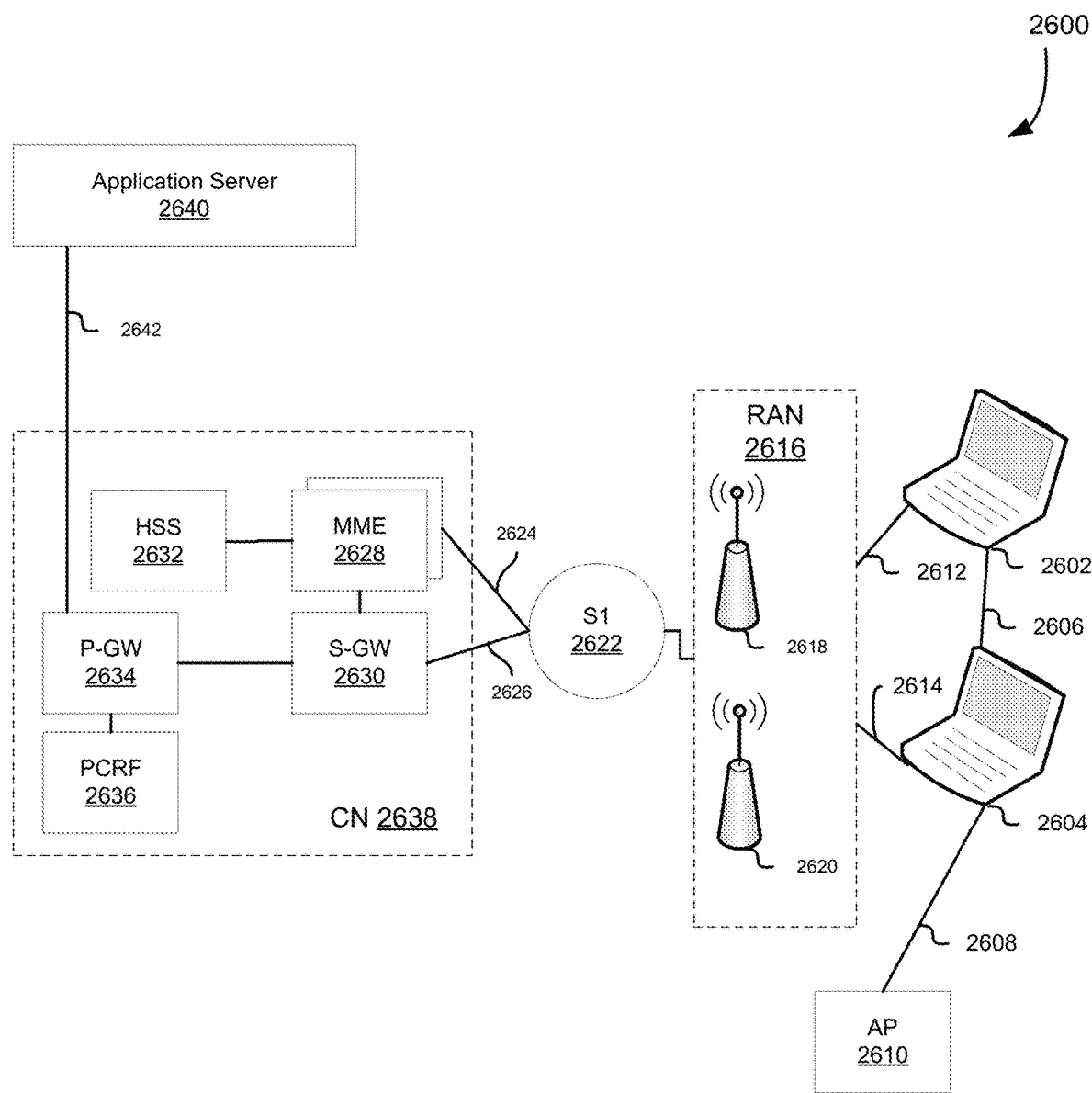
FIG. 26 illustrates an architecture of a system of a network, in accordance with at least one embodiment.

FIG. 26 illustrates an architecture of a system 2600 of a network, in accordance with at least one embodiment. In at least one embodiment, system 2600 is shown to include a user equipment (UE) 2602 and a UE 2604. In at least one embodiment, UEs 2602 and 2604 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, or any computing device including a wireless communications interface.

In at least one embodiment, any of UEs 2602 and 2604 can include an Internet of Things (IoT) UE, which can include a network access layer designed for low-power IoT applications utilizing short-lived UE connections. In at least one embodiment, an IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. In at least one embodiment, a M2M or MTC exchange of data may be a machine-initiated exchange of data. In at least one embodiment, an IoT network describes interconnecting IoT UEs, which may include uniquely identifiable embedded computing devices (within Internet infrastructure), with short-lived connections. In at least one embodiment, an IoT UEs may execute background applications (e.g., keep alive messages, status updates, etc.) to facilitate connections of an IoT network.

In at least one embodiment, UEs 2602 and 2604 may be configured to connect, e.g., communicatively couple, with a radio access network (RAN) 2616. In at least one embodiment, RAN 2616 may be, for example, an Evolved Universal Mobile Telecommunications System (UMTS) Terrestrial Radio Access Network (E-UTRAN), a NextGen RAN (NG RAN), or some other type of RAN. In at least one embodiment, UEs 2602 and 2604 utilize connections 2612 and 2614, respectively, each of which includes a physical communications interface or layer. In at least one embodiment, connections 2612 and 2614 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and variations thereof.

In at least one embodiment, UEs 2602 and 2604 may further directly exchange communication data via a ProSe interface 2606. In at least one embodiment, ProSe interface 2606 may alternatively be referred to as a sidelink interface including one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

In at least one embodiment, UE 2604 is shown to be configured to access an access point (AP) 2610 via connection 2608. In at least one embodiment, connection 2608 can include a local wireless connection, such as a connection consistent with any IEEE 802.11 protocol, wherein AP 2610 would include a wireless fidelity (WiFi®) router. In at least one embodiment, AP 2610 is shown to be connected to an Internet without connecting to a core network of a wireless system.

In at least one embodiment, RAN 2616 can include one or more access nodes that enable connections 2612 and 2614. In at least one embodiment, these access nodes (ANs) can be referred to as base stations (BSs), NodeBs, evolved NodeBs (eNBs), next Generation NodeBs (gNB), RAN nodes, and so forth, and can includes ground stations (e.g., terrestrial access points) or satellite stations providing coverage within a geographic area (e.g., a cell). In at least one embodiment, RAN 2616 may include one or more RAN nodes for providing macrocells, e.g., macro RAN node 2618, and one or more RAN nodes for providing femtocells or picocells (e.g., cells having smaller coverage areas, smaller user capacity, or higher bandwidth compared to macrocells), e.g., low power (LP) RAN node 2620.

In at least one embodiment, any of RAN nodes 2618 and 2620 can terminate an air interface protocol and can be a first point of contact for UEs 2602 and 2604. In at least one embodiment, any of RAN nodes 2618 and 2620 can fulfill various logical functions for RAN 2616 including, but not limited to, radio network controller (RNC) functions such as radio bearer management, uplink and downlink dynamic radio resource management and data packet scheduling, and mobility management.

In at least one embodiment, UEs 2602 and 2604 can be configured to communicate using Orthogonal Frequency-Division Multiplexing (OFDM) communication signals with each other or with any of RAN nodes 2618 and 2620 over a multi-carrier communication channel in accordance various communication techniques, such as, but not limited to, an Orthogonal Frequency Division Multiple Access (OFDMA) communication technique (e.g., for downlink communications) or a Single Carrier Frequency Division Multiple Access (SC-FDMA) communication technique (e.g., for uplink and ProSe or sidelink communications), and/or variations thereof. In at least one embodiment, OFDM signals can include a plurality of orthogonal subcarriers.

In at least one embodiment, a downlink resource grid can be used for downlink transmissions from any of RAN nodes 2618 and 2620 to UEs 2602 and 2604, while uplink transmissions can utilize similar techniques. In at least one embodiment, a grid can be a time frequency grid, called a resource grid or time-frequency resource grid, which is a physical resource in a downlink in each slot. In at least one embodiment, such a time frequency plane representation is a common practice for OFDM systems, which makes it intuitive for radio resource allocation. In at least one embodiment, each column and each row of a resource grid corresponds to one OFDM symbol and one OFDM subcarrier, respectively. In at least one embodiment, a duration of a resource grid in a time domain corresponds to one slot in a radio frame. In at least one embodiment, a smallest time-frequency unit in a resource grid is denoted as a resource element. In at least one embodiment, each resource grid includes a number of resource blocks, which describe a mapping of certain physical channels to resource elements. In at least one embodiment, each resource block includes a collection of resource elements. In at least one embodiment, in a frequency domain, this may represent a smallest quantity of resources that currently can be allocated. In at least one embodiment, there are several different physical downlink channels that are conveyed using such resource blocks.

In at least one embodiment, a physical downlink shared channel (PDSCH) may carry user data and higher-layer signaling to UEs 2602 and 2604. In at least one embodiment, a physical downlink control channel (PDCCH) may carry information about a transport format and resource allocations related to PDSCH channel, among other things. In at least one embodiment, it may also inform UEs 2602 and 2604 about a transport format, resource allocation, and HARQ (Hybrid Automatic Repeat Request) information related to an uplink shared channel. In at least one embodiment, typically, downlink scheduling (assigning control and shared channel resource blocks to UE 2602 within a cell) may be performed at any of RAN nodes 2618 and 2620 based on channel quality information fed back from any of UEs 2602 and 2604. In at least one embodiment, downlink resource assignment information may be sent on a PDCCH used for (e.g., assigned to) each of UEs 2602 and 2604.

In at least one embodiment, a PDCCH may use control channel elements (CCEs) to convey control information. In at least one embodiment, before being mapped to resource elements, PDCCH complex valued symbols may first be organized into quadruplets, which may then be permuted using a sub-block interleaver for rate matching. In at least one embodiment, each PDCCH may be transmitted using one or more of these CCEs, where each CCE may correspond to nine sets of four physical resource elements known as resource element groups (REGs). In at least one embodiment, four Quadrature Phase Shift Keying (QPSK) symbols may be mapped to each REG. In at least one embodiment, PDCCH can be transmitted using one or more CCEs, depending on a size of a downlink control information (DCI) and a channel condition. In at least one embodiment, there can be four or more different PDCCH formats defined in LTE with different numbers of CCEs (e.g., aggregation level, L=1, 2, 4, or 8).

In at least one embodiment, an enhanced physical downlink control channel (EPDCCH) that uses PDSCH resources may be utilized for control information transmission. In at least one embodiment, EPDCCH may be transmitted using one or more enhanced control channel elements (ECCEs). In at least one embodiment, each ECCE may correspond to nine sets of four physical resource elements known as an enhanced resource element groups (EREGs). In at least one embodiment, an ECCE may have other numbers of EREGs in some situations.

In at least one embodiment, RAN 2616 is shown to be communicatively coupled to a core network (CN) 2638 via an S1 interface 2622. In at least one embodiment, CN 2638 may be an evolved packet core (EPC) network, a NextGen Packet Core (NPC) network, or some other type of CN. In at least one embodiment, S1 interface 2622 is split into two parts: S1-U interface 2626, which carries traffic data between RAN nodes 2618 and 2620 and serving gateway (S-GW) 2630, and a S1-mobility management entity (MME) interface 2624, which is a signaling interface between RAN nodes 2618 and 2620 and MMEs 2628.

In at least one embodiment, CN 2638 includes MMES 2628, S-GW 2630, Packet Data Network (PDN) Gateway (P-GW) 2634, and a home subscriber server (HSS) 2632. In at least one embodiment, MMES 2628 may be similar in function to a control plane of legacy Serving General Packet Radio Service (GPRS) Support Nodes (SGSN). In at least one embodiment, MMES 2628 may manage mobility aspects in access such as gateway selection and tracking area list management. In at least one embodiment, HSS 2632 may include a database for network users, including subscription related information to support a network entities' handling of communication sessions. In at least one embodiment, CN 2638 may include one or several HSSs 2632, depending on a number of mobile subscribers, on a capacity of an equipment, on an organization of a network, etc. In at least one embodiment, HSS 2632 can provide support for routing/roaming, authentication, authorization, naming/addressing resolution, location dependencies, etc.

In at least one embodiment, S-GW 2630 may terminate a S1 interface 2622 towards RAN 2616, and routes data packets between RAN 2616 and CN 2638. In at least one embodiment, S-GW 2630 may be a local mobility anchor point for inter-RAN node handovers and also may provide an anchor for inter-3GPP mobility. In at least one embodiment, other responsibilities may include lawful intercept, charging, and some policy enforcement.

In at least one embodiment, P-GW 2634 may terminate an SGi interface toward a PDN. In at least one embodiment, P-GW 2634 may route data packets between an EPC network 2638 and external networks such as a network including application server 2640 (alternatively referred to as application function (AF)) via an Internet Protocol (IP) interface 2642. In at least one embodiment, application server 2640 may be an element offering applications that use IP bearer resources with a core network (e.g., UMTS Packet Services (PS) domain, LTE PS data services, etc.). In at least one embodiment, P-GW 2634 is shown to be communicatively coupled to an application server 2640 via an IP communications interface 2642. In at least one embodiment, application server 2640 can also be configured to support one or more communication services (e.g., Voice-over-Internet Protocol (VoIP) sessions, PTT sessions, group communication sessions, social networking services, etc.) for UEs 2602 and 2604 via CN 2638.

In at least one embodiment, P-GW 2634 may further be a node for policy enforcement and charging data collection. In at least one embodiment, policy and Charging Enforcement Function (PCRF) 2636 is a policy and charging control element of CN 2638. In at least one embodiment, in a non-roaming scenario, there may be a single PCRF in a Home Public Land Mobile Network (HPLMN) associated with a UE's Internet Protocol Connectivity Access Network (IP-CAN) session. In at least one embodiment, in a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). In at least one embodiment, PCRF 2636 may be communicatively coupled to application server 2640 via P-GW 2634. In at least one embodiment, application server 2640 may signal PCRF 2636 to indicate a new service flow and select an appropriate Quality of Service (QoS) and charging parameters. In at least one embodiment, PCRF 2636 may provision this rule into a Policy and Charging Enforcement Function (PCEF) (not shown) with an appropriate traffic flow template (TFT) and QoS class of identifier (QCI), which commences a QoS and charging as specified by application server 2640.

Figure 27:
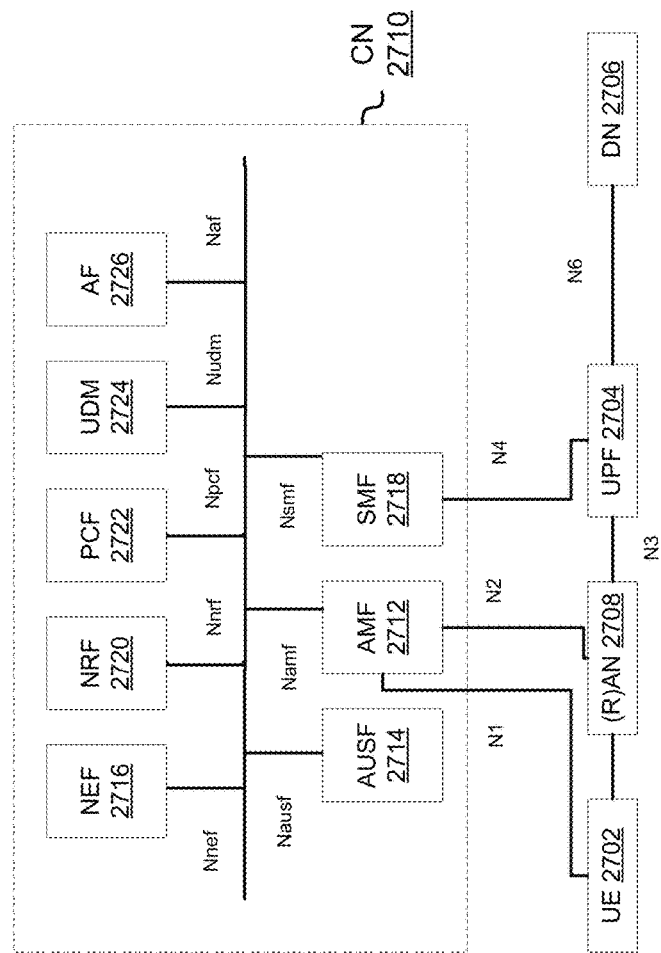
FIG. 27 illustrates an architecture of a system of a network, in accordance with at least one embodiment.

FIG. 27 illustrates an architecture of a system 2700 of a network in accordance with some embodiments. In at least one embodiment, system 2700 is shown to include a UE 2702, a 5G access node or RAN node (shown as (R)AN node 2708), a User Plane Function (shown as UPF 2704), a Data Network (DN 2706), which may be, for example, operator services, Internet access or 3rd party services, and a 5G Core Network (5GC) (shown as CN 2710).

In at least one embodiment, CN 2710 includes an Authentication Server Function (AUSF 2714); a Core Access and Mobility Management Function (AMF 2712); a Session Management Function (SMF 2718); a Network Exposure Function (NEF 2716); a Policy Control Function (PCF 2722); a Network Function (NF) Repository Function (NRF 2720); a Unified Data Management (UDM 2724); and an Application Function (AF 2726). In at least one embodiment, CN 2710 may also include other elements that are not shown, such as a Structured Data Storage network function (SDSF), an Unstructured Data Storage network function (UDSF), and variations thereof.

In at least one embodiment, UPF 2704 may act as an anchor point for intra-RAT and inter-RAT mobility, an external PDU session point of interconnect to DN 2706, and a branching point to support multi-homed PDU session. In at least one embodiment, UPF 2704 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in uplink and downlink, and downlink packet buffering and downlink data notification triggering. In at least one embodiment, UPF 2704 may include an uplink classifier to support routing traffic flows to a data network. In at least one embodiment, DN 2706 may represent various network operator services, Internet access, or third party services.

In at least one embodiment, AUSF 2714 may store data for authentication of UE 2702 and handle authentication related functionality. In at least one embodiment, AUSF 2714 may facilitate a common authentication framework for various access types.

In at least one embodiment, AMF 2712 may be responsible for registration management (e.g., for registering UE 2702, etc.), connection management, reachability management, mobility management, and lawful interception of AMF-related events, and access authentication and authorization. In at least one embodiment, AMF 2712 may provide transport for SM messages for SMF 2718, and act as a transparent proxy for routing SM messages. In at least one embodiment, AMF 2712 may also provide transport for short message service (SMS) messages between UE 2702 and an SMS function (SMSF) (not shown by FIG. 27). In at least one embodiment, AMF 2712 may act as Security Anchor Function (SEA), which may include interaction with AUSF 2714 and UE 2702 and receipt of an intermediate key that was established as a result of UE 2702 authentication process. In at least one embodiment, where USIM based authentication is used, AMF 2712 may retrieve security material from AUSF 2714. In at least one embodiment, AMF 2712 may also include a Security Context Management (SCM) function, which receives a key from SEA that it uses to derive access-network specific keys. In at least one embodiment, furthermore, AMF 2712 may be a termination point of RAN CP interface (N2 reference point), a termination point of NAS (NI) signaling, and perform NAS ciphering and integrity protection.

In at least one embodiment, AMF 2712 may also support NAS signaling with a UE 2702 over an N3 interworking-function (IWF) interface. In at least one embodiment, N3IWF may be used to provide access to untrusted entities. In at least one embodiment, N3IWF may be a termination point for N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in uplink, and enforce QoS corresponding to N3 packet marking taking into account QoS requirements associated to such marking received over N2. In at least one embodiment, N3IWF may also relay uplink and downlink control-plane NAS (NI) signaling between UE 2702 and AMF 2712, and relay uplink and downlink user-plane packets between UE 2702 and UPF 2704. In at least one embodiment, N3IWF also provides mechanisms for IPsec tunnel establishment with UE 2702.

In at least one embodiment, SMF 2718 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. In at least one embodiment, SMF 2718 may include following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

In at least one embodiment, NEF 2716 may provide means for securely exposing services and capabilities provided by 3GPP network functions for third party, internal exposure/re-exposure, Application Functions (e.g., AF 2726), edge computing or fog computing systems, etc. In at least one embodiment, NEF 2716 may authenticate, authorize, and/or throttle AFs. In at least one embodiment, NEF 2716 may also translate information exchanged with AF 2726 and information exchanged with internal network functions. In at least one embodiment, NEF 2716 may translate between an AF-Service-Identifier and an internal 5GC information. In at least one embodiment, NEF 2716 may also receive information from other network functions (NFs) based on exposed capabilities of other network functions. In at least one embodiment, this information may be stored at NEF 2716 as structured data, or at a data storage NF using a standardized interfaces. In at least one embodiment, stored information can then be re-exposed by NEF 2716 to other NFs and AFs, and/or used for other purposes such as analytics.

In at least one embodiment, NRF 2720 may support service discovery functions, receive NF Discovery Requests from NF instances, and provide information of discovered NF instances to NF instances. In at least one embodiment, NRF 2720 also maintains information of available NF instances and their supported services.

In at least one embodiment, PCF 2722 may provide policy rules to control plane function(s) to enforce them, and may also support unified policy framework to govern network behavior. In at least one embodiment, PCF 2722 may also implement a front end (FE) to access subscription information relevant for policy decisions in a UDR of UDM 2724.

In at least one embodiment, UDM 2724 may handle subscription-related information to support a network entities' handling of communication sessions, and may store subscription data of UE 2702. In at least one embodiment, UDM 2724 may include two parts, an application FE and a User Data Repository (UDR). In at least one embodiment, UDM may include a UDM FE, which is in charge of processing of credentials, location management, subscription management and so on. In at least one embodiment, several different front ends may serve a same user in different transactions. In at least one embodiment, UDM-FE accesses subscription information stored in an UDR and performs authentication credential processing; user identification handling; access authorization; registration/mobility management; and subscription management. In at least one embodiment, UDR may interact with PCF 2722. In at least one embodiment, UDM 2724 may also support SMS management, wherein an SMS-FE implements a similar application logic as discussed previously.

In at least one embodiment, AF 2726 may provide application influence on traffic routing, access to a Network Capability Exposure (NCE), and interact with a policy framework for policy control. In at least one embodiment, NCE may be a mechanism that allows a 5GC and AF 2726 to provide information to each other via NEF 2716, which may be used for edge computing implementations. In at least one embodiment, network operator and third party services may be hosted close to UE 2702 access point of attachment to achieve an efficient service delivery through a reduced end-to-end latency and load on a transport network. In at least one embodiment, for edge computing implementations, 5GC may select a UPF 2704 close to UE 2702 and execute traffic steering from UPF 2704 to DN 2706 via N6 interface. In at least one embodiment, this may be based on UE subscription data, UE location, and information provided by AF 2726. In at least one embodiment, AF 2726 may influence UPF (re)selection and traffic routing. In at least one embodiment, based on operator deployment, when AF 2726 is considered to be a trusted entity, a network operator may permit AF 2726 to interact directly with relevant NFs.

In at least one embodiment, CN 2710 may include an SMSF, which may be responsible for SMS subscription checking and verification, and relaying SM messages to/from UE 2702 to/from other entities, such as an SMS-GMSC/IWMSC/SMS-router. In at least one embodiment, SMS may also interact with AMF 2712 and UDM 2724 for notification procedure that UE 2702 is available for SMS transfer (e.g., set a UE not reachable flag, and notifying UDM 2724 when UE 2702 is available for SMS).

In at least one embodiment, system 2700 may include following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

In at least one embodiment, system 2700 may include following reference points: N1: Reference point between UE and AMF; N2: Reference point between (R)AN and AMF; N3: Reference point between (R)AN and UPF; N4: Reference point between SMF and UPF; and N6: Reference point between UPF and a Data Network. In at least one embodiment, there may be many more reference points and/or service-based interfaces between a NF services in NFs, however, these interfaces and reference points have been omitted for clarity. In at least one embodiment, an NS reference point may be between a PCF and AF; an N7 reference point may be between PCF and SMF; an N11 reference point between AMF and SMF; etc. In at least one embodiment, CN 2710 may include an Nx interface, which is an inter-CN interface between MME and AMF 2712 in order to enable interworking between CN 2710 and CN 7227.

In at least one embodiment, system 2700 may include multiple RAN nodes (such as (R)AN node 2708) wherein an Xn interface is defined between two or more (R)AN node 2708 (e.g., gNBs) that connecting to 5GC 410, between a (R)AN node 2708 (e.g., gNB) connecting to CN 2710 and an eNB (e.g., a macro RAN node), and/or between two eNBs connecting to CN 2710.

In at least one embodiment, Xn interface may include an Xn user plane (Xn-U) interface and an Xn control plane (Xn-C) interface. In at least one embodiment, Xn-U may provide non-guaranteed delivery of user plane PDUs and support/provide data forwarding and flow control functionality. In at least one embodiment, Xn-C may provide management and error handling functionality, functionality to manage a Xn-C interface; mobility support for UE 2702 in a connected mode (e.g., CM-CONNECTED) including functionality to manage UE mobility for connected mode between one or more (R)AN node 2708. In at least one embodiment, mobility support may include context transfer from an old (source) serving (R)AN node 2708 to new (target) serving (R)AN node 2708; and control of user plane tunnels between old (source) serving (R)AN node 2708 to new (target) serving (R)AN node 2708.

In at least one embodiment, a protocol stack of a Xn-U may include a transport network layer built on Internet Protocol (IP) transport layer, and a GTP-U layer on top of a UDP and/or IP layer(s) to carry user plane PDUs. In at least one embodiment, Xn-C protocol stack may include an application layer signaling protocol (referred to as Xn Application Protocol (Xn-AP)) and a transport network layer that is built on an SCTP layer. In at least one embodiment, SCTP layer may be on top of an IP layer. In at least one embodiment, SCTP layer provides a guaranteed delivery of application layer messages. In at least one embodiment, in a transport IP layer point-to-point transmission is used to deliver signaling PDUs. In at least one embodiment, Xn-U protocol stack and/or a Xn-C protocol stack may be same or similar to an user plane and/or control plane protocol stack(s) shown and described herein.

Figure 28:
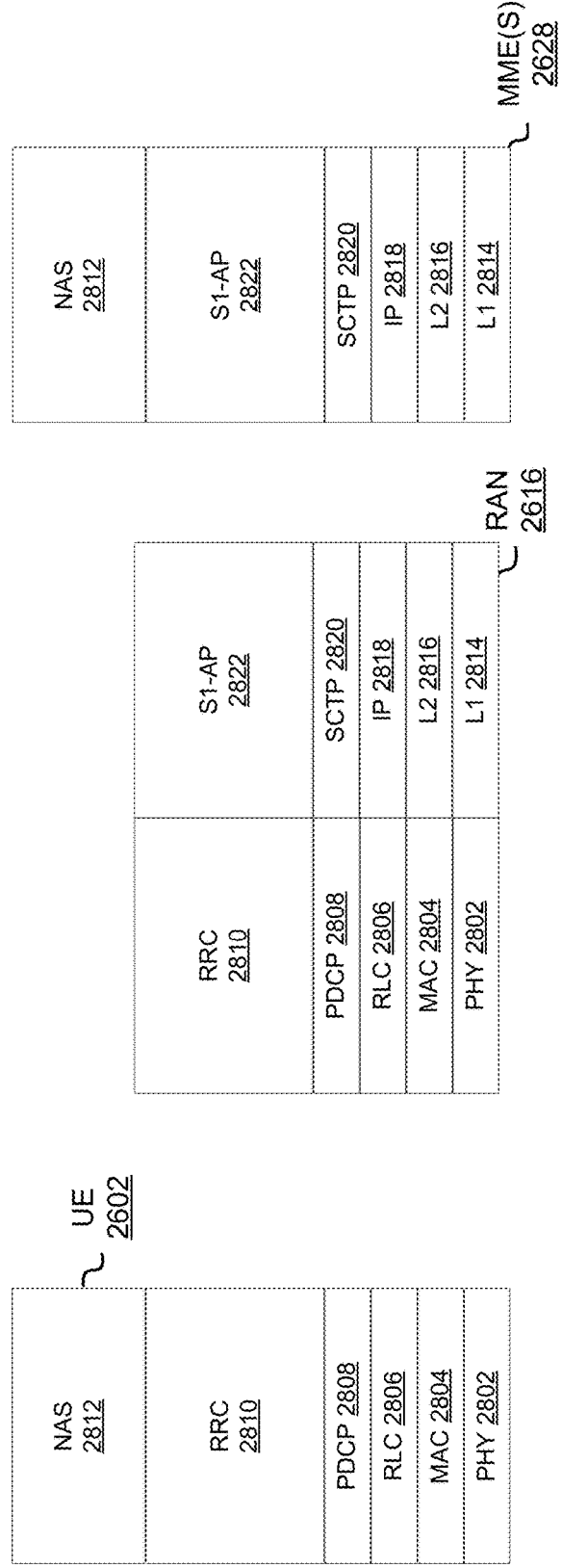
FIG. 28 illustrates a control plane protocol stack, in accordance with at least one embodiment.

FIG. 28 is an illustration of a control plane protocol stack in accordance with some embodiments. In at least one embodiment, a control plane 2800 is shown as a communications protocol stack between UE 2602 (or alternatively, UE 2604), RAN 2616, and MME(s) 2628.

In at least one embodiment, PHY layer 2802 may transmit or receive information used by MAC layer 2804 over one or more air interfaces. In at least one embodiment, PHY layer 2802 may further perform link adaptation or adaptive modulation and coding (AMC), power control, cell search (e.g., for initial synchronization and handover purposes), and other measurements used by higher layers, such as an RRC layer 2810. In at least one embodiment, PHY layer 2802 may still further perform error detection on transport channels, forward error correction (FEC) coding/de-coding of transport channels, modulation/demodulation of physical channels, interleaving, rate matching, mapping onto physical channels, and Multiple Input Multiple Output (MIMO) antenna processing.

In at least one embodiment, MAC layer 2804 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from PHY via transport channels, multiplexing MAC SDUs onto TBs, scheduling information reporting, error correction through hybrid automatic repeat request (HARD), and logical channel prioritization.

In at least one embodiment, RLC layer 2806 may operate in a plurality of modes of operation, including: Transparent Mode™, Unacknowledged Mode (UM), and Acknowledged Mode (AM). In at least one embodiment, RLC layer 2806 may execute transfer of upper layer protocol data units (PDUs), error correction through automatic repeat request (ARQ) for AM data transfers, and concatenation, segmentation and reassembly of RLC SDUs for UM and AM data transfers. In at least one embodiment, RLC layer 2806 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

In at least one embodiment, PDCP layer 2808 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

In at least one embodiment, main services and functions of a RRC layer 2810 may include broadcast of system information (e.g., included in Master Information Blocks (MIBs) or System Information Blocks (SIBs) related to a non-access stratum (NAS)), broadcast of system information related to an access stratum (AS), paging, establishment, maintenance and release of an RRC connection between an UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. In at least one embodiment, said MIBs and SIBs may include one or more information elements (IEs), which may each include individual data fields or data structures.

In at least one embodiment, UE 2602 and RAN 2616 may utilize a Uu interface (e.g., an LTE-Uu interface) to exchange control plane data via a protocol stack including PHY layer 2802, MAC layer 2804, RLC layer 2806, PDCP layer 2808, and RRC layer 2810.

In at least one embodiment, non-access stratum (NAS) protocols (NAS protocols 2812) form a highest stratum of a control plane between UE 2602 and MME(s) 2628. In at least one embodiment, NAS protocols 2812 support mobility of UE 2602 and session management procedures to establish and maintain IP connectivity between UE 2602 and P-GW 2634.

In at least one embodiment, Si Application Protocol (S1-AP) layer (Si-AP layer 2822) may support functions of a Si interface and include Elementary Procedures (EPs). In at least one embodiment, an EP is a unit of interaction between RAN 2616 and CN 2628. In at least one embodiment, S1-AP layer services may include two groups: UE-associated services and non UE-associated services. In at least one embodiment, these services perform functions including, but not limited to: E-UTRAN Radio Access Bearer (E-RAB) management, UE capability indication, mobility, NAS signaling transport, RAN Information Management (RIM), and configuration transfer.

In at least one embodiment, Stream Control Transmission Protocol (SCTP) layer (alternatively referred to as a stream control transmission protocol/internet protocol (SCTP/IP) layer) (SCTP layer 2820) may ensure reliable delivery of signaling messages between RAN 2616 and MME(s) 2628 based, in part, on an IP protocol, supported by an IP layer 2818. In at least one embodiment, L2 layer 2816 and an L1 layer 2814 may refer to communication links (e.g., wired or wireless) used by a RAN node and MME to exchange information.

In at least one embodiment, RAN 2616 and MME(s) 2628 may utilize an S1-MME interface to exchange control plane data via a protocol stack including a L1 layer 2814, L2 layer 2816, IP layer 2818, SCTP layer 2820, and Si-AP layer 2822.

Figure 29:
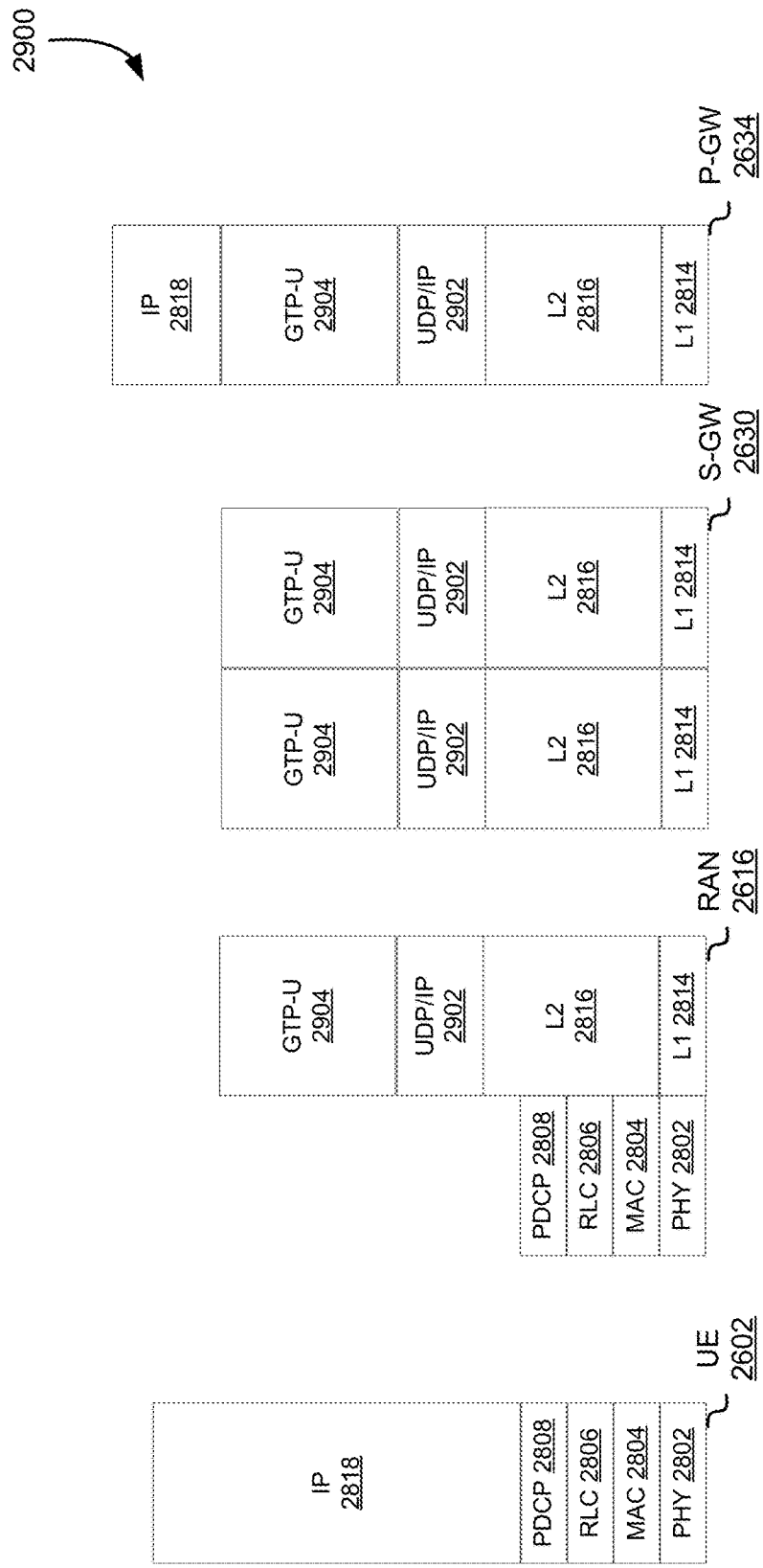
FIG. 29 illustrates a user plane protocol stack, in accordance with at least one embodiment.

FIG. 29 is an illustration of a user plane protocol stack in accordance with at least one embodiment. In at least one embodiment, a user plane 2900 is shown as a communications protocol stack between a UE 2602, RAN 2616, S-GW 2630, and P-GW 2634. In at least one embodiment, user plane 2900 may utilize a same protocol layers as control plane 2800. In at least one embodiment, for example, UE 2602 and RAN 2616 may utilize a Uu interface (e.g., an LTE-Uu interface) to exchange user plane data via a protocol stack including PHY layer 2802, MAC layer 2804, RLC layer 2806, PDCP layer 2808.

In at least one embodiment, General Packet Radio Service (GPRS) Tunneling Protocol for a user plane (GTP-U) layer (GTP-U layer 2904) may be used for carrying user data within a GPRS core network and between a radio access network and a core network. In at least one embodiment, user data transported can be packets in any of IPv4, IPv6, or PPP formats, for example. In at least one embodiment, UDP and IP security (UDP/IP) layer (UDP/IP layer 2902) may provide checksums for data integrity, port numbers for addressing different functions at a source and destination, and encryption and authentication on selected data flows. In at least one embodiment, RAN 2616 and S-GW 2630 may utilize an S1-U interface to exchange user plane data via a protocol stack including L1 layer 2814, L2 layer 2816, UDP/IP layer 2902, and GTP-U layer 2904. In at least one embodiment, S-GW 2630 and P-GW 2634 may utilize an S5/S8a interface to exchange user plane data via a protocol stack including L1 layer 2814, L2 layer 2816, UDP/IP layer 2902, and GTP-U layer 2904. In at least one embodiment, as discussed above with respect to FIG. 28, NAS protocols support a mobility of UE 2602 and session management procedures to establish and maintain IP connectivity between UE 2602 and P-GW 2634.

Figure 30:
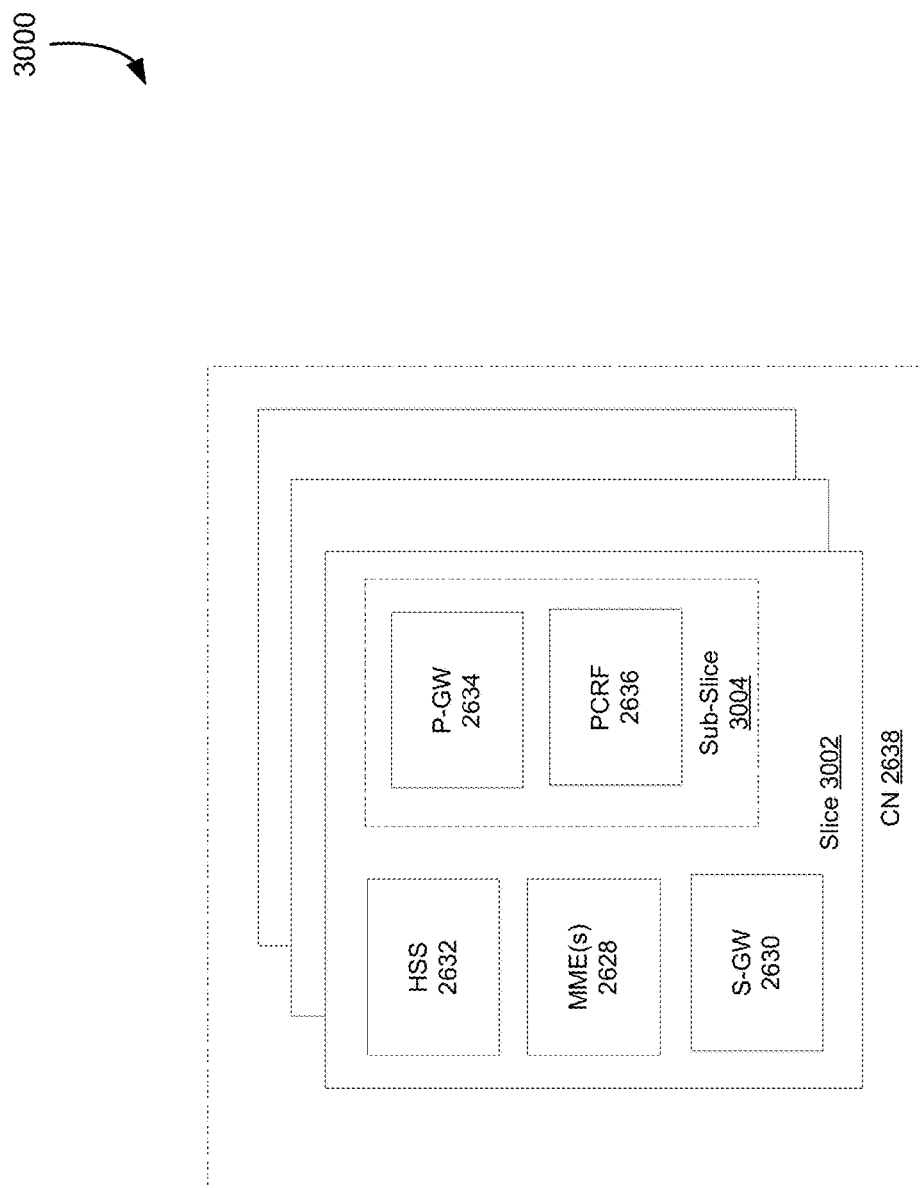
FIG. 30 illustrates components of a core network, in accordance with at least one embodiment.

FIG. 30 illustrates components 3000 of a core network in accordance with at least one embodiment. In at least one embodiment, components of CN 2638 may be implemented in one physical node or separate physical nodes including components to read and execute instructions from a machine-readable or computer-readable medium (e.g., a non-transitory machine-readable storage medium). In at least one embodiment, Network Functions Virtualization (NFV) is utilized to virtualize any or all of above described network node functions via executable instructions stored in one or more computer readable storage mediums (described in further detail below). In at least one embodiment, a logical instantiation of CN 2638 may be referred to as a network slice 3002 (e.g., network slice 3002 is shown to include HSS 2632, MME(s) 2628, and S-GW 2630). In at least one embodiment, a logical instantiation of a portion of CN 2638 may be referred to as a network sub-slice 3004 (e.g., network sub-slice 3004 is shown to include P-GW 2634 and PCRF 2636).

In at least one embodiment, NFV architectures and infrastructures may be used to virtualize one or more network functions, alternatively performed by proprietary hardware, onto physical resources including a combination of industry-standard server hardware, storage hardware, or switches. In at least one embodiment, NFV systems can be used to execute virtual or reconfigurable implementations of one or more EPC components/functions.

Figure 31:
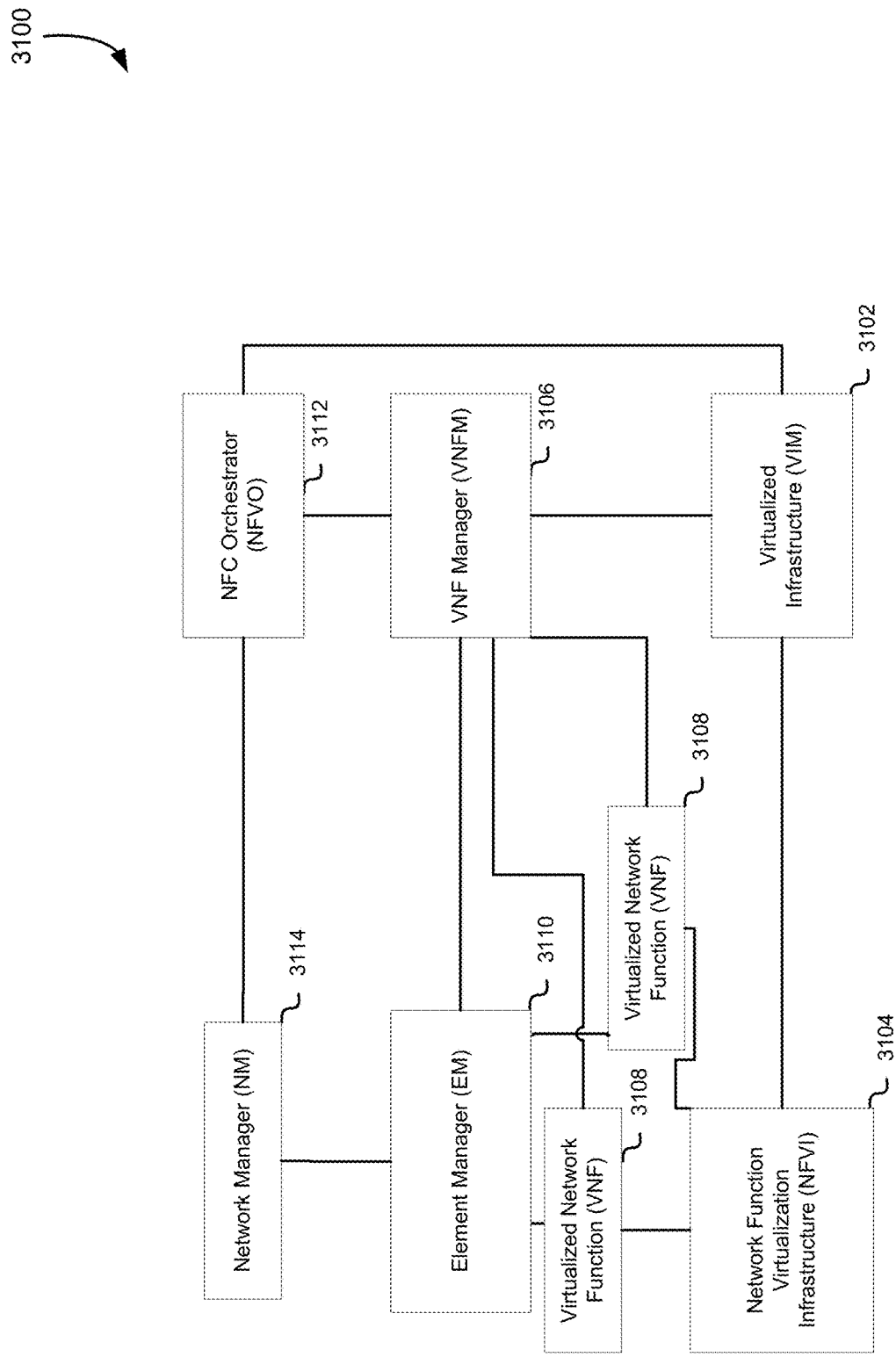
FIG. 31 illustrates components of a system to support network function virtualization (NFV), in accordance with at least one embodiment.

FIG. 31 is a block diagram illustrating components, according to at least one embodiment, of a system 3100 to support network function virtualization (NFV). In at least one embodiment, system 3100 is illustrated as including a virtualized infrastructure manager (shown as VIM 3102), a network function virtualization infrastructure (shown as NFVI 3104), a VNF manager (shown as VNFM 3106), virtualized network functions (shown as VNF 3108), an element manager (shown as EM 3110), an NFV Orchestrator (shown as NFVO 3112), and a network manager (shown as NM 3114).

In at least one embodiment, VIM 3102 manages resources of NFVI 3104. In at least one embodiment, NFVI 3104 can include physical or virtual resources and applications (including hypervisors) used to execute system 3100. In at least one embodiment, VIM 3102 may manage a life cycle of virtual resources with NFVI 3104 (e.g., creation, maintenance, and tear down of virtual machines (VMs) associated with one or more physical resources), track VM instances, track performance, fault and security of VM instances and associated physical resources, and expose VM instances and associated physical resources to other management systems.

In at least one embodiment, VNFM 3106 may manage VNF 3108. In at least one embodiment, VNF 3108 may be used to execute EPC components/functions. In at least one embodiment, VNFM 3106 may manage a life cycle of VNF 3108 and track performance, fault and security of virtual aspects of VNF 3108. In at least one embodiment, EM 3110 may track performance, fault and security of functional aspects of VNF 3108. In at least one embodiment, tracking data from VNFM 3106 and EM 3110 may include, for example, performance measurement (PM) data used by VIM 3102 or NFVI 3104. In at least one embodiment, both VNFM 3106 and EM 3110 can scale up/down a quantity of VNFs of system 3100.

In at least one embodiment, NFVO 3112 may coordinate, authorize, release and engage resources of NFVI 3104 in order to provide a requested service (e.g., to execute an EPC function, component, or slice). In at least one embodiment, NM 3114 may provide a package of end-user functions with responsibility for a management of a network, which may include network elements with VNFs, non-virtualized network functions, or both (management of VNFs may occur via an EM 3110).

In at least one embodiment, the network 106 may be implemented using system 2600 (see FIG. 26), system 2700 (see FIG. 27), and/or a system 3100 (see FIG. 31). In such embodiments, the sender device 102 and/or the receiver device 104 may each be implemented as UE 2602 or UE 2604.

In at least one embodiment, the packet data network 522 may be implemented using system 2600 (see FIG. 26), system 2700 (see FIG. 27), and/or a system 3100 (see FIG. 31). In such embodiments, one or more of the Tx host computers 524, 526, and 528 and/or the Rx host computer 540 may each be implemented as UE 2602 or UE 2604.

In at least one embodiment, the network 816 may be implemented using system 2600 (see FIG. 26), system 2700 (see FIG. 27), and/or a system 3100 (see FIG. 31). In such embodiments, the O-DU 812 and/or the O-RU 814 may each be implemented as UE 2602 or UE 2604.

Computer-Based Systems

The following figures set forth, without limitation, exemplary computer-based systems that can be used to implement at least one embodiment.

Figure 32:
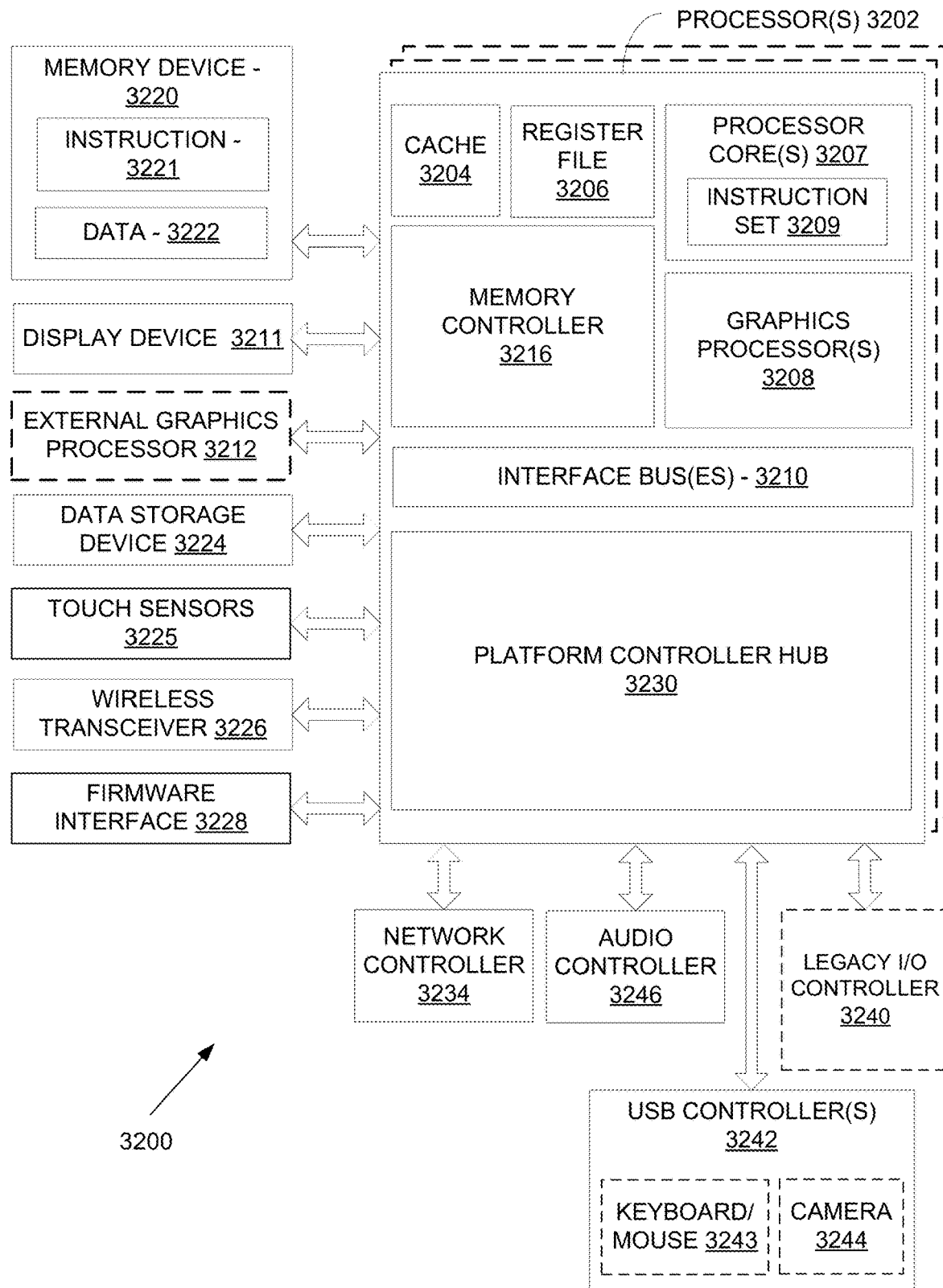
FIG. 32 illustrates a processing system, in accordance with at least one embodiment.

FIG. 32 illustrates a processing system 3200, in accordance with at least one embodiment. In at least one embodiment, processing system 3200 includes one or more processors 3202 and one or more graphics processors 3208, and may be a single processor desktop system, a multiprocessor workstation system, or a server system having a large number of processors 3202 or processor cores 3207. In at least one embodiment, processing system 3200 is a processing platform incorporated within a system-on-a-chip ("SoC") integrated circuit for use in mobile, handheld, or embedded devices.

In at least one embodiment, processing system 3200 can include, or be incorporated within a server-based gaming platform, a game console, a media console, a mobile gaming console, a handheld game console, or an online game console. In at least one embodiment, processing system 3200 is a mobile phone, smart phone, tablet computing device or mobile Internet device. In at least one embodiment, processing system 3200 can also include, couple with, or be integrated within a wearable device, such as a smart watch wearable device, smart eyewear device, augmented reality device, or virtual reality device. In at least one embodiment, processing system 3200 is a television or set top box device having one or more processors 3202 and a graphical interface generated by one or more graphics processors 3208.

In at least one embodiment, one or more processors 3202 each include one or more processor cores 3207 to process instructions which, when executed, perform operations for system and user software. In at least one embodiment, each of one or more processor cores 3207 is configured to process a specific instruction set 3209. In at least one embodiment, instruction set 3209 may facilitate Complex Instruction Set Computing ("CISC"), Reduced Instruction Set Computing ("RISC"), or computing via a Very Long Instruction Word ("VLIW"). In at least one embodiment, processor cores 3207 may each process a different instruction set 3209, which may include instructions to facilitate emulation of other instruction sets. In at least one embodiment, processor core 3207 may also include other processing devices, such as a digital signal processor ("DSP").

In at least one embodiment, processor 3202 includes cache memory ('cache") 3204. In at least one embodiment, processor 3202 can have a single internal cache or multiple levels of internal cache. In at least one embodiment, cache memory is shared among various components of processor 3202. In at least one embodiment, processor 3202 also uses an external cache (e.g., a Level 3 ("L3") cache or Last Level Cache ("LLC")) (not shown), which may be shared among processor cores 3207 using known cache coherency techniques. In at least one embodiment, register file 3206 is additionally included in processor 3202 which may include different types of registers for storing different types of data (e.g., integer registers, floating point registers, status registers, and an instruction pointer register). In at least one embodiment, register file 3206 may include general-purpose registers or other registers.

In at least one embodiment, one or more processor(s) 3202 are coupled with one or more interface bus(es) 3210 to transmit communication signals such as address, data, or control signals between processor 3202 and other components in processing system 3200. In at least one embodiment interface bus 3210, in one embodiment, can be a processor bus, such as a version of a Direct Media Interface ("DMI") bus. In at least one embodiment, interface bus 3210 is not limited to a DMI bus, and may include one or more Peripheral Component Interconnect buses (e.g., "PCI," PCI Express ("PCIe")), memory buses, or other types of interface buses. In at least one embodiment processor(s) 3202 include an integrated memory controller 3216 and a platform controller hub 3230. In at least one embodiment, memory controller 3216 facilitates communication between a memory device and other components of processing system 3200, while platform controller hub ("PCH") 3230 provides connections to Input/Output ("I/O") devices via a local I/O bus.

In at least one embodiment, memory device 3220 can be a dynamic random access memory ("DRAM") device, a static random access memory ("SRAM") device, flash memory device, phase-change memory device, or some other memory device having suitable performance to serve as processor memory. In at least one embodiment memory device 3220 can operate as system memory for processing system 3200, to store data 3222 and instructions 3221 for use when one or more processors 3202 executes an application or process. In at least one embodiment, memory controller 3216 also couples with an optional external graphics processor 3212, which may communicate with one or more graphics processors 3208 in processors 3202 to perform graphics and media operations. In at least one embodiment, a display device 3211 can connect to processor(s) 3202. In at least one embodiment display device 3211 can include one or more of an internal display device, as in a mobile electronic device or a laptop device or an external display device attached via a display interface (e.g., DisplayPort, etc.). In at least one embodiment, display device 3211 can include a head mounted display ("HMD") such as a stereoscopic display device for use in virtual reality ("VR") applications or augmented reality ("AR") applications.

In at least one embodiment, platform controller hub 3230 enables peripherals to connect to memory device 3220 and processor 3202 via a high-speed I/O bus. In at least one embodiment, I/O peripherals include, but are not limited to, an audio controller 3246, a network controller 3234, a firmware interface 3228, a wireless transceiver 3226, touch sensors 3225, a data storage device 3224 (e.g., hard disk drive, flash memory, etc.). In at least one embodiment, data storage device 3224 can connect via a storage interface (e.g., SATA) or via a peripheral bus, such as PCI, or PCIe. In at least one embodiment, touch sensors 3225 can include touch screen sensors, pressure sensors, or fingerprint sensors. In at least one embodiment, wireless transceiver 3226 can be a Wi-Fi transceiver, a Bluetooth transceiver, or a mobile network transceiver such as a 3G, 4G, or Long Term Evolution ("LTE") transceiver. In at least one embodiment, firmware interface 3228 enables communication with system firmware, and can be, for example, a unified extensible firmware interface ("UEFI"). In at least one embodiment, network controller 3234 can enable a network connection to a wired network. In at least one embodiment, a high-performance network controller (not shown) couples with interface bus 3210. In at least one embodiment, audio controller 3246 is a multi-channel high definition audio controller. In at least one embodiment, processing system 3200 includes an optional legacy I/O controller 3240 for coupling legacy (e.g., Personal System 2 ("PS/2")) devices to processing system 3200. In at least one embodiment, platform controller hub 3230 can also connect to one or more Universal Serial Bus ("USB") controllers 3242 connect input devices, such as keyboard and mouse 3243 combinations, a camera 3244, or other USB input devices.

In at least one embodiment, an instance of memory controller 3216 and platform controller hub 3230 may be integrated into a discreet external graphics processor, such as external graphics processor 3212. In at least one embodiment, platform controller hub 3230 and/or memory controller 3216 may be external to one or more processor(s) 3202. For example, in at least one embodiment, processing system 3200 can include an external memory controller 3216 and platform controller hub 3230, which may be configured as a memory controller hub and peripheral controller hub within a system chipset that is in communication with processor(s) 3202.

In at least one embodiment, the sender device 102 and/or the receiver device 104 may each be implemented using the processing system 3200. In such embodiments, the sender processor 114 and/or the receiver processor 126 may each be implemented as the processor(s) 3202. The sender memory 116 and/or the receiver memory 128 may each be implemented using any memory, such as the memory device 3220 and/or the data storage device 3224, of the processing system 3200. The sender bus 228 and/or the receiver bus 418 may each be implemented using any bus, such as interface bus(es) 3210, of the processing system 3200. The sender communication apparatus 112 and/or the receiver communication apparatus 124 may each be implemented as the network controller 3234.

In at least one embodiment, one or more of the Tx host computers 524, 526, and 528 and/or the Rx host computer 540 may each be implemented using the processing system 3200. In such embodiments, the sender processor 114 and/or the receiver processor 126 may each be implemented as the processor(s) 3202. The sender memory 116 and/or the receiver memory 128 may each be implemented using any memory, such as the memory device 3220 and/or the data storage device 3224, of the processing system 3200. The sender bus 228 and/or the receiver bus 418 may each be implemented using any bus, such as interface bus(es) 3210, of the processing system 3200. The sender communication apparatus 112 and/or the receiver communication apparatus 124 may each be implemented as the network controller 3234.

In at least one embodiment, the O-DU 812 and/or the O-RU 814 may each be implemented using the processing system 3200. In such embodiments, the sender processor 114 and/or the receiver processor 126 may each be implemented as the processor(s) 3202. The sender memory 116 and/or the receiver memory 128 may each be implemented using any memory, such as the memory device 3220 and/or the data storage device 3224, of the processing system 3200. The sender bus 228 and/or the receiver bus 418 may each be implemented using any bus, such as interface bus(es) 3210, of the processing system 3200. The sender communication apparatus 112 and/or the receiver communication apparatus 124 may each be implemented as the network controller 3234.

Figure 33:
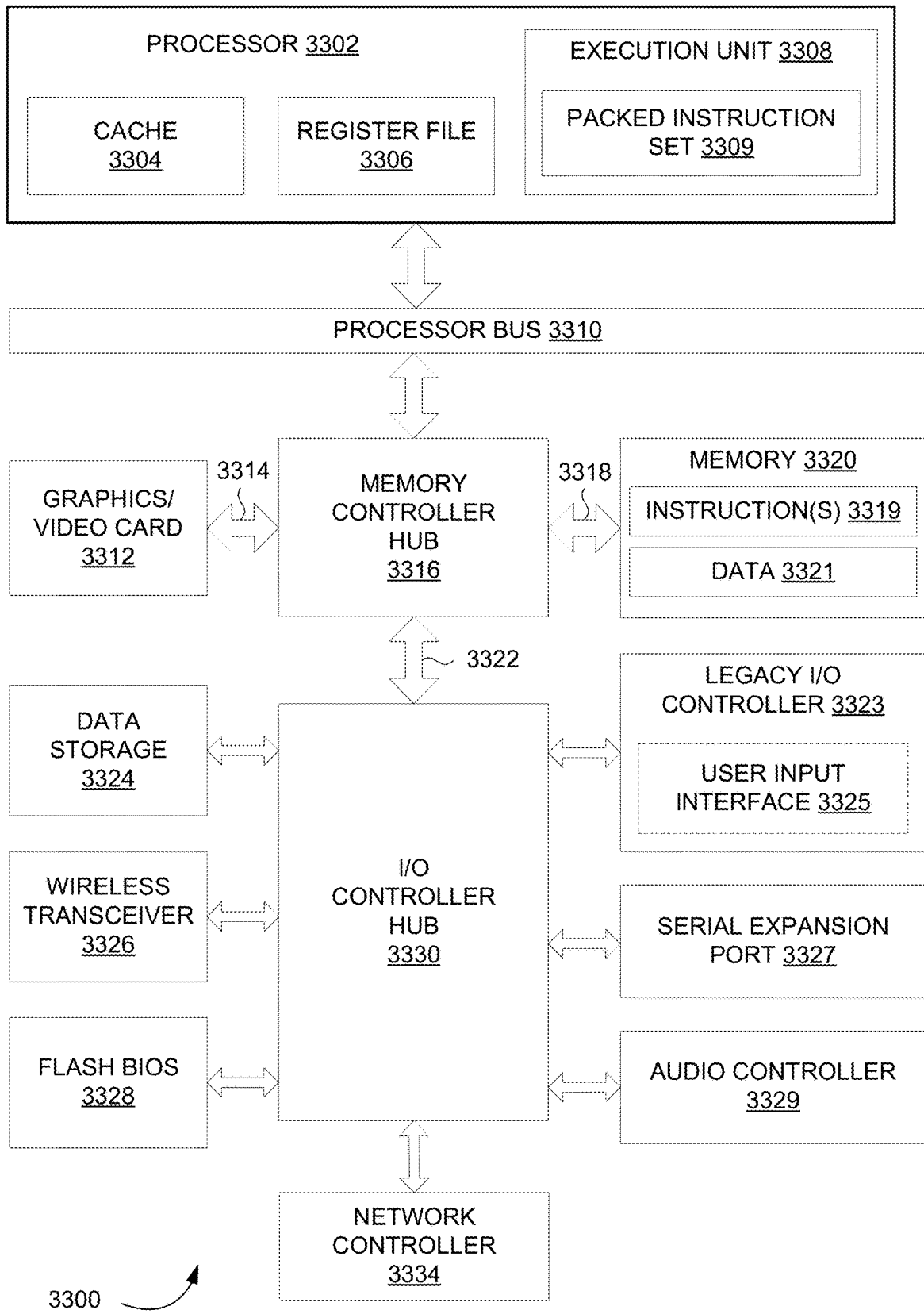
FIG. 33 illustrates a computer system, in accordance with at least one embodiment.

FIG. 33 illustrates a computer system 3300, in accordance with at least one embodiment. In at least one embodiment, computer system 3300 may be a system with interconnected devices and components, an SOC, or some combination. In at least on embodiment, computer system 3300 is formed with a processor 3302 that may include execution units to execute an instruction. In at least one embodiment, computer system 3300 may include, without limitation, a component, such as processor 3302 to employ execution units including logic to perform algorithms for processing data. In at least one embodiment, computer system 3300 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 3300 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 3300 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 3300 may include, without limitation, processor 3302 that may include, without limitation, one or more execution units 3308 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 3300 is a single processor desktop or server system. In at least one embodiment, computer system 3300 may be a multiprocessor system. In at least one embodiment, processor 3302 may include, without limitation, a CISC microprocessor, a RISC microprocessor, a VLIW microprocessor, a processor implementing a combination of instruction sets, or any other processor device, such as a digital signal processor, for example. In at least one embodiment, processor 3302 may be coupled to a processor bus 3310 that may transmit data signals between processor 3302 and other components in computer system 3300.

In at least one embodiment, processor 3302 may include, without limitation, a Level 1 ("L1") internal cache memory ("cache") 3304. In at least one embodiment, processor 3302 may have a single internal cache or multiple levels of internal cache. In at least one embodiment, cache memory may reside external to processor 3302. In at least one embodiment, processor 3302 may also include a combination of both internal and external caches. In at least one embodiment, a register file 3306 may store different types of data in various registers including, without limitation, integer registers, floating point registers, status registers, and instruction pointer register.

In at least one embodiment, execution unit 3308, including, without limitation, logic to perform integer and floating point operations, also resides in processor 3302. Processor 3302 may also include a microcode ("ucode") read only memory ("ROM") that stores microcode for certain macro instructions. In at least one embodiment, execution unit 3308 may include logic to handle a packed instruction set 3309. In at least one embodiment, by including packed instruction set 3309 in an instruction set of a general-purpose processor 3302, along with associated circuitry to execute instructions, operations used by many multimedia applications may be performed using packed data in a general-purpose processor 3302. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 3308 may also be used in microcontrollers, embedded processors, graphics devices, DSPs, and other types of logic circuits. In at least one embodiment, computer system 3300 may include, without limitation, a memory 3320. In at least one embodiment, memory 3320 may be implemented as a DRAM device, an SRAM device, flash memory device, or other memory device. Memory 3320 may store instruction(s) 3319 and/or data 3321 represented by data signals that may be executed by processor 3302.

In at least one embodiment, a system logic chip may be coupled to processor bus 3310 and memory 3320. In at least one embodiment, a system logic chip may include, without limitation, a memory controller hub ("MCH") 3316, and processor 3302 may communicate with MCH 3316 via processor bus 3310. In at least one embodiment, MCH 3316 may provide a high bandwidth memory path 3318 to memory 3320 for instruction and data storage and for storage of graphics commands, data and textures. In at least one embodiment, MCH 3316 may direct data signals between processor 3302, memory 3320, and other components in computer system 3300 and to bridge data signals between processor bus 3310, memory 3320, and a system I/O 3322. In at least one embodiment, system logic chip may provide a graphics port for coupling to a graphics controller. In at least one embodiment, MCH 3316 may be coupled to memory 3320 through high bandwidth memory path 3318 and graphics/video card 3312 may be coupled to MCH 3316 through an Accelerated Graphics Port ("AGP") interconnect 3314.

In at least one embodiment, computer system 3300 may use system I/O 3322 that is a proprietary hub interface bus to couple MCH 3316 to I/O controller hub ("ICH") 3330. In at least one embodiment, ICH 3330 may provide direct connections to some I/O devices via a local I/O bus. In at least one embodiment, local I/O bus may include, without limitation, a high-speed I/O bus for connecting peripherals to memory 3320, a chipset, and processor 3302. Examples may include, without limitation, an audio controller 3329, a firmware hub ("flash BIOS") 3328, a wireless transceiver 3326, a data storage 3324, a legacy I/O controller 3323 containing a user input interface 3325 and a keyboard interface, a serial expansion port 3327, such as a USB, and a network controller 3334. Data storage 3324 may include a hard disk drive, a floppy disk drive, a CD-ROM device, a flash memory device, or other mass storage device.

In at least one embodiment, FIG. 33 illustrates a system, which includes interconnected hardware devices or "chips." In at least one embodiment, FIG. 33 may illustrate an exemplary SoC. In at least one embodiment, devices illustrated in FIG. 33 may be interconnected with proprietary interconnects, standardized interconnects (e.g., PCIe), or some combination thereof. In at least one embodiment, one or more components of system 3300 are interconnected using compute express link ("CXL") interconnects.

In at least one embodiment, the sender device 102 and/or the receiver device 104 may each be implemented using the computer system 3300. In such embodiments, the sender processor 114 and/or the receiver processor 126 may each be implemented as the processor 3302. The sender memory 116 and/or the receiver memory 128 may each be implemented using any of the memory, such as the memory 3320 and/or data storage 3324, of the computer system 3300. The sender bus 228 and/or the receiver bus 418 may each be implemented using any of the buses, such as processor bus 3310, of the computer system 3300. The sender communication apparatus 112 and/or the receiver communication apparatus 124 may each be implemented as the network controller 3334.

In at least one embodiment, one or more of the Tx host computers 524, 526, and 528 and/or the Rx host computer 540 may each be implemented using the computer system 3300. In such embodiments, the sender processor 114 and/or the receiver processor 126 may each be implemented as the processor 3302. The sender memory 116 and/or the receiver memory 128 may each be implemented using any of the memory, such as the memory 3320 and/or data storage 3324, of the computer system 3300. The sender bus 228 and/or the receiver bus 418 may each be implemented using any of the buses, such as processor bus 3310, of the computer system 3300. The sender communication apparatus 112 and/or the receiver communication apparatus 124 may each be implemented as the network controller 3334.

In at least one embodiment, the O-DU 812 and/or the O-RU 814 may each be implemented using the computer system 3300. In such embodiments, the sender processor 114 and/or the receiver processor 126 may each be implemented as the processor 3302. The sender memory 116 and/or the receiver memory 128 may each be implemented using any of the memory, such as the memory 3320 and/or data storage 3324, of the computer system 3300. The sender bus 228 and/or the receiver bus 418 may each be implemented using any of the buses, such as processor bus 3310, of the computer system 3300. The sender communication apparatus 112 and/or the receiver communication apparatus 124 may each be implemented as the network controller 3334.

Figure 34:
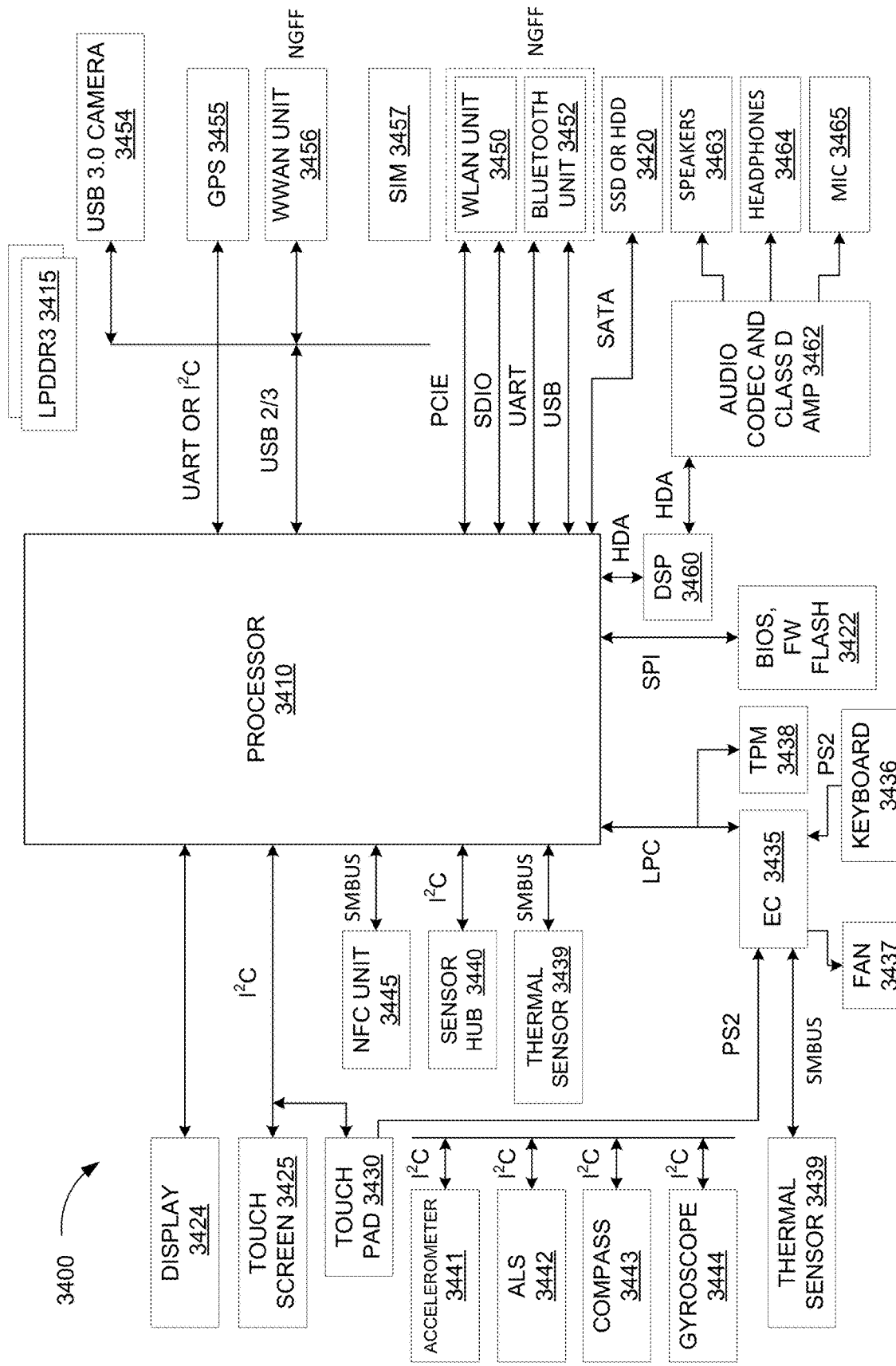
FIG. 34 illustrates a system, in accordance with at least one embodiment.

FIG. 34 illustrates a system 3400, in accordance with at least one embodiment. In at least one embodiment, system 3400 is an electronic device that utilizes a processor 3410. In at least one embodiment, system 3400 may be, for example and without limitation, a notebook, a tower server, a rack server, a blade server, a laptop, a desktop, a tablet, a mobile device, a phone, an embedded computer, or any other suitable electronic device.

In at least one embodiment, system 3400 may include, without limitation, processor 3410 communicatively coupled to any suitable number or kind of components, peripherals, modules, or devices. In at least one embodiment, processor 3410 is coupled using a bus or interface, such as an $I^2C$ bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 34 illustrates a system which includes interconnected hardware devices or "chips." In at least one embodiment, FIG. 34 may illustrate an exemplary SoC. In at least one embodiment, devices illustrated in FIG. 34 may be interconnected with proprietary interconnects, standardized interconnects (e.g., PCIe) or some combination thereof. In at least one embodiment, one or more components of FIG. 34 are interconnected using CXL interconnects.

In at least one embodiment, FIG. 34 may include a display 3424, a touch screen 3425, a touch pad 3430, a Near Field Communications unit ("NFC") 3445, a sensor hub 3440, a thermal sensor 3446, an Express Chipset ("EC") 3435, a Trusted Platform Module ("TPM") 3438, BIOS/firmware/flash memory ("BIOS, FW Flash") 3422, a DSP 3460, a Solid State Disk ("SSD") or Hard Disk Drive ("HDD") 3420, a wireless local area network unit ("WLAN") 3450, a Bluetooth unit 3452, a Wireless Wide Area Network unit ("WWAN") 3456, a Global Positioning System ("GPS") 3455, a camera ("USB 3.0 camera") 3454 such as a USB 3.0 camera, or a Low Power Double Data Rate ("LPDDR") memory unit ("LPDDR3") 3415 implemented in, for example, LPDDR3 standard. These components may each be implemented in any suitable manner.

In at least one embodiment, other components may be communicatively coupled to processor 3410 through components discussed above. In at least one embodiment, an accelerometer 3441, an Ambient Light Sensor ("ALS") 3442, a compass 3443, and a gyroscope 3444 may be communicatively coupled to sensor hub 3440. In at least one embodiment, a thermal sensor 3439, a fan 3437, a keyboard 3446, and a touch pad 3430 may be communicatively coupled to EC 3435. In at least one embodiment, a speaker 3463, a headphones 3464, and a microphone ("mic") 3465 may be communicatively coupled to an audio unit ("audio codec and class d amp") 3464, which may in turn be communicatively coupled to DSP 3460. In at least one embodiment, audio unit 3464 may include, for example and without limitation, an audio coder/decoder ("codec") and a class D amplifier. In at least one embodiment, a SIM card ("SIM") 3457 may be communicatively coupled to WWAN unit 3456. In at least one embodiment, components such as WLAN unit 3450 and Bluetooth unit 3452, as well as WWAN unit 3456 may be implemented in a Next Generation Form Factor ("NGFF").

In at least one embodiment, the sender device 102 and/or the receiver device 104 may each be implemented using the system 3400. In such embodiments, the sender processor 114 and/or the receiver processor 126 may each be implemented as the processor 3410. The sender memory 116 and/or the receiver memory 128 may each be implemented using any of the memory, such as the BIOS, FW Flash 3422 and/or LPDDR3 3415, of the system 3400. The sender bus 228 and/or the receiver bus 418 may each be implemented using any of the buses of the system 3400. The sender communication apparatus 112 and/or the receiver communication apparatus 124 may each be implemented as the WLAN unit 3450 and/or WWAN unit 3456.

In at least one embodiment, one or more of the Tx host computers 524, 526, and 528 and/or the Rx host computer 540 may each be implemented using the system 3400. In such embodiments, the sender processor 114 and/or the receiver processor 126 may each be implemented as the processor 3410. The sender memory 116 and/or the receiver memory 128 may each be implemented using any of the memory, such as the BIOS, FW Flash 3422 and/or LPDDR3 3415, of the system 3400. The sender bus 228 and/or the receiver bus 418 may each be implemented using any of the buses of the system 3400. The sender communication apparatus 112 and/or the receiver communication apparatus 124 may each be implemented as the WLAN unit 3450 and/or WWAN unit 3456.

In at least one embodiment, the O-DU 812 and/or the O-RU 814 may each be implemented using the system 3400. In such embodiments, the sender processor 114 and/or the receiver processor 126 may each be implemented as the processor 3410. The sender memory 116 and/or the receiver memory 128 may each be implemented using any of the memory, such as the BIOS, FW Flash 3422 and/or LPDDR3 3415, of the system 3400. The sender bus 228 and/or the receiver bus 418 may each be implemented using any of the buses of the system 3400. The sender communication apparatus 112 and/or the receiver communication apparatus 124 may each be implemented as the WLAN unit 3450 and/or WWAN unit 3456.

Figure 35:
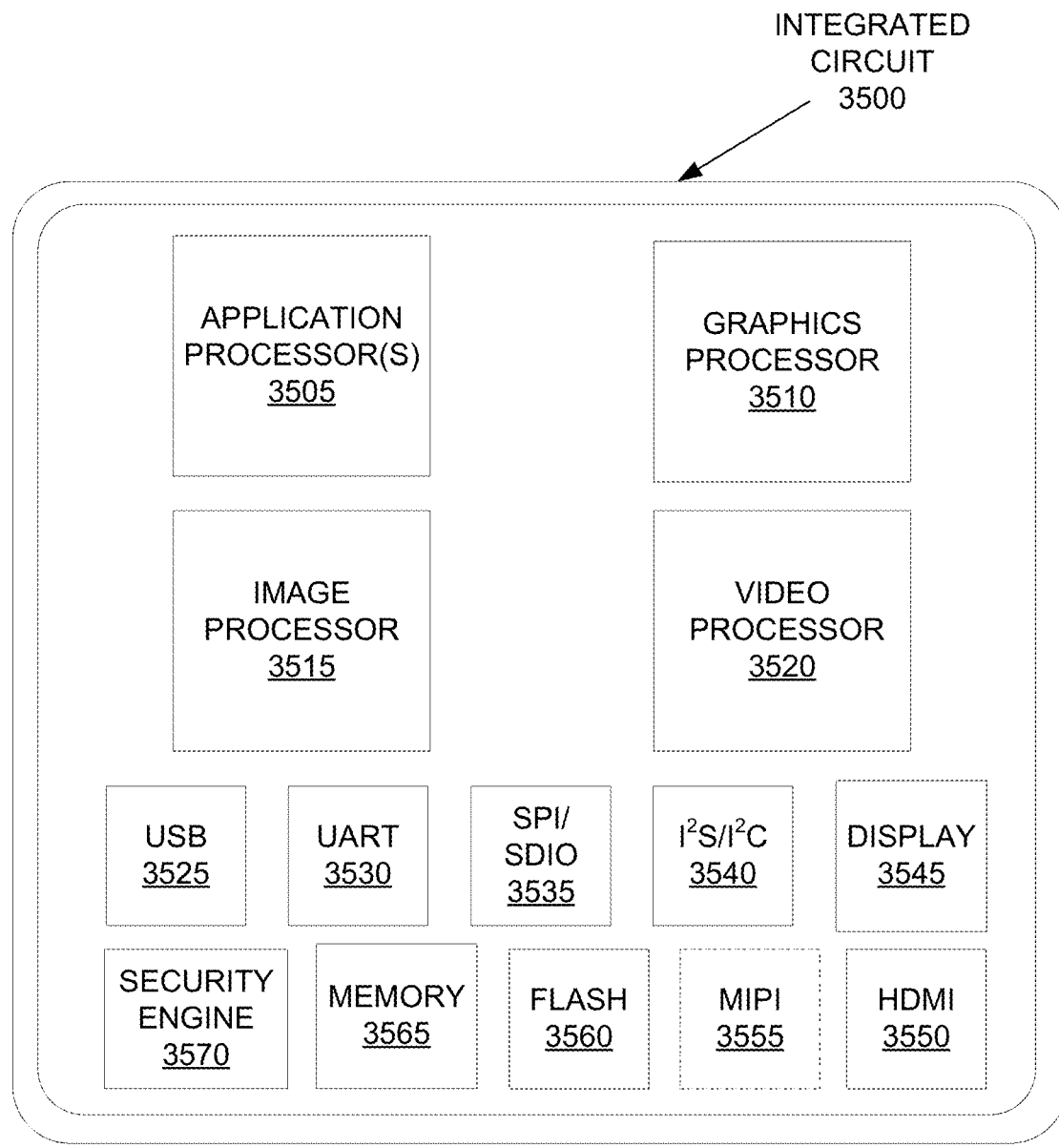
FIG. 35 illustrates an exemplary integrated circuit, in accordance with at least one embodiment.

FIG. 35 illustrates an exemplary integrated circuit 3500, in accordance with at least one embodiment. In at least one embodiment, exemplary integrated circuit 3500 is an SoC that may be fabricated using one or more IP cores. In at least one embodiment, integrated circuit 3500 includes one or more application processor(s) 3505 (e.g., CPUs), at least one graphics processor 3510, and may additionally include an image processor 3515 and/or a video processor 3520, any of which may be a modular IP core. In at least one embodiment, integrated circuit 3500 includes peripheral or bus logic including a USB controller 3525, a UART controller 3530, an SPI/SDIO controller 3535, and an $I^2S/I^2C$ controller 3540. In at least one embodiment, integrated circuit 3500 can include a display device 3545 coupled to one or more of a high-definition multimedia interface ("HDMI") controller 3550 and a mobile industry processor interface ("MIPI") display interface 3555. In at least one embodiment, storage may be provided by a flash memory subsystem 3560 including flash memory and a flash memory controller. In at least one embodiment, a memory interface may be provided via a memory controller 3565 for access to SDRAM or SRAM memory devices. In at least one embodiment, some integrated circuits additionally include an embedded security engine 3570.

In at least one embodiment, the sender device 102 and/or the receiver device 104 may each be implemented using the integrated circuit 3500. In such embodiments, the sender processor 114 and/or the receiver processor 126 may each be implemented using any processor(s), such as the application processor(s) 3505, graphics processor 3510, image processor 3515, and/or video processor 3520, of the integrated circuit 3500. The sender memory 116 and/or the receiver memory 128 may each be implemented using any of the memory of the integrated circuit 3500. The sender bus 228 and/or the receiver bus 418 may each be implemented using any of the buses of the integrated circuit 3500. The sender communication apparatus 112 and/or the receiver communication apparatus 124 may each be implemented as any communication apparatus of the integrated circuit 3500.

In at least one embodiment, one or more of the Tx host computers 524, 526, and 528 and/or the Rx host computer 540 may each be implemented using the integrated circuit 3500. In such embodiments, the sender processor 114 and/or the receiver processor 126 may each be implemented using any processor(s), such as the application processor(s) 3505, graphics processor 3510, image processor 3515, and/or video processor 3520, of the integrated circuit 3500. The sender memory 116 and/or the receiver memory 128 may each be implemented using any of the memory of the integrated circuit 3500. The sender bus 228 and/or the receiver bus 418 may each be implemented using any of the buses of the integrated circuit 3500. The sender communication apparatus 112 and/or the receiver communication apparatus 124 may each be implemented as any communication apparatus of the integrated circuit 3500.

In at least one embodiment, the O-DU 812 and/or the O-RU 814 may each be implemented using the integrated circuit 3500. In such embodiments, the sender processor 114 and/or the receiver processor 126 may each be implemented using any processor(s), such as the application processor(s) 3505, graphics processor 3510, image processor 3515, and/or video processor 3520, of the integrated circuit 3500. The sender memory 116 and/or the receiver memory 128 may each be implemented using any of the memory of the integrated circuit 3500. The sender bus 228 and/or the receiver bus 418 may each be implemented using any of the buses of the integrated circuit 3500. The sender communication apparatus 112 and/or the receiver communication apparatus 124 may each be implemented as any communication apparatus of the integrated circuit 3500.

Figure 36:
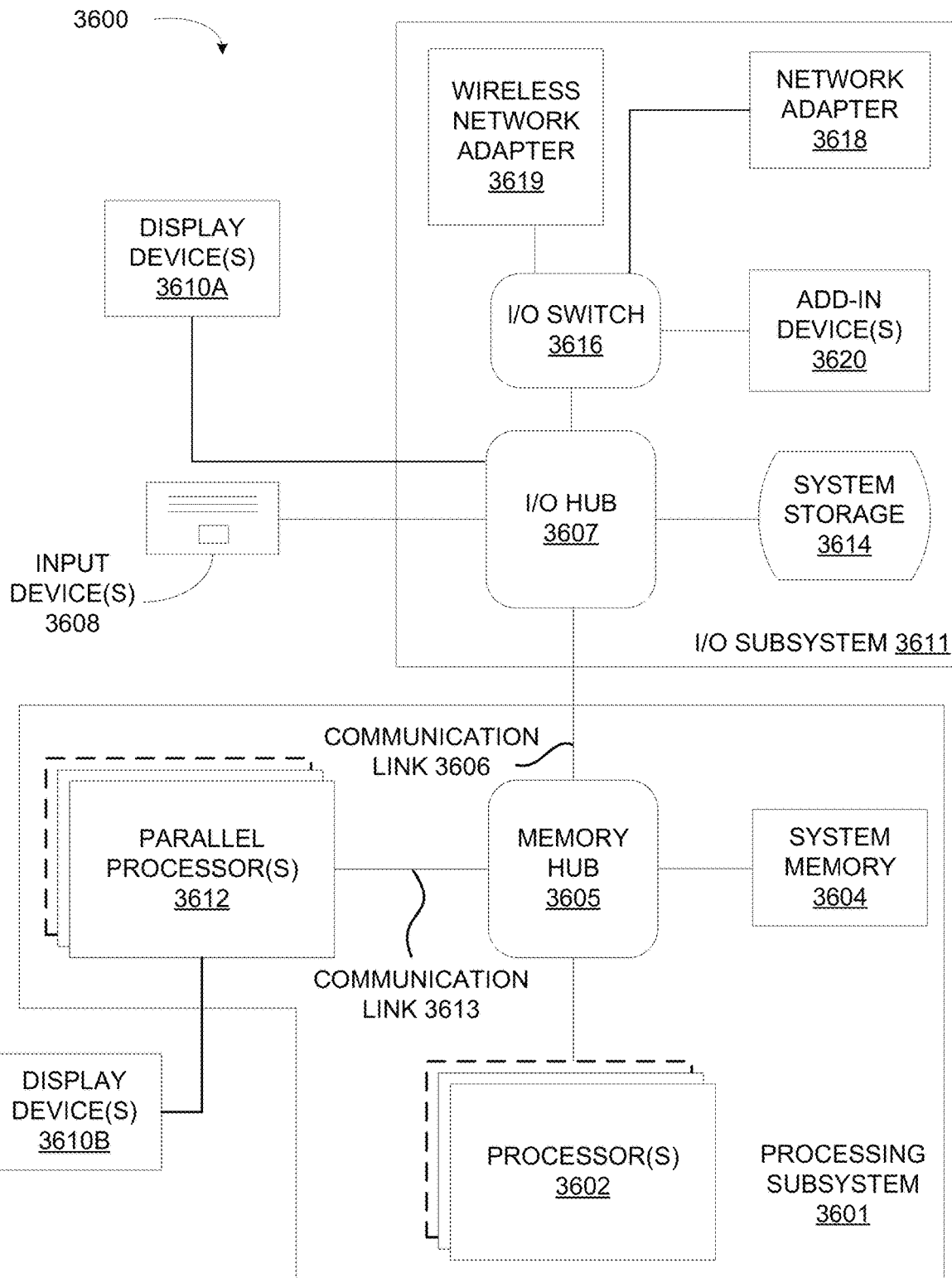
FIG. 36 illustrates a computing system, according to at least one embodiment.

FIG. 36 illustrates a computing system 3600, according to at least one embodiment; In at least one embodiment, computing system 3600 includes a processing subsystem 3601 having one or more processor(s) 3602 and a system memory 3604 communicating via an interconnection path that may include a memory hub 3605. In at least one embodiment, memory hub 3605 may be a separate component within a chipset component or may be integrated within one or more processor(s) 3602. In at least one embodiment, memory hub 3605 couples with an I/O subsystem 3611 via a communication link 3606. In at least one embodiment, I/O subsystem 3611 includes an I/O hub 3607 that can enable computing system 3600 to receive input from one or more input device(s) 3608. In at least one embodiment, I/O hub 3607 can enable a display controller, which may be included in one or more processor(s) 3602, to provide outputs to one or more display device(s) 3610A. In at least one embodiment, one or more display device(s) 3610A coupled with I/O hub 3607 can include a local, internal, or embedded display device.

In at least one embodiment, processing subsystem 3601 includes one or more parallel processor(s) 3612 coupled to memory hub 3605 via a bus or other communication link 3613. In at least one embodiment, communication link 3613 may be one of any number of standards based communication link technologies or protocols, such as, but not limited to PCIe, or may be a vendor specific communications interface or communications fabric. In at least one embodiment, one or more parallel processor(s) 3612 form a computationally focused parallel or vector processing system that can include a large number of processing cores and/or processing clusters, such as a many integrated core processor. In at least one embodiment, one or more parallel processor(s) 3612 form a graphics processing subsystem that can output pixels to one of one or more display device(s) 3610A coupled via I/O Hub 3607. In at least one embodiment, one or more parallel processor(s) 3612 can also include a display controller and display interface (not shown) to enable a direct connection to one or more display device(s) 3610B.

In at least one embodiment, a system storage unit 3614 can connect to I/O hub 3607 to provide a storage mechanism for computing system 3600. In at least one embodiment, an I/O switch 3616 can be used to provide an interface mechanism to enable connections between I/O hub 3607 and other components, such as a network adapter 3618 and/or wireless network adapter 3619 that may be integrated into a platform, and various other devices that can be added via one or more add-in device(s) 3620. In at least one embodiment, network adapter 3618 can be an Ethernet adapter or another wired network adapter. In at least one embodiment, wireless network adapter 3619 can include one or more of a Wi-Fi, Bluetooth, NFC, or other network device that includes one or more wireless radios.

In at least one embodiment, computing system 3600 can include other components not explicitly shown, including USB or other port connections, optical storage drives, video capture devices, and/or variations thereof, that may also be connected to I/O hub 3607. In at least one embodiment, communication paths interconnecting various components in FIG. 36 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 3612 incorporate circuitry optimized for graphics and video processing, including, for example, video output circuitry, and constitutes a graphics processing unit ("GPU"). In at least one embodiment, one or more parallel processor(s) 3612 incorporate circuitry optimized for general purpose processing. In at least embodiment, components of computing system 3600 may be integrated with one or more other system elements on a single integrated circuit. For example, in at least one embodiment, one or more parallel processor(s) 3612, memory hub 3605, processor(s) 3602, and I/O hub 3607 can be integrated into a SoC integrated circuit. In at least one embodiment, components of computing system 3600 can be integrated into a single package to form a system in package ("SIP") configuration. In at least one embodiment, at least a portion of components of computing system 3600 can be integrated into a multi-chip module ("MCM"), which can be interconnected with other multi-chip modules into a modular computing system. In at least one embodiment, I/O subsystem 3611 and display devices 3610B are omitted from computing system 3600.

In at least one embodiment, the sender device 102 and/or the receiver device 104 may each be implemented using the computing system 3600. In such embodiments, the sender processor 114 and/or the receiver processor 126 may each be implemented using any processor(s), such as the processor(s) 3602, of the computing system 3600. The sender memory 116 and/or the receiver memory 128 may each be implemented using any of the memory, such as system memory 3604, of the computing system 3600. The sender bus 228 and/or the receiver bus 418 may each be implemented using any of the buses, such as communication link 3613, of the computing system 3600. The sender communication apparatus 112 and/or the receiver communication apparatus 124 may each be implemented as any communication apparatus, such as network adapter 3618 and/or wireless network adapter 3619, of the computing system 3600.

In at least one embodiment, one or more of the Tx host computers 524, 526, and 528 and/or the Rx host computer 540 may each be implemented using the computing system 3600. In such embodiments, the sender processor 114 and/or the receiver processor 126 may each be implemented using any processor(s), such as the processor(s) 3602, of the computing system 3600. The sender memory 116 and/or the receiver memory 128 may each be implemented using any of the memory, such as system memory 3604, of the computing system 3600. The sender bus 228 and/or the receiver bus 418 may each be implemented using any of the buses, such as communication link 3613, of the computing system 3600. The sender communication apparatus 112 and/or the receiver communication apparatus 124 may each be implemented as any communication apparatus, such as network adapter 3618 and/or wireless network adapter 3619, of the computing system 3600.

In at least one embodiment, the O-DU 812 and/or the O-RU 814 may each be implemented using the computing system 3600. In such embodiments, the sender processor 114 and/or the receiver processor 126 may each be implemented using any processor(s), such as the processor(s) 3602, of the computing system 3600. The sender memory 116 and/or the receiver memory 128 may each be implemented using any of the memory, such as system memory 3604, of the computing system 3600. The sender bus 228 and/or the receiver bus 418 may each be implemented using any of the buses, such as communication link 3613, of the computing system 3600. The sender communication apparatus 112 and/or the receiver communication apparatus 124 may each be implemented as any communication apparatus, such as network adapter 3618 and/or wireless network adapter 3619, of the computing system 3600.

Processing Systems

The following figures set forth, without limitation, exemplary processing systems that can be used to implement at least one embodiment.

Figure 37:
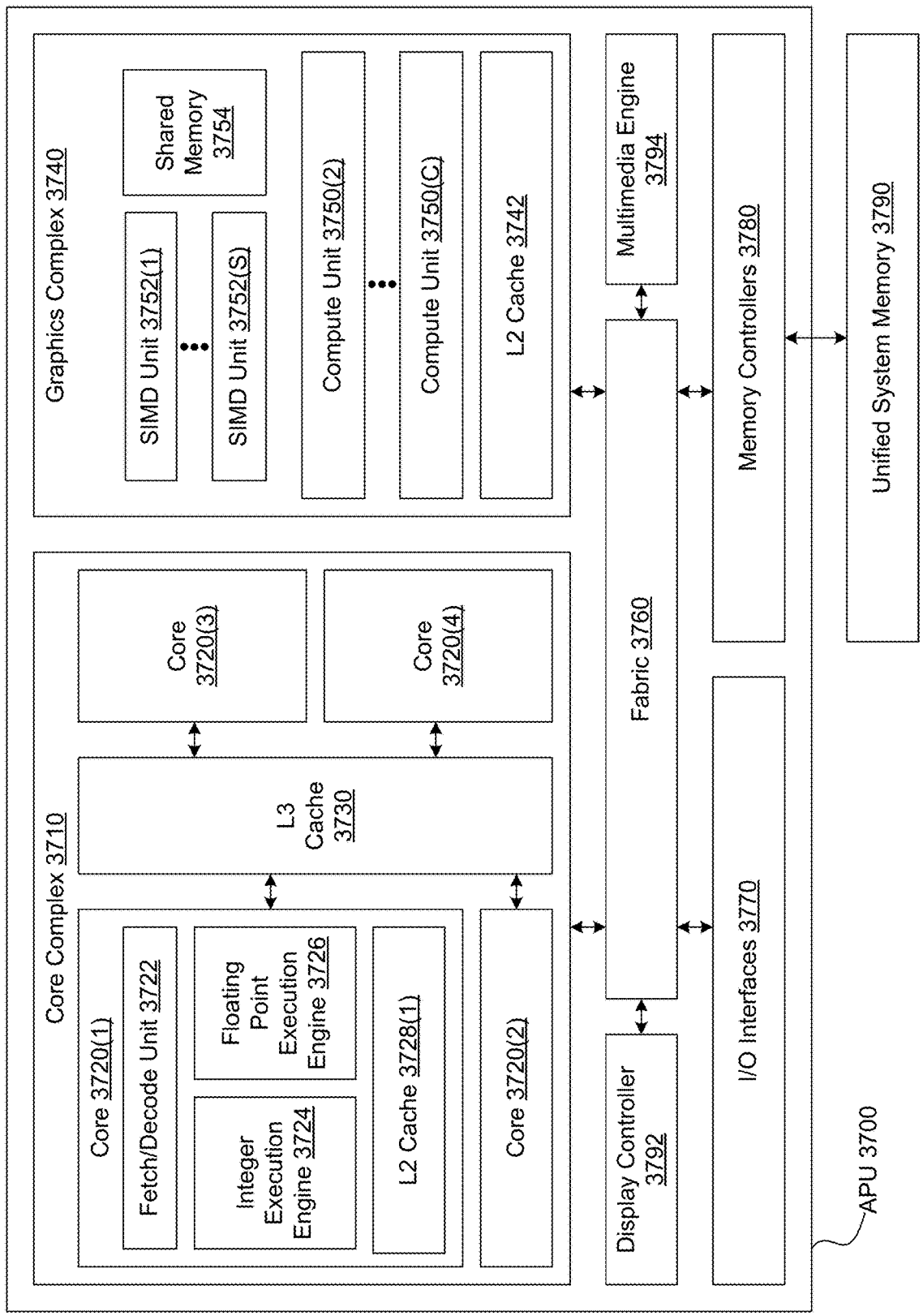
FIG. 37 illustrates an APU, in accordance with at least one embodiment.

FIG. 37 illustrates an accelerated processing unit ("APU") 3700, in accordance with at least one embodiment. In at least one embodiment, APU 3700 is developed by AMD Corporation of Santa Clara, CA. In at least one embodiment, APU 3700 can be configured to execute an application program, such as a CUDA program. In at least one embodiment, APU 3700 includes, without limitation, a core complex 3710, a graphics complex 3740, fabric 3760, I/O interfaces 3770, memory controllers 3780, a display controller 3792, and a multimedia engine 3794. In at least one embodiment, APU 3700 may include, without limitation, any number of core complexes 3710, any number of graphics complexes 3740, any number of display controllers 3792, and any number of multimedia engines 3794 in any combination. For explanatory purposes, multiple instances of like objects are denoted herein with reference numbers identifying an object and parenthetical numbers identifying an instance where needed.

In at least one embodiment, core complex 3710 is a CPU, graphics complex 3740 is a GPU, and APU 3700 is a processing unit that integrates, without limitation, 3710 and 3740 onto a single chip. In at least one embodiment, some tasks may be assigned to core complex 3710 and other tasks may be assigned to graphics complex 3740. In at least one embodiment, core complex 3710 is configured to execute main control software associated with APU 3700, such as an operating system. In at least one embodiment, core complex 3710 is a master processor of APU 3700, controlling and coordinating operations of other processors. In at least one embodiment, core complex 3710 issues commands that control an operation of graphics complex 3740. In at least one embodiment, core complex 3710 can be configured to execute host executable code derived from CUDA source code, and graphics complex 3740 can be configured to execute device executable code derived from CUDA source code.

In at least one embodiment, core complex 3710 includes, without limitation, cores 3720(1)-3720(4) and an L3 cache 3730. In at least one embodiment, core complex 3710 may include, without limitation, any number of cores 3720 and any number and type of caches in any combination. In at least one embodiment, cores 3720 are configured to execute instructions of a particular instruction set architecture ("ISA"). In at least one embodiment, each core 3720 is a CPU core.

In at least one embodiment, each core 3720 includes, without limitation, a fetch/decode unit 3722, an integer execution engine 3724, a floating point execution engine 3726, and an L2 cache 3728. In at least one embodiment, fetch/decode unit 3722 fetches instructions, decodes such instructions, generates micro-operations, and dispatches separate micro-instructions to integer execution engine 3724 and floating point execution engine 3726. In at least one embodiment, fetch/decode unit 3722 can concurrently dispatch one micro-instruction to integer execution engine 3724 and another micro-instruction to floating point execution engine 3726. In at least one embodiment, integer execution engine 3724 executes, without limitation, integer and memory operations. In at least one embodiment, floating point engine 3726 executes, without limitation, floating point and vector operations. In at least one embodiment, fetch-decode unit 3722 dispatches micro-instructions to a single execution engine that replaces both integer execution engine 3724 and floating point execution engine 3726.

In at least one embodiment, each core 3720(i), where i is an integer representing a particular instance of core 3720, may access L2 cache 3728(i) included in core 3720(i). In at least one embodiment, each core 3720 included in core complex 3710(j), where j is an integer representing a particular instance of core complex 3710, is connected to other cores 3720 included in core complex 3710(j) via L3 cache 3730(j) included in core complex 3710(j). In at least one embodiment, cores 3720 included in core complex 3710(j), where j is an integer representing a particular instance of core complex 3710, can access all of L3 cache 3730(*j*) included in core complex 3710(*j*). In at least one embodiment, L3 cache 3730 may include, without limitation, any number of slices.

In at least one embodiment, graphics complex 3740 can be configured to perform compute operations in a highly-parallel fashion. In at least one embodiment, graphics complex 3740 is configured to execute graphics pipeline operations such as draw commands, pixel operations, geometric computations, and other operations associated with rendering an image to a display. In at least one embodiment, graphics complex 3740 is configured to execute operations unrelated to graphics. In at least one embodiment, graphics complex 3740 is configured to execute both operations related to graphics and operations unrelated to graphics.

In at least one embodiment, graphics complex 3740 includes, without limitation, any number of compute units 3750 and an L2 cache 3742. In at least one embodiment, compute units 3750 share L2 cache 3742. In at least one embodiment, L2 cache 3742 is partitioned. In at least one embodiment, graphics complex 3740 includes, without limitation, any number of compute units 3750 and any number (including zero) and type of caches. In at least one embodiment, graphics complex 3740 includes, without limitation, any amount of dedicated graphics hardware.

In at least one embodiment, each compute unit 3750 includes, without limitation, any number of SIMD units 3752 and a shared memory 3754. In at least one embodiment, each SIMD unit 3752 implements a SIMD architecture and is configured to perform operations in parallel. In at least one embodiment, each compute unit 3750 may execute any number of thread blocks, but each thread block executes on a single compute unit 3750. In at least one embodiment, a thread block includes, without limitation, any number of threads of execution. In at least one embodiment, a workgroup is a thread block. In at least one embodiment, each SIMD unit 3752 executes a different warp. In at least one embodiment, a warp is a group of threads (e.g., 16 threads), where each thread in a warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 3754.

In at least one embodiment, fabric 3760 is a system interconnect that facilitates data and control transmissions across core complex 3710, graphics complex 3740, I/O interfaces 3770, memory controllers 3780, display controller 3792, and multimedia engine 3794. In at least one embodiment, APU 3700 may include, without limitation, any amount and type of system interconnect in addition to or instead of fabric 3760 that facilitates data and control transmissions across any number and type of directly or indirectly linked components that may be internal or external to APU 3700. In at least one embodiment, I/O interfaces 3770 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 3770 In at least one embodiment, peripheral devices that are coupled to I/O interfaces 3770 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 3794 includes, without limitation, any amount and type of circuitry that is related to multimedia, such as a video decoder, a video encoder, an image signal processor, etc. In at least one embodiment, memory controllers 3780 facilitate data transfers between APU 3700 and a unified system memory 3790. In at least one embodiment, core complex 3710 and graphics complex 3740 share unified system memory 3790.

In at least one embodiment, APU 3700 implements a memory subsystem that includes, without limitation, any amount and type of memory controllers 3780 and memory devices (e.g., shared memory 3754) that may be dedicated to one component or shared among multiple components. In at least one embodiment, APU 3700 implements a cache subsystem that includes, without limitation, one or more cache memories (e.g., L2 caches 3828, L3 cache 3730, and L2 cache 3742) that may each be private to or shared between any number of components (e.g., cores 3720, core complex 3710, SIMD units 3752, compute units 3750, and graphics complex 3740).

In at least one embodiment, the sender processor 114 and/or the receiver processor 126 may each be implemented as APU 3700. In such embodiments, the sender memory 116 and/or the receiver memory 128 may each be implemented as unified system memory 3790.

Figure 38:
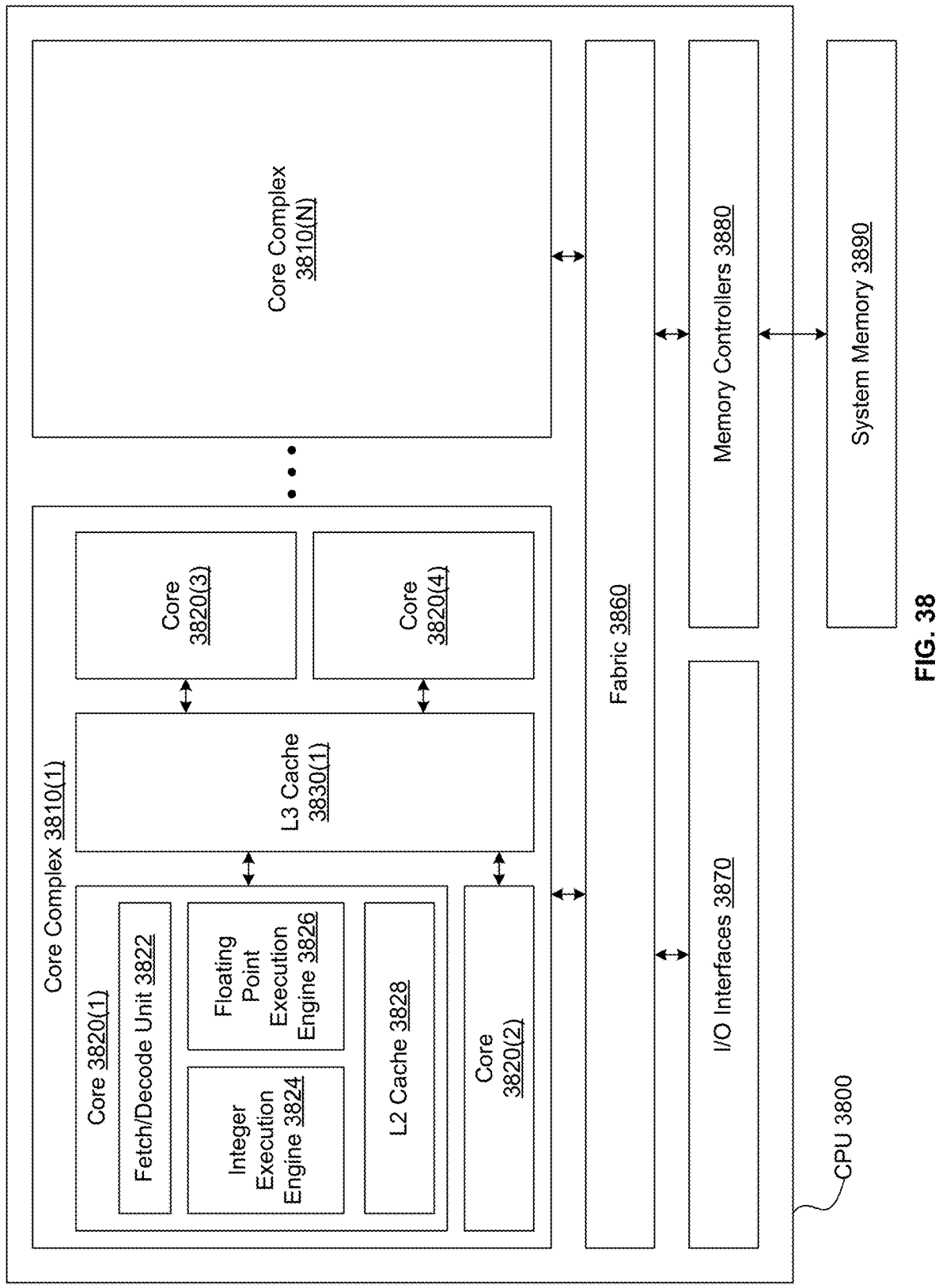
FIG. 38 illustrates a CPU, in accordance with at least one embodiment.

FIG. 38 illustrates a CPU 3800, in accordance with at least one embodiment. In at least one embodiment, CPU 3800 is developed by AMD Corporation of Santa Clara, CA. In at least one embodiment, CPU 3800 can be configured to execute an application program. In at least one embodiment, CPU 3800 is configured to execute main control software, such as an operating system. In at least one embodiment, CPU 3800 issues commands that control an operation of an external GPU (not shown). In at least one embodiment, CPU 3800 can be configured to execute host executable code derived from CUDA source code, and an external GPU can be configured to execute device executable code derived from such CUDA source code. In at least one embodiment, CPU 3800 includes, without limitation, any number of core complexes 3810, fabric 3860, I/O interfaces 3870, and memory controllers 3880.

In at least one embodiment, core complex 3810 includes, without limitation, cores 3820(1)-3820(4) and an L3 cache 3830. In at least one embodiment, core complex 3810 may include, without limitation, any number of cores 3820 and any number and type of caches in any combination. In at least one embodiment, cores 3820 are configured to execute instructions of a particular ISA. In at least one embodiment, each core 3820 is a CPU core.

In at least one embodiment, each core 3820 includes, without limitation, a fetch/decode unit 3822, an integer execution engine 3824, a floating point execution engine 3826, and an L2 cache 3828. In at least one embodiment, fetch/decode unit 3822 fetches instructions, decodes such instructions, generates micro-operations, and dispatches separate micro-instructions to integer execution engine 3824 and floating point execution engine 3826. In at least one embodiment, fetch/decode unit 3822 can concurrently dispatch one micro-instruction to integer execution engine 3824 and another micro-instruction to floating point execution engine 3826. In at least one embodiment, integer execution engine 3824 executes, without limitation, integer and memory operations. In at least one embodiment, floating point engine 3826 executes, without limitation, floating point and vector operations. In at least one embodiment, fetch-decode unit 3822 dispatches micro-instructions to a single execution engine that replaces both integer execution engine 3824 and floating point execution engine 3826.

In at least one embodiment, each core 3820(i), where i is an integer representing a particular instance of core 3820, may access L2 cache 3828(i) included in core 3820(i). In at least one embodiment, each core 3820 included in core complex 3810(j), where j is an integer representing a particular instance of core complex 3810, is connected to other cores 3820 in core complex 3810(j) via L3 cache 3830(j) included in core complex 3810(j). In at least one embodiment, cores 3820 included in core complex 3810(j), where j is an integer representing a particular instance of core complex 3810, can access all of L3 cache 3830(j) included in core complex 3810(j). In at least one embodiment, L3 cache 3830 may include, without limitation, any number of slices.

In at least one embodiment, fabric 3860 is a system interconnect that facilitates data and control transmissions across core complexes 3810(1)-3810(N) (where N is an integer greater than zero), I/O interfaces 3870, and memory controllers 3880. In at least one embodiment, CPU 3800 may include, without limitation, any amount and type of system interconnect in addition to or instead of fabric 3860 that facilitates data and control transmissions across any number and type of directly or indirectly linked components that may be internal or external to CPU 3800. In at least one embodiment, I/O interfaces 3870 are representative of any number and type of I/O interfaces (e.g., PCI, PCI-X, PCIe, GBE, USB, etc.). In at least one embodiment, various types of peripheral devices are coupled to I/O interfaces 3870 In at least one embodiment, peripheral devices that are coupled to I/O interfaces 3870 may include, without limitation, displays, keyboards, mice, printers, scanners, joysticks or other types of game controllers, media recording devices, external storage devices, network interface cards, and so forth.

In at least one embodiment, memory controllers 3880 facilitate data transfers between CPU 3800 and a system memory 3890. In at least one embodiment, core complex 3810 and graphics complex 3840 share system memory 3890. In at least one embodiment, CPU 3800 implements a memory subsystem that includes, without limitation, any amount and type of memory controllers 3880 and memory devices that may be dedicated to one component or shared among multiple components. In at least one embodiment, CPU 3800 implements a cache subsystem that includes, without limitation, one or more cache memories (e.g., L2 caches 3828 and L3 caches 3830) that may each be private to or shared between any number of components (e.g., cores 3820 and core complexes 3810).

In at least one embodiment, the sender processor 114 and/or the receiver processor 126 may each be implemented as CPU 3800. In such embodiments, the sender memory 116 and/or the receiver memory 128 may each be implemented as system memory 3890.

Figure 39:
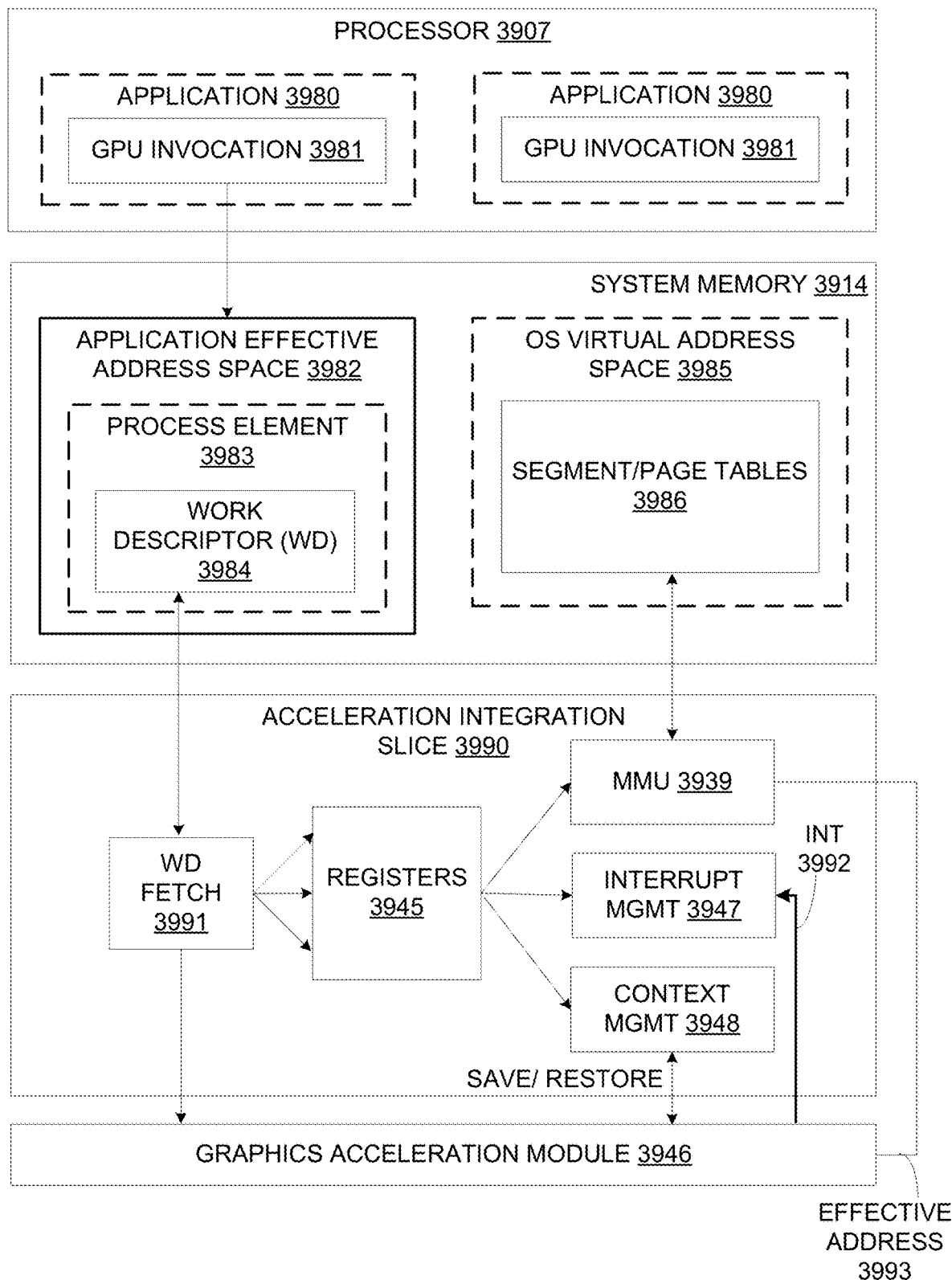
FIG. 39 illustrates an exemplary accelerator integration slice, in accordance with at least one embodiment.

FIG. 39 illustrates an exemplary accelerator integration slice 3990, in accordance with at least one embodiment. As used with reference to FIGS. 39-48, a "slice" includes a specified portion of processing resources of an accelerator integration circuit. In at least one embodiment, an accelerator integration circuit provides cache management, memory access, context management, and interrupt management services on behalf of multiple graphics processing engines included in a graphics acceleration module. Graphics processing engines may each include a separate GPU. Alternatively, graphics processing engines may include different types of graphics processing engines within a GPU such as graphics execution units, media processing engines (e.g., video encoders/decoders), samplers, and blit engines. In at least one embodiment, a graphics acceleration module may be a GPU with multiple graphics processing engines. In at least one embodiment, graphics processing engines may be individual GPUs integrated on a common package, line card, or chip.

An application effective address space 3982 within system memory 3914 stores process elements 3983. In one embodiment, process elements 3983 are stored in response to GPU invocations 3981 from applications 3980 executed on processor 3907. A process element 3983 contains process state for corresponding application 3980. A work descriptor ("WD") 3984 contained in process element 3983 can be a single job requested by an application or may contain a pointer to a queue of jobs. In at least one embodiment, WD 3984 is a pointer to a job request queue in application effective address space 3982.

Graphics acceleration module 3946 and/or individual graphics processing engines can be shared by all or a subset of processes in a system. In at least one embodiment, an infrastructure for setting up process state and sending WD 3984 to graphics acceleration module 3946 to start a job in a virtualized environment may be included.

In at least one embodiment, a dedicated-process programming model is implementation-specific. In this model, a single process owns graphics acceleration module 3946 or an individual graphics processing engine. Because graphics acceleration module 3946 is owned by a single process, a hypervisor initializes an accelerator integration circuit for an owning partition and an operating system initializes accelerator integration circuit for an owning process when graphics acceleration module 3946 is assigned.

In operation, a WD fetch unit 3991 in accelerator integration slice 3990 fetches next WD 3984 which includes an indication of work to be done by one or more graphics processing engines of graphics acceleration module 3946. Data from WD 3984 may be stored in registers 3945 and used by a memory management unit ("MMU") 3939, interrupt management circuit 3947 and/or context management circuit 3948 as illustrated. For example, one embodiment of MMU 3939 includes segment/page walk circuitry for accessing segment/page tables 3986 within OS virtual address space 3985. Interrupt management circuit 3947 may process interrupt events ("INT") 3992 received from graphics acceleration module 3946. When performing graphics operations, an effective address 3993 generated by a graphics processing engine is translated to a real address by MMU 3939.

In one embodiment, a same set of registers 3945 are duplicated for each graphics processing engine and/or graphics acceleration module 3946 and may be initialized by a hypervisor or operating system. Each of these duplicated registers may be included in accelerator integration slice 3990. Exemplary registers that may be initialized by a hypervisor are shown in Table 1.

TABLE 1

| | Hypervisor Initialized Registers |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| Operating | System Initialized Registers |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 3984 is specific to a particular graphics acceleration module 3946 and/or a particular graphics processing engine. It contains all information required by a graphics processing engine to do work or it can be a pointer to a memory location where an application has set up a command queue of work to be completed.

In at least one embodiment, the sender device 102 and/or the receiver device 104 may each be implemented using the system of FIG. 39. In such embodiments, the sender processor 114 and/or the receiver processor 126 may each be implemented as processor 3907, and the sender memory 116 and/or the receiver memory 128 may each be implemented as system memory 3914.

In at least one embodiment, one or more of the Tx host computers 524, 526, and 528 and/or the Rx host computer 540 may each be implemented using the system of FIG. 39. In such embodiments, the sender processor 114 and/or the receiver processor 126 may each be implemented as processor 3907, and the sender memory 116 and/or the receiver memory 128 may each be implemented as system memory 3914.

In at least one embodiment, the O-DU 812 and/or the O-RU 814 may each be implemented using the system of FIG. 39. In such embodiments, the sender processor 114 and/or the receiver processor 126 may each be implemented as processor 3907, and the sender memory 116 and/or the receiver memory 128 may each be implemented as system memory 3914.

Figure 40A:
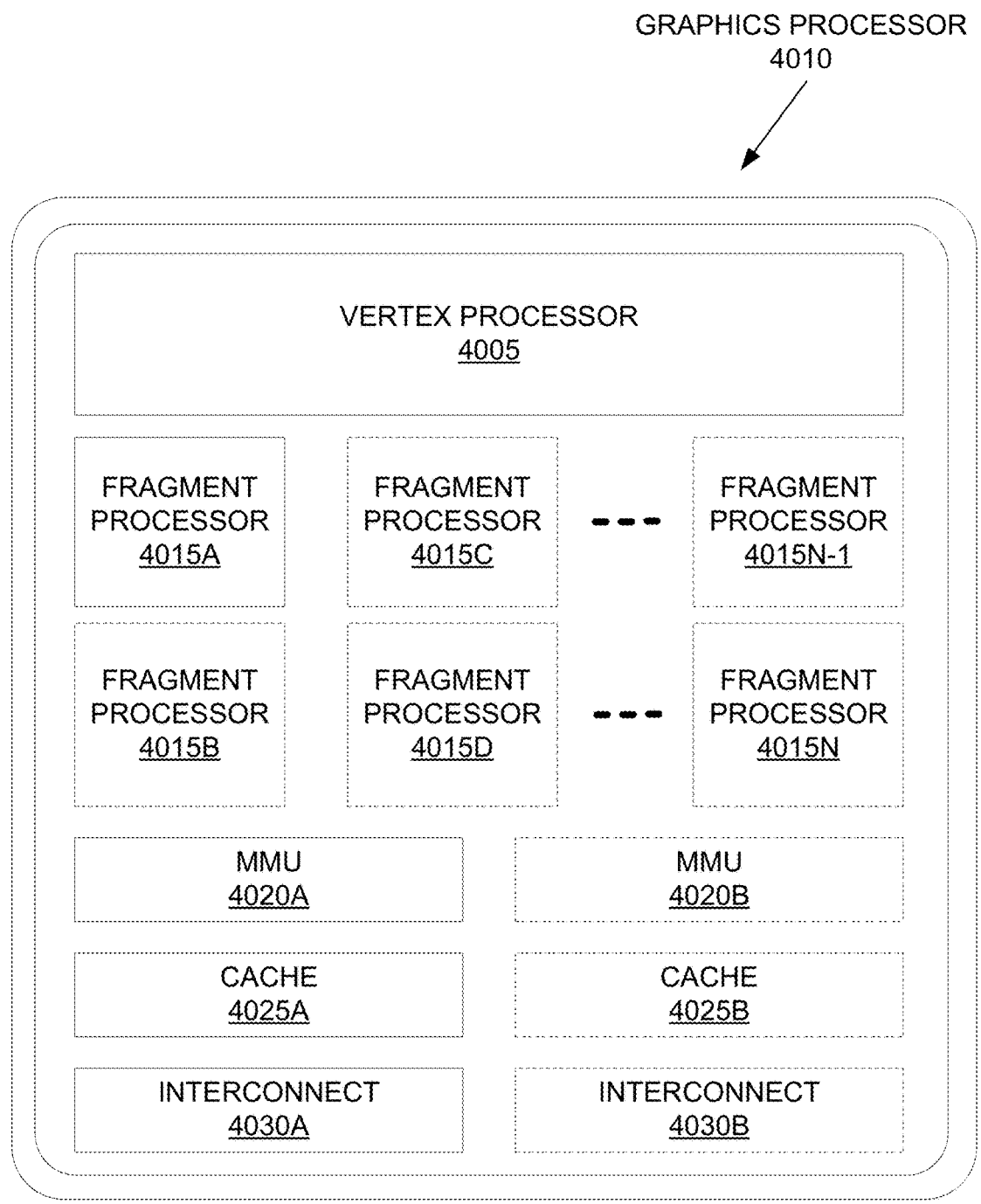
FIGS. 40A-40B illustrate exemplary graphics processors, in accordance with at least one embodiment.
Figure 40B:
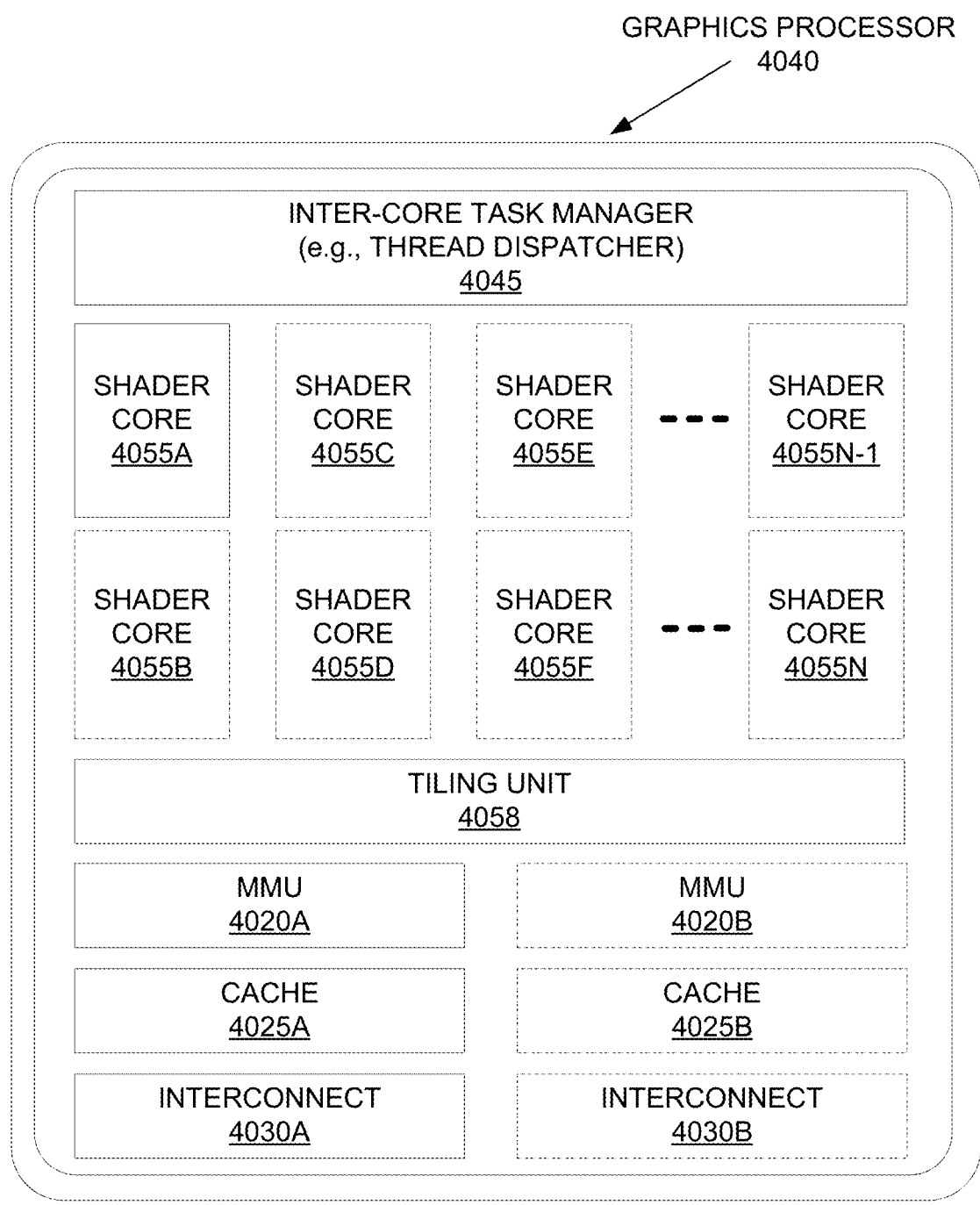

FIGS. 40A-40B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 40A illustrates an exemplary graphics processor 4010 of an SoC integrated circuit that may be fabricated using one or more IP cores, in accordance with at least one embodiment. FIG. 40B illustrates an additional exemplary graphics processor 4040 of an SoC integrated circuit that may be fabricated using one or more IP cores, in accordance with at least one embodiment. In at least one embodiment, graphics processor 4010 of FIG. 40A is a low power graphics processor core. In at least one embodiment, graphics processor 4040 of FIG. 40B is a higher performance graphics processor core. In at least one embodiment, each of graphics processors 4010, 4040 can be variants of graphics processor 1610 of FIG. 16.

In at least one embodiment, graphics processor 4010 includes a vertex processor 4005 and one or more fragment processor(s) 4015A-4015N (e.g., 4015A, 4015B, 4015C, 4015D, through 4015N-1, and 4015N). In at least one embodiment, graphics processor 4010 can execute different shader programs via separate logic, such that vertex processor 4005 is optimized to execute operations for vertex shader programs, while one or more fragment processor(s) 4015A-4015N execute fragment (e.g., pixel) shading operations for fragment or pixel shader programs. In at least one embodiment, vertex processor 4005 performs a vertex processing stage of a 3D graphics pipeline and generates primitives and vertex data. In at least one embodiment, fragment processor(s) 4015A-4015N use primitive and vertex data generated by vertex processor 4005 to produce a framebuffer that is displayed on a display device. In at least one embodiment, fragment processor(s) 4015A-4015N are optimized to execute fragment shader programs as provided for in an OpenGL API, which may be used to perform similar operations as a pixel shader program as provided for in a Direct 3D API.

In at least one embodiment, graphics processor 4010 additionally includes one or more MMU(s) 4020A-4020B, cache(s) 4025A-4025B, and circuit interconnect(s) 4030A-4030B. In at least one embodiment, one or more MMU(s) 4020A-4020B provide for virtual to physical address mapping for graphics processor 4010, including for vertex processor 4005 and/or fragment processor(s) 4015A-4015N, which may reference vertex or image/texture data stored in memory, in addition to vertex or image/texture data stored in one or more cache(s) 4025A-4025B. In at least one embodiment, one or more MMU(s) 4020A-4020B may be synchronized with other MMUs within a system, including one or more MMUs associated with one or more application processor(s) 1605, image processors 1615, and/or video processors 1620 of FIG. 16, such that each processor 1605-1620 can participate in a shared or unified virtual memory system. In at least one embodiment, one or more circuit interconnect(s) 4030A-4030B enable graphics processor 4010 to interface with other IP cores within an SoC, either via an internal bus of an SoC or via a direct connection.

In at least one embodiment, graphics processor 4040 includes one or more MMU(s) 4020A-4020B, caches 4025A-4025B, and circuit interconnects 4030A-4030B of graphics processor 4010 of FIG. 40A. In at least one embodiment, graphics processor 4040 includes one or more shader core(s) 4055A-4055N (e.g., 4055A, 4055B, 4055C, 4055D, 4055E, 4055F, through 4055N-1, and 4055N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 4040 includes an inter-core task manager 4045, which acts as a thread dispatcher to dispatch execution threads to one or more shader cores 4055A-4055N and a tiling unit 4058 to accelerate tiling operations for tile-based rendering, in which rendering operations for a scene are subdivided in image space, for example to exploit local spatial coherence within a scene or to optimize use of internal caches.

In at least one embodiment, the sender device 102 and/or the receiver device 104 may each include graphics processor 4010 and/or graphics processor 4040. In at least one embodiment, one or more of the Tx host computers 524, 526, and 528 and/or the Rx host computer 540 may each include graphics processor 4010 and/or graphics processor 4040. In at least one embodiment, the O-DU 812 and/or the O-RU 814 may each include graphics processor 4010 and/or graphics processor 4040.

Figure 41A:
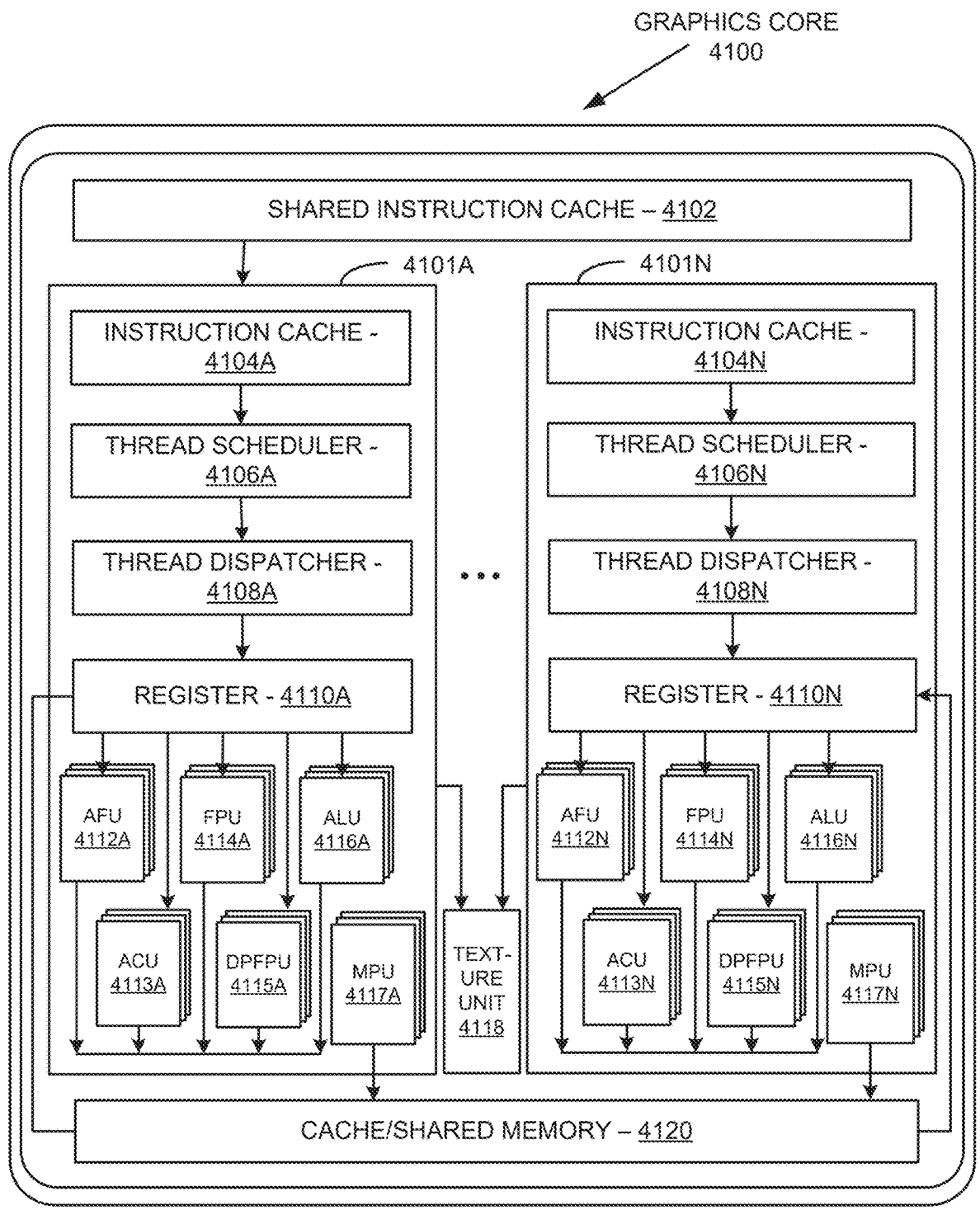
FIG. 41A illustrates a graphics core, in accordance with at least one embodiment.

FIG. 41A illustrates a graphics core 4100, in accordance with at least one embodiment. In at least one embodiment, graphics core 4100 may be included within graphics processor 3510 of FIG. 35. In at least one embodiment, graphics core 4100 may be a unified shader core 4055A-4055N as in FIG. 40B. In at least one embodiment, graphics core 4100 includes a shared instruction cache 4102, a texture unit 4118, and a cache/shared memory 4120 that are common to execution resources within graphics core 4100. In at least one embodiment, graphics core 4100 can include multiple slices 4101A-4101N or partition for each core, and a graphics processor can include multiple instances of graphics core 4100. Slices 4101A-4101N can include support logic including a local instruction cache 4104A-4104N, a thread scheduler 4106A-4106N, a thread dispatcher 4108A-4108N, and a set of registers 4110A-4110N. In at least one embodiment, slices 4101A-4101N can include a set of additional function units ("AFUs") 4112A-4112N, floating-point units ("FPUs") 4114A-4114N, integer arithmetic logic units ("ALUs") 4116-4116N, address computational units ("ACUs") 4113A-4113N, double-precision floating-point units ("DPFPUs") 4115A-4115N, and matrix processing units ("MPUs") 4117A-4117N.

In at least one embodiment, FPUs 4114A-4114N can perform single-precision (32-bit) and half-precision (16-bit) floating point operations, while DPFPUs 4115A-4115N perform double precision (64-bit) floating point operations. In at least one embodiment, ALUs 4116A-4116N can perform variable precision integer operations at 8-bit, 16-bit, and 32-bit precision, and can be configured for mixed precision operations. In at least one embodiment, MPUs 4117A-4117N can also be configured for mixed precision matrix operations, including half-precision floating point and 8-bit integer operations. In at least one embodiment, MPUs 4117-4117N can perform a variety of matrix operations to accelerate CUDA programs, including enabling support for accelerated general matrix to matrix multiplication ("GEMM"). In at least one embodiment, AFUs 4112A-4112N can perform additional logic operations not supported by floating-point or integer units, including trigonometric operations (e.g., Sine, Cosine, etc.).

Figure 41B:
FIG. 41B illustrates a GPGPU, in accordance with at least one embodiment.

FIG. 41B illustrates a general-purpose graphics processing unit ("GPGPU") 4130, in accordance with at least one embodiment. In at least one embodiment, GPGPU 4130 is highly-parallel and suitable for deployment on a multi-chip module. In at least one embodiment, GPGPU 4130 can be configured to enable highly-parallel compute operations to be performed by an array of GPUs. In at least one embodiment, GPGPU 4130 can be linked directly to other instances of GPGPU 4130 to create a multi-GPU cluster to improve execution time for CUDA programs. In at least one embodiment, GPGPU 4130 includes a host interface 4132 to enable a connection with a host processor. In at least one embodiment, host interface 4132 is a PCIe interface. In at least one embodiment, host interface 4132 can be a vendor specific communications interface or communications fabric. In at least one embodiment, GPGPU 4130 receives commands from a host processor and uses a global scheduler 4134 to distribute execution threads associated with those commands to a set of compute clusters 4136A-4136H. In at least one embodiment, compute clusters 4136A-4136H share a cache memory 4138. In at least one embodiment, cache memory 4138 can serve as a higher-level cache for cache memories within compute clusters 4136A-4136H.

In at least one embodiment, GPGPU 4130 includes memory 4144A-4144B coupled with compute clusters 4136A-4136H via a set of memory controllers 4142A-4142B. In at least one embodiment, memory 4144A-4144B can include various types of memory devices including DRAM or graphics random access memory, such as synchronous graphics random access memory ("SGRAM"), including graphics double data rate ("GDDR") memory.

In at least one embodiment, compute clusters 4136A-4136H each include a set of graphics cores, such as graphics core 4100 of FIG. 41A, which can include multiple types of integer and floating point logic units that can perform computational operations at a range of precisions including suited for computations associated with CUDA programs. For example, in at least one embodiment, at least a subset of floating point units in each of compute clusters 4136A-4136H can be configured to perform 16-bit or 32-bit floating point operations, while a different subset of floating point units can be configured to perform 64-bit floating point operations.

In at least one embodiment, multiple instances of GPGPU 4130 can be configured to operate as a compute cluster. In at least one embodiment, compute clusters 4136A-4136H may implement any technically feasible communication techniques for synchronization and data exchange. In at least one embodiment, multiple instances of GPGPU 4130 communicate over host interface 4132. In at least one embodiment, GPGPU 4130 includes an I/O hub 4139 that couples GPGPU 4130 with a GPU link 4140 that enables a direct connection to other instances of GPGPU 4130. In at least one embodiment, GPU link 4140 is coupled to a dedicated GPU-to-GPU bridge that enables communication and synchronization between multiple instances of GPGPU 4130. In at least one embodiment GPU link 4140 couples with a high speed interconnect to transmit and receive data to other GPGPUs 4130 or parallel processors. In at least one embodiment, multiple instances of GPGPU 4130 are located in separate data processing systems and communicate via a network device that is accessible via host interface 4132. In at least one embodiment GPU link 4140 can be configured to enable a connection to a host processor in addition to or as an alternative to host interface 4132. In at least one embodiment, GPGPU 4130 can be configured to execute a CUDA program.

In at least one embodiment, the sender device 102 and/or the receiver device 104 may each include graphics core 4100 and/or GPGPUs 4130. In at least one embodiment, one or more of the Tx host computers 524, 526, and 528 and/or the Rx host computer 540 may each include graphics core 4100 and/or GPGPUs 4130. In at least one embodiment, the O-DU 812 and/or the O-RU 814 may each include graphics core 4100 and/or GPGPUs 4130.

Figure 42A:
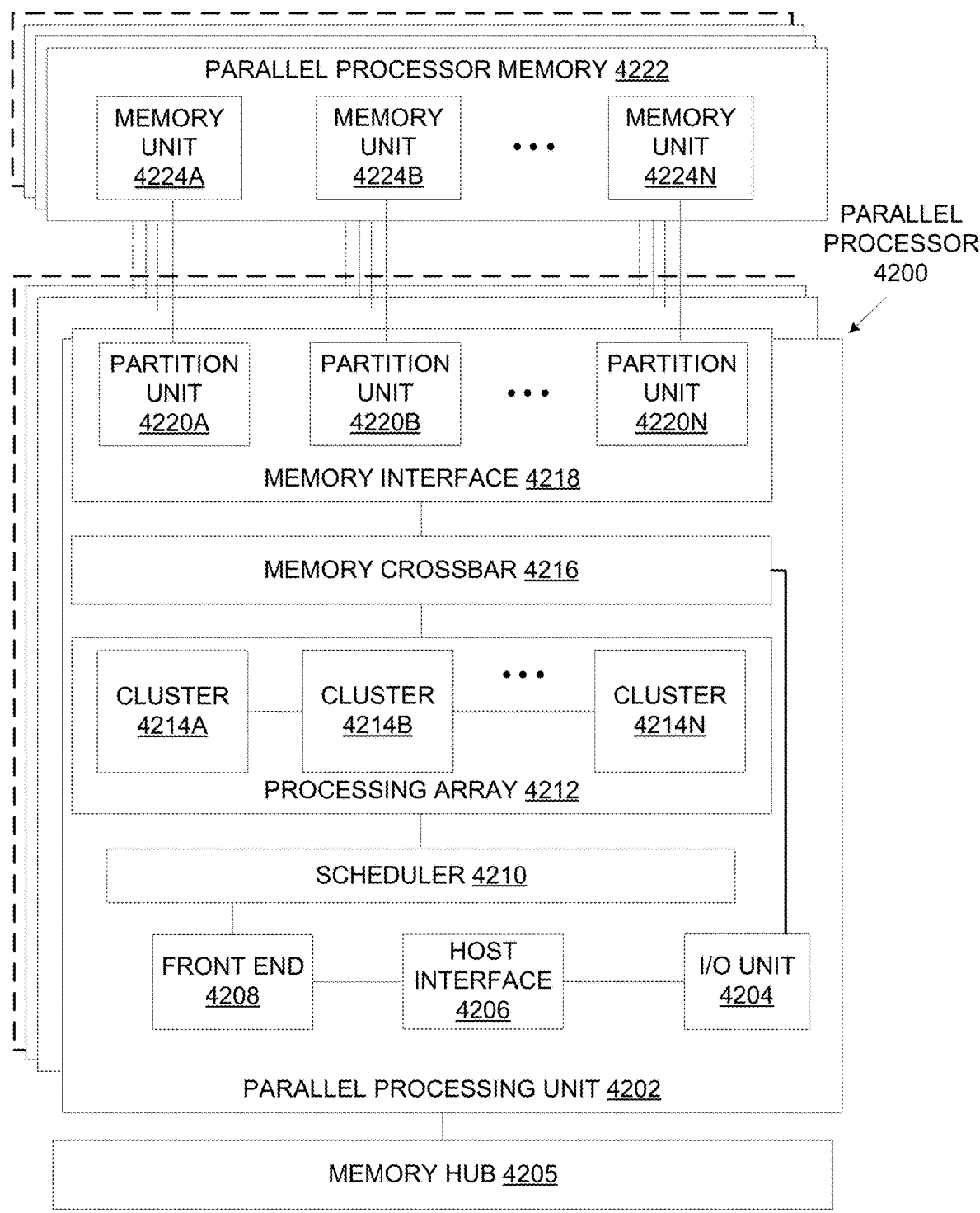
FIG. 42A illustrates a parallel processor, in accordance with at least one embodiment.

FIG. 42A illustrates a parallel processor 4200, in accordance with at least one embodiment. In at least one embodiment, various components of parallel processor 4200 may be implemented using one or more integrated circuit devices, such as programmable processors, application specific integrated circuits ("ASICs"), or FPGAs.

In at least one embodiment, parallel processor 4200 includes a parallel processing unit 4202. In at least one embodiment, parallel processing unit 4202 includes an I/O unit 4204 that enables communication with other devices, including other instances of parallel processing unit 4202. In at least one embodiment, I/O unit 4204 may be directly connected to other devices. In at least one embodiment, I/O unit 4204 connects with other devices via use of a hub or switch interface, such as memory hub 1705. In at least one embodiment, connections between memory hub 1705 and I/O unit 4204 form a communication link. In at least one embodiment, I/O unit 4204 connects with a host interface 4206 and a memory crossbar 4216, where host interface 4206 receives commands directed to performing processing operations and memory crossbar 4216 receives commands directed to performing memory operations.

In at least one embodiment, when host interface 4206 receives a command buffer via I/O unit 4204, host interface 4206 can direct work operations to perform those commands to a front end 4208. In at least one embodiment, front end 4208 couples with a scheduler 4210, which is configured to distribute commands or other work items to a processing array 4212. In at least one embodiment, scheduler 4210 ensures that processing array 4212 is properly configured and in a valid state before tasks are distributed to processing array 4212. In at least one embodiment, scheduler 4210 is implemented via firmware logic executing on a microcontroller. In at least one embodiment, microcontroller implemented scheduler 4210 is configurable to perform complex scheduling and work distribution operations at coarse and fine granularity, enabling rapid preemption and context switching of threads executing on processing array 4212. In at least one embodiment, host software can prove workloads for scheduling on processing array 4212 via one of multiple graphics processing doorbells. In at least one embodiment, workloads can then be automatically distributed across processing array 4212 by scheduler 4210 logic within a microcontroller including scheduler 4210.

In at least one embodiment, processing array 4212 can include up to "N" clusters (e.g., cluster 4214A, cluster 4214B, through cluster 4214N). In at least one embodiment, each cluster 4214A-4214N of processing array 4212 can execute a large number of concurrent threads. In at least one embodiment, scheduler 4210 can allocate work to clusters 4214A-4214N of processing array 4212 using various scheduling and/or work distribution algorithms, which may vary depending on a workload arising for each type of program or computation. In at least one embodiment, scheduling can be handled dynamically by scheduler 4210, or can be assisted in part by compiler logic during compilation of program logic configured for execution by processing array 4212. In at least one embodiment, different clusters 4214A-4214N of processing array 4212 can be allocated for processing different types of programs or for performing different types of computations.

In at least one embodiment, processing array 4212 can be configured to perform various types of parallel processing operations. In at least one embodiment, processing array 4212 is configured to perform general-purpose parallel compute operations. For example, in at least one embodiment, processing array 4212 can include logic to execute processing tasks including filtering of video and/or audio data, performing modeling operations, including physics operations, and performing data transformations.

In at least one embodiment, processing array 4212 is configured to perform parallel graphics processing operations. In at least one embodiment, processing array 4212 can include additional logic to support execution of such graphics processing operations, including, but not limited to texture sampling logic to perform texture operations, as well as tessellation logic and other vertex processing logic. In at least one embodiment, processing array 4212 can be configured to execute graphics processing related shader programs such as, but not limited to vertex shaders, tessellation shaders, geometry shaders, and pixel shaders. In at least one embodiment, parallel processing unit 4202 can transfer data from system memory via I/O unit 4204 for processing. In at least one embodiment, during processing, transferred data can be stored to on-chip memory (e.g., a parallel processor memory 4222) during processing, then written back to system memory.

In at least one embodiment, when parallel processing unit 4202 is used to perform graphics processing, scheduler 4210 can be configured to divide a processing workload into approximately equal sized tasks, to better enable distribution of graphics processing operations to multiple clusters 4214A-4214N of processing array 4212. In at least one embodiment, portions of processing array 4212 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 4214A-4214N may be stored in buffers to allow intermediate data to be transmitted between clusters 4214A-4214N for further processing.

In at least one embodiment, processing array 4212 can receive processing tasks to be executed via scheduler 4210, which receives commands defining processing tasks from front end 4208. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 4210 may be configured to fetch indices corresponding to tasks or may receive indices from front end 4208. In at least one embodiment, front end 4208 can be configured to ensure processing array 4212 is configured to a valid state before a workload specified by incoming command buffers batch-buffers, push buffers, etc.) is initiated.

In at least one embodiment, each of one or more instances of parallel processing unit 4202 can couple with parallel processor memory 4222. In at least one embodiment, parallel processor memory 4222 can be accessed via memory crossbar 4216, which can receive memory requests from processing array 4212 as well as I/O unit 4204. In at least one embodiment, memory crossbar 4216 can access parallel processor memory 4222 via a memory interface 4218. In at least one embodiment, memory interface 4218 can include multiple partition units (e.g., a partition unit 4220A, partition unit 4220B, through partition unit 4220N) that can each couple to a portion (e.g., memory unit) of parallel processor memory 4222. In at least one embodiment, a number of partition units 4220A-4220N is configured to be equal to a number of memory units, such that a first partition unit 4220A has a corresponding first memory unit 4224A, a second partition unit 4220B has a corresponding memory unit 4224B, and an Nth partition unit 4220N has a corresponding Nth memory unit 4224N. In at least one embodiment, a number of partition units 4220A-4220N may not be equal to a number of memory devices.

In at least one embodiment, memory units 4224A-4224N can include various types of memory devices, including DRAM or graphics random access memory, such as SGRAM, including GDDR memory. In at least one embodiment, memory units 4224A-4224N may also include 3D stacked memory, including but not limited to high bandwidth memory ("HBM"). In at least one embodiment, render targets, such as frame buffers or texture maps may be stored across memory units 4224A-4224N, allowing partition units 4220A-4220N to write portions of each render target in parallel to efficiently use available bandwidth of parallel processor memory 4222. In at least one embodiment, a local instance of parallel processor memory 4222 may be excluded in favor of a unified memory design that utilizes system memory in conjunction with local cache memory.

In at least one embodiment, any one of clusters 4214A-4214N of processing array 4212 can process data that will be written to any of memory units 4224A-4224N within parallel processor memory 4222. In at least one embodiment, memory crossbar 4216 can be configured to transfer an output of each cluster 4214A-4214N to any partition unit 4220A-4220N or to another cluster 4214A-4214N, which can perform additional processing operations on an output. In at least one embodiment, each cluster 4214A-4214N can communicate with memory interface 4218 through memory crossbar 4216 to read from or write to various external memory devices. In at least one embodiment, memory crossbar 4216 has a connection to memory interface 4218 to communicate with I/O unit 4204, as well as a connection to a local instance of parallel processor memory 4222, enabling processing units within different clusters 4214A-4214N to communicate with system memory or other memory that is not local to parallel processing unit 4202. In at least one embodiment, memory crossbar 4216 can use virtual channels to separate traffic streams between clusters 4214A-4214N and partition units 4220A-4220N.

In at least one embodiment, multiple instances of parallel processing unit 4202 can be provided on a single add-in card, or multiple add-in cards can be interconnected. In at least one embodiment, different instances of parallel processing unit 4202 can be configured to interoperate even if different instances have different numbers of processing cores, different amounts of local parallel processor memory, and/or other configuration differences. For example, in at least one embodiment, some instances of parallel processing unit 4202 can include higher precision floating point units relative to other instances. In at least one embodiment, systems incorporating one or more instances of parallel processing unit 4202 or parallel processor 4200 can be implemented in a variety of configurations and form factors, including but not limited to desktop, laptop, or handheld personal computers, servers, workstations, game consoles, and/or embedded systems.

In at least one embodiment, the sender processor 114 and/or the receiver processor 126 may each be implemented as parallel processor 4200. In such embodiments, the sender memory 116 and/or the receiver memory 128 may each be implemented using any memory illustrated in FIG. 42A and/or described with respect to FIG. 42A.

Figure 42B:
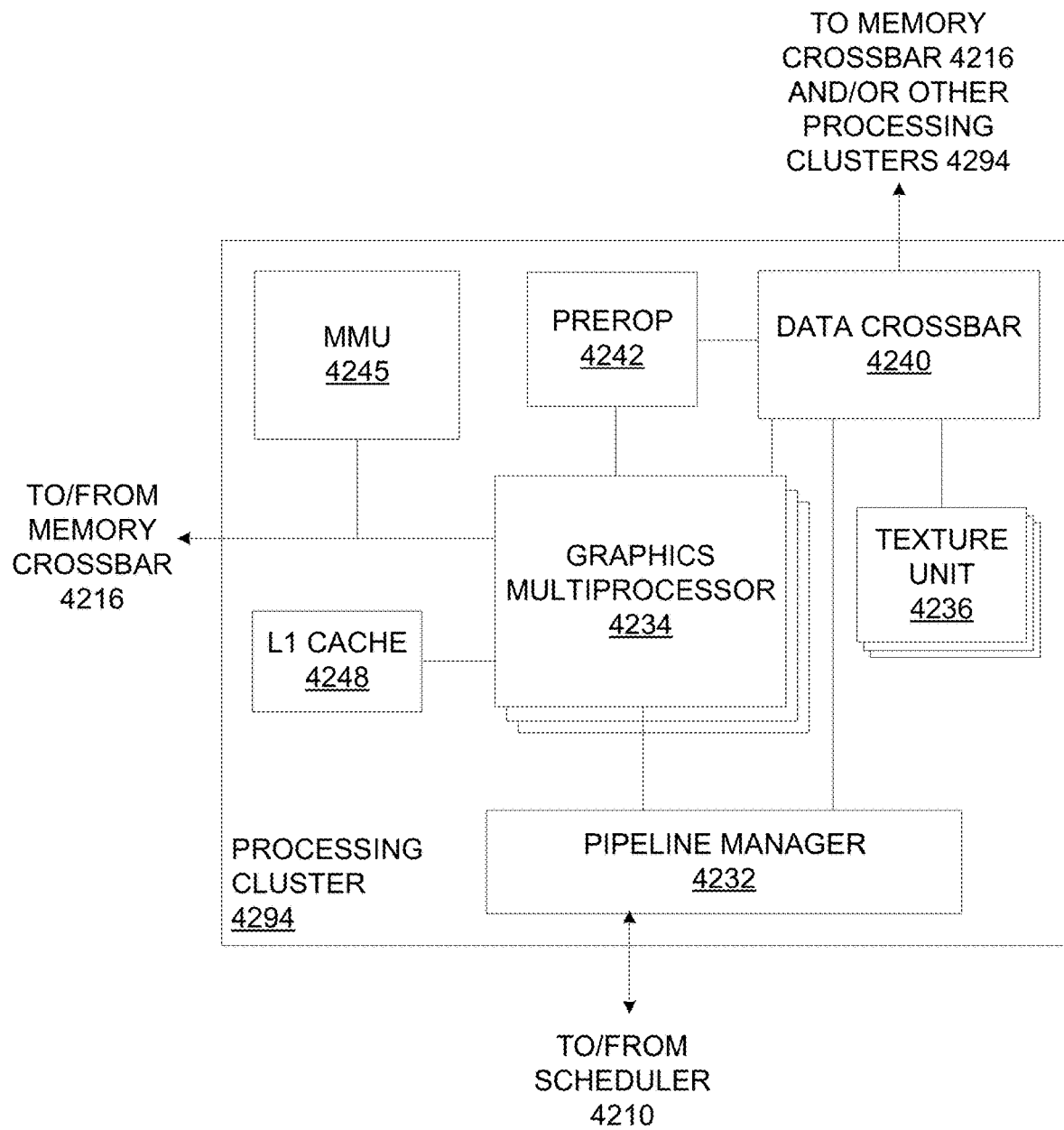
FIG. 42B illustrates a processing cluster, in accordance with at least one embodiment.

FIG. 42B illustrates a processing cluster 4294, in accordance with at least one embodiment. In at least one embodiment, processing cluster 4294 is included within a parallel processing unit. In at least one embodiment, processing cluster 4294 is one of processing clusters 4214A-4214N of FIG. 42. In at least one embodiment, processing cluster 4294 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 4294.

In at least one embodiment, operation of processing cluster 4294 can be controlled via a pipeline manager 4232 that distributes processing tasks to SIMT parallel processors. In at least one embodiment, pipeline manager 4232 receives instructions from scheduler 4210 of FIG. 42 and manages execution of those instructions via a graphics multiprocessor 4234 and/or a texture unit 4236. In at least one embodiment, graphics multiprocessor 4234 is an exemplary instance of a SIMT parallel processor. However, in at least one embodiment, various types of SIMT parallel processors of differing architectures may be included within processing cluster 4294. In at least one embodiment, one or more instances of graphics multiprocessor 4234 can be included within processing cluster 4294. In at least one embodiment, graphics multiprocessor 4234 can process data and a data crossbar 4240 can be used to distribute processed data to one of multiple possible destinations, including other shader units. In at least one embodiment, pipeline manager 4232 can facilitate distribution of processed data by specifying destinations for processed data to be distributed via data crossbar 4240.

In at least one embodiment, each graphics multiprocessor 4234 within processing cluster 4294 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 4294 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 4234. In at least one embodiment, a thread group may include fewer threads than a number of processing engines within graphics multiprocessor 4234. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 4234. In at least one embodiment, when a thread group includes more threads than a number of processing engines within graphics multiprocessor 4234, processing can be performed over consecutive clock cycles. In at least one embodiment, multiple thread groups can be executed concurrently on graphics multiprocessor 4234.

In at least one embodiment, graphics multiprocessor 4234 includes an internal cache memory to perform load and store operations. In at least one embodiment, graphics multiprocessor 4234 can forego an internal cache and use a cache memory L1 cache 4248) within processing cluster 4294. In at least one embodiment, each graphics multiprocessor 4234 also has access to Level 2 ("L2") caches within partition units (e.g., partition units 4220A-4220N of FIG. 42A) that are shared among all processing clusters 4294 and may be used to transfer data between threads. In at least one embodiment, graphics multiprocessor 4234 may also access off-chip global memory, which can include one or more of local parallel processor memory and/or system memory. In at least one embodiment, any memory external to parallel processing unit 4202 may be used as global memory. In at least one embodiment, processing cluster 4294 includes multiple instances of graphics multiprocessor 4234 that can share common instructions and data, which may be stored in L1 cache 4248.

In at least one embodiment, each processing cluster 4294 may include an MMU 4245 that is configured to map virtual addresses into physical addresses. In at least one embodiment, one or more instances of MMU 4245 may reside within memory interface 4218 of FIG. 42. In at least one embodiment, MMU 4245 includes a set of page table entries ("PTEs") used to map a virtual address to a physical address of a tile and optionally a cache line index. In at least one embodiment, MMU 4245 may include address translation lookaside buffers ("TLBs") or caches that may reside within graphics multiprocessor 4234 or L1 cache 4248 or processing cluster 4294. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 4294 may be configured such that each graphics multiprocessor 4234 is coupled to a texture unit 4236 for performing texture mapping operations, e.g., determining texture sample positions, reading texture data, and filtering texture data. In at least one embodiment, texture data is read from an internal texture L1 cache (not shown) or from an L1 cache within graphics multiprocessor 4234 and is fetched from an L2 cache, local parallel processor memory, or system memory, as needed. In at least one embodiment, each graphics multiprocessor 4234 outputs a processed task to data crossbar 4240 to provide a processed task to another processing cluster 4294 for further processing or to store a processed task in an L2 cache, a local parallel processor memory, or a system memory via memory crossbar 4216. In at least one embodiment, a pre-raster operations unit ("preROP") 4242 is configured to receive data from graphics multiprocessor 4234, direct data to ROP units, which may be located with partition units as described herein (e.g., partition units 4220A-4220N of FIG. 42). In at least one embodiment, PreROP 4242 can perform optimizations for color blending, organize pixel color data, and perform address translations.

In at least one embodiment, the sender processor 114 and/or the receiver processor 126 may each be implemented as processing cluster 4294. In such embodiments, the sender memory 116 and/or the receiver memory 128 may each be implemented using any memory illustrated in FIG. 42B and/or described with respect to FIG. 42B.

Figure 42C:
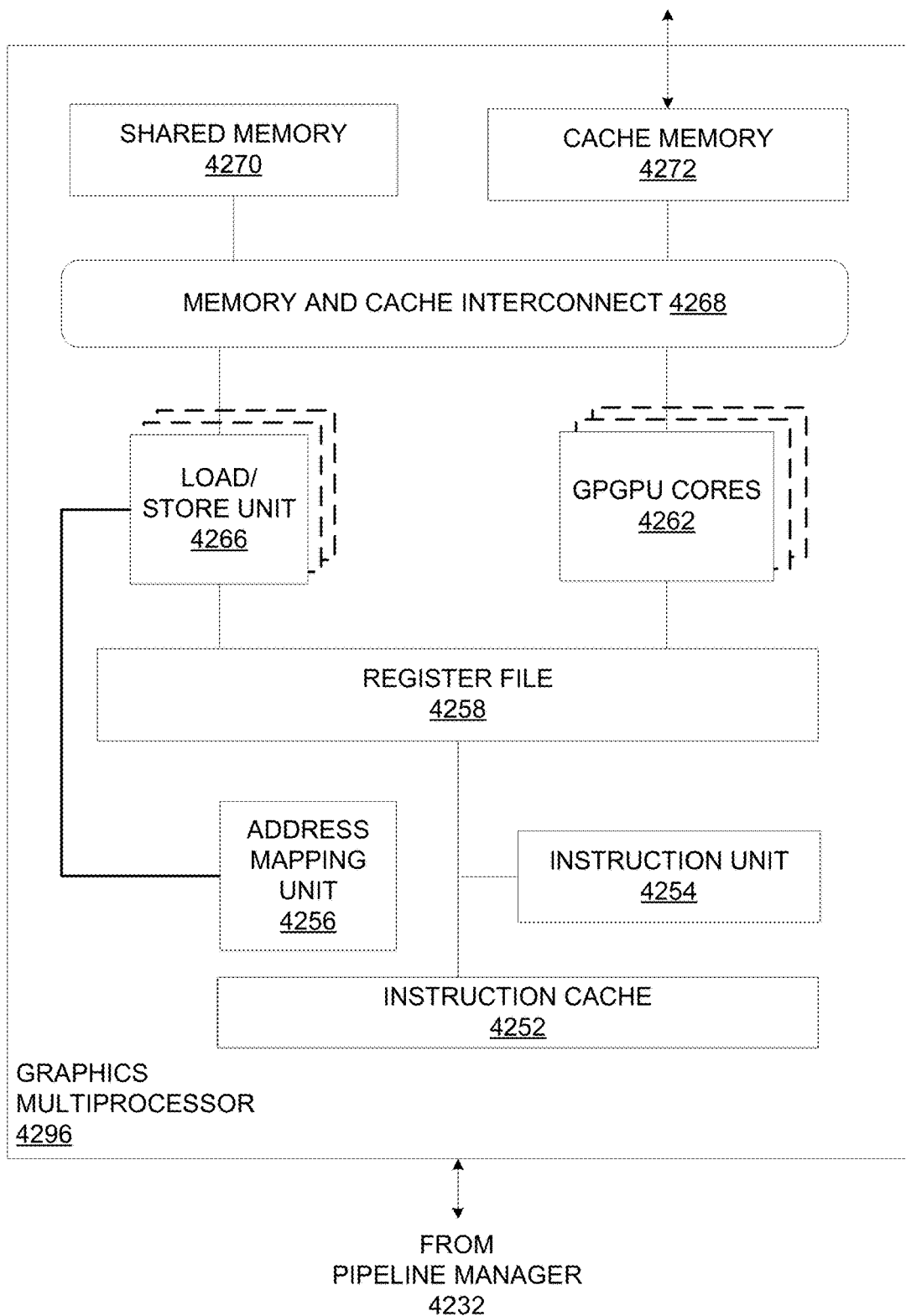
FIG. 42C illustrates a graphics multiprocessor, in accordance with at least one embodiment.

FIG. 42C illustrates a graphics multiprocessor 4296, in accordance with at least one embodiment. In at least one embodiment, graphics multiprocessor 4296 is graphics multiprocessor 4234 of FIG. 42B. In at least one embodiment, graphics multiprocessor 4296 couples with pipeline manager 4232 of processing cluster 4294. In at least one embodiment, graphics multiprocessor 4296 has an execution pipeline including but not limited to an instruction cache 4252, an instruction unit 4254, an address mapping unit 4256, a register file 4258, one or more GPGPU cores 4262, and one or more LSUs 4266. GPGPU cores 4262 and LSUs 4266 are coupled with cache memory 4272 and shared memory 4270 via a memory and cache interconnect 4268.

In at least one embodiment, instruction cache 4252 receives a stream of instructions to execute from pipeline manager 4232. In at least one embodiment, instructions are cached in instruction cache 4252 and dispatched for execution by instruction unit 4254. In at least one embodiment, instruction unit 4254 can dispatch instructions as thread groups (e.g., warps), with each thread of a thread group assigned to a different execution unit within GPGPU core 4262. In at least one embodiment, an instruction can access any of a local, shared, or global address space by specifying an address within a unified address space. In at least one embodiment, address mapping unit 4256 can be used to translate addresses in a unified address space into a distinct memory address that can be accessed by LSUs 4266.

In at least one embodiment, register file 4258 provides a set of registers for functional units of graphics multiprocessor 4296. In at least one embodiment, register file 4258 provides temporary storage for operands connected to data paths of functional units (e.g., GPGPU cores 4262, LSUs 4266) of graphics multiprocessor 4296. In at least one embodiment, register file 4258 is divided between each of functional units such that each functional unit is allocated a dedicated portion of register file 4258. In at least one embodiment, register file 4258 is divided between different thread groups being executed by graphics multiprocessor 4296.

In at least one embodiment, GPGPU cores 4262 can each include FPUs and/or integer ALUs that are used to execute instructions of graphics multiprocessor 4296. GPGPU cores 4262 can be similar in architecture or can differ in architecture. In at least one embodiment, a first portion of GPGPU cores 4262 include a single precision FPU and an integer ALU while a second portion of GPGPU cores 4262 include a double precision FPU. In at least one embodiment, FPUs can implement IEEE 754-2008 standard for floating point arithmetic or enable variable precision floating point arithmetic. In at least one embodiment, graphics multiprocessor 4296 can additionally include one or more fixed function or special function units to perform specific functions such as copy rectangle or pixel blending operations. In at least one embodiment one or more of GPGPU cores 4262 can also include fixed or special function logic.

In at least one embodiment, GPGPU cores 4262 include SIMD logic capable of performing a single instruction on multiple sets of data. In at least one embodiment GPGPU cores 4262 can physically execute SIMD4, SIMD8, and SIMD16 instructions and logically execute SIMD1, SIMD2, and SIMD32 instructions. In at least one embodiment, SIMD instructions for GPGPU cores 4262 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 4268 is an interconnect network that connects each functional unit of graphics multiprocessor 4296 to register file 4258 and to shared memory 4270. In at least one embodiment, memory and cache interconnect 4268 is a crossbar interconnect that allows LSU 4266 to implement load and store operations between shared memory 4270 and register file 4258. In at least one embodiment, register file 4258 can operate at a same frequency as GPGPU cores 4262, thus data transfer between GPGPU cores 4262 and register file 4258 is very low latency. In at least one embodiment, shared memory 4270 can be used to enable communication between threads that execute on functional units within graphics multiprocessor 4296. In at least one embodiment, cache memory 4272 can be used as a data cache for example, to cache texture data communicated between functional units and texture unit 4236. In at least one embodiment, shared memory 4270 can also be used as a program managed cached. In at least one embodiment, threads executing on GPGPU cores 4262 can programmatically store data within shared memory in addition to automatically cached data that is stored within cache memory 4272.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on a same package or chip as cores and communicatively coupled to cores over a processor bus/interconnect that is internal to a package or a chip. In at least one embodiment, regardless of a manner in which a GPU is connected, processor cores may allocate work to a GPU in a form of sequences of commands/instructions contained in a WD. In at least one embodiment, a GPU then uses dedicated circuitry/logic for efficiently processing these commands/instructions.

In at least one embodiment, the sender processor 114 and/or the receiver processor 126 may each be implemented as graphics multiprocessor 4296. In such embodiments, the sender memory 116 and/or the receiver memory 128 may each be implemented using any memory illustrated in FIG. 42C and/or described with respect to FIG. 42C.

General Computing

The following figures set forth, without limitation, exemplary software constructs within general computing that can be used to implement at least one embodiment.

Figure 43:
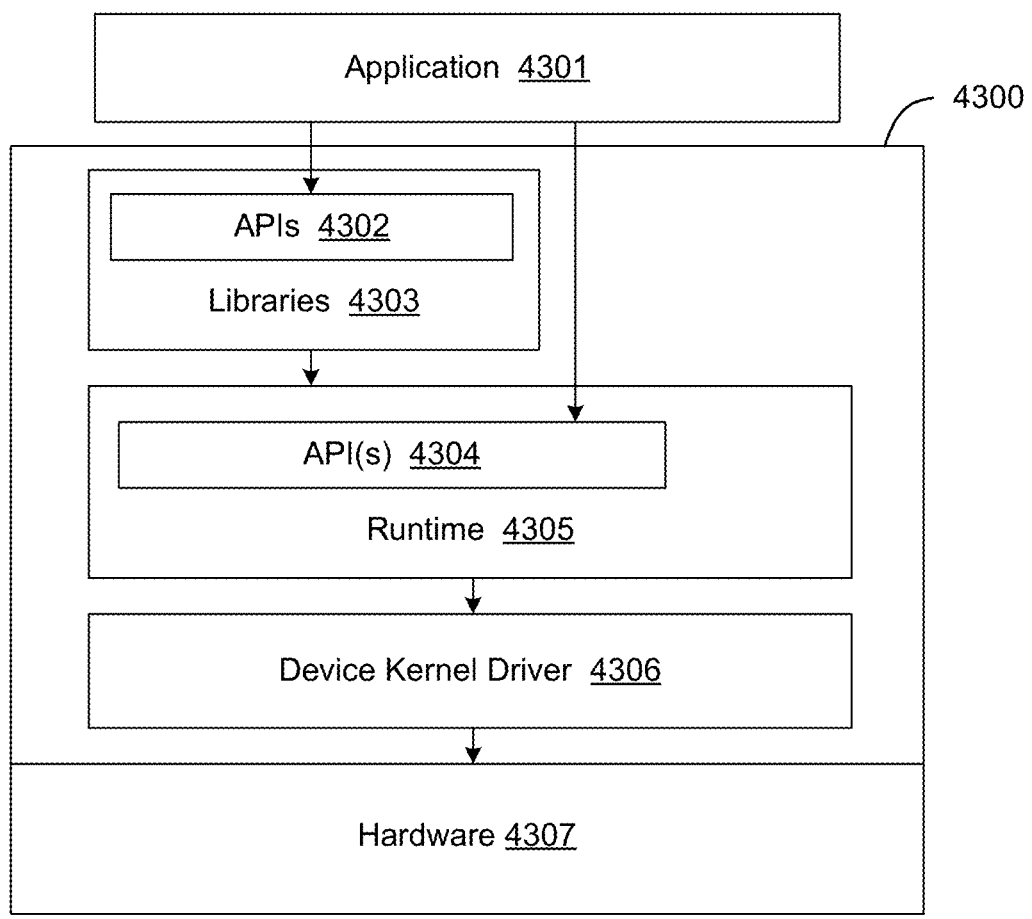
FIG. 43 illustrates a software stack of a programming platform, in accordance with at least one embodiment.

FIG. 43 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 4300 of a programming platform provides an execution environment for an application 4301. In at least one embodiment, application 4301 may include any computer software capable of being launched on software stack 4300. In at least one embodiment, application 4301 may include, but is not limited to, an artificial intelligence ("AI")/machine learning ("ML") application, a high performance computing ("HPC") application, a virtual desktop infrastructure ("VDI"), or a data center workload.

In at least one embodiment, application 4301 and software stack 4300 run on hardware 4307. Hardware 4307 may include one or more GPUs, CPUs, FPGAs, AI engines, and/or other types of compute devices that support a programming platform, in at least one embodiment. In at least one embodiment, such as with CUDA, software stack 4300 may be vendor specific and compatible with only devices from particular vendor(s). In at least one embodiment, such as in with OpenCL, software stack 4300 may be used with devices from different vendors. In at least one embodiment, hardware 4307 includes a host connected to one more devices that can be accessed to perform computational tasks via application programming interface ("API") calls. A device within hardware 4307 may include, but is not limited to, a GPU, FPGA, AI engine, or other compute device (but may also include a CPU) and its memory, as opposed to a host within hardware 4307 that may include, but is not limited to, a CPU (but may also include a compute device) and its memory, in at least one embodiment.

In at least one embodiment, software stack 4300 of a programming platform includes, without limitation, a number of libraries 4303, a runtime 4305, and a device kernel driver 4306. Each of libraries 4303 may include data and programming code that can be used by computer programs and leveraged during software development, in at least one embodiment. In at least one embodiment, libraries 4303 may include, but are not limited to, pre-written code and subroutines, classes, values, type specifications, configuration data, documentation, help data, and/or message templates. In at least one embodiment, libraries 4303 include functions that are optimized for execution on one or more types of devices. In at least one embodiment, libraries 4303 may include, but are not limited to, functions for performing mathematical, deep learning, and/or other types of operations on devices. In at least one embodiment, libraries 4403 are associated with corresponding APIs 4402, which may include one or more APIs, that expose functions implemented in libraries 4403.

In at least one embodiment, application 4301 is written as source code that is compiled into executable code, as discussed in greater detail below in conjunction with FIG. 48. Executable code of application 4301 may run, at least in part, on an execution environment provided by software stack 4300, in at least one embodiment. In at least one embodiment, during execution of application 4301, code may be reached that needs to run on a device, as opposed to a host. In such a case, runtime 4305 may be called to load and launch requisite code on a device, in at least one embodiment. In at least one embodiment, runtime 4305 may include any technically feasible runtime system that is able to support execution of application S01.

In at least one embodiment, runtime 4305 is implemented as one or more runtime libraries associated with corresponding APIs, which are shown as API(s) 4304. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 4304 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 4306 is configured to facilitate communication with an underlying device. In at least one embodiment, device kernel driver 4306 may provide low-level functionalities upon which APIs, such as API(s) 4304, and/or other software relies. In at least one embodiment, device kernel driver 4306 may be configured to compile intermediate representation ("IR") code into binary code at runtime. For CUDA, device kernel driver 4306 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 4306 to compile IR code at runtime.

Figure 44:
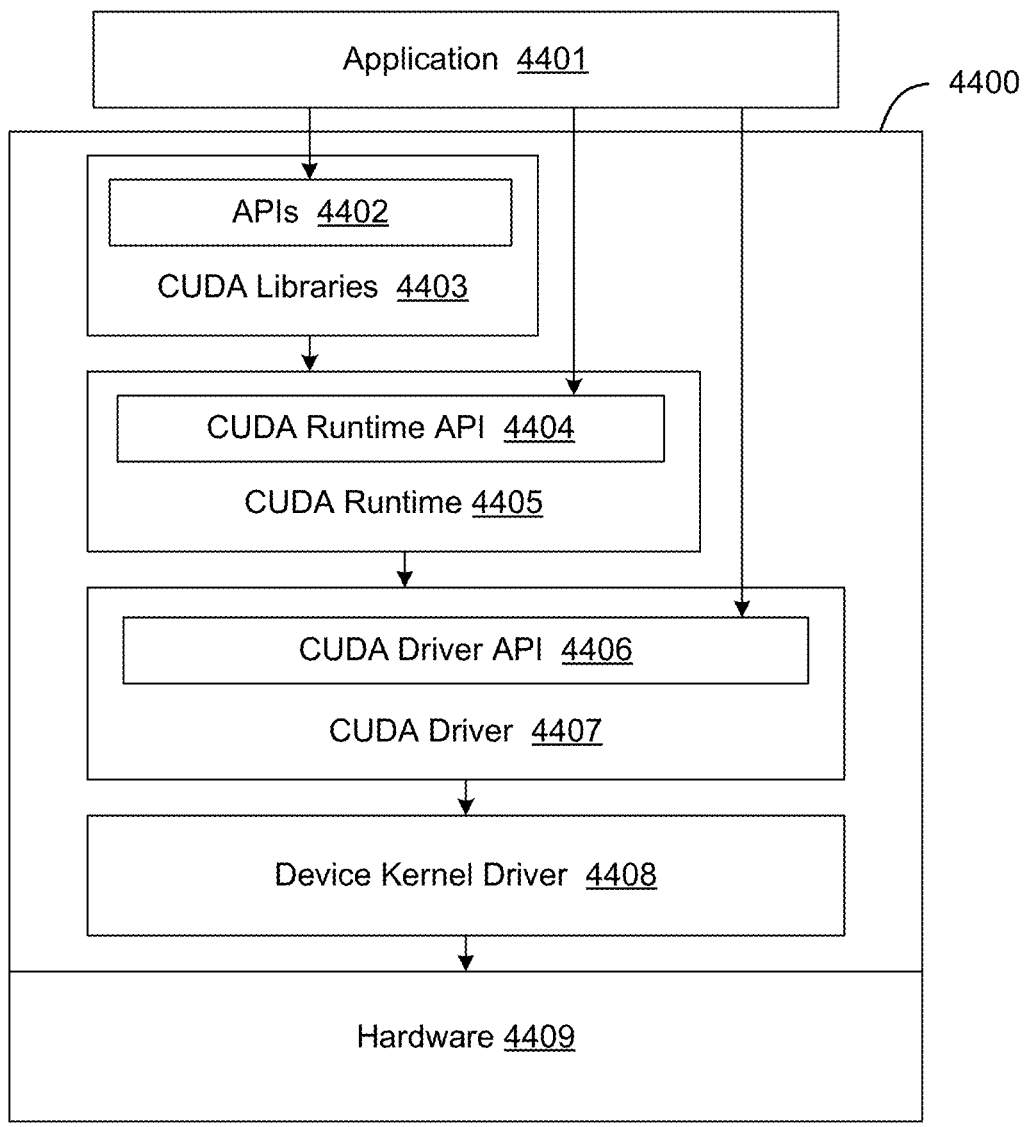
FIG. 44 illustrates a CUDA implementation of a software stack of FIG. 43, in accordance with at least one embodiment.

FIG. 44 illustrates a CUDA implementation of software stack 4300 of FIG. 43, in accordance with at least one embodiment. In at least one embodiment, a CUDA software stack 4400, on which an application 4401 may be launched, includes CUDA libraries 4403, a CUDA runtime 4405, a CUDA driver 4407, and a device kernel driver 4408. In at least one embodiment, CUDA software stack 4400 executes on hardware 4409, which may include a GPU that supports CUDA and is developed by NVIDIA Corporation of Santa Clara, CA.

In at least one embodiment, application 4401, CUDA runtime 4405, and device kernel driver 4408 may perform similar functionalities as application 4301, runtime 4305, and device kernel driver 4306, respectively, which are described above in conjunction with FIG. 43. In at least one embodiment, CUDA driver 4407 includes a library (libcuda.so) that implements a CUDA driver API 4406. Similar to a CUDA runtime API 4404 implemented by a CUDA runtime library (cudart), CUDA driver API 4406 may, without limitation, expose functions for memory management, execution control, device management, error handling, synchronization, and/or graphics interoperability, among other things, in at least one embodiment. In at least one embodiment, CUDA driver API 4406 differs from CUDA runtime API 4404 in that CUDA runtime API 4404 simplifies device code management by providing implicit initialization, context (analogous to a process) management, and module (analogous to dynamically loaded libraries) management. In contrast to high-level CUDA runtime API 4404, CUDA driver API 4406 is a low-level API providing more fine-grained control of a device, particularly with respect to contexts and module loading, in at least one embodiment. In at least one embodiment, CUDA driver API 4406 may expose functions for context management that are not exposed by CUDA runtime API 4404. In at least one embodiment, CUDA driver API 4406 is also language-independent and supports, e.g., OpenCL in addition to CUDA runtime API 4404. Further, in at least one embodiment, development libraries, including CUDA runtime 4405, may be considered as separate from driver components, including user-mode CUDA driver 4407 and kernel-mode device driver 4408 (also sometimes referred to as a "display" driver).

In at least one embodiment, CUDA libraries 4403 may include, but are not limited to, mathematical libraries, deep learning libraries, parallel algorithm libraries, and/or signal/image/video processing libraries, which parallel computing applications such as application 4401 may utilize. In at least one embodiment, CUDA libraries 4403 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 4403 may include deep learning libraries such as a cuDNN library of primitives for deep neural networks and a TensorRT platform for high-performance deep learning inference, among others.

Figure 45:
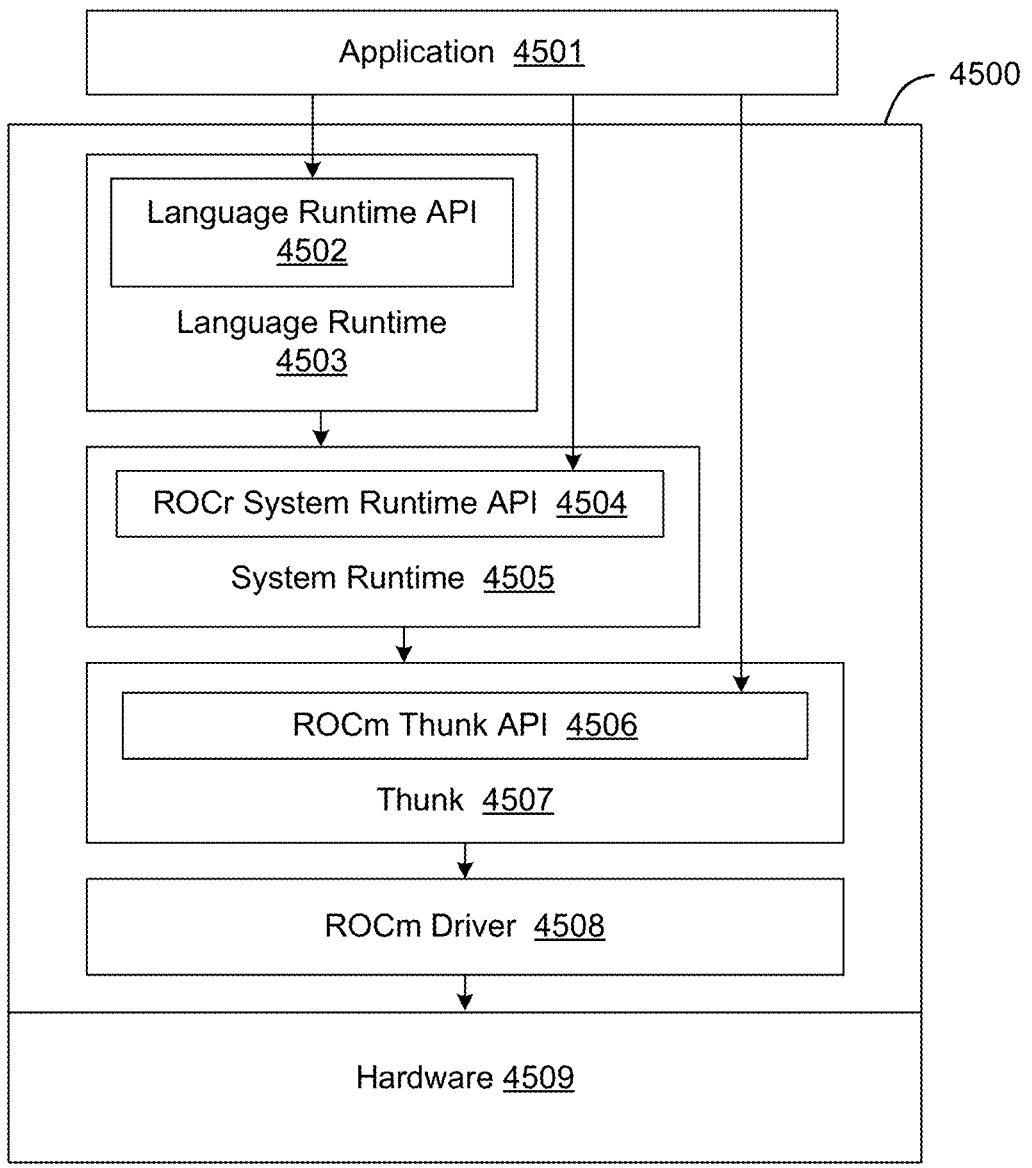
FIG. 45 illustrates a ROCm implementation of a software stack of FIG. 43, in accordance with at least one embodiment.

FIG. 45 illustrates a ROCm implementation of software stack 4300 of FIG. 43, in accordance with at least one embodiment. In at least one embodiment, a ROCm software stack 4500, on which an application 4501 may be launched, includes a language runtime 4503, a system runtime 4505, a thunk 4507, a ROCm kernel driver 4508, and a device kernel driver 4509. In at least one embodiment, ROCm software stack 4500 executes on hardware 4510, which may include a GPU that supports ROCm and is developed by AMD Corporation of Santa Clara, CA.

In at least one embodiment, application 4501 may perform similar functionalities as application 4301 discussed above in conjunction with FIG. 43. In addition, language runtime 4503 and system runtime 4505 may perform similar functionalities as runtime 4305 discussed above in conjunction with FIG. 43, in at least one embodiment. In at least one embodiment, language runtime 4503 and system runtime 4505 differ in that system runtime 4505 is a language-independent runtime that implements a ROCr system runtime API 4504 and makes use of a Heterogeneous System Architecture ("HAS") Runtime API. HAS runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 4505, language runtime 4503 is an implementation of a language-specific runtime API 4502 layered on top of ROCr system runtime API 4504, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 4404 discussed above in conjunction with FIG. 44, such as functions for memory management, execution control, device management, error handling, and synchronization, among other things.

In at least one embodiment, thunk (ROCt) 4507 is an interface that can be used to interact with underlying ROCm driver 4508. In at least one embodiment, ROCm driver 4508 is a ROCk driver, which is a combination of an AMDGPU driver and a HAS kernel driver (amdkfd). In at least one embodiment, AMDGPU driver is a device kernel driver for GPUs developed by AMD that performs similar functionalities as device kernel driver 4306 discussed above in conjunction with FIG. 43. In at least one embodiment, HAS kernel driver is a driver permitting different types of processors to share system resources more effectively via hardware features.

In at least one embodiment, various libraries (not shown) may be included in ROCm software stack 4500 above language runtime 4503 and provide functionality similarity to CUDA libraries 4403, discussed above in conjunction with FIG. 44. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 46:
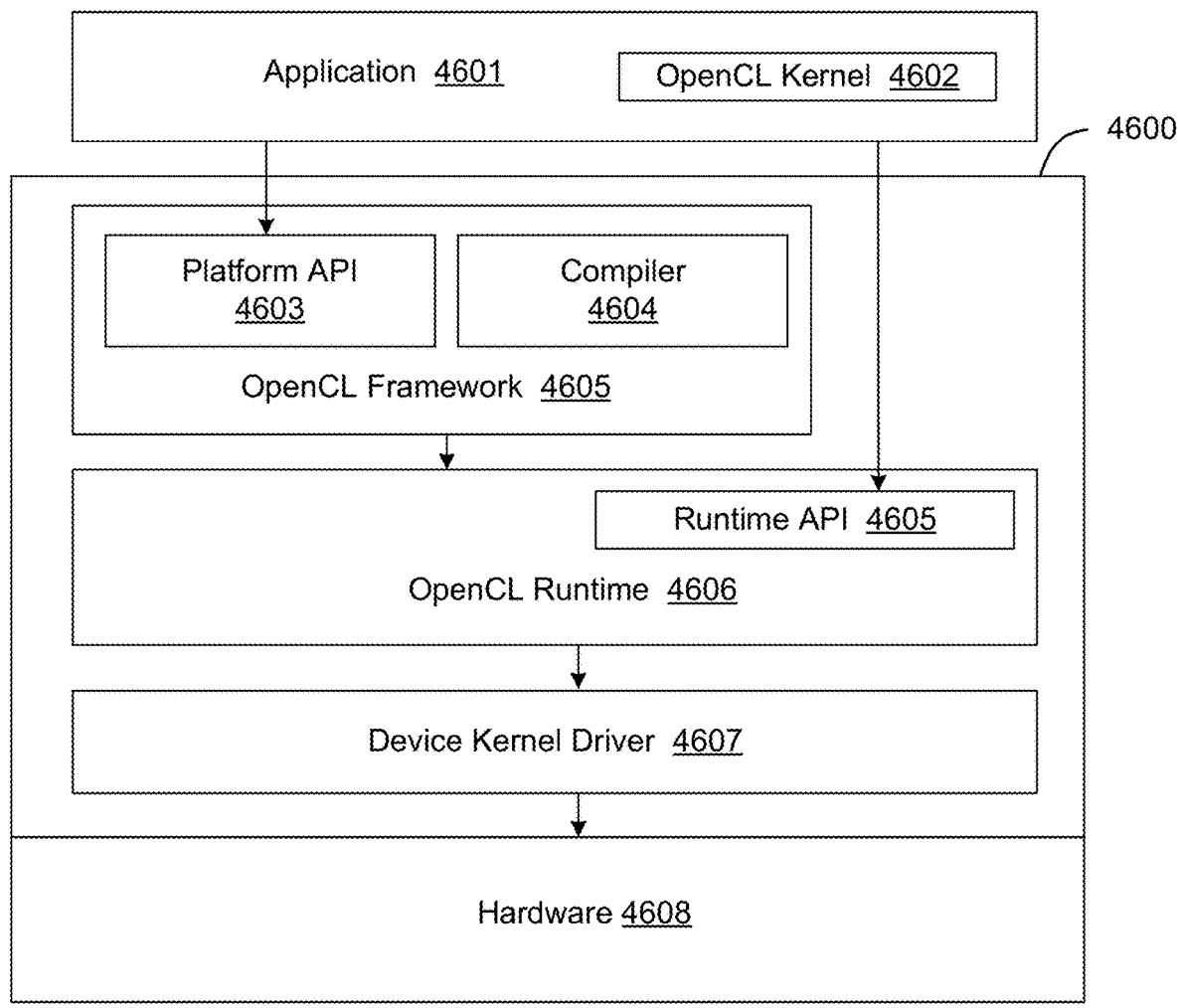
FIG. 46 illustrates an OpenCL implementation of a software stack of FIG. 43, in accordance with at least one embodiment.

FIG. 46 illustrates an OpenCL implementation of software stack 4300 of FIG. 43, in accordance with at least one embodiment. In at least one embodiment, an OpenCL software stack 4600, on which an application 4601 may be launched, includes an OpenCL framework 4605, an OpenCL runtime 4606, and a driver 4607. In at least one embodiment, OpenCL software stack 4600 executes on hardware 4409 that is not vendor-specific. As OpenCL is supported by devices developed by different vendors, specific OpenCL drivers may be required to interoperate with hardware from such vendors, in at least one embodiment.

In at least one embodiment, application 4601, OpenCL runtime 4606, device kernel driver 4607, and hardware 4608 may perform similar functionalities as application 4301, runtime 4305, device kernel driver 4306, and hardware 4307, respectively, that are discussed above in conjunction with FIG. 43. In at least one embodiment, application 4601 further includes an OpenCL kernel 4602 with code that is to be executed on a device.

In at least one embodiment, OpenCL defines a "platform" that allows a host to control devices connected to a host. In at least one embodiment, an OpenCL framework provides a platform layer API and a runtime API, shown as platform API 4603 and runtime API 4605. In at least one embodiment, runtime API 4605 uses contexts to manage execution of kernels on devices. In at least one embodiment, each identified device may be associated with a respective context, which runtime API 4605 may use to manage command queues, program objects, and kernel objects, share memory objects, among other things, for that device. In at least one embodiment, platform API 4603 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 4604 is also included in OpenCL framework 4605. Source code may be compiled offline prior to executing an application or online during execution of an application, in at least one embodiment. In contrast to CUDA and ROCm, OpenCL applications in at least one embodiment may be compiled online by compiler 4604, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

Figure 47:
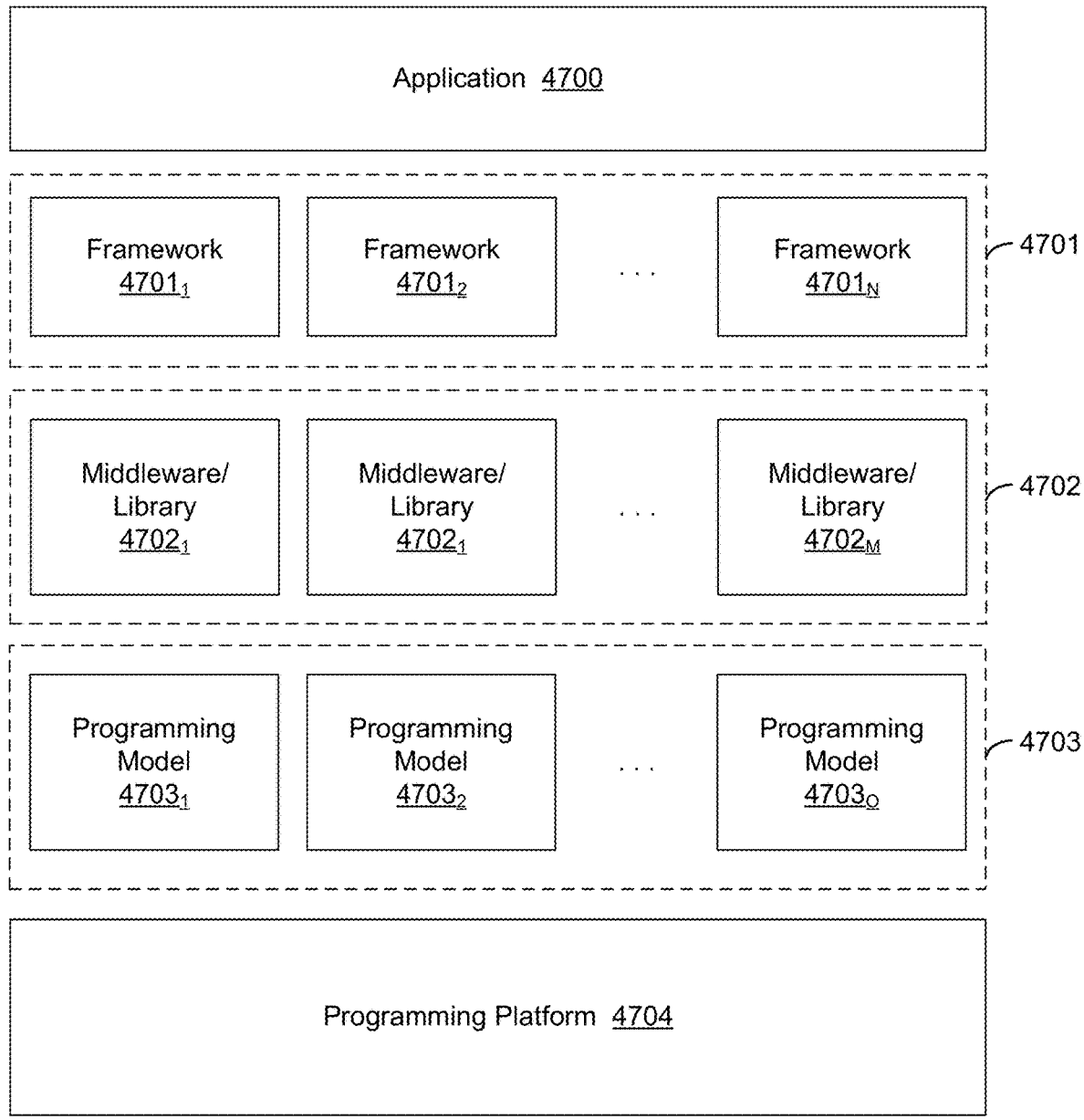
FIG. 47 illustrates software that is supported by a programming platform, in accordance with at least one embodiment.

FIG. 47 illustrates software that is supported by a programming platform, in accordance with at least one embodiment. In at least one embodiment, a programming platform 4704 is configured to support various programming models 4703, middlewares and/or libraries 4702, and frameworks 4701 that an application 4700 may rely upon. In at least one embodiment, application 4700 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 4704 may be one of a CUDA, ROCm, or OpenCL platform described above in conjunction with FIG. 44, FIG. 45, and FIG. 46, respectively. In at least one embodiment, programming platform 4704 supports multiple programming models 4703, which are abstractions of an underlying computing system permitting expressions of algorithms and data structures. Programming models 4703 may expose features of underlying hardware in order to improve performance, in at least one embodiment. In at least one embodiment, programming models 4703 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 4702 provide implementations of abstractions of programming models 4704. In at least one embodiment, such libraries include data and programming code that may be used by computer programs and leveraged during software development. In at least one embodiment, such middlewares include software that provides services to applications beyond those available from programming platform 4704. In at least one embodiment, libraries and/or middlewares 4702 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 4702 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 4701 depend on libraries and/or middlewares 4702. In at least one embodiment, each of application frameworks 4701 is a software framework used to implement a standard structure of application software. An AI/ML application may be implemented using a framework such as Caffe, Caffe2, TensorFlow, Keras, PyTorch, or MxNet deep learning frameworks, in at least one embodiment.

Figure 48:
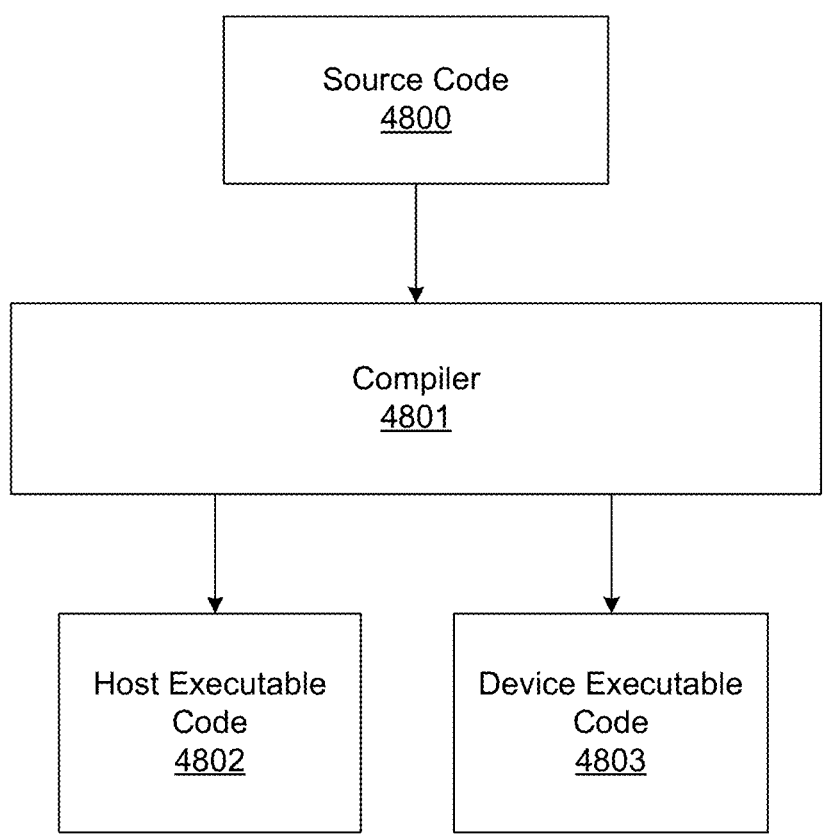
FIG. 48 illustrates compiling code to execute on programming platforms of FIGS. 43-46, in accordance with at least one embodiment.

FIG. 48 illustrates compiling code to execute on one of programming platforms of FIGS. 43-46, in accordance with at least one embodiment. In at least one embodiment, a compiler 4801 receives source code 4800 that includes both host code as well as device code. In at least one embodiment, compiler 4801 is configured to convert source code 4800 into host executable code 4802 for execution on a host and device executable code 4803 for execution on a device. In at least one embodiment, source code 4800 may either be compiled offline prior to execution of an application, or online during execution of an application.

In at least one embodiment, source code 4800 may include code in any programming language supported by compiler 4801, such as C++, C, Fortran, etc. In at least one embodiment, source code 4800 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 4800 may include multiple source code files, rather than a single-source file, into which host code and device code are separated.

In at least one embodiment, compiler 4801 is configured to compile source code 4800 into host executable code 4802 for execution on a host and device executable code 4803 for execution on a device. In at least one embodiment, compiler 4801 performs operations including parsing source code 4800 into an abstract system tree (AST), performing optimizations, and generating executable code. In at least one embodiment in which source code 4800 includes a single-source file, compiler 4801 may separate device code from host code in such a single-source file, compile device code and host code into device executable code 4803 and host executable code 4802, respectively, and link device executable code 4803 and host executable code 4802 together in a single file, as discussed in greater detail below with respect to FIG. 37.

In at least one embodiment, host executable code 4802 and device executable code 4803 may be in any suitable format, such as binary code and/or IR code. In a case of CUDA, host executable code 4802 may include native object code and device executable code 4803 may include code in PTX intermediate representation, in at least one embodiment. In a case of ROCm, both host executable code 4802 and device executable code 4803 may include target binary code, in at least one embodiment.

At least one embodiment of the disclosure can be described in view of the following clauses:

1. A communication apparatus comprising a network interface, packet processing circuitry, and an interface, the network interface to receive a plurality of packet streams transmitting data and at least one redundant copy of the data, the plurality of packet streams comprising a plurality of packets comprising packet identifiers and payloads, each of the payloads being associated with one of the packet identifiers, each of the plurality of packets comprising one of the packet identifiers and one of the payloads, the packet processing circuitry to prevent at least some duplicate storage of the payloads, and determine memory addresses for respective individual ones of the payloads; and the interface to write the individual payloads to respective memory addresses determined by the packet processing circuitry.

2. The communication apparatus of clause 1, wherein the network interface comprises a plurality of connections to receive the plurality of packet streams over multiple different communication channels.

3. The communication apparatus of clause 1 or 2, wherein the packet processing circuitry implements an anti-replay engine that prevents the at least some duplicate storage of the payloads by passing at most a single payload associated with each unique value of the packet identifier.

4. The communication apparatus of clause 3, wherein the packet processing circuitry implements a scatter engine, the anti-replay engine passes the single payload associated with each unique value of the packet identifier to the scatter engine, and the scatter engine determines a memory address for each payload passed to the scatter engine to thereby determine the memory addresses for the respective individual ones of the payloads.

5. The communication apparatus of clause 4, wherein each of the plurality of packets comprises a header comprising the packet identifier, the packet processing circuitry implements a packet parsing engine and a steering engine, the packet parsing engine parses each of the plurality of packets, identifies the header of each of the plurality of packets, and forwards the header and the payload of each of the plurality of packets to the steering engine, and the steering engine identifies the packet identifier inside the header of each of the plurality of packets, and passes the packet identifier and the payload of each of the plurality of packets to the anti-replay engine.

6. The communication apparatus of any one of clauses 1-5, wherein the packet processing circuitry implements an anti-replay engine that prevents the at least some duplicate storage of the payloads by discarding all but one packet having each unique packet identifier received within a sliding window.

7. The communication apparatus of clause 6 for use by a user, wherein a size of the sliding window may be provided by the user.

8. The communication apparatus of clause 6 or 7, wherein a late packet is received outside the sliding window, and the anti-replay engine discards the late packet.

9. The communication apparatus of clause 6 or 7, wherein a late packet is received outside the sliding window, and the anti-replay engine stores the late packet in a queue for subsequent processing.

10. The communication apparatus of any one of clauses 1-9, further comprising: a bus connecting the interface with memory comprising the memory addresses, the interface writing, over the bus, at most only a single copy of the payloads to each of the memory addresses.

11. The communication apparatus of clause 10, wherein the bus is a peripheral component interconnect express ("PCIe") bus.

12. The communication apparatus of any one of clauses 1-11, wherein the payloads comprise a plurality of passed payloads and a plurality of discarded payloads, the packet processing circuitry prevents storage of the plurality of discarded payloads, and the packet processing circuitry determines one of the memory addresses for each of the plurality of passed payloads by mapping the packet identifier associated with the passed payload to one of the memory addresses.

13. The communication apparatus of clause 12, wherein a linear mapping is used to map the packet identifier associated with the passed payload to one of the memory addresses.

14. The communication apparatus of clauses 12 or 13, wherein the payloads comprise a plurality of passed payloads and a plurality of discarded payloads, the packet processing circuitry prevents storage of the plurality of discarded payloads, and the packet processing circuitry determines one of the memory addresses for each of the plurality of passed payloads as a function of an initial sequence number, the packet identifier associated with the passed payload, a size of the passed payload, and a base one of the memory addresses.

15. A communication apparatus comprising circuitry and a network interface, the circuitry to add a header comprising a unique packet identifier to each of a plurality of packets, duplicate each of the plurality of packets after the header is added thereto to thereby create a plurality of duplicate packets each having a duplicate header, modify an address in the duplicate header of each of the plurality of duplicate packets, and send at least one notification to a different communication apparatus that transmission of the plurality of packets and the plurality of duplicate packets is being initiated, and the network interface to transmit the plurality of packets and the plurality of duplicate packets as a plurality of packet streams to the different communication apparatus over multiple different communication channels.

16. The communication apparatus of clause 15, wherein the plurality of packet streams are each sent via a different port of the network interface.

17. The communication apparatus of clauses 15 or 16, wherein those of the plurality of packets and the plurality of duplicate packets having identical packet identifiers are transmitted with low jitter.

18. The communication apparatus of any one of clauses 15-17, further comprising: a host interface to receive data from at least one host processor and packetize the data into the plurality of packets.

19. The communication apparatus of clause 18, wherein the data is video data, and the communication apparatus further comprises a video camera to capture the video data and transmit the video data to the host interface.

20. The communication apparatus of any one of clauses 15-19, wherein the circuitry implements an Internet Protocol Security engine that generates the unique packet identifier.

21. The communication apparatus of any one of clauses 15-20, wherein the unique packet identifier is a packet sequence number generated in accordance with Real-time Transport Protocol ("RTP") for Society of Motion Picture and Television Engineers ("SMPTE") 2022-7.

22. The communication apparatus of any one of clauses 15-21, wherein the network interface comprises a different connection connected to each of the multiple different communication channels, and the network interface transmits each of the plurality of packet streams over a different one of the multiple different communication channels via the different connection connected thereto.

23. The communication apparatus of any one of clauses 15-22, wherein modifying the address in the duplicate header of each of the plurality of duplicate packets comprises changing a User Datagram Protocol ("UDP")) source port value.

24. The communication apparatus of clause 23, wherein modifying the address in the duplicate header of each of the plurality of duplicate packets comprises changing a source Media Access Control ("MAC") address value.

25. A system comprising a packet source and a receiver device, the packet source to transmit a plurality of packets comprising a plurality of payloads associated one each with a plurality of packet identifiers, as a plurality of packet streams over multiple different communication channels, the receiver device comprising circuitry that receives the plurality of packet streams, prevents duplicate storage of at least some of the plurality of payloads, determines memory addresses for respective individual payloads, and writes payloads to respective memory addresses determined by the circuitry.

26. The system of clause 25, wherein the packet source comprises a virtual machine.

27. The system of clauses 25 or 26, wherein the circuitry implements an anti-replay engine and a scatter engine, the anti-replay engine prevents the at least some duplicate storage of the payloads by passing, to the scatter engine, at most a single payload associated with each unique value of the packet identifier, and the scatter engine determining a memory address for each payload passed to the scatter engine to thereby determine the memory addresses for the respective individual ones of the payloads.

28. The system of any one of clauses 25-27, wherein the circuitry implements an anti-replay engine that prevents the at least some duplicate storage of the payloads by discarding all but one packet having each unique packet identifier received within a sliding window.

29. The system of clause 28, wherein a late packet is received outside the sliding window, and the anti-replay engine at least one of discards the late packet or stores the late packet in a queue for subsequent processing.

30. The system of any one of clauses 25-29, wherein the payloads comprise a plurality of passed payloads and a plurality of discarded payloads, the circuitry prevents storage of the plurality of discarded payloads, and the circuitry determines one of the memory addresses for each of the plurality of passed payloads by mapping the packet identifier associated with the passed payload to one of the memory addresses.

31. The system of clause 30, wherein a linear mapping is used to map the packet identifier associated with the passed payload to one of the memory addresses.

32. The system of any one of clauses 25-31, wherein the payloads comprise a plurality of passed payloads and a plurality of discarded payloads, the circuitry prevents storage of the plurality of discarded payloads, and the circuitry determines one of the memory addresses for each of the plurality of passed payloads as a function of an initial sequence number, the packet identifier associated with the passed payload, a size of the passed payload, and a base one of the memory addresses.

33. The system of any one of clauses 25-32, wherein the packet source comprises a sender device with circuitry that adds a unique one of the plurality of packet identifiers to each of a plurality of initial packets, duplicates each of the plurality of initial packets after the unique packet identifier is added to each of the plurality of initial packets to create a plurality of duplicate packets, and transmits the plurality of initial packets and the plurality of duplicate packets as the plurality of packet streams over the multiple different communication channels.

34. The system of clause 33, wherein at least one of the sender device or the receiver device is an autonomous vehicle.

35. The system of clause 34, wherein the sender device is an autonomous vehicle, the autonomous vehicle comprises at least one sensor, and the plurality of payloads each comprise information based on sensor data obtained from the at least one sensor.

36 The system of clause 35, wherein the sender device comprises a video camera to capture video data and an interface to packetize the video data into the plurality of initial packets.

37. The system of clause 36, wherein the plurality of payloads each comprise a slice of the video data.

38. A method comprising: receiving a plurality of packet streams transmitted over multiple different communication channels, the plurality of packet streams comprising a plurality of packets comprising a plurality of payloads associated one each with a plurality of packet identifiers; identifying one copy of each of at least some of the plurality of payloads; determining a memory address for each of the identified payloads; and writing each of the identified payloads to the memory address determined for the identified payload.

39. The method of clause 38, further comprising discarding all but one of the plurality of packets associated with each unique one of the plurality of packet identifiers received within a sliding window.

40. The method of clause 39, wherein a late packet is received outside the sliding window, and the method further comprises discarding the late packet or storing the late packet in a queue for subsequent processing.

41. The method of any one of clauses 38-40, wherein determining the memory address for each of the identified payloads comprises mapping the packet identifier associated with each of the identified payloads to the memory address.

42. The method of clause 41, wherein a linear mapping is used to map the packet identifier associated with each of the identified payloads to the memory address.

43. The method of any one of clauses 38-42, wherein a function of an initial sequence number, the packet identifier associated with each of the identified payloads, a size of each of the identified payloads, and a base memory address is used to map the packet identifier associated with each of the identified payloads to the memory address.

44. The method of any one of clauses 38-43, further comprising: adding a unique one of the plurality of packet identifiers to each of a plurality of initial packets; duplicating each of the plurality of initial packets after the unique packet identifier is added to each of the plurality of packets to create a plurality of duplicate packets; and transmitting the plurality of initial packets and the plurality of duplicate packets as the plurality of packet streams over the multiple different communication channels.

45. A communication apparatus comprising a network interface and packet processing circuitry, the network interface to receive a plurality of packets, each of the plurality of packets comprising at least one packet identifier and at least one payload, and the packet processing circuitry to detect a redundant packet, and prevent at least some duplicate storage of redundant packets.

46. The communication apparatus of clause 45, wherein the redundant packet is detected based on a redundant one of the at least one packet identifier or a redundant one of the at least one payload.

47. The communication apparatus of clauses 45 or 46, wherein the network interface comprises a plurality of connections to receive the plurality of packets as a plurality of packet streams over multiple different communication channels.

48. The communication apparatus of any one of clauses 45-47, wherein a plurality of packet identifiers comprises the at least one packet identifier of each of the plurality of packets, and the packet processing circuitry implements an anti-replay engine that prevents the at least some duplicate storage of the redundant packets by passing at least one unique packet comprising at most a single one of the plurality of packets having each unique value of the plurality of packet identifiers.

49. The communication apparatus of clause 48, wherein the packet processing circuitry implements a scatter engine, the anti-replay engine passes the at least one unique packet to the scatter engine, and the scatter engine determines a memory address for each of the at least one unique packet passed to the scatter engine.

50. The communication apparatus of clause 49, wherein each of the plurality of packets comprises a header comprising the at least one packet identifier, the packet processing circuitry implements a packet parsing engine and a steering engine, the packet parsing engine parses each of the plurality of packets, identifies the header of each of the plurality of packets, and forwards the header and the at least one payload of each of the plurality of packets to the steering engine, and the steering engine identifies the at least one packet identifier inside the header of each of the plurality of packets, and passes the at least one packet identifier and the at least one payload of each of the plurality of packets to the anti-replay engine.

51. The communication apparatus of any one of clauses 45-50, wherein a plurality of packet identifiers comprises the at least one packet identifier of each of the plurality of packets, and the packet processing circuitry implements an anti-replay engine that prevents the at least some duplicate storage of the redundant packets by discarding all but one packet having each unique one of the plurality of packet identifiers received within a sliding window.

52. The communication apparatus of clause 51 for use by a user, wherein a size of the sliding window may be provided by the user.

53. The communication apparatus of clauses 51 or 52, wherein a late packet is received outside the sliding window, and the anti-replay engine discards the late packet.

54. The communication apparatus of clauses 51 or 52, wherein a late packet is received outside the sliding window, and the anti-replay engine stores the late packet in a queue for subsequent processing.

55. The communication apparatus of any one of clauses 45-54, wherein the plurality of packets comprises one or more passed packets and one or more discarded packets, and the packet processing circuitry is to prevent storage of the one or more discarded packets, and determine a memory address for each of the one or more passed packets.

56. The communication apparatus of clause 55, further comprising: an interface to write each of the one or more passed packets to the memory address determined for the passed packet.

57. The communication apparatus of clause 56, further comprising: a bus connecting the interface with memory comprising the memory address determined for each of the one or more passed packets, the interface writing, over the bus, at most only a single copy of each of the one or more passed packets to the memory address determined for the passed packet.

58. The communication apparatus of clause 57, wherein the bus is a peripheral component interconnect express ("PCIe") bus.

59. The communication apparatus of any one of clauses 55-58, wherein the packet processing circuitry is to determine the memory address for each of the one or more passed packets by mapping the at least one packet identifier of the passed packet to the memory address.

60. The communication apparatus of any one of clauses 55-58, wherein the packet processing circuitry is to determine the memory address for each of the one or more passed packets by using a linear mapping to map the at least one packet identifier of the passed packet to the memory address.

61. The communication apparatus of any one of clauses 55-58, wherein the packet processing circuitry is to determine the memory address for each of the one or more passed packets as a function of an initial packet identifier, the at least one packet identifier of the passed packet, a size of the at least one payload of the passed packet, and a base memory address.

62. A communication apparatus comprising: a network interface to receive a plurality of packets comprising a plurality of packet identifiers; and packet processing circuitry comprising an anti-replay engine that prevents at least some duplicate storage of redundant packets by discarding one or more of those of the plurality of packets comprising duplicate ones of the plurality of packet identifiers.

63. The communication apparatus of clause 62, wherein the plurality of packets comprise a plurality of payloads, and the plurality of packet identifiers comprise at least a portion of each of the plurality of payloads.

64. The communication apparatus of clause 62 or 63, wherein the network interface comprises a plurality of connections to receive the plurality of packets as a plurality of packet streams over multiple different communication channels.

65. The communication apparatus of any one of clauses 62-64, wherein the anti-replay engine discards all but a single one of the plurality of packets having each unique value of the plurality of packet identifiers.

66. The communication apparatus of clause 65, wherein the packet processing circuitry implements a scatter engine, the anti-replay engine passes to the scatter engine as passed packets those of the plurality of packets that have not been discarded, and the scatter engine determines a memory address for each of the passed packets.

67. The communication apparatus of clause 66, wherein each of the plurality of packets comprises a header comprising an associated one of the plurality of packet identifiers, each of the plurality of packets comprises a payload, the packet processing circuitry implements a packet parsing engine and a steering engine, the packet parsing engine parses each of the plurality of packets, identifies the header of each of the plurality of packets, and forwards the header and the payload of each of the plurality of packets to the steering engine, and the steering engine identifies the associated packet identifier inside the header of each of the plurality of packets, and passes the associated packet identifier and the payload of each of the plurality of packets to the anti-replay engine.

68. The communication apparatus of any one of clauses 62-67, wherein the anti-replay engine discards all but one packet having each unique one of the plurality of packet identifiers received within a sliding window.

69. The communication apparatus of clause 68 for use by a user, wherein a size of the sliding window may be provided by the user.

70. The communication apparatus of clauses 68 or 69, wherein a late packet is received outside the sliding window, and the anti-replay engine discards the late packet.

71. The communication apparatus of any one of clauses 68-70, wherein a late packet is received outside the sliding window, and the anti-replay engine stores the late packet in a queue for subsequent processing.

72. The communication apparatus of any one of clauses 62-71, wherein the plurality of packets comprises one or more passed packets and one or more discarded packets, the one or more discarded packets comprise any of the plurality of packets discarded by the anti-replay engine, and the packet processing circuitry is to determine a memory address for each of the one or more passed packets.

73. The communication apparatus of clause 72, further comprising: an interface to write each of the one or more passed packets to the memory address determined for the passed packet.

74. The communication apparatus of clause 73, further comprising: a bus connecting the interface with memory comprising the memory address determined for each of the one or more passed packets, the interface writing, over the bus, at most only a single copy of each of the one or more passed packets to the memory address determined for the passed packet.

75. The communication apparatus of clause 74, wherein the bus is a peripheral component interconnect express ("PCIe") bus.

76. The communication apparatus of any one of clauses 72-75, wherein the packet processing circuitry is to determine the memory address for each of the one or more passed packets by mapping one of the plurality of packet identifiers associated with the passed packet to the memory address.

77. The communication apparatus of any one of clauses 72-75, wherein the packet processing circuitry is to determine the memory address for each of the one or more passed packets by using a linear mapping to map one of the plurality of packet identifiers associated with the passed packet to the memory address.

78. The communication apparatus of any one of clauses 72-75, wherein the packet processing circuitry is to determine the memory address for each of the one or more passed packets as a function of an initial packet identifier, one of the plurality of packet identifiers associated with the passed packet, a size of a payload of the passed packet, and a base memory address.

79. A method comprising: (a) adding, by a sending communication apparatus, a plurality of packet identifiers one each to each of a plurality of packets; (b) duplicating, by the sending communication apparatus, each of the plurality of packets after the plurality of packet identifiers has been added thereto to thereby create a plurality of duplicate packets; (c) modifying, by the sending communication apparatus, an address in each of the plurality of duplicate packets; (d) transmitting, by the sending communication apparatus, the plurality of packets and the plurality of duplicate packets as a plurality of packet streams to a receiving communication apparatus over multiple different communication channels; (e) receiving, by the receiving communication apparatus, the plurality of packet streams; and (f) discarding, by an anti-replay engine of the receiving communication apparatus, at least one packet received in the plurality of packet streams comprising a packet identifier that is identical to another packet identifier of a different packet received in the plurality of packet streams.

80. The method of clause 79, wherein the sending communication apparatus transmits each of the plurality of packet streams via a different port of a network interface of the sending communication apparatus.

81. The method of clauses 79 or 80, wherein the sending communication apparatus transmits those of the plurality of packets and the plurality of duplicate packets having identical packet identifiers with low jitter.

82. The method of any one of clauses 79-81, further comprising: receiving, by a host interface of the sending communication apparatus, data from at least one host processor; and packetizing, by the host interface, the data into the plurality of packets.

83. The method of clause 82, wherein the data is video data, and the method further comprises: capturing, by a video camera, the video data; and transmitting, by the video camera, the video data to the host interface.

84. The method of any one of clauses 79-83, further comprising: generating, by an Internet Protocol Security engine of the sending communication apparatus, the plurality of packet identifiers.

85. The method of any one of clauses 79-84, wherein each of the plurality of packet identifiers is a packet sequence number generated in accordance with Real-time Transport Protocol ("RTP") for Society of Motion Picture and Television Engineers ("SMPTE") 2022-7.

86. The method of any one of clauses 79-85, wherein modifying the address in each of the plurality of duplicate packets comprises changing a User Datagram Protocol ("UDP")) source port value.

87. The method of clause 86, wherein modifying the address in each of the plurality of duplicate packets comprises changing a source Media Access Control ("MAC") address value.

88. A system comprising: a packet source that transmits a plurality of packets comprising a plurality of payloads associated one each with a plurality of packet identifiers, as a plurality of packet streams over multiple different communication channels; and a receiver device comprising circuitry that receives the plurality of packet streams, expects to receive particular ones of the plurality of packet identifiers within a sliding window, prevents duplicate storage of at least some of the plurality of payloads by creating an ordered data set comprising at most a single one of the plurality of packets having each of the particular packet identifiers received within the sliding window, and forwards those of the plurality of payloads associated with the plurality of packets included in the ordered data set to a component external to the receiver device for additional processing.

89. The system of clause 88, wherein the packet source comprises a virtual machine.

90. The system of clauses 88 or 89, wherein the circuitry implements an anti-replay engine and a scatter engine, those of the plurality of payloads associated with the plurality of packets included in the ordered data set are forwarded payloads, the anti-replay engine creates the ordered data and forwards the forwarded payloads to the scatter engine, the scatter engine determines a memory address for each of the forwarded payloads, and the additional processing comprises storing each of the forwarded payloads in the memory address determined for the forwarded payload.

91. The system of any one of clauses 88-90, wherein those of the plurality of payloads associated with the plurality of packets included in the ordered data set are passed payloads and others of the plurality of payloads are discarded payloads, the circuitry prevents storage of the discarded payloads, the circuitry determines a memory address for each of the passed payloads by mapping the packet identifier associated with the passed payload to the memory address, and the additional processing comprises storing each of the passed payloads in the memory address determined for the passed payload.

92. The system of clause 91, wherein for each of the passed payloads, a linear mapping is used to map the packet identifier associated with the passed payload to the memory address determined for the passed payload.

93. The system of any one of clauses 88-92, wherein those of the plurality of payloads associated with the plurality of packets included in the ordered data set are passed payloads and others of the plurality of payloads are discarded payloads, the circuitry prevents storage of the discarded payloads, the circuitry determines a memory address for each of the passed payloads as a function of an initial sequence number, the packet identifier associated with the passed payload, a size of the passed payload, and a base one of the memory addresses, and the additional processing comprises storing each of the passed payloads in the memory address determined for the passed payload.

94. The system of any one of clauses 88-93, wherein a late packet is received outside the sliding window, and the circuitry at least one of discards the late packet or stores the late packet in a queue for subsequent processing.

95. The system of any one of clauses 88-94, wherein the packet source comprises a sender device with circuitry that adds a unique one of the plurality of packet identifiers to each of a plurality of initial packets, duplicates each of the plurality of initial packets after the unique packet identifier is added to each of the plurality of initial packets to create a plurality of duplicate packets, and transmits the plurality of initial packets and the plurality of duplicate packets as the plurality of packet streams over the multiple different communication channels.

96. The system of clause 95, wherein at least one of the sender device or the receiver device is an autonomous vehicle.

97. The system of clause 96, wherein the sender device is an autonomous vehicle, the autonomous vehicle comprises at least one sensor, and the plurality of payloads each comprise information based on sensor data obtained from the at least one sensor.

98. The system of clause 97, wherein the sender device comprises a video camera to capture video data and an interface to packetize the video data into the plurality of initial packets.

99. The system of clause 98, wherein the plurality of payloads each comprise a slice of the video data.

100. A method comprising: (a) receiving a plurality of packet streams transmitted over multiple different communication channels, the plurality of packet streams comprising a plurality of packets comprising a plurality of payloads associated one each with a plurality of packet identifiers; (b) identifying one copy of each of at least some of the plurality of payloads by creating an ordered data set comprising a subset of the plurality of packets, the subset of packets comprising a subset of packet identifiers, each particular packet identifier in the subset of packet identifiers having been received in a particular packet of the subset of packets before any other packets having the particular packet identifier were received; (c) determining a memory address for each of the identified payloads; and (d) writing each of the identified payloads to the memory address determined for the identified payload.

101. The method of clause 100, further comprising: discarding all but one of the plurality of packets associated with each unique one of the plurality of packet identifiers received within a sliding window.

102. The method of clause 101, wherein a late packet is received outside the sliding window, and the method further comprises: discarding the late packet or storing the late packet in a queue for subsequent processing.

103. The method of any one of clauses 100-102, wherein determining the memory address for each of the identified payloads comprises: mapping the packet identifier associated with each of the identified payloads to the memory address.

104. The method of clause 103, wherein a linear mapping is used to map the packet identifier associated with each of the identified payloads to the memory address.

105. The method of clauses 103 or 104, wherein a function of an initial sequence number, the packet identifier associated with each of the identified payloads, a size of each of the identified payloads, and a base memory address is used to map the packet identifier associated with each of the identified payloads to the memory address.

106. The method of any one of clauses 100-105, further comprising: adding a unique one of the plurality of packet identifiers to each of a plurality of initial packets; duplicating each of the plurality of initial packets after the unique packet identifier is added to each of the plurality of initial packets to create a plurality of duplicate packets; and transmitting the plurality of initial packets and the plurality of duplicate packets as the plurality of packet streams over the multiple different communication channels.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium. In at least one embodiment, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—in at least one embodiment, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, in at least one embodiment, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or inter-process communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A communication apparatus comprising:
  at least one connection to host memory of a host computing system comprising the communication apparatus, and at least one host processor;
  a network interface to receive a plurality of packets for transmitting at least a message, each of the plurality of packets comprising a packet identifier of a plurality of packet identifiers and at least one payload; and
  packet processing circuitry to:
  order at least a portion of the plurality of packets received in a particular stream within a sliding window;
  discard any late packets received in the particular stream outside the sliding window;

maintain a bit vector comprising bits corresponding to the plurality of packet identifiers and indicating which of the plurality of packet identifiers have been received in at least one of the plurality of packets, a particular one of the bits to indicate that a corresponding packet identifier has been received if the particular bit is set;

detect as one or more redundant packets any of the plurality of packets comprising a received packet identifier corresponding to a bit in the bit vector that is set, drop the one or more redundant packets to prevent communication of the one or more redundant packets over the at least one connection, receive a base address within the host memory from the at least one host processor, store a reconstructed version of the message in the host memory by storing each remaining packet in a set of remaining packets in the host memory at a location determined based at least in part on the base address, and the packet identifier of the remaining packet; and notify the host computing system after the reconstructed version of the message has been stored in the host memory.

2. The communication apparatus of claim 1, wherein the network interface is to receive the plurality of packets in a plurality of packet streams comprising the particular stream, and the packet processing circuitry is to:

maintain a plurality of ordered data sets corresponding to the plurality of packet streams;

use the bit vector to determine which of the plurality of packets received in the plurality of packet streams are to be stored in the plurality of ordered data sets; and combine the plurality of ordered data sets to define the set of remaining packets.

3. The communication apparatus of claim 1, wherein the network interface is to comprise a plurality of connections to receive the plurality of packets as a plurality of packet streams comprising the particular stream over multiple different communication channels.

4. The communication apparatus of claim 1, wherein a set of remaining packets is to comprise each remaining packet stored in the host memory, and the packet processing circuitry comprises anti-replay circuitry that is to identify the one or more redundant packets, drop the one or more redundant packets, and pass the set of remaining packets.

5. The communication apparatus of claim 4, wherein the packet processing circuitry comprises scatter circuitry, the anti-replay circuitry is to pass the set of remaining packets to the scatter circuitry, and the scatter circuitry is to determine the location for each remaining packet in the set of remaining packets.

6. The communication apparatus of claim 5, wherein each of the plurality of packets is to comprise a header comprising the packet identifier, the packet processing circuitry comprises packet parsing circuitry and steering circuitry, the packet parsing circuitry is to parse each of the plurality of packets, identify the header of each of the plurality of packets, and forward the header and the at least one payload of each of the plurality of packets to the steering circuitry, and the steering circuitry is to identify the packet identifier inside the header of each of the plurality of packets, and pass the packet identifier and the at least one payload of each of the plurality of packets to the anti-replay circuitry.

7. The communication apparatus of claim 1, wherein a size of the sliding window is to be received from a user.

8. The communication apparatus of claim 1, wherein the at least one connection comprises a bus.

9. The communication apparatus of claim 8, wherein the bus is a peripheral component interconnect express ("PCIe") bus.

10. The communication apparatus of claim 1, wherein the packet processing circuitry is to determine the location of each remaining packet by mapping the packet identifier of the remaining packet to the location.

11. The communication apparatus of claim 1, wherein the packet processing circuitry is to determine the location of each remaining packet by using a linear mapping to map the packet identifier of the remaining packet to the location.

12. The communication apparatus of claim 1, wherein the packet processing circuitry is to determine the location of each remaining packet as a function of an initial packet identifier, the packet identifier of the remaining packet, a size of the at least one payload of the remaining packet, and a base memory address.

13. A system comprising:

a packet source comprising a virtual machine, the packet source to transmit a plurality of packets comprising a plurality of payloads associated one each with a plurality of packet identifiers, as a plurality of packet streams over multiple different communication channels; and a receiver device comprising at least one processor, a memory, and a network interface, the network interface comprising circuitry to receive the plurality of packet streams transmitting at least a message, use a bit vector to detect one or more redundant packets in the plurality of packet streams, discard the one or more redundant packets to avoid communication of the one or more redundant packets over a connection to the memory, receive a base address within the memory from the at least one processor, determine memory addresses for respective individual payloads based, at least in part, on the base address, write payloads to respective memory addresses determined by the circuitry, and notify the at least one processor after the payloads have been written to the respective memory addresses.

14. The system of claim 13, wherein the circuitry comprises anti-replay circuitry and scatter circuitry, the anti-replay circuitry passes, to the scatter circuitry, at most a single payload associated with each unique value of the plurality of packet identifiers, and the scatter circuitry determines a memory address for each payload passed to the scatter circuitry to thereby determine the memory addresses for respective individual ones of the payloads.

15. The system of claim 13, wherein the circuitry is to order a portion of the plurality of packets received in each of the plurality of packet streams within a sliding window.

16. The system of claim 15, wherein a late packet is received outside the sliding window, and the circuitry at least one of discards the late packet or stores the late packet in a queue for subsequent processing.

17. The system of claim 13, wherein the payloads comprise a plurality of passed payloads and a plurality of discarded payloads, the circuitry prevents storage of the plurality of discarded payloads, and the circuitry determines one of the memory addresses for each of the plurality of passed payloads by mapping a packet identifier associated with the passed payload to one of the memory addresses.

18. The system of claim 17, wherein a linear mapping is used to map the packet identifier associated with the passed payload to one of the memory addresses.

19. The system of claim 13, wherein the payloads comprise a plurality of passed payloads and a plurality of discarded payloads,
the circuitry prevents storage of the plurality of discarded payloads, and
the circuitry determines one of the memory addresses for each of the plurality of passed payloads as a function of an initial sequence number, a packet identifier associated with the passed payload, a size of the passed payload, and a base one of the memory addresses.

20. The system of claim 13, wherein the packet source comprises a sender device with circuitry that implements the virtual machine, adds a unique one of the plurality of packet identifiers to each of a plurality of initial packets, duplicates each of the plurality of initial packets after the unique packet identifier is added to each of the plurality of initial packets to create a plurality of duplicate packets, and transmits the plurality of initial packets and the plurality of duplicate packets as the plurality of packet streams over the multiple different communication channels.

21. The system of claim 20, wherein at least one of the sender device or the receiver device is an autonomous vehicle.

22. The system of claim 21, wherein the sender device is an autonomous vehicle,
the autonomous vehicle comprises at least one sensor, and
the plurality of payloads each comprise information based on sensor data obtained from the at least one sensor.

23. The system of claim 22, wherein the sender device comprises a video camera to capture video data and an interface to packetize the video data into the plurality of initial packets.

24. The system of claim 23, wherein the plurality of payloads each comprise a slice of the video data.

25. A method comprising:
receiving, by a network interface of a computing system comprising at least one processor, a plurality of packet streams transmitted over multiple different communication channels, the plurality of packet streams comprising a plurality of packets comprising a plurality of payloads associated one each with a plurality of packet identifiers;
using, by the network interface, a bit vector to identify a subset of the plurality of packets comprising one copy of each of at least some of the plurality of packet identifiers;
discarding, by the network interface, one or more of the plurality of packets not included in the subset to prevent communication of the one or more packets over a connection to a memory of the computer system, wherein discarding the one or more packets comprises discarding all but one of the plurality of packets associated with each unique one of the plurality of packet identifiers received within a sliding window, and the memory is separate from the network interface;
if a late packet is received outside the sliding window, discarding the late packet or storing the late packet in a queue for subsequent processing;
receiving, by the network interface, a base memory address within the memory from the at least one processor;
determining, by the network interface, a memory address within the memory for a payload of each packet in the subset based at least in part on the base memory address;
writing, by the network interface, the payload of each packet in the subset to the memory address determined for the payload; and
notifying, by the network interface, the computing system after the payload of each packet in the subset has been written to the memory.

26. The method of claim 25, wherein determining the memory address for the payload of each packet in the subset comprises:
mapping a packet identifier associated with the payload of each packet in the subset to the memory address.

27. The method of claim 26, wherein a linear mapping is used to map the packet identifier associated with the payload of each packet in the subset to the memory address.

28. The method of claim 26, wherein, for each packet in the subset, a function of an initial sequence number, the packet identifier associated with the payload of the packet, a size of the payload of the packet, and the base memory address is used to map the packet identifier associated with the payload of the packet to the memory address.

29. The method of claim 25, further comprising:
adding a unique one of the plurality of packet identifiers to each of a plurality of initial packets;
duplicating each of the plurality of initial packets after the unique packet identifier is added to each of the plurality of initial packets to create a plurality of duplicate packets; and
transmitting the plurality of initial packets and the plurality of duplicate packets as the plurality of packet streams over the multiple different communication channels.

30. A communication apparatus comprising:
at least one connection to host memory of a host computing system comprising the communication apparatus, and at least one host processor;
a network interface to receive a plurality of packets for transmitting at least a message, each of the plurality of packets comprising a packet identifier of a plurality of packet identifiers and at least one payload; and
packet processing circuitry to:
order at least a portion of the plurality of packets received in a particular stream within a sliding window;
store any late packets received in the particular stream outside the sliding window in a queue for subsequent processing;
maintain a bit vector comprising bits corresponding to the plurality of packet identifiers and indicating which of the plurality of packet identifiers have been received in at least one of the plurality of packets, a particular one of the bits to indicate that a corresponding packet identifier has been received if the particular bit is set;
detect as one or more redundant packets any of the plurality of packets comprising a received packet identifier corresponding to a bit in the bit vector that is set,
drop the one or more redundant packets to prevent communication of the one or more redundant packets over the at least one connection,
receive a base address within the host memory from the at least one host processor,
store a reconstructed version of the message in the host memory by storing each remaining packet in a set of remaining packets in the host memory at a location determined based at least in part on the base address, and the packet identifier of the remaining packet; and notify the host computing system after the reconstructed version of the message has been stored in the host memory.

31. The communication apparatus of claim 30, wherein the network interface is to receive the plurality of packets in a plurality of packet streams comprising the particular stream, and the packet processing circuitry is to:

maintain a plurality of ordered data sets corresponding to the plurality of packet streams;

use the bit vector to determine which of the plurality of packets received in the plurality of packet streams are to be stored in the plurality of ordered data sets; and combine the plurality of ordered data sets to define the set of remaining packets.

32. The communication apparatus of claim 30, wherein the network interface is to comprise a plurality of connections to receive the plurality of packets as a plurality of packet streams comprising the particular stream over multiple different communication channels.

33. The communication apparatus of claim 30, wherein a set of remaining packets is to comprise each remaining packet stored in the host memory, and the packet processing circuitry comprises anti-replay circuitry that is to identify the one or more redundant packets, drop the one or more redundant packets, and pass the set of remaining packets.

34. The communication apparatus of claim 33, wherein the packet processing circuitry comprises scatter circuitry, the anti-replay circuitry is to pass the set of remaining packets to the scatter circuitry, and the scatter circuitry is to determine the location for each remaining packet in the set of remaining packets.

35. The communication apparatus of claim 34, wherein each of the plurality of packets is to comprise a header comprising the packet identifier, the packet processing circuitry comprises packet parsing circuitry and steering circuitry, the packet parsing circuitry is to parse each of the plurality of packets, identify the header of each of the plurality of packets, and forward the header and the at least one payload of each of the plurality of packets to the steering circuitry, and the steering circuitry is to identify the packet identifier inside the header of each of the plurality of packets, and pass the packet identifier and the at least one payload of each of the plurality of packets to the anti-replay circuitry.

36. The communication apparatus of claim 30, wherein a size of the sliding window is to be received from a user.

37. The communication apparatus of claim 30, wherein the at least one connection comprises a bus.

38. The communication apparatus of claim 37, wherein the bus is a peripheral component interconnect express ("PCIe") bus.

39. The communication apparatus of claim 30, wherein the packet processing circuitry is to determine the location of each remaining packet by mapping the packet identifier of the remaining packet to the location.

40. The communication apparatus of claim 30, wherein the packet processing circuitry is to determine the location of each remaining packet by using a linear mapping to map the packet identifier of the remaining packet to the location.

41. The communication apparatus of claim 30, wherein the packet processing circuitry is to determine the location of each remaining packet as a function of an initial packet identifier, the packet identifier of the remaining packet, a size of the at least one payload of the remaining packet, and a base memory address.

\* \* \* \* \*